United States Patent
Walker et al.

(10) Patent No.: US 7,860,753 B2
(45) Date of Patent: *Dec. 28, 2010

(54) PURCHASING, REDEMPTION, AND SETTLEMENT SYSTEMS AND METHODS WHEREIN A BUYER TAKES POSSESSION AT A RETAILER OF A PRODUCT PURCHASED USING A COMMUNICATION NETWORK

(75) Inventors: Jay S. Walker, Ridgefield, CT (US); Andrew S. Van Luchne, Santa Fe, NM (US); Magdalena M. Fincham, Ridgefield, CT (US); Daniel E. Tedesco, Huntington, CT (US)

(73) Assignee: Walker Digital, LLC, Stamford, CT (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/930,893

(22) Filed: Oct. 31, 2007

(65) Prior Publication Data

US 2008/0052189 A1 Feb. 28, 2008

Related U.S. Application Data

(60) Division of application No. 10/821,255, filed on Apr. 8, 2004, now abandoned, which is a continuation-in-part of application No. 09/337,906, filed on Jun. 22, 1999, now Pat. No. 6,754,636, which is a continuation-in-part of application No. 08/889,503, filed on Jul. 8, 1997, now Pat. No. 6,249,772, and a continuation-in-part of application No. 08/889,319, filed on Jul. 8, 1997, now Pat. No. 6,085,169, and a continuation-in-part of application No. 09/190,744, filed on Nov. 12, 1998, now abandoned, which is a continuation of application No. 08/707,660, filed on Sep. 4, 1996, now Pat. No. 5,794,207, said application No. 09/337,906 is a continuation-in-part of application No. 09/083,345, filed on May 22, 1998, now abandoned, said application No. 10/821,255 is a continuation-in-part of application No. 09/388,723, filed on Sep. 2, 1999, now abandoned, which is a continuation-in-part of application No. 09/337,345, filed on Jun. 21, 1999, now Pat. No. 6,404,729, which is a continuation-in-part of application No. 08/889,503, filed on Jul. 8, 1997, now Pat. No. 6,249,772, said application No. 09/388,723 is a continuation-in-part of application No. 08/889,319, filed on Jul. 8, 1997, now Pat. No. 6,085,169, and a continuation-in-part of application No. 09/190,744, filed on Nov. 12, 1998, now abandoned, and a continuation-in-part of application No. 09/083,345, filed on May 22, 1998, now abandoned, said application No. 10/821,255 is a continuation-in-part of application No. 09/348,566, filed on Jul. 7, 1999, now Pat. No. 7,039,603, which is a continuation-in-part of application No. 09/337,345, filed on Jun. 21, 1999, now Pat. No. 6,404,729, which is a continuation-in-part of application No. 08/889,503, filed on Jul. 8, 1997, now Pat. No. 6,249,772, said application No. 09/348,566 is a continuation-in-part of application No. 08/889,319, filed on Jul. 8, 1997, now Pat. No. 6,085,169, and a continuation-in-part of application No. 09/190,744, filed on Nov. 12, 1998, now abandoned, which is a continuation of application No. 08/707,660, filed on Sep. 4, 1996, now Pat. No. 5,794,207, said application No. 09/348,566 is a continuation-in-part of application No. 09/083,345, filed on May 22, 1998, now abandoned.

(51) Int. Cl.
*G06Q 30/00* (2006.01)
(52) U.S. Cl. .......................................... 705/26; 705/27
(58) Field of Classification Search .................. 705/26, 705/27

See application file for complete search history.

(56) References Cited

U.S. PATENT DOCUMENTS

| | | |
|---|---|---|
| 3,691,527 A | 9/1972 | Yamamoto |
| 4,237,537 A | 12/1980 | Pitches et al. |
| 4,341,951 A | 7/1982 | Benton |
| 4,554,446 A | 11/1985 | Murphy et al. |
| 4,734,858 A | 3/1988 | Schlafly |

| | | | | | | |
|---|---|---|---|---|---|---|
| 4,737,910 A | 4/1988 | Kimbrow | 5,864,604 A | 1/1999 | Moen et al. | |
| 4,766,548 A | 8/1988 | Cedrone et al. | 5,870,716 A | 2/1999 | Sugiyama et al. | |
| 4,799,156 A | 1/1989 | Shavit et al. | 5,870,717 A | 2/1999 | Wiecha | |
| 4,882,675 A | 11/1989 | Nichtberger et al. | 5,870,719 A | 2/1999 | Maritzen et al. | |
| 4,947,028 A | 8/1990 | Gorog | 5,875,110 A | 2/1999 | Jacobs | |
| 4,949,256 A | 8/1990 | Humble | 5,878,139 A | 3/1999 | Rosen | |
| 4,992,940 A | 2/1991 | Dworkin | 5,878,401 A | 3/1999 | Joseph | |
| 5,010,485 A | 4/1991 | Bigari | 5,883,810 A | 3/1999 | Franklin et al. | |
| 5,064,999 A | 11/1991 | Okamoto et al. | 5,887,271 A | 3/1999 | Powell | |
| 5,117,354 A | 5/1992 | Long et al. | 5,890,136 A | 3/1999 | Kipp | |
| 5,136,501 A | 8/1992 | Silverman et al. | 5,892,827 A | 4/1999 | Beach et al. | |
| 5,176,224 A | 1/1993 | Spector | 5,905,246 A | 5/1999 | Fajkowski | |
| 5,191,410 A | 3/1993 | McCalley et al. | 5,907,830 A | 5/1999 | Engel et al. | |
| 5,253,165 A | 10/1993 | Leiseca et al. | 5,909,793 A | 6/1999 | Beach | |
| 5,256,863 A | 10/1993 | Ferguson et al. | 5,918,213 A | 6/1999 | Bernard et al. | |
| 5,305,195 A | 4/1994 | Murphy | 5,923,016 A | 7/1999 | Fredregill et al. | |
| 5,319,542 A | 6/1994 | King, Jr. et al. | 5,924,078 A | 7/1999 | Naftzger | |
| 5,353,218 A | 10/1994 | De Lapa et al. | 5,924,080 A | 7/1999 | Johnson | |
| 5,367,452 A | 11/1994 | Gallery et al. | 5,924,082 A | 7/1999 | Silverman et al. | |
| 5,375,055 A | 12/1994 | Togher et al. | 5,938,721 A | 8/1999 | Dussell et al. | |
| 5,434,394 A | 7/1995 | Roach et al. | 5,948,040 A | 9/1999 | DeLorme | |
| 5,452,344 A | 9/1995 | Larson | 5,963,939 A | 10/1999 | McCann et al. | |
| 5,495,412 A | 2/1996 | Thiessen | 5,970,469 A * | 10/1999 | Scroggie et al. | 705/14.26 |
| 5,513,117 A | 4/1996 | Small | 5,974,399 A | 10/1999 | Giuliani et al. | |
| 5,515,268 A | 5/1996 | Yoda | 5,988,346 A | 11/1999 | Tedesco et al. | |
| 5,526,257 A | 6/1996 | Lerner | 6,009,412 A | 12/1999 | Storey | |
| 5,536,045 A | 7/1996 | Adams | 6,014,634 A | 1/2000 | Scroggie et al. | |
| 5,537,314 A | 7/1996 | Kanter | 6,017,157 A | 1/2000 | Garfinkle et al. | |
| 5,546,316 A | 8/1996 | Buckley et al. | 6,035,284 A | 3/2000 | Straub et al. | |
| 5,550,746 A | 8/1996 | Jacobs | 6,038,551 A | 3/2000 | Barlow et al. | |
| 5,557,518 A | 9/1996 | Rosen | 6,055,514 A * | 4/2000 | Wren | 705/36 R |
| 5,557,721 A | 9/1996 | Fite et al. | 6,058,373 A | 5/2000 | Blinn et al. | |
| 5,561,282 A | 10/1996 | Price et al. | 6,058,375 A | 5/2000 | Park | |
| 5,590,197 A | 12/1996 | Chen et al. | 6,061,660 A | 5/2000 | Eggleston et al. | |
| 5,592,375 A | 1/1997 | Salmon et al. | 6,073,840 A | 6/2000 | Marion | |
| 5,592,378 A | 1/1997 | Cameron et al. | 6,076,068 A | 6/2000 | DeLapa et al. | |
| 5,611,051 A | 3/1997 | Pirelli | 6,085,168 A | 7/2000 | Mori et al. | |
| 5,612,527 A | 3/1997 | Ovadia | 6,108,672 A | 8/2000 | DeJoseph | |
| 5,631,724 A | 5/1997 | Sawada et al. | 6,116,402 A | 9/2000 | Beach et al. | |
| 5,637,859 A | 6/1997 | Menoud | 6,119,099 A | 9/2000 | Walker et al. | |
| 5,692,132 A | 11/1997 | Hogan | 6,131,085 A | 10/2000 | Rossides | |
| 5,701,252 A | 12/1997 | Facchin et al. | 6,134,534 A | 10/2000 | Walker et al. | |
| 5,708,782 A | 1/1998 | Larson et al. | 6,167,382 A | 12/2000 | Sparks et al. | |
| 5,710,886 A | 1/1998 | Christensen et al. | 6,192,349 B1 | 2/2001 | Husemann et al. | |
| 5,710,887 A | 1/1998 | Chelliah et al. | 6,193,154 B1 | 2/2001 | Phillips et al. | |
| 5,713,795 A | 2/1998 | Kohorn | 6,193,155 B1 | 2/2001 | Walker et al. | |
| 5,715,402 A | 2/1998 | Popolo | 6,199,014 B1 | 3/2001 | Walker et al. | |
| 5,727,163 A | 3/1998 | Bezos | 6,205,435 B1 | 3/2001 | Biffar | |
| 5,727,164 A | 3/1998 | Kaye et al. | 6,236,971 B1 | 5/2001 | Stefik et al. | |
| 5,732,398 A | 3/1998 | Tagawa | 6,247,047 B1 | 6/2001 | Wolff | |
| 5,734,150 A | 3/1998 | Brown et al. | 6,249,772 B1 | 6/2001 | Walker et al. | |
| 5,739,512 A | 4/1998 | Tognazzini | 6,260,024 B1 | 7/2001 | Shkedy | |
| 5,754,653 A | 5/1998 | Canfield | 6,266,651 B1 | 7/2001 | Woolston | |
| 5,758,328 A | 5/1998 | Giovannoli | 6,330,544 B1 | 12/2001 | Walker et al. | |
| 5,761,648 A | 6/1998 | Golden et al. | 6,370,513 B1 | 4/2002 | Kolawa et al. | |
| 5,768,142 A | 6/1998 | Jacobs | 6,460,036 B1 | 10/2002 | Herz | |
| 5,774,870 A | 6/1998 | Storey | 6,512,570 B2 | 1/2003 | Garfinkle et al. | |
| 5,774,874 A | 6/1998 | Veeneman et al. | 6,754,636 B1 | 6/2004 | Walker et al. | |
| 5,791,991 A | 8/1998 | Small | 6,885,994 B1 | 4/2005 | Scroggie | |
| 5,794,207 A | 8/1998 | Walker et al. | 2001/0001203 A1 | 5/2001 | McCall et al. | |
| 5,799,284 A | 8/1998 | Bourquin | | | | |
| 5,806,044 A | 9/1998 | Powell | | | | |
| 5,809,144 A | 9/1998 | Sirbu et al. | | | | |

FOREIGN PATENT DOCUMENTS

| | | |
|---|---|---|
| CA | 2070736 A1 | 6/1992 |
| CA | 2217739 A1 | 4/1996 |
| EP | 0 370 146 A1 | 5/1990 |
| EP | 0779587 A2 | 9/1996 |
| EP | 0779587 A3 | 9/1996 |
| EP | 0 817 138 A1 | 1/1998 |
| FR | 2 733 068 A1 | 10/1996 |
| JP | 6035946 | 2/1994 |
| JP | 7078274 | 3/1995 |
| JP | 7272012 | 10/1995 |

| | | |
|---|---|---|
| 5,816,918 A | 10/1998 | Kelly et al. |
| 5,822,736 A | 10/1998 | Hartman et al. |
| 5,826,241 A | 10/1998 | Stein et al. |
| 5,832,457 A | 11/1998 | O'Brien et al. |
| 5,842,178 A | 11/1998 | Giovannoli |
| 5,845,259 A | 12/1998 | West et al. |
| 5,845,265 A | 12/1998 | Woolston |
| 5,848,399 A | 12/1998 | Burke |
| 5,855,007 A | 12/1998 | Jovicic |
| 5,857,175 A | 1/1999 | Day et al. |

| | | |
|---|---|---|
| JP | 08137951 | 5/1996 |
| JP | 8221484 | 8/1996 |
| JP | 9097288 | 4/1997 |
| JP | 11088560 A | 9/1997 |
| JP | 10187820 | 7/1998 |
| JP | 10214284 | 8/1998 |
| JP | 10240830 | 9/1998 |
| JP | 10269049 | 10/1998 |
| WO | WO 9632701 | 10/1996 |
| WO | WO 9636023 | 11/1996 |
| WO | WO 97/16797 | 5/1997 |
| WO | WO 97/16897 | 5/1997 |
| WO | WO 97/23838 | 7/1997 |
| WO | WO 97/25684 | 7/1997 |
| WO | WO 97/35441 | 9/1997 |
| WO | WO 97/44749 | 11/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |

OTHER PUBLICATIONS

Tellis, Gerald, ."Beyond the Many Faces of Price: An Integration of Pricing Strategies", dated Oct. 1986.*

Shea, Barbara, "Read Fine Print When Comparing Car Rentals", Feb. 9, 1997, St. Louis Post-Dispatch, Section: Travel & Leisure, p. 04T, 2 pp.

Maras, Elliot, "1995: downsizing adds costs; new strategies sought", Automatic Merchandiser, Aug. 1996, pp. 20-22, 24, 26, 28, 30, 32, 34, 36, 38, 40 and 44, 13 pp.

Naik, Gautam, "In Digital Dorm, Click on Return for Soda", The Wall Street Journal, Jan. 23, 1997, Section: Online, p. B1, 3 pp.

Website: "CSH Drink Machine(s)", (http //www csh rit edu/proj/ drink html), download date: Jan. 29, 1998, 2 pp.

Website: "FAQ: CSH Coke Machine Information", (http //www cs uu nl/wais/html/na-dir/csh-coke-machine-info html), download date: Oct. 24, 2000, 6 pp.

Godwin, Nadine, "New software was key lure in $17 million agency buyout.", Travel Weekly, Nov. 26, 1984, Section: vol. 43, p. 45, ISSN: 0041-2082, 4 pp.

Kuttner, Robert, "Computers May Turn the World into One Big commodities Pit.", Business Week, Sep. 11, 1989, Section: Economic Viewpoint, No. 3123, p. 15, 3 pp.

Del Rosso, Laura, "Firm proposes ticket-bidding system; Marketel explores electronic auction of travel; Marketel International", Travel Weekly, Nov. 13, 1989, Section: No. 91, vol. 48, p. 1, ISSN: 0041-2082, 3 pp.

"http://web.archive.org/web/19961029153454/www.autobytel.com/ march12.html" downloaded: Nov. 19, 2004, 15pp.

Bronnenberg, Bart J., "Limited Choice Sets, Local Price Response, and Implied Measures of Price Competition", Journal of Marketing Research, Spring 1996, SEction: vol. XXXIII, p. 163. 20 pp.

"Reaching Out in New Directions", Introducing the U$A Value Exchange, First Data Corporation, undated, 31 pp.

Stigler, George J., "The Theory of Price", The Macmillan Company, Copyright 1952, pp. 82-94, 214-221. 14 pp.

Bowman, Jr., Ward S., "Tying Arrangements and the Leverage Problem", The Yale Law Journal, Nov. 1957, vol. 67, No. 1, pp. 19-36. 10 pp.

Stigler, George J., "The Theory of Price", The Macmillan Company, Third Edition, Copyright 1966, pp. 208-215.

Quinn, Jane Bryant, "New Cars for Less", Newsweek, Oct. 23, 1978, Section: The Columnist, p. 80, 2 pp.

Narasimhan, Chakravarthi, "A Price Discrimination Theory of Coupons", Marketing Science, Spring 1984, vol. 3, No. 2, pp. 128-147. 20 pp.

"Woodside Management Systems Inc. today announced . . . ", PR Newswire, Apr. 1, 1986, 2 pp.

Tellis, Gerard J., "Beyond the Many Faces of Price: An Integration of Pricing Strategies", Journal of Marketing, Oct. 1986, vol. 50, pp. 146-160. 15 pp.

Godwin, Nadine, "Agency, funded by 3M, set to market software; Travelmation touts trip planner to corporations; designed to eliminate client-agent telephone calls; Business Travel Update", Travel Weekly, Oct. 13, 1986, Section: vol. 45, p. 45, ISSN: 0041-2082, 3 pp.

Godwin, Nadine, "Agency dares to launch its own air res system; Travelmation system provides greater versatility, Automation Report", Travel Weekly, Oct. 23, 1986, 5 pp.

Joseph, Anthony, "Baby the engine, and other saving tips", The Christian Science Monitor, Nov. 4, 1986, Section: Autos '87 Pullout, p. B10, 3 pp.

"Thomas Cook Travel U.S.A. has announced . . . ", PR Newswire, Jan. 12, 1987, 2 pp.

Bawa, Kapil et al., "The Coupon-Prone Consumer: some Findings Based on Purchase Behavior Across Product Classes", Journal of Marketing, Oct. 1987, vol. 51, pp. 99-110. 12 pp.

Nomani Sr., A., "Air Crashes Stir Signs of Anxiety in Travelers", Wall Street Journal, Aug. 1, 1989, Section 2, p. 1, Col. 1, 2 pp.

Carlsen, Clifford, "From Airline Tickets to Human Organs, the Electronic Markets are Booming", San Francisco Business Times, Aug. 14, 1989, Section: vol. 3, No. 50, Section 1, p. 17,2 pp.

"Letters to BusinessExtra", The San Francisco Chronicle, Dec. 26, 1989, Section: Business, C7, 3 pp.

Wallace, David, "Company Planning to Let Flyers bid on Airfares", Philadelphia Business Journal, Mar. 26, 1990, Section: vol. 9, No. 3, Section 1, p. 15, 3 pp.

Greenberg, Peter S., "The Savvy Traveler: Lower Air Fares for Consumers Not in the Cards . . . " Los Angeles Times, Jul. 8, 1990, Section: Travel, Part L, p. 2, Col. 1, Travel Peak, 2 pp.

Carey, Christopher, "Firm Offers Auction for Airline Tickets", St. Louis Post-Dispatch, Aug. 7, 1991, Section: Business, p. 1B, 2 pp.

Pelline, Jeff, "Travelers Bidding on Airline Tickets SF firm offers chance for cut-rate fares", The San Francisco Chronicle, Aug. 19, 1991, Section: News, p. A4, 4 pp.

Upton, Kim, "News and Briefs: French Say Monoliths Off-Limits to Visitors", Los Angeles Times, Aug. 25, 1991, Section: Travel, Part L, p. 4, Col. 1, Travel Desk, 2 pp.

"Bookit Airfare Bidding System (Fax for Your Plane Ticket?)", Consumer Reports Travel Letter, Sep. 1991, Section: vol. 7, No. 9, pp. 97, 106, 3 pp.

Nelson, Janet, "Practical Traveler; Airlines Relaxing Policy on No-Refund Tickets", The New York Times, Sep. 22, 1991, Section 5, p. 3, Col. 1, Travel Desk, 4 pp.

"Traveler's Notes; Easier Airfare Bidding.", Consumer Reports Travel Letter, Oct. 1991, Section: vol. 7, No. 10, p. 119, 1 pg.

"Buy Low, Fly High", USA Today, Nov. 14, 1991, Section: Bonus, p. 15, 2 pp.

Feldman, Joan M., "To rein in those CRSs; computer reservation systems" Air Transport World, Dec. 1991, Section: vol. 28, No. 12, p. 89, ISSN: 0002-2543, 5 pp.

Golden, Fran, "AAL's Riga doubts Marketel's appeal to retailers", Travel Weekly, Nov. 13, 1989, Section: vol. 48, No. 91, p. 4, ISSN: 0041-2082, 2 pp.

International Search Report, completed Mar. 12, 1997, International application No. PCT/US97/00738, 1 pg.

"Traveler's Notes; Bookit Report", Consumers Reports Travel Letter, Dec. 1991, Section: vol. 7, No. 12, p. 143, 1 pg.

"welcome to cool savings.com", (coolsavings.com), copyright 1996-1999, 3 pp.

"CRTL's Blue Ribbon Deals for 1992", Consumer Reports Travel Letter, Jan. 1992, Section: vol. 8, No. 1, pp. 3-5. 2 pp.

"Newsletters", The Atlanta Journal and Constitution, Mar. 1, 1992, Section: Travel: Section K, p. 13, 1 pg.

Del Rosso, Laura, "Ticket-bidding firm closes its doors, Marketel International", Travel Weekly, Mar. 12, 1992, Section: vol. 51, No. 21, p. 1, ISSN: 0041-2082, 2 pp.

Hainer, Cathy et al., "Where vacationing kids get good care", USA Today, Apr. 1, 1992, Section: Life, p. 4D, 2 pp.

Weatherford, Lawrence R. et al., "A Taxonomy and Research Overview of Perishable-Asset Revenue Management: Yield Management, Overbooking, and Pricing", Operations Research, Sep.-Oct. 1992, vol. 40, No. 5, pp. 831-844. 14 pp.

Spencer, Milton, H. et al., "Contemporary Economics", Worth Publishers, Copyright 1993, pp. 567-570. 6 pp.

Rajendran, K.N., "Contextual and Temporal Components of Reference Price", Journal of Marketing, Jan. 1994, vol. 58, pp. 22-34. 13 pp.

"Six Vendors Sign on for Early Electronic Commerce Venture", Voice Technology News, Dec. 13, 1994, Section: No. 25, vol. 6, ISSN: 1045-1498, 2 pp.

Feldman, Joan M., "Reclaiming control; new software to close gap between projected and actual revenues", Aug. 1995, Section: vol. 32, No. 8, p. 35, ISSN: 0002-2543, 5 pp.

*United Sates v. Eastman Kodak Co.*, United States Court of Appeals for the Second Circuit, Docket No. 97-6190, decided Aug. 4, 1995, 16 pp.

"Coupons and More - Welcome to coolsavings com", www coolsavings com, copyright 1996-1999, 3 pp.

Evans, Judith, "Who was that Masked Cybershopper? MasterCard-Visa Agreement on Credit Card Securiity May Make On-Line Commerce Fly", The Washington Post, Feb. 2, 1996, Section: Financial, p. F01, 2 pp.

Hilts, Paul, "Technology meets commerce; electronic publishing", Publishers Weekly, Jul. 8, 1996, Section: vol. 243, No. 28, p. 43, ISSN: 0000-0019, 4 pp.

Prentice, Michael, "Searching for the lowest fare: Getting the lowest fare takes work, but it's worth the effort", The Ottawa Citizen, Oct. 9, 1996, Section: Citylife; Consuming Passion, p. C3, 3 pp.

"Auctioning unsold airline tickets", Insight (USA), download date: Oct. 29, 1996, 1 pp.

"Web Ventures presents Bookit!", (http www webventures com/bookit), download date: Dec. 2, 1996, 1 pp.

"Salomon Brother's Maldutis Says Internet is Aviation's 'Third Revolution;' Will Earn Billions", World Airline News, Mar. 21, 1997, Section: vol. 7, No. 12, 2 pp.

"First Virtual Holdings Releases Beta Software for Secure Transactions on Microsoft Merchant Server", PR Newswire, Mar. 31, 1997, Section: Financial News 2 pp.

PCT International Search Report for Application No. PCT/US97/13588, in the name of Walker et al., mailed Apr. 12, 1997. 3 pp.

"About Cyberslice", (http //www cyberslice com/cgi-bin/WebObjects/Cyberslice 2@httpserv01/), download date: May 6, 1997. 2 pp.

"My Auto Broker - Online Auto Broker", (http www adverlink com/myautobroker/), download date: May 28, 1997. 4 pp.

"Pricewatch", (http //icon co za/~robo/prod01 ht.), download date: Jun. 9, 1997. 5 pp.

"The Easy, Pain-Free Way to Buy or Lease Your Next Car!", (http www autoseek com/#what), download date: May 28, 1997. 4 pp.

Adyanthaya, Surain, "Revenue management: the Black Art", Interavia Business & Technology, Sep. 1998, Section: No. 623, vol. 53, p. 43, ISSN: 0983-1592. 4 pp.

Tooher, Nora Lockwood, "Macy's new gift card gets trial run in Warwick", The Providence Journal-Bulletin, Oct. 1, 1998, Section: Business, p. 1E. 2 pp.

"A Personal Information Manager for the Web Savvy Consumer.", (http www killerapp com/html/main/pr0004 html), Oct. 2, 1998. 2 pp.

"Airfare Bargains on the Net: About E-mail Lists", (http //travel epicurious com/travel/c_planning/02_airfares/email/intro html), download date: Oct. 5, 1998. 17 pp.

"Airtech —FlightPass Faq", (http //www airtech com/at_flightpass/at_faqflightpass htm), download date: Oct. 5, 1998. 4 pp.

Woolley, Scott, "I got it cheaper than you", Forbes, Nov. 2, 1998, Section: Management, Strategies, Trends, p. 82. 4 pp.

Caruso, Denise, "Digital Commerce; The boom in on-line shopping adds a twist to the old quandary of how to tax interstate purchases.", The New York Times, Dec. 28, 1998. 3 pp.

"Travel Industry Bellwether for All Commerce Players", Jupiter Communications, Copyright 1999, Jupiter Strategic Planning Services. 2 pp.

Fallon, James, "Safeway Puts Ordering into Customers' Palms", Executive Technology, Jan. 1999. 1 pp.

"SaveSmart —How SaveSmart Works for Consumers", (http //www savesmart com/consumer/consumer_howitworks html), download date: Jan. 17, 1999. 7 pp.

"Welcome to 1-800-FLOWERS", (http www 1800flowers com/flowers/welcome asp), download date: Aug. 3, 1999. 4pp.

"Groceries Online —The Leader in Internet Shopping Systems for Supermarkets and Drug Stores", (http www groceries-online com/), download date: Mar. 8, 1999. 4 pp.

"WebVoucher Form", (http www pinex co uk/webvoucher/), download date: Mar. 14, 1999. 2 pp.

"welcome to planet U, providers of U-pons —Internet Coupons", (http www planetu com/), download date: Mar. 16, 1999. 7 pp.

"WebCertificate.com", (http //www webcertificate com: 443/webcert/Faq-detail.ASP), download date: May 20, 1999. 14 pp.

Press Release: "Priceline com Delivers Savings for Flexible Travelers in Side-By-Side Price Comparison", May 28, 1999. 4 pp.

"Kmart Expands Inventory Via In-Store Kiosks", RT News, Jun. 1999, p. 20. 1 pp.

Lazarus, David, "E-Commerce, Japanese Style", Wired Online, Jun. 7, 1999 3 pp.

"Mercata —Group Buying Power", (http //www mercata com/cgi_bin/mercata/mercata/v1/pages/home jsp), download date: Jun. 7, 1999. 5 pp.

"*Wal-Mark* vs. *Amazon*: The fight begins", Yahoo News Page, Jun. 9, 1999. 3 pp.

"Circuit City to Integrate E-Commerce With Store Shopping; Retailer's Superstore —www Circuitcity com —to Open in Jul.", PR Newswire, Jun. 15, 1999. 3 pp.

"Pricing, The Professional Pricing Society Conference Agenda", (http //www pricing-advisor com/conf_agn htm), download date: Jun. 19, 1999. 10 pp.

"Chakravarthi Narasimhan", (http www olin wustl edu/faculty/narasimhan/), download date: Jul. 1, 1999. 2 pp.

Varian, Hal R., "First Monday: Differential Pricing and Efficiency", (http www firstmonday dk/issues/issue2/different/), download date: Jul. 1, 1999. 18 pp.

"Pricing Strategy and Tactics", (http //www Vanderbilt edu/econ/reiley/ba250/outlines/21 html), download date: Jul. 1, 1999. 3 pp.

Odlyzko, Andrew, "The Bumpy Road of Electronic Commerce", (http //aace Virginia edu/aace/conf/webnet/html/ao htm), download date: Jul. 1, 1999. 17 pp.

Frederick, James, "Walgreens gears for opening of its own Internet pharmacy", Drug Store News —Chain Pharmacy, Jul. 19, 1999, vol. 9, No. 7. 2 pp.

"Internet Wine Gift Company Offers Answers to Recent Legislation", (http //biz yahoo com/prnews/990810/ma_send_co_1 html), download date: Aug. 11, 1999. 2 pp.

Kephart, Jeff, "Price Dynamics of Vertically; Introduction", (http //www research ibm com/infoecon . . . ), download date: Nov. 11, 1999. 3 pp.

Website: "Frictionless Commerce Incorporated: Solutions", (http www frictionless com/solutions html), download date: Nov. 11, 1999. 2 pp.

Website: "DealTime.com: The Ultimate Online Shopping Service", (http //www dealtime com/about/aboutbodyhome asp?B=dealtime &AID=0), download date: Oct. 20, 1999. 4 pp.

"United Buying Services", (http www inform umd edu/muc/clubinfo/ubs html), download date: Apr. 15, 2003. 2 pp.

Office Action for U.S. Appl. No. 09/348,566, mailed Oct. 1, 2003, pp. 3-5. 3 pp.

PCT International Search Report for International Application No. PCT/US98/12977 mailed Oct. 19, 1998, 5pp.

PCT Written Opinion for PCT International Application No. PCT/US98/13977 mailed Jul. 1, 1999, 6pp.

Desjardins, Doug, "Hollywood's Investment in Online Video Retailer Gets Mixed Reviews", Video Store, Aug. 9, 1998, Section: p. 1, ISSN: 0195-1750. 3 pp.

Office Action for U.S. Appl. No. 10/821,255 mailed Nov. 2, 2007, 15 pp.

Office Action for U.S. Appl. No. 10/821,255 mailed Apr. 20, 2007, 7 pp.

Office Action for U.S. Appl. No. 11/426,799 mailed Aug. 29, 2008, 13 pp.
Office Action for U.S. Appl. No. 11/426,799 mailed Feb. 16, 2008, 10 pp.
Office Action for U.S. Appl. No. 11/426,809 mailed Feb. 10, 2009, 21 pp.
Office Action for U.S. Appl. No. 11/426,809 mailed Aug. 27, 2008, 23 pp.
Notice of Allowance for U.S. Appl. No. 09/348,566 mailed Apr. 25, 2005, 6 pp.
Office Action for U.S. Appl. No. 09/348,566 mailed Jun. 15, 2004, 12 pp.
Office Action for U.S. Appl. No. 09/348,566 mailed Oct. 1, 2003, 6 pp.
Office Action for U.S. Appl. No. 09/348,566 mailed Oct. 23, 2002, 16 pp.
Office Action for U.S. Appl. No. 09/348,566 mailed Feb. 6, 2002, 18 pp.
Written Opinion for PCT/US00/16983 mailed Aug. 3, 2001, 4 pp.
Office Action for U.S. Appl. No. 09/388,723 mailed Apr. 21, 2004, 11 pp.
Office Action for U.S. Appl. No. 09/388,723 mailed Oct. 22, 2003, 8 pp.
Office Action for U.S. Appl. No. 09/388,723 mailed Apr. 30, 2003, 29 pp.
Office Action for U.S. Appl. No. 09/388,723 mailed Oct. 2, 2002, 26 pp.
International Preliminary Examination Report for PCT/US00/16998 mailed Apr. 6, 2005, 3 pp.
Notice of Allowance for U.S. Appl. No. 09/337,906 mailed Nov 28, 2003, 7 pp.
Office Action for U.S. Appl. No. 09/337,906 mailed Dec. 17, 2002, 12 pp.
Office Action for U.S. Appl. No. 09/337,906 mailed Apr. 24, 2002, 28 pp.
Written Opinion for PCT/US00/12640 mailed Aug. 4, 2001, 4 pp.
Notice of Allowability for U.S. Appl. No. 08/889,503 received May 26, 2000, 6 pp.
Supplemental Notice of Allowability for U.S. Appl. No. 09/591,594 mailed Feb. 7, 2006, 2 pp.
Office Action for U.S. Appl. No. 09/591,594 mailed Nov. 30, 2004, 12 pp.
Office Action for U.S. Appl. No. 09/591,594 mailed Feb. 6, 2004, 9 pp.
Office Action for U.S. Appl. No. 09/591,594 mailed Jun. 18, 2003, 7 pp.
Office Action for U.S. Appl. No. 11/410,342 mailed Oct. 22, 2009, 12 pp.
Office Action for U.S. Appl. No. 11/424,289 mailed Oct. 14, 2009, 12 pp.
Office Action for U.S. Appl. No. 11/424,291 mailed Aug. 10, 2009, 19 pp.
Office Action for U.S. Appl. No. 11/424,294 mailed Mar. 24, 2009, 10 pp.
Office Action for U.S. Appl. No. 08/889,503 mailed Oct. 26, 1999, 7 pp.
Office Action for U.S. Appl. No. 08/889,503 mailed Oct. 6, 1998, 13 pp.
Office Action for U.S. Appl. No. 11/424,289, 10 pp.

\* cited by examiner

*Primary Examiner* — Mark Fadok
(74) *Attorney, Agent, or Firm* — Fincham Downs, LLC; Carson C. K. Fincham

(57) ABSTRACT

Purchasing, redemption and settlement systems and methods are provided wherein a buyer takes possession of a product at a retailer. A purchasing system may communicate with a buyer through a communication network to establish a first price for a product between the buyer and a seller. The purchasing system may also arrange for the buyer to take possession of the product at a retailer, different from the seller, that offers the product for sale at a second price. Verification information, which enables the retailer to authorize the buyer to take possession of the product, is transmitted to the retailer. The buyer provides a payment, based on the first price, to the purchasing system in exchange for the right to take possession of the product at the retailer. In one embodiment, the purchasing system receives a buyer offer, including an offer price, related to the product. In another embodiment, the purchasing system transmits redemption information, including a redemption code, to the buyer. The redemption information may also include information that enables the creation of a voucher to be used when taking possession of the product. The purchasing system may also receive information related to an attempt by the buyer to take possession of the product, including the redemption code, from the retailer.

30 Claims, 117 Drawing Sheets

← 600

| CATEGORY CODE 610 | CATEGORY DESCRIPTION 620 |
|---|---|
| TV | TELEVISION |
| VC | VIDEO CAMERA |
| SC | STILL PHOTO CAMERA |
| PC | PERSONAL COMPUTER |
| DW | DISHWASHER |
| WM | WASHING MACHINE |
| ST | STEREO; HOME |
| ST-C | STEREO; CAR |
| LM | LAWN MOWER |

| PRODUCT CATEGORY 710 | CLASS 1 720 | CLASS 2 730 | CLASS 3 740 |
|---|---|---|---|
| TV | SONI TOHIBA | MAGNETBOX PANATRONIC | PCA SAMSONG |
| SC | NIFON RINALTO | CODAK KINNIR | LINOX |
| PC | BELL PEAR | COMPACT GATELOCK | PICKARD ROLL |
| WM | PAYTAG WHIRLBATH | CE CLEANBOY | - |

| PRODUCT CATEGORY 810 | FEATURE CODE 820 | FEATURE DESCRIPTION 830 |
|---|---|---|
| TV | RM | REMOTE CONTROL |
| | URM | UNIVERSAL REMOTE CONTROL |
| | SS | SURROUND SOUND |
| | PIP | PICTURE IN PICTURE |
| SC | PV | PANORAMIC VIEW CAPABILITY |
| | MM-1 | ZOOM AT LEAST 35-105MM CAPABLE |
| | DG | DIGITAL |
| | PC | DOWNLOAD TO PC CAPABLE |
| WM | TL | TOP LOADER |
| | DR | DRYER INCLUDED |
| | EX | EXTRA LARGE CAPACITY |
| | SC | SOFTNER COMPARTMENT |

FIG. 8

| PRODUCT IDENTIFIER 911 | PRODUCT CATEGORY 912 | PRODUCT CLASS 913 | PRODUCT FEATURES 914 | SELLER IDENTIFIER 915 | MINIMUM PRICE 916 | RETAILER IDENTIFIER 917 |
|---|---|---|---|---|---|---|
| P102-39 | TV | 1 | URM; SS; PIP | S 12345 | $500.00 | N/A |
| P102-39 | TV | 1 | URM; SS; PIP | S 23456 | $490.00 | R031-29 R192-05 R718-93 |
| P310-99 | SC | 2 | PC; PV; DS | S 34567 | $300.00 | R192-05 R302-11 |
| P003-11 | SC | 2 | PV; MM-1 | S 45678 | $200.00 | R031-29 R192-05 R302-11 |

| PRODUCT IDENTIFIER 921 | PRODUCT DESCRIPTION 922 | PRODUCT CLASS 923 | PRODUCT CATEGORY 924 | SELLER IDENTIFIER 925 | MINIMUM PRICE 926 | AVAILABLE QUANTITY 927 | REGION 928 | RETAILER IDENTIFIER 929 |
|---|---|---|---|---|---|---|---|---|
| P102-39 | 27" TELEVISION; SONI; BLACK; MODEL ST-942 | 1 | TV | S 23456 | $500.00 | 20 | CT; MA | R 031-29 R 781-96 R 005-11 |
| P310-99 | DIGITAL CAMERA; GREY; PANORAMIC; COMES W/ BLACK LEATHER CASE; MODEL LN-198 | 2 | SC | S 34567 | $490.00 | 300 | NEW ENGLAND | R 031-29 R 088-99 |
| P098-13 | WHIRLBATH WASHER; OFF WHITE; MODEL WS-302 | 1 | WM | S 03218 | $300.00 | 50 | FL | R 999-11 R 888-22 R 666-33 |
| P909-11 | CLEANBOY | 2 | WM | S 13029 | $600.00 | 20 | USA | R 102-22 R 701-99 R 902-03 |

| PRODUCT IDENTIFIER 931 | PRODUCT DESCRIPTION 932 | PRODUCT CATEGORY 933 | PRODUCT FEATURES 934 | MINIMUM PRICE 935 |
|---|---|---|---|---|
| P099-32 | 27" TELEVISION; MODEL AK-0497 | TV | RM; PIP; SS | $500.00 |
| P098-13 | 36" TELEVISION; MODEL 5R-0312 | TV | URM; PIP; SS | $650.00 |
| P072-99 | 27" TELEVISION; MODEL AK-0473 | TV | RM | $400.00 |
| P032-86 | 21" TELEVISION; MODEL PI-0372 | TV | -- | $200.00 |
| P045-03 | 45" TELEVISION; MODEL OR-9132 | TV | URM; SS | $600.00 |

| PRODUCT IDENTIFIER 941 | PRODUCT CATEGORY 942 | PRODUCT CLASS 943 | PRODUCT FEATURES 944 | SELLER IDENTIFIER 945 | MAXIMUM SUBSIDY AMOUNT 946 | RETAILER IDENTIFIER 947 |
|---|---|---|---|---|---|---|
| P102-39 | TV | 1 | URM; SS; PIP | S 12345 | $50.00 | N/A |
| P102-39 | TV | 1 | URM; SS; PIP | S 23456 | $20.00 | R031-29<br>R192-05<br>R718-93 |
| P310-99 | SC | 2 | PC; PV; DS | S 34567 | $30.00 | R192-05<br>R302-11 |
| P003-11 | SC | 2 | PV; MM-1 | S 45678 | $100.00 | R031-29<br>R192-05<br>R302-11 |

| SELLER IDENTIFIER 1010 | SELLER NAME 1020 | SELLER TYPE 1030 | SELLER ADDRESS 1040 | SELLER CATEGORIES 1050 |
|---|---|---|---|---|
| S 12345 | WALMAK | RETAILER | E-MAIL | TV, SC, PC |
| S 23456 | SONI | MANUFACTURER | HTTP | TV, ST |
| S 34567 | PANATRONIC | MANUFACTURER | CITY+STATE | TV |
| S 45678 | AIWER | MANUFACTURER | FILEPATH | TV, ST-C |
| S 56789 | WALMAK STORE # 892 | RETAILER | E-MAIL | TV, SC, PC |
| S 67890 | TOHIBA | MANUFACTURER | E-MAIL | ST, ST-C |

| RETAILER IDENTIFIER 1110 | RETAILER NAME 1120 | RETAILER LOCATION 1130 | PRODUCT CATEGORIES HONORED / SOLD 1140 |
|---|---|---|---|
| R031-29 | WALMAK STORE # 1920 | 10 S. NEW ST. NEW TOWN, CT 55555 | TV; VC; SC; ST; ST-C |
| R192-05 | SIRCUIT CITY STORE #8132 | 2930 HIGH BLVD. TOWN, MA 44444 | TV; VC; SC; PC; ST; ST-C |
| R302-11 | JOE'S ELECTRONICS | 89 COUNTRY LN. PORT SHIP, NY 33333 | VC; SC; ST |
| R718-93 | WALMAK STORE # 2311 | 357 LONG HWY. CITY, VT 22222 | TV; VC; SC; ST; ST-C |
| R012-39 | SEERS STORE # 2813 | 1829 WIDE RD. METROPOLIS, CA 99999 | DW; PC; ST; ST-C; LM |

| OFFER IDENTIFIER 1211 | BUYER E-MAIL 1212 | OFFER PRICE 1213 | SELECTED PRODUCT CATEGORY 1214 | SELECTED PRODUCT CLASS 1215 | SELECTED PRODUCT FEATURES 1216 | OFFER STATUS 1217 |
|---|---|---|---|---|---|---|
| O-932-122-08 | BUCK@ AOL.COM | $200.00 | TV | 3 | RM | REJECTED |
| O-192-032-25 | JENNY@ ATT.COM | $500.00 | WM | 2 | TL; EX | ACCEPTED |
| O-898-323-01 | BIFF@ SURFREE.COM | $400.00 | SC | 1 | PV; MM-1; DG; PC | ACCEPTED |
| O-111-098-33 | ARI@ CBC.COM | $320.00 | TV | 2 | URM; PIP; SS | PENDING |

| SECONDARY OFFER MADE? 1221 | SECONDARY OFFER PRICE 1222 | SECONDARY OFFER STATUS 1223 | PAYMENT IDENTIFIER 1224 |
|---|---|---|---|
| YES | $210.00 | ACCEPTED | 2222-3333-4444-5555 |
| NO | N/A | N/A | 3333-4444-5555-6666 |
| NO | N/A | N/A | 4444-555-6666-7777 |
| NO | N/A | N/A | 5555-6666-7777-8888 |

| SUPPLEMENTAL OFFER IDENTIFIER 1310 | SUPPLEMENTAL OFFER DESCRIPTION 1320 | RETAILER IDENTIFIER 1330 |
|---|---|---|
| 00-32 | FREE MOVIE TAPE | R031-29 |
| 09-83 | 50% OFF ANY CD IN STORE | R139-08 |
| 19-05 | $15.00 OFF LIFETIME WARRANTEE | R022-91 |
| 33-11 | 30% OFF TRIPOD MODEL LL-122 | R111-77 |
| 55-44 | 3 FREE ROLLS OF FILM | R919-55 |

FIG. 13

| | | |
|---|---|---|
| TRANSACTION IDENTIFIER: | T103-222-99 | |
| OFFER IDENTIFIER: | O-932-112-08 | |
| REDEMPTION CODE: | 1876-3290-0187 | |
| PAYMENT IDENTIFIER: | 2222-3333-4444-5555 | |
| INITIAL PAYMENT AMOUNT: | $230.00 | |
| FINAL PAYMENT AMOUNT: | $213.00 | |
| PAYMENT STATUS: | CHARGED | |
| SELLER IDENTIFIER: | S 03298 | |
| PRODUCT IDENTIFIER | P 107-77 | |

| RETAILER IDENTIFIER 1420 | REDEMPTION STATUS 1430 | SUPPLEMENTAL OFFER IDENTIFIER 1440 | SUPPLEMENTAL OFFER STATUS 1450 |
|---|---|---|---|
| R031-29 | REDEEMED | 00-32 | REDEEMED |
| R193-08 | INVALID | 09-83 | INVALID |
| R022-91 | INVALID | 19-05 | INVALID |

FIG. 14

| PRODUCT IDENTIFIER 1610 | PRODUCT CATEGORY 1620 | PRODUCT FEATURES 1630 | MINIMUM PRICE 1640 |
|---|---|---|---|
| P112-55 | TV | URM; PIP; SS | $500.00 |
| P066-91 | TV | RM; SS | $400.00 |
| P333-00 | TV | RM | $300.00 |

| 1802 → | RETAILER TRANSACTION IDENTIFIER: | RT-000-333-111 |
| --- | --- | --- |
| 1804 → | TIME: | 3/14/99  2:53 PM |
| 1806 → | POS TERMINAL: | 0739 |
| 1808 → | OPERATOR IDENTIFIER: | 18735102 |
| 1810 → | TOTAL: | $178.91 |
| 1812 → | PAYMENT TYPE: | CASH; INTERNET PRICING VOUCHER |
| | PRODUCT IDENTIFIER _1820_ | PRODUCT PRICE _1830_ |
| | P064-44 | $49.99 |
| | P107-77 | $118.00 |
| | P304-44 | 0-1P |

FIG. 18

| RETAILER TRANSACTION IDENTIFIER 1910 | REDEMPTION CODE 1920 | PRODUCT IDENTIFIER 1930 | PAYMENT EXPECTED 1940 | PAYMENT STATUS 1950 |
|---|---|---|---|---|
| TR-000-333-111 | 1234-5678-1234 | P304-44 | $200.00 | PENDING |
| TR-111-222-333 | 1234-5678-1235 | P089-55 | $250.00 | RECEIVED |
| TR-666-777-888 | 1234-5678-1236 | P999-99 | $75.00 | RECEIVED |

FIG. 19

| PRODUCT IDENTIFIER  2010 | RETAIL PRICE  2020 | SETTLEMENT PRICE  2030 |
|---|---|---|
| P304-44 | $220.00 | $200.00 |
| P089-55 | $270.00 | $250.00 |
| P999-99 | $75.00 | $75.00 |
| P133-44 | $180.00 | $175.00 |

| REDEMPTION CODE 2111 | STATUS 2112 |
|---|---|
| 1111-4593-2943-8920 | AVAILABLE |
| 1111-9403-0297-4673 | ISSUED |
| 1111-4689-0938-9200 | ISSUED |
| 1111-3809-7267-0182 | AVAILABLE |

FIG. 21A

| REDEMPTION CODE 2121 | STATUS 2122 | OFFER IDENTIFIER 2123 | RETAILER IDENTIFIER 2124 | RETAILER IDENTIFIER 2125 | RETAILER IDENTIFIER 2126 |
|---|---|---|---|---|---|
| 1111-9403-0297-4673 | REDEEMED | T103-222-012 | 9033526179800002 | 8430029120936400 | 9302990122390190 |
| 1111-4698-0938-9200 | REDEEMED | T103-221-99 | 7830221062970600 | 6520094210000110 | 5400963188956000 |
| 1111-5023-5639-9210 | REDEEMED | T102-321-12 | 7388820198362100 | 9033526179800020 | 2036610943210070 |
| 1111-6290-9126-7533 | UNREDEEMED | T123-111-55 | 2036610943210070 | N/A | N/A |

FIG. 21B

| OFFER IDENTIFIER 2131 | PAYMENT IDENTIFIER 2133 | AUTHORIZED AMOUNT 2133 | CHARGED AMOUNT 2134 |
|---|---|---|---|
| T103-222-010 | 5555-0013-9268-0192 | $216.00 | $213.00 |
| T103-222-012 | 2222-9230-0192-9367 | $1,100.00 | $1,065.00 |
| T104-333-432 | 3333-0978-2710-8723 | $2,200.00 | $2,105.00 |
| T471-274-483 | 7777-9087-1023-5436 | $330.00 | N/A |

| OFFER IDENTIFIER 2141 | RETAILER IDENTIFIER 2142 | PRODUCT IDENTIFIER 2143 | SELLER IDENTIFIER 2144 | ESTABLISHED PRICE 2145 | INITIAL ADDITIONAL CHARGE 2146 | SUBSEQUENT ADDITIONAL CHARGE 2147 | FINAL PRICE 2148 |
|---|---|---|---|---|---|---|---|
| T989-442-453 | 9033526179800002 | P1130 | S18790 | $200.00 | 8.0% SALES TAX ($16.00) | -1.5% SALES TAX ($3.00) | $213.00 |
| T964-647-121 | 7830221062970 | P9034 | S56234 | $1,000.00 | 6.5% SALES TAX ($65.00) | $0.00 | $1,065.00 |
| T432-827-279 | 7388820193621 | P8723 | S02281 | $2,000.00 | 4.0% SALES TAX ($80.00) | $25.00 LATE PICK UP PENALTY | $2,105.00 |
| T103-222-012 | 2036610943210 | P0029 | S97610 | $300.00 | 6.5% SALES TAX ($19.50) | N/A | N/A |

2140

| INITIAL AMOUNT 3220 | FINAL AMOUNT 3222 | AUTHORIZED RETAILERS 3224 | EXPECTED PRICE RANGE 3226 | REDEMPTION RETAILER 3228 |
|---|---|---|---|---|
| $79.87 (USED 6% TAX) | $78.75 (ACTUAL 5% TAX) | R771-41; R993-03; R982-19 | $70 - $90 | R993-03 |
| $105.00 | N/A | R679-99; R107-45; R091-10; R103-33 | $90 - $120 | TBD |

| SELLER IDENTIFIER  3302 | SELLER COMMUNICATION ADDRESS  3304 | ACCOUNT IDENTIFIER  3306 |
|---|---|---|
| 123321 | SELLERA@SERVER.COM | 33333333 |
| 321123 | SELLERB@ISP.COM | 44444444 |

FIG. 33

| RETAILER IDENTIFIER 3402 | PHYSICAL LOCATION 3404 | RETAILER COMMUNICATION ADDRESS 3406 |
|---|---|---|
| 92879 | 123 MAIN ST. TOWN, STATE, ZIP | STORE1@ SEARS.COM/POS1 |
| 98981 | 827 MAIN ST. TOWN, STATE, ZIP | KMART92@ KMART.COM/SALES |

| OFFERING PARTY IDENTIFIER 3502 | SUPPLEMENTAL PRODUCT IDENTIFIER 3504 | SUPPLEMENTAL PRODUCT OFFER IDENTIFIER 3506 | SUPPLEMENTAL PRODUCT DISCOUNT 3508 | SUPPLEMENTAL PRODUCT OFFER RULES 3510 | SUPPLEMENTAL PRODUCT OFFER CONTENT 3512 | OFFER EXPIRATION DATE 3514 |
|---|---|---|---|---|---|---|
| 92897 | P018-97 | 019 | 25% OFF VCR MODEL X | MUST PURCHASE PRODUCT UPC 01937584 | "REDEEM YOUR SONI TELEVISION AT SEARS AND GET 25% OFF VCR MODEL X!" | 4/1/2000 |
| 123321 | P051-33 | 020 | 10% OFF ANY SELLER A PRODUCT | AT LEAST 20% PROFIT MARGIN ON BASE TRANSACTION | "GET 10% OFF ANY SELLER A PRODUCT WHEN YOU REDEEM YOUR PRODUCT!" | 12/1/1999 |

| REDEMPTION IDENTIFIER 3702 | RETAILER IDENTIFIER 3704 | EXPECTED RETAILER AMOUNT 3706 | STATUS 3708 |
|---|---|---|---|
| 877175671 | R771-41 | $500 | PENDING |
| 1234123412341234 | R679-99 | $95 | REDEEMED |
| 1111222233334444 | R771-41 | $100 | N/A |

FIG. 37

| REDEMPTION IDENTIFIER 3802 | STATUS 3804 | PRODUCT IDENTIFIER 3806 | DATES VALID RANGE 3808 |
|---|---|---|---|
| 1111-2222-3333-4444 | REDEEMED | P304-44 | 1/15/03 - 7/15/03 |
| 1111-3333-4444-5555 | PENDING | P089-55 | 1/15/03 - 7/15/03 |
| 1111-4444-5555-6666 | CANCELED | P999-99 | 1/16/03 - 7/16/03 |

| TRANSACTION IDENTIFIER<br>3902 | TIME<br>3904 | PRODUCT IDENTIFIER(S)<br>3906 | PAYMENT METHOD<br>3908 | PAYMENT STATUS<br>3910 |
|---|---|---|---|---|
| T100-0391 | 3/17/99<br>1:57 PM | P107-99;<br>P333-77 | REDEMPTION IDENTIFIER | COMPLETE |
| T107-2517 | 3/17/99<br>2:12 PM | P999-22 | CASH | COMPLETE |

FIG. 39

| PRODUCT IDENTIFIER 6302 | MINIMUM ACCEPTABLE PRICE 6304 | SELLER IDENTIFIER 6306 | RETAILER IDENTIFIER 6308 |
|---|---|---|---|
| P132-01 | $110 | S13204 | R771-41; R993-03; R218-99; R982-19 |
| P132-01 | $190 | S40290 | R753-93 |
| P098-75 | $250 | S80513 | R679-99; R103-33; R218-99; R628-41 |
| P195-33 | $95 | S80513 | R679-99; R107-45; R091-10 |

| PRODUCT IDENTIFIER 6402 | SUBSIDY AMOUNT 6404 | SELLER IDENTIFIER 6406 |
|---|---|---|
| P132-01 | $50 | S13204 |
| P098-75 | $50 | S12340 |
| P195-33 | $30 | S80513 |
| P713-05 | $75 | S23456 |
| P042-19 | $70 | S45678 |
| P911-44 | $25 | S67890 |
| P555-02 | $10 | S23456 |

| PRODUCT IDENTIFIER 6502 | RETAILER IDENTIFIER 6504 | SETTLEMENT PRICE 6506 |
|---|---|---|
| P132-01 | R218-99 | $150 |
| P132-01 | R982-19 | $145 |
| P132-01 | R084-34 | $160 |
| P132-01 | R753-93 | $150 |
| P098-75 | R218-99 | $300 |
| P098-75 | R075-15 | $300 |
| P195-33 | R873-93 | $125 |

FIG. 65

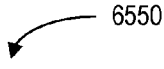
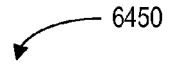
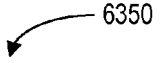
FIG. 66

| RETAILER IDENTIFIER 6702 | RETAILER NAME 6704 | RETAILER TYPE 6706 | RETAILER ADDRESS 6708 |
|---|---|---|---|
| R031-29 | WALMAK STORE #1920 | SINGLE STORE | 10 SOUTH ST. NEW TOWN, USA |
| R192-05 | SIRCUIT CITY STORE #8132 | SINGLE STORE | 2930 HIGH BLVD. CITYVILLE, USA |
| R302-11 | JOE'S ELECTRONICS | SINGLE STORE | 89 COUNTRY LN. PORT SHIP, USA |
| R718-93 | WALMAK STORE #2311 | SINGLE STORE | 357 LONG HWY. METROPOLIS, USA |
| R012-39 | SEERS | ALL STORES | N/A |

FIG. 67

| OFFER IDENTIFIER 6801 | REDEMPTION CODE 6802 | BUYER NAME 6804 | BUYER E-MAIL 6806 | BUYER ADDRESS 6808 | BUYER'S PRICE 6810 | OFFER STATUS 6812 | SELLER IDENTIFIER 6814 |
|---|---|---|---|---|---|---|---|
| O231-283 | N/A | BOB SMITH | BUCK@ AOL.COM | 45 CURVING LANE SMALL TOWN, USA | $100 | REJECTED | N/A |
| O245-092 | 1111-2222-3333-4444 | JENNIFER DOE | JENNY@ ATT.COM | 834 BRIDGE ST. CITY, USA | $200 | ACCEPTED | S67890 |
| O332-001 | 0384-1827-3827 | BRIAN JONES | BIFF@ SURFREE.COM | 333 DIRT RD. VILLAGE, USA | $300 | REDEEMED | S12345 |
| O532-123 | 4638-1029-3746 | ARI BROWN | ARI@ CBC.COM | 2909 COBBLE DR. METROPOLIS, USA | $100 | REDEEMED | S34567 |

FIG. 68A 6800 (CONT.)

| AUTHORIZED RETAILER IDENTIFIER 6816 | REDEMPTION RETAILER IDENTIFIER 6817 | PRODUCT IDENTIFIER 6818 | AUTHORIZED AMOUNT 6820 | CHARGED AMOUNT 6822 | PAYMENT IDENTIFIER 6824 |
|---|---|---|---|---|---|
| N/A | N/A | P098-75 | N/A | N/A | 2222-3333-4444-5555 |
| R031-29; R192-05; R302-11 | R192-05 | P909-09 | $220 | N/A | 3333-4444-5555-6666 |
| R031-29; R718-93 | R031-29 | P201-45 | $330 | $319.50 | 4444-555-6666-7777 |
| R192-05; R302-11; R012-39 | R012-39 | P444-04 | $110 | $105 | 5555-6666-7777-8888 |

FIG. 68B

| RETAILER IDENTIFIER 6902 | TOTAL PAID BY, TO DATE 6904 | TOTAL PAID TO, TO DATE 6906 | CURRENT AMOUNT OWED BY 6908 | CURRENT AMOUNT DUE TO 6910 | LAST BILLING DATE 6912 |
|---|---|---|---|---|---|
| R031-29 | $89,700 | $934,930 | $450 | $4,925 | 4/15/99 |
| R192-05 | $53,250 | $723,900 | $367 | $4,150 | 4/15/99 |
| R302-11 | $28,973 | $400,340 | $890 | $10,500 | 4/15/99 |

| SELLER IDENTIFIER 7002 | TOTAL PAID BY, TO DATE 7004 | TOTAL PAID TO, TO DATE 7006 | CURRENT AMOUNT OWED BY 7008 | CURRENT AMOUNT DUE TO 7010 | LAST BILLING DATE 7012 |
|---|---|---|---|---|---|
| S12345 | $319,750 | $30,900 | $10,900 | $2,100 | 4/15/99 |
| S23456 | $567,890 | $55,670 | $69,450 | $7,300 | 4/15/99 |
| S34567 | $650,025 | $65,900 | $32,700 | $2,560 | 4/15/99 |

FIG. 70

| OFFER CODE 7101 | REDEMPTION CODE 7102 | PRODUCT IDENTIFIER 7104 | BUYER'S PRICE 7106 | STATUS 7108 |
|---|---|---|---|---|
| O321-213 | 1876-3290-0187 | P404-99 | $200 | PENDING |
| O977-123 | 1111-2222-3333-4444 | P555-11 | $350 | REDEEMED |
| O413-321 | 7401-3872-0283 | P707-33 | $150 | REDEEMED |
| O091-112 | 5362-9102-6251 | P732-44 | $200 | REDEEMED |
| O769-063 | 3427-1902-8172 | P320-82 | $125 | PENDING |

FIG. 71

| PRODUCT IDENTIFIER 7202 | SUBSIDY AMOUNT 7204 | QUANTITY SOLD 7206 |
|---|---|---|
| P132-01 | $50 | 1,730 |
| P098-75 | $60 | 4,235 |
| P195-33 | $25 | 708 |
| P713-05 | $10 | 410 |
| P042-19 | $30 | 2,175 |

| ISSUER IDENTIFIER 7302 | ISSUER NAME 7304 | ISSUER ADDRESS 7306 |
|---|---|---|
| 5555 | CITIRANK | FILEPATH |
| 3333 | MBRA | FILEPATH |
| 2222 | NABANKO | FILEPATH |
| 9999 | FIRST EBA | FILEPATH |
| 1111 | CENTRAL SYSTEM | FILEPATH |

FIG. 73

| ISSUER IDENTIFIER 7402 | AMOUNT OWED 7404 | PAYMENT DUE DATE 7406 |
|---|---|---|
| 5555 | $30,900 | 5/15/99 |
| 3333 | $23,750 | 5/15/99 |
| 2222 | $43,900 | 5/15/99 |
| 9999 | $75,070 | 5/15/99 |
| 1111 | $46,345 | 5/15/99 |

| RETAILER IDENTIFIER 7502 | ISSUER IDENTIFIER 7504 | AMOUNT DUE 7506 | ISSUER IDENTIFIER 7508 | AMOUNT DUE 7510 |
|---|---|---|---|---|
| R031-29 | 5555 | $10,000 | 1111 | $10,345 |
| R192-05 | 3333 | $23,750 | 5555 | $20,900 |
| R302-11 | 1111 | $16,000 | 9999 | $50,020 |
| R718-93 | 9999 | $25,050 | 1111 | $10,000 |
| R012-39 | 2222 | $43,900 | 1111 | $10,000 |

FIG. 75

| THIRD PARTY SUBSIDY IDENTIFIER 7602 | THIRD PARTY SUBSIDY DESCRIPTION 7604 | THIRD PARTY SUBSIDY AMOUNT 7606 | THIRD PARTY IDENTIFIER 7608 |
|---|---|---|---|
| A33-11 | APPLY FOR MBRA GOLD CARD | $20 | 1672 |
| A33-12 | 6-MONTH SUBSCRIPTION TO SCIENCE MAGAZINE | $10 | 4523 |
| A33-13 | OPEN ACCOUNT WITH E-BARTER | $30 | 7839 |

| THIRD PARTY IDENTIFIER 7702 | THIRD PARTY ADDRESS 7704 | AMOUNT DUE FROM THIRD PARTY 7706 |
|---|---|---|
| 1672 | FILEPATH | $14,900 |
| 4523 | E-MAIL | $23,500 |
| 7839 | CITY + STATE | $17,800 |

FIG. 77

PURCHASING, REDEMPTION, AND SETTLEMENT SYSTEMS AND METHODS WHEREIN A BUYER TAKES POSSESSION AT A RETAILER OF A PRODUCT PURCHASED USING A COMMUNICATION NETWORK

CROSS REFERENCE TO RELATED APPLICATIONS

The present application is a divisional application of U.S. patent application Ser. No. 10/821,255 filed on Apr. 8, 2004 now abandoned, which is a continuation-in-part of the following U.S. Patent Applications:

(1) U.S. patent application Ser. No. 09/337,906, filed Jun. 22, 1999 in the name of Walker et al., which issued as U.S. Pat. No. 6,754,636, which in turn is a continuation-in-part of U.S. patent application Ser. No. 08/889,503 filed Jul. 8, 1997 now U.S. Pat. No. 6,249,772 and entitled "System and Process for Local Acquisition of Products Priced Online" (97-032); Ser. No. 08/889,319 filed Jul. 8, 1997 now U.S. Pat. No. 6,085,169 and entitled "Conditional Purchase Offer Management System" (96-008X); Ser. No. 09/190,744 filed Nov. 12, 1998 now abandoned and entitled "Method and Apparatus for A Cryptographically Assisted Commercial Network System Designed to Facilitate Buyer-Driven Conditional Purchase Offers" (96-008XXX), which is a continuation of Ser. No. 08/707,660 now U.S. Pat. No. 5,794,207, filed Sep. 4, 1996; and Ser. No. 09/083,345 filed May 22, 1998 now abandoned and entitled "Method and Apparatus for Managing Remote Vending Machine Transactions" (97-554);

(2) U.S. patent application Ser. No. 09/388,723, filed Sep. 2, 1999 now abandoned in the name of Walker et al., which in turn is a continuation-in-part of U.S. patent application Ser. No. 09/337,345 filed Jun. 21, 1999 now U.S. Pat. No. 6,404,729 and entitled "Purchasing Systems and Methods Wherein a Buyer Takes Possession at a Retailer of a Product Purchased Using a Communication Network" (99-013), which is a continuation-in-part of U.S. patent application Ser. No. 08/889,503 filed Jul. 8, 1997 now U.S. Pat. No. 6,249,772 and entitled "System and Process for Local Acquisition of Products Priced Online" (97-032); Ser. No. 08/889,319 filed Jul. 8, 1997 now U.S. Pat. No. 6,085,169 and entitled "Conditional Purchase Offer Management System" (96-008X); Ser. No. 09/190,744 filed Nov. 12, 1998 now abandoned and entitled "Method and Apparatus for A Cryptographically Assisted Commercial Network System Designed to Facilitate Buyer-Driven Conditional Purchase Offers" (96-008XXX), which is a continuation of Ser. No. 08/707,660 now U.S. Pat. No. 5,794,207, filed Sep. 4, 1996; and Ser. No. 09/083,345 filed May 22, 1998 now abandoned and entitled "Method and Apparatus for Managing Remote Vending Machine Transactions" (97-554); and (3) U.S. patent application Ser. No. 09/348,566, filed Jul. 7, 1999 in the name of Walker et al., which issued as U.S. Pat. No. 7,039,603, which in turn is a continuation-in-part of U.S. patent application Ser. No. 09/337,345 filed Jun. 21, 1999 now U.S. Pat. No. 6,404,729 and entitled "Purchasing Systems and Methods Wherein a Buyer Takes Possession at a Retailer of a Product Purchased Using a Communication Network" (99-013), which is a continuation-in-part of U.S. patent application Ser. No. 08/889,503 filed Jul. 8, 1997 now U.S. Pat. No. 6,249,772 and entitled "System and Process for Local Acquisition of Products Priced Online" (97-032); Ser. No. 08/889,319 filed Jul. 8, 1997 now U.S. Pat. No. 6,085,169 and entitled "Conditional Purchase Offer Management System" (96-008X); Ser. No. 09/190,744 filed Nov. 12, 1998 now abandoned and entitled "Method and Apparatus for A Cryptographically Assisted Commercial Network System Designed to Facilitate Buyer-Driven Conditional Purchase Offers" (96-008XXX), which is a continuation of Ser. No. 08/707,660 now U.S. Pat. No. 5,794,207, filed Sep. 4, 1996; and Ser. No. 09/083,345 filed May 22, 1998 now abandoned and entitled "Method and Apparatus for Managing Remote Vending Machine Transactions" (97-554).

The entire content of each of the above applications is incorporated by reference herein for all purposes.

The present application is also related to the subject matter of U.S. patent application Ser. No. 08/943,483 filed Oct. 3, 1997 and entitled "System and Method for Facilitating Acceptance of Conditional Purchase Offers" (97-072); Ser. No. 08/858,738 filed May 19, 1997 and entitled "System and Process for Issuing and Managing Forced Redemption Vouchers Having Alias Account Numbers" (96-139); and Ser. No. 08/997,680 filed Dec. 23, 1997 and entitled "Method and Apparatus for Issuing and Managing Gift Certificates" (96-139X). The entire contents of these applications are hereby incorporated by reference.

FIELD OF THE INVENTION

The present invention relates to the sale of products. In particular, the present invention relates to purchasing, redemption, and settlement systems and methods wherein a buyer takes possession at a retailer of a product purchased using a communication network.

BACKGROUND OF THE INVENTION

Typically, a buyer visits one or more retailers to shop for a product. When the buyer finds the product he or she is looking for, at a reasonable price, the buyer purchases the product from the retailer. This traditional method of providing products to buyers, however, may require that the buyer visit a number of retailers to determine a reasonable price for the product.

Moreover, the traditional method of selling a product to a buyer requires that a retailer attract buyers, such as by spending money on advertising. For example, when a new retail store opens for business, many buyers will not know what products the store sells. In addition, traditional methods do not let a product manufacturer establish a pricing relationship directly with buyers when the product is provided to buyers through one or more retailers. For example, a manufacturer may sell a product to a retailer (perhaps through a distributor) that ultimately decides the price at which the product is sold to buyers. A manufacturer may also provide a manufacturer's rebate or coupon to a buyer. Such a rebate or coupon, however, typically does not completely bypass the retailer's pricing structure (e.g., the buyer may receive a 10% discount from the retail price of a product).

Recently, products have been sold to buyers through communication networks, such as with online transactions completed through the Internet. Internet sales have been growing steadily over the past few years, and are expected to continue increasing because buyers are attracted to the ease and convenience of shopping online. For example, a buyer can shop online from the comfort of home at any time of day or night.

Another advantage of online shopping is that pricing comparisons are less time consuming. For example, a Web service can compile prices from various sources (e.g., Web merchants and/or retail stores that are not online) for various products. This lets a buyer easily find and select, for example, a retail store that offers the lowest price for a product. Although this will save a buyer time, only regular retail prices (which the buyer would eventually be able to find without the Web site) are typically reported—without providing any other pricing advantage. As price information becomes more accessible, buyers are growing more price sensitive and demand that products be sold at lower prices.

Having a product shipped to a buyer, which is the conventional mode of delivering a product purchased online, presents several drawbacks. For example, many buyers are not home during the day and cannot sign for, or otherwise arrange to receive, the product from a delivery service. In addition, the shipping service itself presents an additional cost that, depending on the product, may offset any savings made possible by shopping online. Finally, some products simply cannot be delivered at all, such as a service provided to buyers.

With respect to a buyer, another disadvantage of online shopping is the delay involved with receiving a product. The online shopping community has not effectively captured the impulsive and impatient buyer market, because a buyer is more likely to impulsively purchase a product when he or she can take immediate possession (instead of waiting several days for delivery). In other words, a buyer who wants a product immediately is likely to visit a retailer and not buy the product online.

With respect to retail stores that are not online, online shopping presents additional problems. For example, the store is typically left completely out of any online shopping transaction. In addition to losing the potential profit from the sale of the product itself, the store loses any chance of selling the buyer additional items during a visit, such as peripherals for the product or even unrelated items that attract the buyer's attention while he or she is in the store. This would still be a problem even if the store invested the time and money required to establish an online shopping service. Moreover, the store's online service may simply shift sales that would have otherwise occurred at the actual store (as opposed to attracting new buyers).

With respect to manufacturers, the availability of online shopping does little to solve the problem of establishing a pricing relationship directly with buyers. Some manufacturers have attempted to establish such a relationship by establishing an online shopping service. However, manufacturers that establish such a service compete directly with their retailer's traditional distribution channel and therefore risk alienating retailers that also sell the manufacturer's product. Additionally, establishing such a service requires a manufacturer to take on additional cost and responsibility in attracting and servicing customers directly.

A need therefore exists for methods and systems that use the capabilities and convenience of online shopping to provide buyers with reasonable pricing for products and satisfy the needs of an individual buyer more effectively. A further need exists for a system that allows the online sales industry to capture the impulsive and impatient buyer market.

SUMMARY OF THE INVENTION

To alleviate the problems inherent in the prior art, the present invention introduces purchasing, redemption and settlement systems and methods wherein a buyer takes possession at a retailer of a product purchased using a communication network.

In one embodiment of the present invention, a purchasing system communicates with a buyer through a communication network to establish a first price for a product between the buyer and a seller. The purchasing system also arranges for the buyer to take possession of the product at a retailer, different from the seller, that offers the product for sale at a second price. Verification information, which enables the retailer to authorize the buyer to take possession of the product, is transmitted to the retailer. The buyer provides a payment, based on the first price, to the purchasing system in exchange for the right to take possession of the product at the retailer.

In another embodiment, a purchasing system receives a buyer offer, including an offer price, related to a product desired by a remote, prospective buyer. The purchasing system arranges for the prospective buyer to purchase the product. The purchasing system also arranges for the buyer to take possession of the product at a retailer.

In another embodiment, a purchasing system arranges for a buyer to purchase a product and transmits redemption information, including a redemption code, to the buyer. The redemption information may also include information that enables the creation of a voucher to be used when taking possession of the product at a retailer.

In still another embodiment of the present invention, the purchasing system again arranges for a buyer to purchase a product and transmits redemption information, including a redemption code, to the buyer. Information related to an attempt to take possession of the product, including the redemption code, is received by the purchasing system from a retailer, and a verification authorizing the buyer to take possession of the product is sent to the retailer.

In still another embodiment of the present invention, a retailer receives redemption information from a buyer, such as a pseudo payment identifier redemption code. The retailer also receives verification information from a purchasing system, the verification information enabling the retailer to authorize the buyer to take possession of a product. The retailer provides the product to the buyer and receives, from a party different than the buyer, a payment in exchange for providing the product to the buyer.

In still another embodiment of the present invention, a purchasing system arranges through a communication network for a buyer to purchase a product from a seller at a first price. The purchasing system also arranges for the buyer to take possession of the product at a retailer that offers the product for sale at a second price. Payment of an amount based on the first price is received from the buyer, and the purchasing system arranges for the retailer to receive payment of an amount based on a settlement price in exchange for providing the product to the buyer.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 6 is a tabular representation of a portion of a product category database according to an embodiment of the present invention.

FIG. 7 is a tabular representation of a portion of a product class database according to an embodiment of the present invention.

FIG. 8 is a tabular representation of a portion of a product feature database according to an embodiment of the present invention.

FIGS. 9A to 9D are tabular representations of portions of product databases according to embodiments of the present invention.

FIG. 10A is a tabular representation of a portion of a seller database according to an embodiment of the present invention.

FIG. 11 is a tabular representation of a portion of a retailer database according to an embodiment of the present invention.

FIGS. 12A and 12B are tabular representations of portions of an offer database according to an embodiment of the present invention.

FIG. 13 is a tabular representation of a portion of a supplemental offer database according to an embodiment of the present invention.

FIG. 14 is a tabular representation of a portion of an accepted offer database according to an embodiment of the present invention.

FIG. 16 is a tabular representation of a portion of a seller product database according to an embodiment of the present invention.

FIG. 18 is a tabular representation of a portion of a record of a retailer transaction database according to an embodiment of the present invention.

FIG. 19 is a tabular representation of a portion of a purchasing system transaction database according to an embodiment of the present invention.

FIG. 20 is a tabular representation of a portion of a pricing database according to an embodiment of the present invention.

FIGS. 21 to 21D are tabular representations of portions of databases that may be used to issue, track and authorize the redemption of redemption codes in the format of a credit card account number, in accordance with one embodiment of the present invention

FIGS. 32A and 32B are a tabular representation of a portion of an accepted offer database according to an embodiment of the present invention.

FIG. 33 is a tabular representation of a portion of a seller database according to an embodiment of the present invention.

FIG. 34 is a tabular representation of a portion of a retailer database according to an embodiment of the present invention.

FIG. 35 is a tabular representation of a portion of a supplemental product offer rules database according to an embodiment of the present invention.

FIG. 37 is a tabular representation of a portion of a redemption identifier database according to an embodiment of the present invention.

FIG. 38 is a tabular representation of a portion of a retailer redemption identifier database according to an embodiment of the present invention.

FIG. 39 is a tabular representation of a portion of a transaction database according to an embodiment of the present invention.

FIG. 63 is a tabular representation of a portion of a product database according to an embodiment of the present invention.

FIG. 64 is a tabular representation of a portion of a subsidy database according to an embodiment of the present invention.

FIG. 65 is a tabular representation of a portion of a settlement price database according to an embodiment of the present invention.

FIG. 66 is a tabular representation of portions of the product, subsidy and settlement price databases according to an embodiment of the present invention.

FIG. 67 is a tabular representation of a portion of a retailer database according to an embodiment of the present invention.

FIGS. 68A and 68B are a tabular representation of a portion of an accepted offer database stored at a purchasing system device according to an embodiment of the present invention.

FIG. 69 is a tabular representation of a portion of a retailer account database stored at a purchasing system device according to an embodiment of the present invention.

FIG. 70 is a tabular representation of a portion of a seller account database according to an embodiment of the present invention.

FIG. 71 is a tabular representation of a portion of an accepted offer database stored at a retailer device according to an embodiment of the present invention.

FIG. 72 is a tabular representation of a portion of a seller product database according to an embodiment of the present invention.

FIG. 73 is a tabular representation of a portion of an issuer database according to an embodiment of the present invention.

FIG. 74 is a tabular representation of a portion of an issuer account database according to an embodiment of the present invention.

FIG. 75 is a tabular representation of a portion of a retailer account database stored at a credit card processing system device according to an embodiment of the present invention.

FIG. 76 is a tabular representation of a portion of a third party subsidy database according to an embodiment of the present invention.

FIG. 77 is a tabular representation of a portion of a third party account database according to an embodiment of the present invention.

DETAILED DESCRIPTION OF THE INVENTION

Purchasing Systems and Methods

Figure 1A:
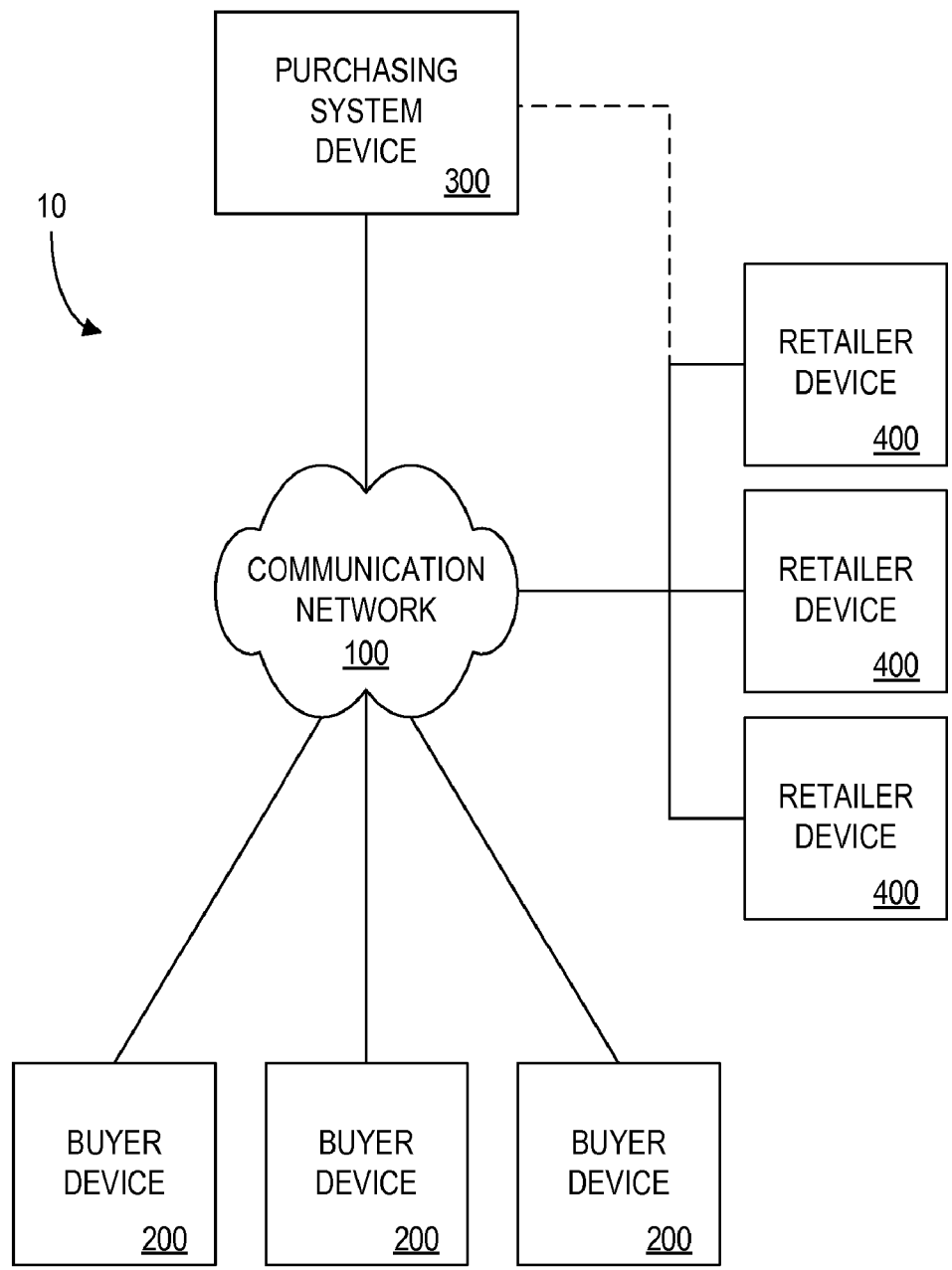
FIGS. 1A and 1B are block diagram overviews of systems in which a buyer takes possession of a product at a retailer according to embodiments of the present invention.

In accordance with at least one embodiment, the present invention is directed to purchasing systems and methods wherein a buyer takes possession of a product at a retailer. Turning now in detail to the drawings, FIG. 1A is a block diagram overview of a system 10 according to one embodiment of the present invention. The system 10 includes a number of buyer devices 200 coupled to a purchasing system device 300 through a communication network 100. The buyer devices 200 may be, for example, Personal Computers (PCs), Personal Digital Assistants (PDAs), wired or wireless telephones, one-way or two-way pagers, kiosks, Automated Teller Machines (ATMs), watches enabled to communicate with the network 100, or any other appropriate communication device.

The communication network 100 may be, for example, a Local Area Network (LAN), a Wide Area Network (WAN), a wireless network, a Public Switched Telephone Network (PSTN), or an Internet Protocol (IP) network such as the Internet, an intranet or an extranet. In one embodiment, the buyer devices 200 communicate with a remote Web-based purchasing system device 300 through the Internet.

According to an embodiment of the present invention, the purchasing system device 300 receives a buyer offer, including a buyer-defined offer price, related to a product to be purchased. The buyer offer may be "binding" in that if a seller agrees the accept the offer the buyer cannot revoke the offer. One example of a buyer offer, called a Conditional Purchase Offer (CPO), is described in U.S. Pat. No. 5,794,207 and U.S. patent application Ser. No. 08/889,319, the entire contents of which are hereby incorporated by reference. A CPO may be, for example, an electronic message from a buyer including an offer price for a product. If a seller agrees to the CPO, the buyer pays the offer amount to the purchasing system and the product is provided to the buyer by a retailer. The purchasing system, in turn, provides a payment to the retailer for providing the product to the buyer. Such a payment to the retail will be referred to herein as a "settlement" amount, and may be equal to, less than or more than the retail price the retailer typically charges customers for the product.

In addition to an offer price, the buyer offer can include other information, such as a product category, a product class, a product manufacturer and model number, and one or more product features. For example, the buyer offer may indicate that the buyer will pay $500 (the offer price) for a television (the product category) made by a well-respected manufacturer and having a 32 inch screen (the product class) and surround sound (a product feature).

The buyer offer may be received from a buyer device 200 through the communication network 100. According to one embodiment, the purchasing system device 300 arranges for the buyer to purchase the product from a "seller," such as the product manufacturer, a retailer, the purchasing system or any other party. The purchasing system device 300 also arranges for the buyer to take possession of the product at a retailer.

It should be noted that, as used herein, a "product" may be, for example, a new or used consumer product such as an electronic device. A product may also be any other good or service that a buyer can take possession of at a retailer. In the case of a service, the product may be, for example, a car tune-up that the buyer "takes possession of" at (i.e., receive receives the service from) a car service center. A product may also be a package of multiple items and/or services. For example, a product may be a television and a Video Cassette Recorder (VCR). In this case, the purchasing system could arrange for the buyer to take possession of both items at a single retailer or at different retailers.

As used herein, a "retailer" may be any entity capable of providing a product to a buyer. For example, a retailer might be a single retail shop, a chain of consumer electronic "superstores," one or more retail stores within a chain, a franchisee, a franchiser, or even a warehouse where products are stored.

According to an embodiment of the present invention, the buyer pays the purchasing system in exchange for the right to take possession of the product at the retailer. The retailer receives a payment, which may or may not be based on the amount paid by the buyer, from a party other than the buyer, such as the purchasing system or product manufacturer, in exchange for providing the product to the buyer.

In another embodiment of the present invention, the purchasing system device 300 communicates with the buyer device 200 through the communication network 100 to establish a first price for a product between the buyer and a seller. The purchasing system device 300 also arranges for the buyer to take possession of the product at a retailer, different from the seller, that offers the product for sale at a second price. Verification information, which enables the retailer to authorize the buyer to take possession of the product, is transmitted from the purchasing system device 300 to a retailer device 400. The verification information may be, for example, a one way hash function transmitted to the retailer (either once or periodically). The retailer may then evaluate a redemption code provided by the buyer, using the one way hash function, to determine if the buyer is authorized to take possession of the product. The verification information may also be, for example, a response to information (sent from the retailer device 400 to the purchasing system device 300) about an attempt to take possession of a product, or a batch of authorized codes sent to the retailer device 400 each night. The buyer provides a payment, based on the first price, to the purchasing system in exchange for the right to take possession of the product at the retailer. The purchasing system, in turn, provides payment to the retailer for allowing the buyer to take possession of the product.

According to another embodiment of the present invention, the purchasing system device 300 arranges for a buyer to purchase a product and transmits redemption information, including a "redemption code," to the buyer device 200, such as through the communication network 100. As used herein, a "redemption code" may be, for example, a unique alphanumeric sequence of digits. In general, however, the redemption code may be anything capable of being identified, such as a one or two dimensional bar code, that represents the right of the buyer to take possession of the product at a retailer. As used herein, the phrase "bar code" includes any machine readable information. The redemption information can also include information that enables the creation of a voucher. For example, a printer attached to a PC may be used to print a coupon-like voucher including the redemption code.

According to still another embodiment of the present invention, information related to an attempt to take possession of the product, including the redemption code, is sent from a retailer device 400 to the purchasing system device 300. In this case, the purchasing system device 300 can send back a verification, authorizing the buyer to take possession of the product, to the retailer device 400. Although FIG. 1A shows the purchasing system device 300 communicating with the retailer device 400 through the same communication network 100 used by the buyer device 200, those skilled in the art will recognize that a different communication network may be used instead (as indicated by the dashed line in FIG. 1A).

Figure 1B:
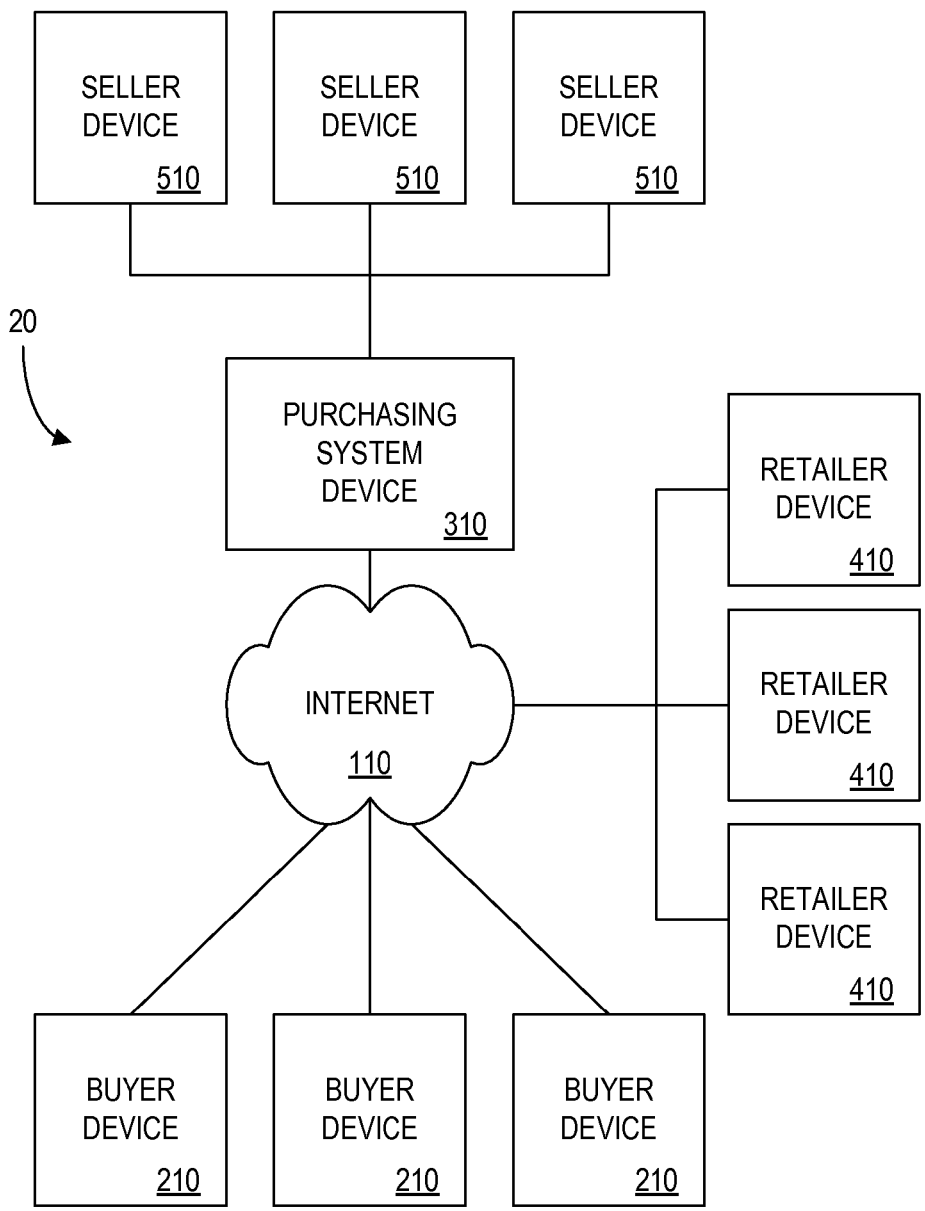

A more detailed description of one embodiment of the present invention will now be provided with respect to FIG. 1B. As before, the system 20 includes a number of buyer devices 210 (such as PCs executing browser application software) coupled to a purchasing system device 310 (such as a Web server) through the Internet 110. Although embodiments of the present invention will be described with respect to information exchanged using a Web site, according to other embodiments of the present invention information may instead be exchanged using, for example: a telephone; a facsimile machine; e-mail; a WebTV interface; a cable network interface, or a wireless device. Information exchanged between a buyer and purchasing system device 310, as well as between a retailer and the purchasing system device 310, may also use a Voice Response Unit (VRU) or Interactive VRU (IVRU). Examples of IVRUs include the Vision 2001 and the Insight IVR/Web from Interactive Voice Technologies, Corp. and the OmniVox for Windows NT from APEX Voice Communications. An IVRU lets a user of a DTMF (Dual Tone Multi-Frequency) tone generating telephone, also known as "push button" telephone, communicate with a computer. The DTMF signals received from a user's telephone are interpreted by an IVRU server, and the server may also communicate with the user by generating and transmitting voice or other audio signals, such as a list of IVRU menu options.

The purchasing system device 310 arranges for the buyer to purchase the product, for example, when a buyer offer is received from a buyer device 210 through the Internet 110. As explained in greater detail with respect to FIGS. 2 and 3, the purchasing system device 310 may or may not route information about the buyer offer to, for example, a number of seller devices 510.

Based on the buyer offer information, the purchasing system device 310 may select a particular product (such as a manufacturer and model number) from a plurality of possible products. In addition to the buyer offer information, the purchasing system device 310 may also consider other factors when selecting a particular product, such as, for example: (i) the expected availability of products at retailers; (ii) the actual availability of product at retailers—which may be done by communicating with the retailer devices 410; (iii) retail prices of products at various retailers—which again may be done by communicating with the retailer devices 410; (iv) subsidy information associated with products; and (v) retailer settlement prices. As used herein, a "subsidy" is an amount a party (such as a manufacturer, a retailer or the purchasing system) is willing to contribute towards the buyer's purchase of a product.

By way of example, consider a buyer who sends the purchasing system device 310 an offer to purchase a 35 millimeter (mm) camera for $150. The purchasing system device 310 and/or the seller devices 510 may determine that cameras produced by two different manufacturers can be used to fulfill the buyer's offer. Both cameras are available at a retailer for the same settlement price of $175. One of the manufacturers, however, has agreed to provide a $35 manufacturer subsidy for each camera sold. In this case, the purchasing system device 310 may select the camera produced by that manufacturer to accept the buyer's offer and realize a $10 gain (i.e., the buyer's offer price of $150 less the retailer's settlement price of $175 plus the manufacturer subsidy of $35).

The purchasing system device 310 may likewise select one or more retailers from a plurality of possible retailers. In this case, the purchasing system device 310 may consider, for example: (i) the location of the buyer; (ii) the location of the retailers; (ii) the expected availability of the product at various retailers; (iii) the actual availability of the product at various retailers; (iv) retail prices of the product at the retailers; (iv) retailer subsidy information; and (v) retailer settlement prices.

To determine whether or not the buyer offer is acceptable and/or how the buyer offer will be accepted (e.g., which product at which retailer), the purchasing system device 310 may compare the offer price with a settlement price associated with a product that successfully meets the buyer's offer information. A settlement price may be, for example, the amount that must be provided to a retailer by the purchasing system in exchange for providing a product to a buyer. A potential seller may also have a minimum acceptable price, which is the lowest price that the seller (as opposed to the retailer) will let the product be sold for (e.g., to prevent brand name dilution). In making this comparison, the purchasing system device 310 may also take into account supplemental price information, such as a manufacturer subsidy amount, a retailer subsidy amount, a purchasing system subsidy amount, and/or a "third-party" subsidy amount associated with the product. As used herein, a third-party subsidy amount may be, for example, an amount that a third-party agrees to provide in exchange for a promise regarding, an action by, or information about the buyer. For example, a credit card company may agree to add $50 towards the purchase of a home stereo if a buyer submits a credit card application to the company. See, for example, U.S. patent application Ser. No. 08/943,483 filed Oct. 3, 1997 and entitled "System and Method for Facilitating Acceptance of Conditional Purchase Offers" (97-072), the entire contents of which are hereby incorporated by reference.

According to embodiments of the present invention, the purchasing system device 310 also arranges for the buyer to take possession of the product at a retailer. This may be done, for example, by sending to the buyer redemption information, including a redemption code such as a "pseudo" credit card number, debit card number or a checking account number. A redemption code may be a "pseudo" credit card number if, for example, it can be entered into (and processed by) a retailer device, such as a Card Authorization Terminal (CAT) device, as if it was a real credit card number. The redemption information can also include a condition that must be met by the buyer, such as a geographic limitation or an expiration date. Penalty information, such as a 10% increase in the price of the product charged to the buyer, may also be included in the event the buyer violates one of the conditions of the sale. The redemption information may also enable the creation of a coupon-like voucher. For example, the redemption information may let the buyer print out a voucher that can be presented to the retailer when taking possession of the product.

Note that the redemption information may include information associated with a number of products, as well as a number of retailers. For example, a single voucher might indicate that the buyer can take possession of a VCR at either of three local retailers. In this case, the voucher may be redeemable for one of several different products, depending on the retailer at which the buyer takes possession of the product. Accordingly, the redemption information (e.g., a voucher), may include several different Stock Keeping Unit (SKU) numbers, model names and/or model numbers. According to another embodiment, the voucher may include several separate products (e.g., a television or a VCR) or several equivalent products (e.g., several different television brands, more than one of which may be available at a single retailer).

The redemption information may also include supplemental offer information. For example, the voucher may include an offer to purchase a pack of three VCR tapes for $1 to the buyer if the buyer takes possession of the VCR at a particular retailer.

When the buyer presents the voucher to a retailer, the retailer device 410 sends information related to an attempt to take possession of the product (such as the redemption code included on the voucher) to the purchasing system device 310. The retailer devices 410 may comprise, for example, inventory systems that periodically update the purchasing system device 310 and/or Point Of Sale (POS) devices, such as a POS controller that communicate with POS terminals (not shown in FIG. 1B) and the purchasing system device 310 during the redemption process. A POS terminal may include an optical bar code scanner to read bar codes on products and/or vouchers and a card reader to read cards such as magnetic strip cards that have magnetizable strips or surfaces on which data can be recorded. One such card reader is the OMNI™ 1450 payment terminal, manufactured by VeriFone, Inc., which includes a built-in, magnetic-stripe reader, a Personal Identification Number entry pad (e.g., one used buy a buyer to enter a debit card PIN) and an integrated smart card reader.

The purchasing system device 310 may communicate with the retailer device 410 in real time during the redemption of a voucher. That is, a POS controller may connect to the purchasing system device 310 when a buyer is attempting to take possession of the product. In another embodiment, the retailer device 410 and the purchasing system device 310 communicate periodically, such as every night at midnight. For example, the purchasing system device 310 could communicate with each retailer device 410 daily regarding the buyer redemption codes, redeemable at the retailer, that have been issued. Likewise, the retailer device 410 can in turn transmit to the purchasing system device 310 a list of the redemption codes that have been redeemed at the retailer in the last 24 hours. In some embodiments, the retailer is the seller who accepts a buyer's offer. In such an embodiment, the retailer device 410 could also perform the function of, or be in communication with another server that performs the function of, a potential seller.

When the retailer device 410 sends information related to an attempt to take possession of the product (such as a redemption code) to the purchasing system device 310, the information can be used to authorize the buyer to take possession of the product. That is, the purchasing system device 310 can send a verification back to the retailer device 410 authorizing the retailer to let the buyer take possession of the product. The purchasing system device 310 may also provide a payment to the retailer in exchange for providing the product to the buyer. In this case, of course, the amount paid to the retailer may or may not be equal to the offer amount paid by the buyer. For example, suppose the purchasing system arranges for a buyer to purchase a television for $300, and the buyer takes possession of the television at a retailer (one of several indicated on the voucher) that typically sells that television for $320. In this case, the purchasing system may pay the full retail price (i.e., $320) to the retailer.

Note that some or all of the actions associated with the purchasing system device 310 may be performed by a retailer, a product manufacturer, or a party other than the retailer and product manufacturer.

Figure 2A:
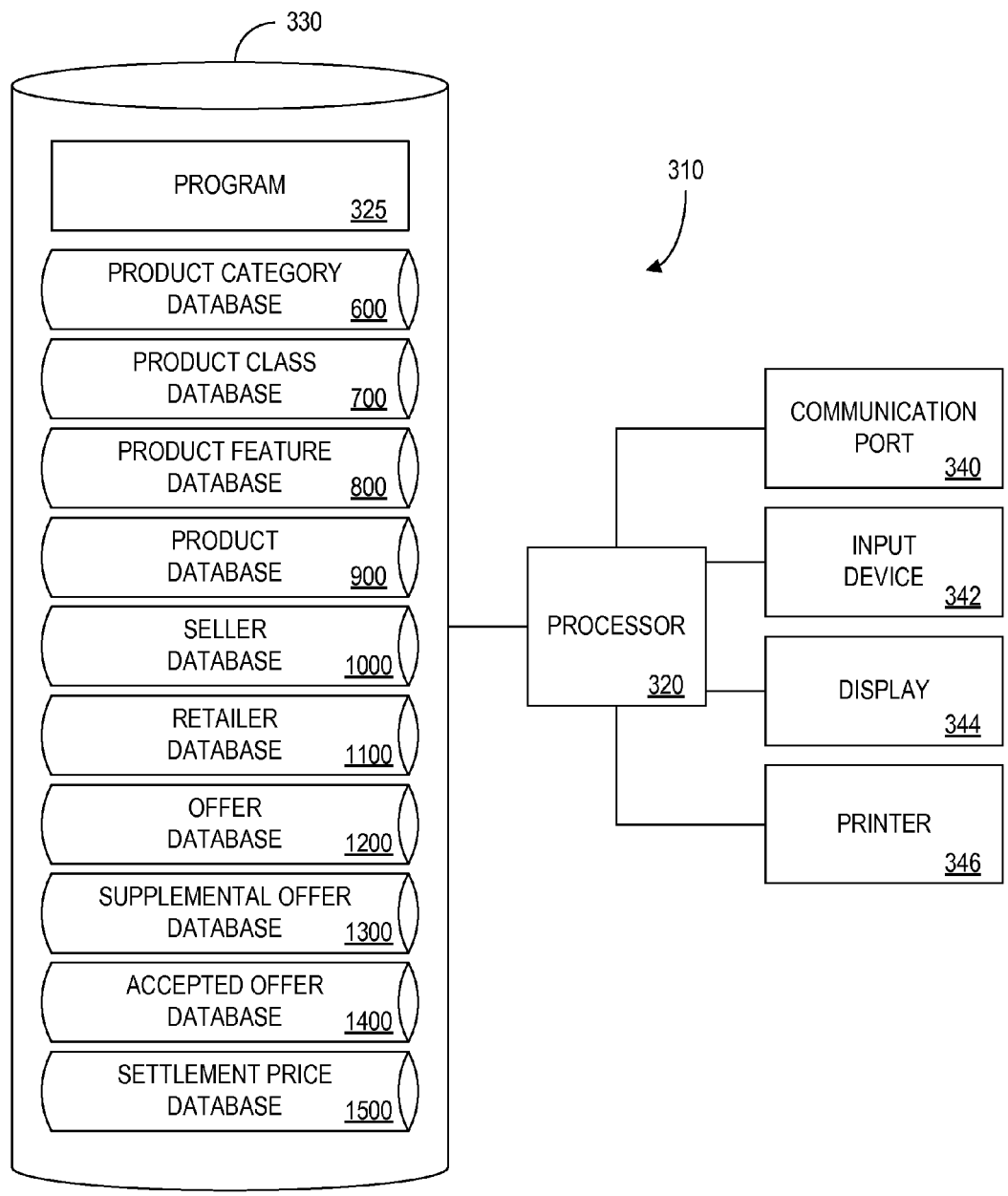
FIGS. 2A and 2B are block schematic diagrams of purchasing system devices according to embodiments of the present invention.
Figure 2B:
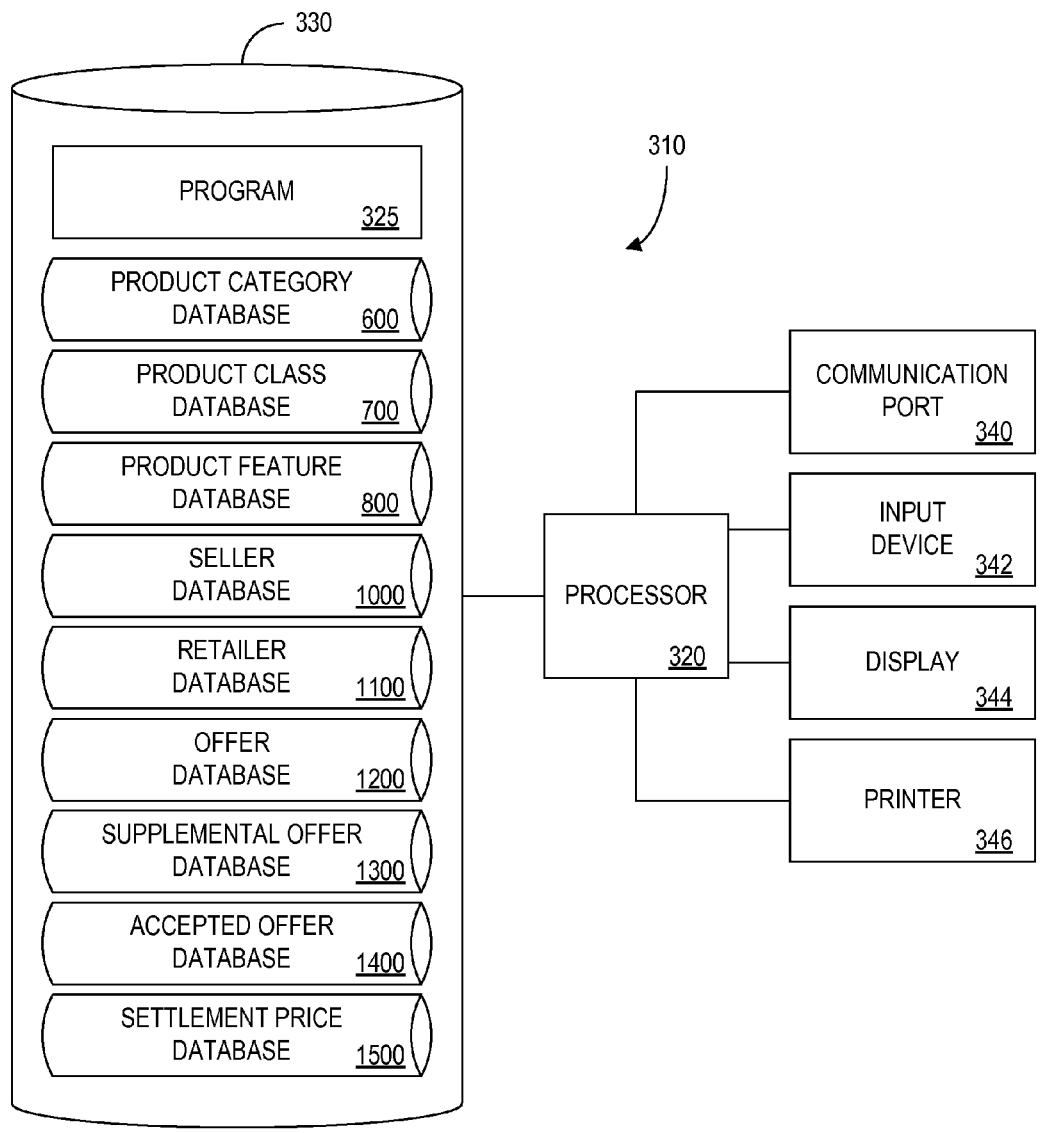

The operation of the purchasing system device 310 will now be described in greater detail with respect to two embodiments of the present invention: a "local database" embodiment (FIG. 2A); and a "routing embodiment" (FIG. 2B). Those skilled in the art, however, will recognize that these embodiments are merely illustrations and that many other embodiments of the present invention are possible.

Purchasing System Device—Local Database Embodiment

FIG. 2A illustrates a purchasing system device 310 that is descriptive of the device shown in FIG. 1B according to a "local database" embodiment of the present invention, wherein the information about products (available from sellers) for sale through the purchasing system is stored locally at the purchasing system device 310. The purchasing system device 310 comprises a processor 320, such as one or more Pentium® processors, coupled to: a communication port 340 configured to communicate through a communication network (not shown in FIG. 2A); an input device 342 (such as a keyboard or mouse); a display 344; and a printer 346. The communication port 340 may be used to communicate with, for example: (i) a plurality of seller devices 510; (ii) a plurality of buyer devices 210; and/or (iii) a plurality of retailer devices 410. The sellers may comprise, for example, product manufacturers and/or retailers. The buyers may comprise individuals who "log onto" a Web site and submit offers to purchase products (i.e., buyer offers). The Web site may be: (i) hosted by a server at the purchasing system device 310 or (ii) hosted by a server coupled to the purchasing system device 310.

The processor 320 is also in communication with a data storage device 330. The data storage device 330 comprises an appropriate combination of magnetic, optical and/or semiconductor memory, and may include Random Access Memory (RAM), Read-Only Memory (ROM) and/or a hard disk. The processor 320 and the storage device 330 may each be (i) located entirely within a single computer or other computing device; (ii) connected to each other by a remote communication medium, such as a serial port cable, telephone line or wireless frequency transceiver; or (iii) a combination thereof. In one embodiment, the purchasing system device 310 may comprise one or more computers that are connected to a remote server computer for maintaining databases.

The data storage device 330 stores a program 325 for controlling the processor 320. The processor 320 performs instructions of the program 325, and thereby operates in accordance with the present invention, and particularly in accordance with the methods described in detail herein. For example, when a buyer offer is received, the purchasing system device 310 may arrange for the buyer to purchase a product and takes possession of the product at a retailer. Note that, as used herein, information may be "received" by, for example: (1) the purchasing system device 310 from a buyer device 210; or (2) a software application or module within the purchasing system device 310 from another software application, module or any other source.

The program 325 may be stored in a compressed, uncompiled and/or encrypted format. The program 325 furthermore includes program elements that may be necessary, such as an operating system, a database management system and "device drivers" used by the processor 320 to interface with peripheral devices. Appropriate device drivers and other necessary program elements are known to those skilled in the art and are not described in detail herein.

Figure 15:
FIG. 15 is a tabular representation of a portion of a settlement price database according to an embodiment of the present invention.

As shown in FIG. 2A, the storage device 330 also stores: a product category database 600 (described in detail with respect to FIG. 6); a product class database 700 (described in detail with respect to FIG. 7); a product feature database 800 (described in detail with respect to FIG. 8); a product database 900 (described in detail with respect to FIGS. 9A to 9D); a seller database 1000 (described in detail with respect to FIG. 10A); a retailer database 1100 (described in detail with respect to FIG. 11); an offer database 1200 (described in detail with respect to FIGS. 12A and 12B); a supplemental offer database 1300 (described in detail with respect to FIG. 13); an accepted offer database 1400 (described in detail with respect to FIG. 14); and a settlement price database 1500 (described in detail with respect to FIG. 15). The schematic illustrations and accompanying descriptions of the databases presented herein are exemplary, and any number of other database arrangements could be employed besides those suggested by the figures.

As will now be described, the purchasing system device 310 shown in FIG. 2A lets a buyer establish a price for a product using a communication network (e.g., through the Internet) with a seller (e.g., a product manufacturer or a retailer) before taking possession of, or "picking up," the product, such as a service, at a convenient retailer. The purchasing system device 310 may issue the buyer a redemption code, such as code included on a printed voucher, that is redeemable for the product at one or more "participating" local retailers. That is, the purchasing system has agreements with these retailers such that the retailers agree to honor pricing system vouchers for specific products.

According to an embodiment of the present invention, each participating retailer establishes "settlement prices" for those products it will exchange for vouchers. The settlement price is the amount that the purchasing system must provide to the retailer in exchange for honoring a voucher. A retailer may set the settlement price below, at or above the product's retail price. The retailer may, for example, set the settlement price below the retail price for a give product to increase the likelihood of the purchasing system accepting a buyer's offer for the product and arranging for the buyer to take possession of the product at the retailer, thus generating additional traffic for the retailer (i.e., the buyers who come to the store to redeem vouchers).

In another embodiment of the present invention, a product manufacturer (acting as a seller) can bypass a retailer's pricing structure and establish a price for a product directly with a buyer without the burden of delivering the product to the buyer. Similarly, an embodiment of the present invention lets a retailer (acting as a seller) establish a price for a product with a particular buyer without lowering the price for the product typically charged at a retail store. This can attract new buyers without giving a discounted price to all customers who visit the retail store.

The purchasing system device 310 shown in FIG. 2A is referred to herein as a "local database" embodiment because the information needed to find and select a product to fulfill a buyer offer is locally stored in the product database 900. The purchasing system device 310 can also locally store available inventory submitted by sellers. For example, a seller may submit to the purchasing system device 310: (i) a description of the product to be sold by the purchasing system; (ii) the number of products available for sale; and (iii) any minimum price below which the seller will not agree to sell the product. In another embodiment, a seller's or retailer's actual inventory database (e.g., those products that are currently in a store or warehouse) can instead be linked to the purchasing systems product database 900, using distributed database techniques that are well known in the art.

The seller may add or remove products from the purchasing system inventory based on factors such as: (i) actual or forecast product demand (e.g., the sales rate); (ii) product age/perishability (e.g., discounting the product when it gets close to it's expiration date); (iii) product life cycle (e.g., new model is coming out soon); (iv) competitive forces (e.g., attempting to sell more of a product than a competitor is selling of a similar product); and/or (v) actual or forecast profitability of the product (e.g., margin/volume trade-off thresholds).

The purchasing system device stores product information, such as in the product database 900, for use when evaluating a buyer offer. In effect, the purchasing system device 310 acts as an "agent" for a seller when deciding whether or not to accept a buyer offer on the seller's behalf.

In contrast to the "routing" embodiment described with respect to FIG. 2B, in this embodiment the purchasing system device 310 does not route, or "broadcast," a buyer offer to one or more sellers. Note that the local database and routing embodiments are not mutually exclusive. That is, the purchasing system device 310 could locally store information with respect to certain sellers, and route buyer offers to other sellers. Similarly, the purchasing system device 310 could locally store some information with respect to a particular seller (such as a minimum price), but still route a buyer offer to that seller (such as to let that seller evaluate product inventory in order to determine whether or not to accept a particular buyer's offer).

A buyer offer received by the purchasing system device 310 is stored in the offer database 1200 and may include, for example: (i) product requirements; (ii) a buyer-defined offer price; and (iii) a payment identifier (e.g., a credit card account number). The buyer can specify product requirements by providing, for example: (i) a category of product (e.g., a television); (ii) a class of product (e.g., class 1 encompassing the top three manufacturers or all 21 inch screen televisions); (iii) a product manufacturer of a product; (iv) a model number of a product; and/or (v) features that the product must include (e.g., a remote control). The product category, class and feature databases 600, 700, 800 are used to help the buyer define his or her offer and are described in detail with respect to FIGS. 6 to 8.

The buyer's product requirements determine which products stored in the product database 900 (if any) can be used to accept the buyer offer. If the purchasing system device 310 finds a product that matches the buyer's offer, the purchasing system device 310 decides whether or not to accept the offer (such as by comparing the buyer price, adjusted for any subsidies, with the settlement price). When an offer is accepted, the purchasing system device 310 sends redemption information, such as voucher information, to the buyer and stores the accepted offer in the accepted offer database 1400.

If an offer is not accepted by any seller, the purchasing system device 310 may take further steps to try to fulfill the offer. For example, the purchasing system device 310 may automatically post an advertisement with an online classified advertisement service for the product, indicating the buyer's interest in obtaining the product at the price established online. Similarly, the purchasing system device 310 may search online auction services and, if a suitable product is found, make bids for the product on behalf of the buyer (up to, for example, the buyer offer price less a purchasing system profit amount). Such steps may be taken by the purchasing system to obtain a new or previously owned product for the buyer. For example, when submitting a buyer offer, the buyer may be asked whether he agrees to accept a previously owned product if a new product cannot be found to fulfill the buyer's offer. In one embodiment, the buyer may establish two prices online: one price for a new product, effective if such a product can be found; and one price for a previously owned product effective if a new product cannot be found.

Purchasing System Device—Routing Embodiment

FIG. 2B is a block schematic diagram of a purchasing system device 310 according to a "routing embodiment" of the present invention. As in FIG. 2A, the purchasing system device 310 includes a processor 320 coupled to: a communication port 340; an input device 342; a display 344; and a printer 346. The processor 320 is also coupled to a storage device 330 that stores a program 325 containing instructions adapted to be executed by the processor 320 to perform at least one embodiment of the present invention.

As shown in FIG. 2B, the storage device 330 also contains a product category database 600 (described in detail with respect to FIG. 6); a product class database 700 (described in detail with respect to FIG. 7); a product feature database 800 (described in detail with respect to FIG. 8); a seller database 1000 (described in detail with respect to FIG. 10A); a retailer database 1100 (described in detail with respect to FIG. 11); an offer database 1200 (described in detail with respect to FIGS. 12A and 12B); a supplemental offer database 1300 (described in detail with respect to FIG. 13); an accepted offer database 1400 (described in detail with respect to FIG. 14) and a settlement price database 1500 (described in detail with respect to FIG. 15).

Note that, according to this embodiment, there is no product database 900 (which, in local database embodiment illustrated in FIG. 2A, stored products available for sale through the purchasing system device 310). In the routing embodiment, the purchasing system device 310 determines what seller to route the buyer's offer to, based on (for example) the product category, and the seller determines, based on the seller's product and pricing availability, whether to accept the buyer's offer. According to another embodiment of the present invention, Universal Product Category (UPC) codes associated with a product may be used, for example, to determine which sellers should receive a buyer offer.

An offer may be "routed" to a seller by, for example: (i) allowing the seller access to the purchasing system device 310's databases; (ii) using database replication (e.g., periodically replicate a subset of the data, such as by taking periodic snapshots of the data and sending it to a seller); or (iii) determining whether to send each offer, as it is received, to sellers. Each potential seller determines whether or not to fulfill a particular buyer's offer, for example: (i) with an automated rules-based program to evaluate incoming buyer offers; or (ii) manually, on an ad-hoc basis, by seller's personnel. The seller then transmits an acceptance/rejection for each offer to the purchasing system device 310. The rules-based program can use a database of products the seller is ready to sell through the purchasing system device 310 together with the associated settlement price for each of those products.

In one embodiment, when the purchasing system device 310 routes an offer to a seller, subsidy information is also be routed with the offer (such as by routing the minimum subsidy amount that the settlement system will require if the seller accepts the buyer's offer). Similarly, a seller may send subsidy information to the purchasing system device 310 when attempting to accept a buyer's offer in an attempt to be selected by the purchasing system device 310.

If more than seller accepts the buyer offer, the purchasing system device 310 may select which seller will be used to fulfill the buyer offer. The purchasing system device 310 may, for example, simply use the first acceptance that is received. The purchasing system device 310 may instead, for example, send an offer to a second group of sellers if, and only if, every one of a first group of sellers has rejected the offer. The purchasing system device 310 may also, for example, award the buyer offer to a seller that guarantees to deliver the product to the buyer within 2 hours (e.g., through a local courier service). Similar consideration may include, for example: (i) the seller's volume; (ii) the profit to the purchasing system; (iii) the profit to the retailer or manufacturer; and (iv) a pre-set ranking of sellers or classes of sellers. Note that these considerations may also apply in the previously described local database embodiment.

When a seller that has accepted a buyer offer is selected, the purchasing system device 310 stores the indication of the acceptance in the offer database 1200 and notifies the buyer of the acceptance. The purchasing system device 310 also creates a new record in the accepted offer database 1400, where the accepted offer and relevant information are stored (e.g., the redemption code issued to the buyer, an offer identifier which uniquely identifies the offer, and the retailer identifier(s) identifying the retailers at which the offer may be redeemed).

Seller Device—Local Database Embodiment

Figure 3A:
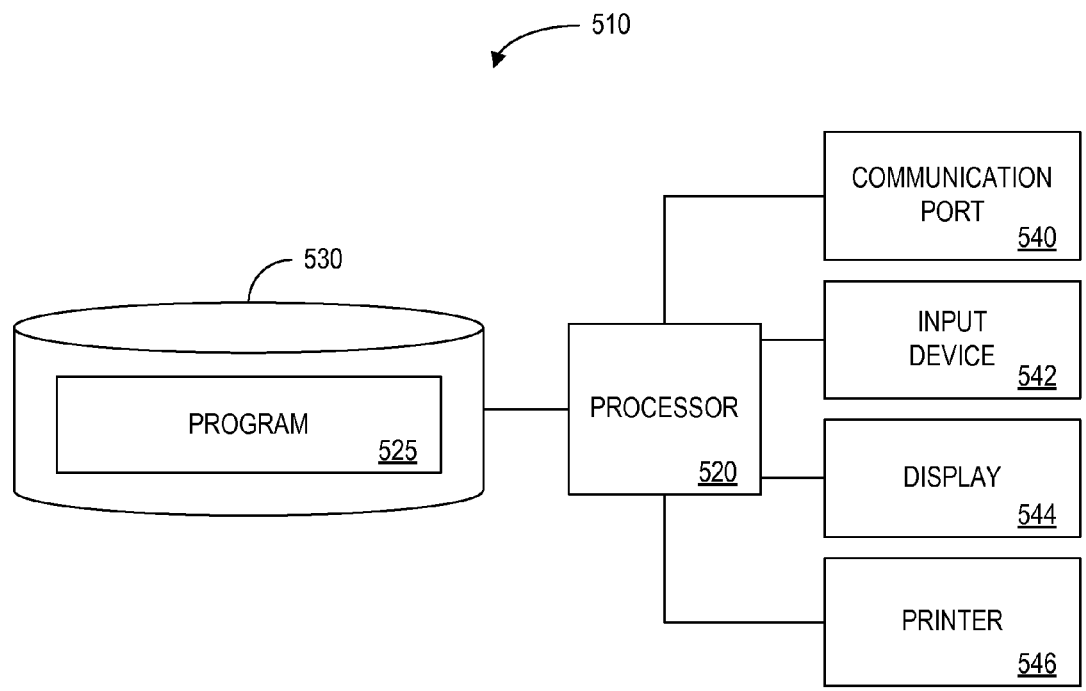
FIGS. 3A and 3B are block schematic diagrams of seller devices according to embodiments of the present invention.

FIG. 3A is a block schematic diagram of a seller device 510 according to the local database embodiment of the present invention. The seller device 510 includes a processor 520 coupled to: a communication port 540; an input device 542; a display 544; and a printer 546. The processor 520 is also coupled to a storage device 530 that stores a program 525 containing instructions adapted to be executed by the processor 520 to perform at least one embodiment of the present invention.

The seller device 510 communicates with the purchasing system device 310 using the communication port 540 to send information to be added to the product database 900. The information may include, for example: (i) what products the seller wants sold through the purchasing system; (ii) the settlement price that the seller is willing to accept for each of the products (if the seller is the retailer); (iii) in one embodiment, the quantity of a product that is available for sale through the purchasing system and/or the region in which the product or quantity of the product is available; and (iv) a minimum acceptable price (e.g., when the seller is a product manufacturer). The seller device 510 may receive such data from the seller's personnel via the input device 542. Alternatively, the seller device 510 may, based on a program or subroutine, determine: (i) what products to offer for sale through the purchasing system; (ii) the settlement prices for those products; and (iii) the quantity and regions of availability of the products. The seller device 510 may make such a determination based on, for example, the seller's current inventory and revenue management rules or predetermined rules input by the seller's personnel.

The seller device 510 additionally receives data from the purchasing system device 310 through the communication port 540. The received data may include: (i) the amount of payment owed by the seller for products sold through the purchasing system; and (ii) reports regarding the demand for products and the prices offered for the products from buyers using the purchasing system device 310. Such data may be provided to the seller's personnel on the display 544 or reports printed out with the printer 546.

Seller Device—Routing Embodiment

Figure 3B:
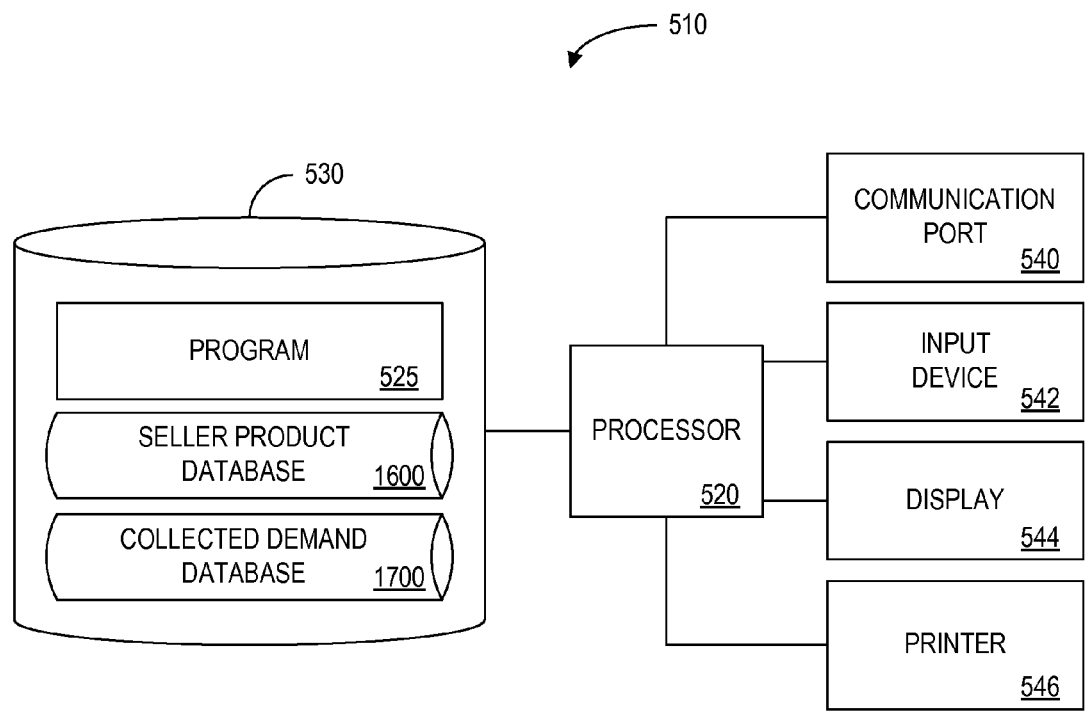

FIG. 3B is a block schematic diagram of a seller device according to the routing embodiment of the present invention. The seller device 510 includes a processor 520 coupled to: a communication port 540; an input device 542; a display 544; and a printer 546. The processor 520 is also coupled to a storage device 530 that stores a program 525 containing instructions adapted to be executed by the processor 520 to perform at least one embodiment of the present invention. As shown in FIG. 3B, the storage device 530 also contains a seller product database 1600 (described in detail with respect to FIG. 16) and a collected demand database 1700 (described in detail with respect to FIG. 17).

According to the routing embodiment, the seller stores the database of products available for sale through the purchasing system device 310. The seller device 510 may also store the "collected demand" for products (or for product descriptions that match the seller's products) directly as buyer offers are received from the purchasing system device 310. For example, the purchasing system device 310 may have 100 outstanding offers for a particular television model at a certain average price. While a seller may not wish to sell a single television at that price, it may agree to do so because the sale will involve 100 televisions (and therefore provide sufficient profit).

When a buyer offer is received by the seller, the seller queries a seller product database to determine, for example, whether: (i) there is a record whose product description successfully fulfills the product specified in the buyer's offer; and (ii) the offered price is at least equal to minimum acceptable price for that product. If the query results in a product that fulfills the buyer's offer, the seller accepts the offer and transmits the acceptance to the purchasing system device 310.

A seller may add inventory to the seller product database 1600 database: (i) automatically, for example, based on market conditions, such as the seller's current inventory or sales data (e.g., how many units of a particular product have sold within a predefined time period); or (ii) manually, on an ad hoc basis (e.g., based on current sales and inventory). According to one embodiment, when inventory of a product has remained stagnant for a predefined amount of time (i.e., the product is not selling), the product is automatically entered into the purchasing system database or the minimum acceptable price may be reduced, such as by 10%.

Buyer Device

Figure 4:
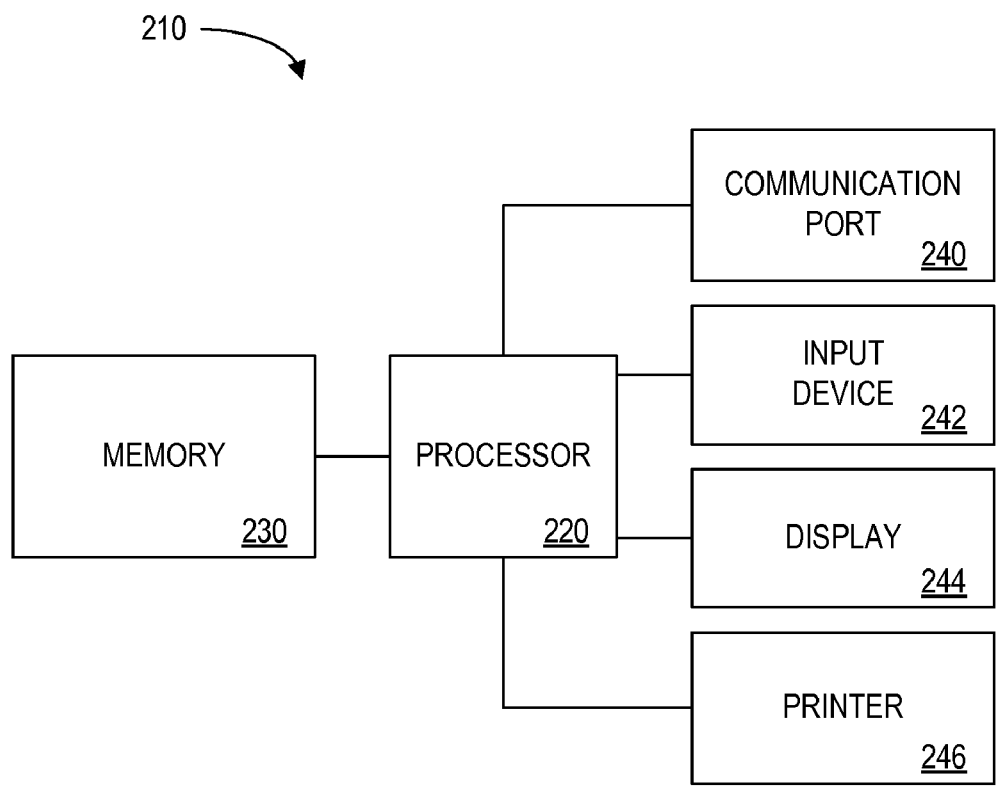
FIG. 4 is a block schematic diagram of a buyer device according to an embodiment of the present invention.

FIG. 4 is a block schematic diagram of a buyer device 210 according to an embodiment of the present invention. The buyer device 210 includes a processor 220 coupled to: a communication port 240; an input device 242; a display 244; and a printer 246. The processor 220 is also coupled to a memory 230 and may execute instructions to perform at least one embodiment of the present invention. A buyer uses the buyer device 210 to communicate with the purchasing system device 310 through, for example, the Internet.

The printer 246 shown in FIG. 4 is optional. If the buyer device 210 does not have the printer 246 attached, the buyer may write down a redemption code or store it in the buyer device 210 or another device, such as a portable buyer device. For example, the buyer may write down a redemption code and input it using a kiosk at the retailer. The kiosk may communicate with the purchasing system device 310, such as through an Internet connection, and retrieve the buyer's record (e.g. from the accepted offer database 1400) based on the redemption code. The kiosk could then print a voucher for the buyer, if desired.

According to another embodiment of the present invention, the buyer can take possession of the product without using a printed voucher. For example, the buyer may simply tell the POS terminal operator the redemption code. The operator inputs the redemption code using the POS terminal and the process continues as if the buyer had used a printed voucher. Also, if the buyer stores the redemption code in a portable buyer device (e.g., a PDA), the buyer may communicate the redemption code directly from the buyer device to the POS terminal, such as by using an Infra-Red (IR) communication link.

Retailer Device

Figure 5:
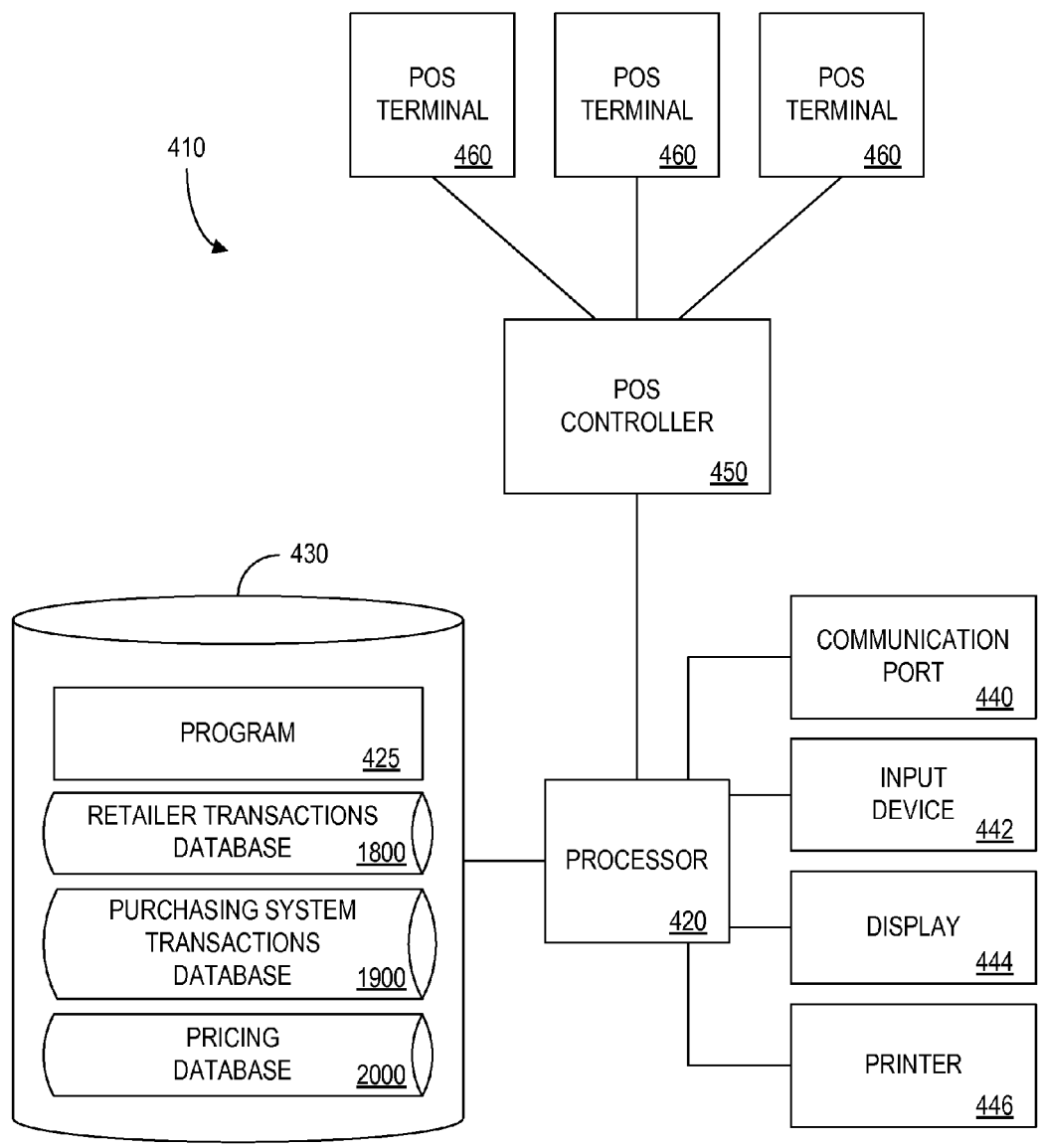
FIG. 5 is a block schematic diagram of a retailer device according to an embodiment of the present invention.

FIG. 5 is a block schematic diagram of a retailer device 410 according to an embodiment of the present invention. The retailer 410 includes a processor 420 coupled to: a communication port 440; an input device 442; a display 444; and a printer 446. The processor 420 is also coupled to a storage device 430 that stores a program 425 containing instructions adapted to be executed by the processor 420 to perform at least one embodiment of the present invention.

As shown in FIG. 5, the storage device 330 also contains a retailer transactions database 1800 (described in detail with respect to FIG. 18); a purchasing system transactions database 1900 (described in detail with respect to FIG. 19); and a pricing database 2000 (described in detail with respect to FIG. 20).

The processor 420 of the retailer device 410 is shown as being in "communication" with (or linked to) a POS controller 450 coupled to a number of POS terminals 460. Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time. In another embodiment, the retailer device 410 may be the POS controller, in which case the processor 420 can be directly linked to the POS terminals 460.

The retailer transactions database 1800 stores retailer transactions occurring at the retailer. A retailer transaction that involves a number of different products—including one purchasing system product redemption—may indicate that fact, for example, next to that product. According to another embodiment, if a buyer is taking possession of a product using a voucher, that product may be stored as a transaction record separate from the buyer's other purchases.

Each time the retailer processes a retail transaction that includes a redemption code, a new record is created in the purchasing system transactions database 1900. The retailer can use this record to track the products provided to buyers and to track the payments received from the purchasing system.

The pricing database 2000 may include, for example, the products the retailer carries, the retail price for those products, and the settlement price for each product. The settlement price may be used, for example, to determine the amount of money the retailer expects from the purchasing system for an honored voucher. If the retailer is the seller that accepted the buyer's offer, the settlement price may not be needed.

In addition, a retailer that participates in the purchasing system as both a seller and a product provider will need to determine, when a given product is being redeemed, whether or not the retailer is acting as the seller. This may be done using a database or by communicating with the purchasing system. For example, a retailer may both (i) sell a particular television through a purchasing system; and (ii) let buyers, who purchased the television through the purchasing system from a different seller, take possession of the television at the store. In this case, when a buyer visits the retailer to redeem a voucher, it must be determined whether the retailer should receive from the purchasing system (i) the buyer price (if the retailer, acting as a seller, sold the television to the buyer through the purchasing system); or (ii) the settlement price (if the retailer is merely letting the buyer take possession of the television at the retail store).

Product Category, Class and Feature Databases

As will now be described, FIGS. 6 to 8 illustrate tables that can be used to help determine the type of product a buyer is trying to purchase through the purchasing system, such as when the buyer is submitting a buyer offer. Referring to FIG. 6, a table 600 represents an embodiment of the product category database 600 that may be stored at a purchasing system device 310 (FIGS. 2A and 2B). The table 600 includes entries defining a category of product that may be purchased. The data of an entry may generally be input, for example, to the purchasing system before the buyer submits an offer. The table 600 also defines fields 610, 620 for each of the entries. The fields specify: a category code 610 that uniquely identifies a product area (such as "TV" or "VC"); and a corresponding category description 620 (such as "television" or "video camera," respectively). Those skilled in the art will understand that the table 600, as well as the other tables discussed herein, may include any number of entries and fields.

When a new product category is to be offered to buyers, the purchasing system device 310 stores a unique category code 610, along with an associated category description 620 describing the category. Once the information is stored, it may be retrieved as needed by the purchasing system device 310, such as to display a list of product categories to a potential buyer.

Referring to FIG. 7, a table 700 represents an embodiment of the product class database 700 that may be stored at a purchasing system device 310 (FIGS. 2A and 2B). The table 700 includes entries for each category of product that may be purchased. The data of an entry may generally be input, for example, to the purchasing system before the buyer submits an offer. The table 700 also defines fields 710, 720, 730, 740 for each of the entries. The fields specify: a product category 710 (corresponding to a unique product category code 610); and a number of product classes 720, 730, 740 such as classes based on the product's manufacturer.

Note that all product categories 710 may not have the same number of classes (e.g., there is no class 3 for the WM category shown in FIG. 7). In other embodiments, the product categories 710 may be divided into classes based on other factors. These factors might include, for example: product features (e.g., class 1 televisions include a remote control, picture-in-picture, surround sound, and Digital Video Disc (DVD) capability; class 2 televisions include all class 1 features except DVD capability; and class 3 televisions include all class 2 features except surround sound and picture-in-picture); or retail price ranges (e.g., televisions with retail prices above $800 are in class 1, televisions with retail prices $500 and $800 are in class 2, and televisions with retail prices below $500 are in class 3). According to one embodiment of the present invention, a buyer is presented with the appropriate classes (as well as a description of the differences between the classes and examples of products within each class) when a product category is selected. The buyer can then select the product class or classes to be associated with the buyer offer.

When a new class or category of product is to be offered to buyers, the purchasing system device 310 stores a new entry or field describing the class of products. Once such information is stored, it may be retrieved as needed by the purchasing system device 310, such as to display a list of product classes to a potential buyer or to determine if a product meets the requirements of a buyer offer.

Referring to FIG. 8, a table 800 represents an embodiment of the product feature database 800 that may be stored at a purchasing system device 310 (FIGS. 2A and 2B). The table 800 includes entries for each category of product available for purchase. The data of an entry may generally be input, for example, to the purchasing system before the buyer submits an offer. The table 800 also defines fields 810, 820, 830 for each of the entries. The fields specify: a product category 810 (again corresponding to a unique product category code 610); one or more feature codes 820 per entry that uniquely identify available features (such as "RM" or "SS"); and one or more corresponding feature descriptions 830 (such as "remote control" or "surround sound"). Note that a class may have no applicable features and that some features may only be available in some classes.

When a new category or product feature is to be offered to buyers, the purchasing system device 310 stores information about the new features available in the category. Once such information is stored, it may be retrieved as needed by the purchasing system device 310, such as to display a list of available product features to a buyer. The features available within a category may be retrieved from this database and displayed to the buyer when a product category and/or class is selected. The buyer can then specify which features the product must (or should) include when the offer is submitted.

Product Database

FIGS. 9A to 9D are tabular representations of portions of product databases 900 that may be stored at the purchasing system device 310 according to local database embodiments of the present invention. In these embodiments, the purchasing system device 310 uses information in the local product database 900 to determine if a buyer offer will be accepted and/or which products will be used to fulfill the buyer offer. On the other hand, note that a product database 900 is not needed in the routing embodiment, where a buyer offer is routed to one or more sellers.

Referring to FIG. 9A, a table 910 represents one such embodiment of the product database 900 that may be stored at a purchasing system device 310 (FIGS. 2A and 2B). According to this embodiment, the purchasing system device 310 determines whether to accept a buyer's offer based on a seller's minimum price and settlement prices for the product. The table 910 includes entries for each product that may be purchased. The table 910 also defines fields 911, 912, 913, 914, 915, 916, 917 for each of the entries. The fields specify: a product identifier 911; a product category 912; a product class 913; product features 914; a seller identifier 915; a minimum (acceptable) price 916; and a retailer identifier 917.

The list of retailer identifiers 917, which may be provided by the seller, represents the retail stores at which a product is usually available. The purchasing system can also generate this list by asking a retail store which products are usually available at that store. The list could also be based on, for example, the category of product (e.g., televisions should be available at a consumer electronics superstore) or historical inventory patterns and trends of known retailers.

FIG. 9B is a table 920 that represents another embodiment of the product database 900. In this embodiment, the seller further specifies a region where a given product is available, and the quantity of the product that is available for sale, through the purchasing system. As shown in FIG. 9B, the table 920 includes the following fields: a product identifier 921; a product description 922; a product class 923; a product category 924; a seller identifier 925; a minimum price 926; an available quantity 927; a region 928; and a retailer identifier 929.

In this case, the seller provides one or more geographical regions 928 where a product will be available through the purchasing system device 310. For example, a seller may offer a limited number of a particular type of television at a reduced price in Connecticut because sales have been lower than expected in that area—but fine in the rest of the country. Similarly, a national retailer may want to offer a product for sale at a reduced price in all Florida stores. This function may also be performed using ZIP codes (or any other indication of geographical area) and/or, for example, a known Geographic Information Systems (GIS) software application such as the GeoMedia Web Map application available from Intergraph Corporation, Huntsville, Ala.

Another embodiment of the present invention is illustrated in FIG. 9C, showing a table 930. According to this embodiment, a buyer offer is routed to an appropriate seller (based on, for example, a product category). In this case, therefore, the product database 930 may be stored at the seller device 510 and no seller identifier field is necessary. As shown in FIG. 9C, the table 930 includes the following fields: a product identifier 931; a product description 932; a product category 933; product features 934; and a minimum price 935 (i.e., the seller's minimum acceptable price).

Referring to FIG. 9D, a table 940 represents another embodiment wherein the seller provides a maximum subsidy, and not a minimum price, to the purchasing system device 310 for a given product. As shown in FIG. 9D, the table 940 includes the following fields: a product identifier 941; a product category 942; a product class 943; product features 934; a seller identifier 945; a maximum subsidy amount 946; and a retailer identifier 947.

Figure 9E:
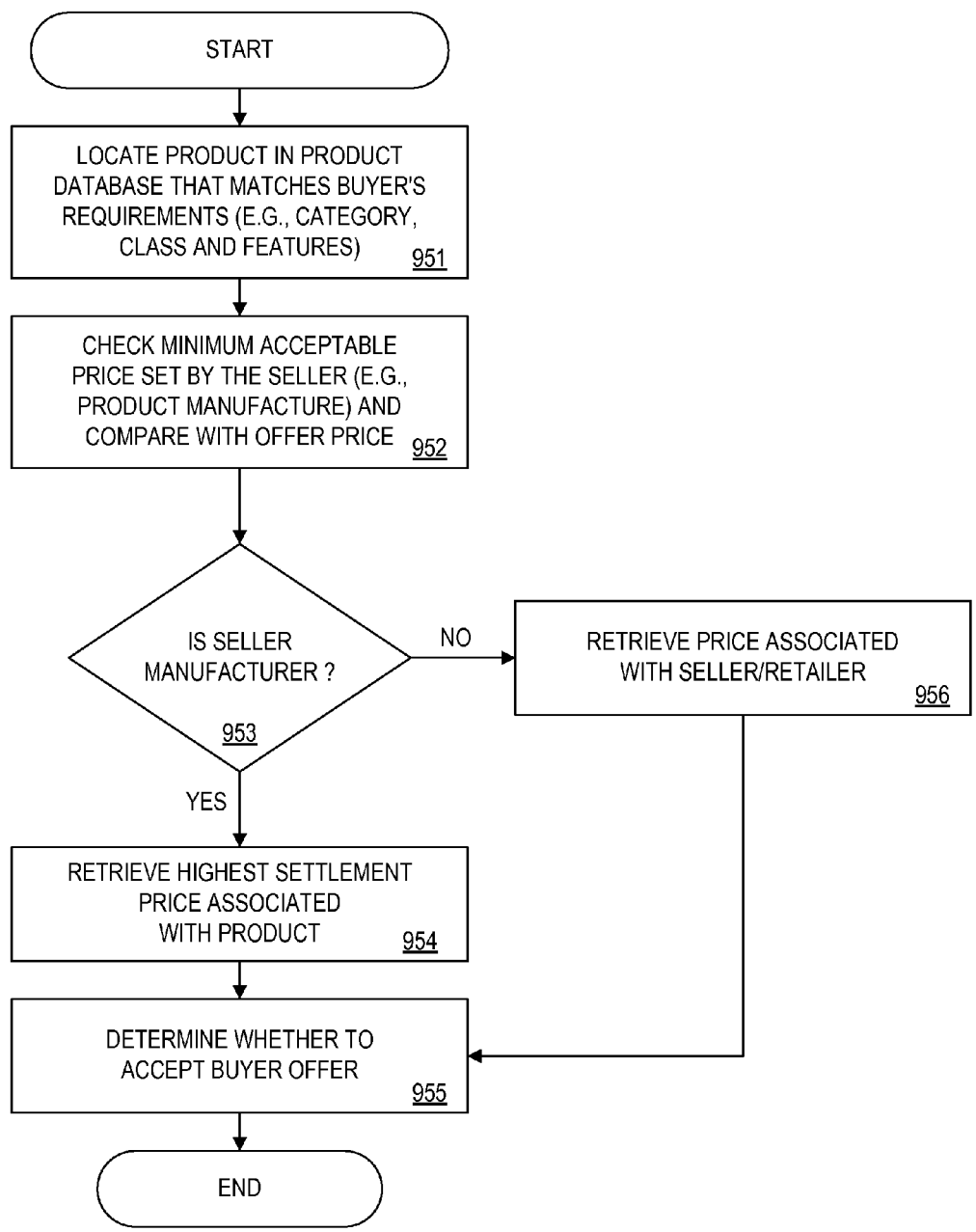
FIG. 9E illustrates a method of how a purchasing system device may use a product database according to an embodiment of the present invention.

FIG. 9E illustrates a method of how the purchasing system device may use the product database 900 according to an embodiment of the present invention. When a buyer offer is to be evaluated, a product in the product database 900 is located that matches the requirements of the buyer offer (such as the product category, class and features) at 951. Of course, if no such product can be found then the buyer offer will not be accepted.

At 952 the buyer's offer price is compared with any minimum price set by the seller. In the event the buyer's offer price is too low, that product will not be used to accept the offer and the process is repeated with respect to other products. If the offer price is not below any minimum price set by a seller (such as a manufacturer), the purchasing system determines if the seller is a retailer or a manufacturer at 953 (such as be querying the seller database 1000).

If it is determined that the seller is a manufacturer, the purchasing system determines the settlement prices associated with the product at various retailers at 954. This may be done, for example, by comparing settlement prices stored in the settlement price database 1500 with respect to various retailers (described with respect to FIG. 15). The purchasing system may, for example, locate the highest possible settlement price it would have to pay (i.e., the highest amount that a retail store may demand in return for honoring a voucher for that product) or an average settlement price looking at all retailers. The highest settlement price (i.e., the largest amount that will need to be provided to a retailer) can be used, for example, to select between two products that could fulfill a buyer offer, or even to reject a buyer offer. According to another embodiment, the average of a number of different settlement prices can be used for this purpose. If the seller is a retailer at 953, the purchasing system may only need to determine the price associated with that retailer at 956.

These steps may be repeated if more than one qualified product is available such that the offer price is not below the minimum price, if any, set by a seller. The purchasing system device 310 can then determine whether or not the buyer offer will be accepted at 954. For example, after any subsidy information is considered, does the purchasing system want to accept the buyer offer using any of the products (e.g., if the buyer's offer is accepted will the purchasing system make enough profit or not lose too much money)? That is, the pricing system device 310 may select the product and/or one or more retailers to be used to fulfill the buyer offer. The conditions used in this determination may be dynamic and can be based on prior sales made through the purchasing system.

Seller Database

FIG. 10A is a tabular representation of a portion of a seller database 1000 that may be stored at the purchasing system device 310 according to an embodiment of the present invention. The purchasing system device 310 may use the seller database 1000 to determine the seller type (i.e. whether the seller is a manufacturer or a retailer) and other information pertaining to a seller (such as the seller address for offer routing purposes or billing). As shown in FIG. 10A, the seller database 1000 may include: a seller identifier 1010; a seller name 1020; a seller type 1030; a seller address 1040; and seller categories 1050. In the routing embodiment, the seller database may contain contact information (e.g., a URL, an e-mail address, or a file path) used to route an offer, as well as product categories typically sold by the seller (used in selecting sellers to receive a buyer offer).

Figure 10B:
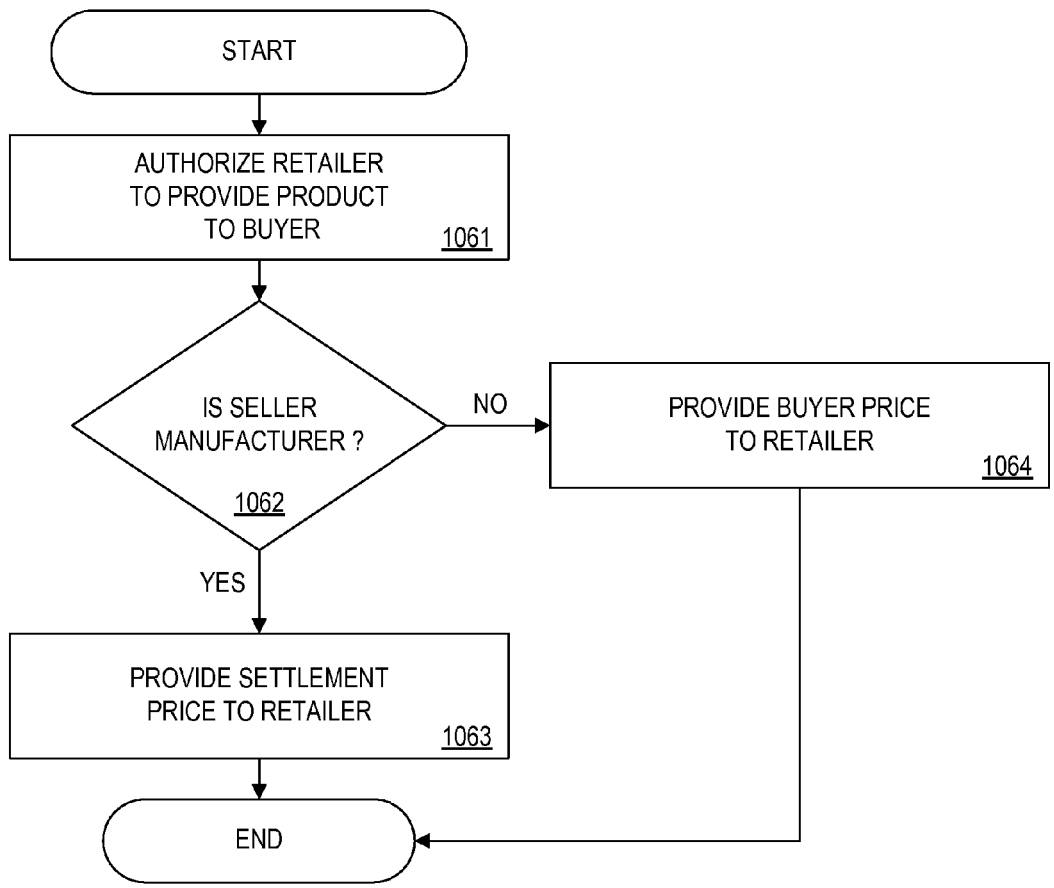
FIG. 10B illustrates a method of how a purchasing system device may use a seller database according to an embodiment of the present invention.

As explained with respect to FIG. 9, the seller database 1000 may be used, for example, to determine whether a number of settlement prices (in the case of a manufacturer seller) or a single price (associated with a retailer seller) should be used when determining whether or not a buyer offer will be accepted. FIG. 10B illustrates another use of the seller database 1000 according to an embodiment of the present invention. When the purchasing system authorizes a retailer to provide a product to a buyer at 1061, it is determined whether or not the seller is a manufacturer at 1062 (such as by using the seller type 1030). In the case of a manufacturer seller, the settlement price is provided to the retailer at 1063. On the other hand, when the retailer also acted as the seller, the buyer price may simply be provided to the retailer. Although not shown in FIG. 10B, if the seller was a retailer—but not the same retailer at which the buyer took possession of the product—the settlement price would still be provided to the retailer at which the took possession of the product.

Retailer Database

FIG. 11 is a tabular representation of a portion of a retailer database 1100 that may be stored at the purchasing system device 310 according to an embodiment of the present invention. The retailer database 1100 may be used by the purchasing system device 310 to retrieve information about a retailer, such as the product categories that the retailer typically carries and the retailer location. As shown in FIG. 11, the retailer database 1100 may include: a retailer identifier 1110; a retailer name 1120; a retailer location 1130; and product categories honored or sold by the retailer 1140.

In particular, the retailer database 1100 may store identifiers and contact information of retailers and the products for which vouchers will be accepted at those retailers. The purchasing system device 310 can use this database to select one or more retailers where a voucher will be redeemable, and to retrieve the contact information for the retailers (e.g., the retailer name 1120 and the retailer location 1130) to be printed on the voucher. The information may be also used to determine if a retailer is close enough to a buyer to be included on the voucher, using algorithms which are well known in the art.

Offer Database

FIGS. 12A and 12B are tabular representations of portions of an offer database 1200 that may be stored at the purchasing system device 310 according to an embodiment of the present invention. The offer database stores information regarding each buyer's offer processed by the purchasing system device 310. In particular, the portion of the offer database 1210 shown in FIG. 12A may include: an offer identifier 1211 (which is the voucher identifier in one embodiment, if the offer is accepted); a buyer e-mail address 1212; an offer price 1213; a selected product category 1214; a selected product class 1215; selected product features 1216; and an offer status 1217 (e.g., pending, not accepted, accepted, redeemed).

The portion of the offer database 1220 shown in FIG. 12B may include: an indication whether or not a secondary offer has been made 1221; a secondary offer price 1222; a secondary offer status 1223; and a payment identifier 1224. According to an embodiment of the present invention, the buyer may specify acceptable substitute products when submitting the original offer. In effect, the buyer submits a primary offer (for the preferred product) and a "secondary" offer (for a substitute product). For example, a buyer submitting an offer for a camera may specify (i) essential and (ii) preferable features. A camera with both the essential and preferable features is the primary offer and a camera with just the essential features is the secondary offer. The buyer may also submit separate prices for the primary and secondary offers. The buyer may or may not agree to be automatically bound by the secondary offer. A detailed description of a system and method for enabling a buyer to rank submitted offers in order of preference can be found in U.S. patent application Ser. No. 08/889, 319, filed on Jul. 8, 1997 and entitled "Buyer Offer Management System."

Supplemental Offer Database

FIG. 13 is a tabular representation of a portion of a supplemental offer database 1300 that may be stored at the purchasing system device 310 according to an embodiment of the present invention. The supplemental offer database 1300 may be used, for example, to determine what supplemental offer to include on a buyer's voucher. As shown in FIG. 13, the supplemental offer database 1300 may include a supplemental offer identifier 1310; a supplemental offer description 1320; and a retailer identifier 1330. The purchasing system device 310 can select a supplemental offer from this database once a buyer offer is accepted by a seller. According to one embodiment, the supplemental offer is selected based on the retailer. Thus, if the voucher is redeemable at several retailers, the purchasing system device 310 may select and include different supplemental offers for each retailer.

Of course, supplemental offers may be selected based on other factors, such as the product manufacturer, the product, the buyer and the price of the product.

Accepted Offer Database

FIG. 14 is a tabular representation of a record of an accepted offer database 1400 that may be stored at the purchasing system device 310 according to an embodiment of the present invention. As shown in FIG. 14, the accepted offer database 1400 may include: a transaction identifier 1402; an offer identifier 3904 (which may, if desired, also serve as the transaction identifier 1402); a redemption code 1406; a payment identifier 1408; an initial payment amount 1410; a final payment amount 1412; a payment status 1414; a seller identifier 1416; and a product identifier 1418.

When a buyer offer is accepted by a seller, or fulfilled by the purchasing system, the purchasing system device 310 may communicate the acceptance to the appropriate buyer device 210 and store the details of the accepted offer, including information from the offer database 1200, in the accepted offer database 1400.

The purchasing system device 310 may then collect payment from the buyer, such as by using the payment identifier 1408. For example, a hold may be immediately placed on the buyer's funds (e.g., credit line of the credit card account) for the offer price, and the buyer's account may not be actually charged until the buyer takes possession of the product. The purchasing system device 310 may instead charge the buyer's account when the offer is accepted, if desired.

It should be noted that the amount of funds charged or put on hold (i.e., "frozen") may be greater than the offer price. For example, an expected sales tax, such as a tax based on the buyer's home address, may be added to the offer price. In addition, the amount of frozen funds may be greater than offer price to account for unforeseen circumstances that may subsequently occur. For example, a penalty may be imposed on the buyer if the buyer does not take possession of the product by a certain date.

As a result, if the purchasing system device 310 charges the buyer's account when the offer is accepted, the amount charge may not be correct based on the actual redemption conditions of the transaction at the retailer. For example, the retailer may determine that the buyer has waited too long to take possession of the product. In this case, the purchasing system device 310 may debit the buyer's account to correct the amount. Similarly, the retail price of the product at the retailer may be lower than the buyer price (e.g., the retailer has unexpectedly placed the product on sale). In this case, the purchasing system device 310 may credit the buyer's account.

According to an embodiment of the present invention, collecting payment (based on the actual redemption conditions) may comprise charging the offer price to the payment identifier (e.g., credit card account) provided with the buyer offer. According to another embodiment, when the purchasing system device 310 receives an indication that the buyer has redeemed the product, the appropriate amount is charged to a financial account provided by the buyer at the retailer.

Note that when a buyer goes to a retailer to redeem a voucher, it is possible that he or she will find that the retailer's in-store price is less than the price arranged with the pricing system (e.g., the item may be on sale). In this case, the pricing system can guarantee, if desired, the buyer that he or she will be charged the lower of the two prices. Thus, the purchasing system device 310 may compare the product's retail price at the time of redemption with the buyer price, and make sure that the buyer's financial account is only charged the lower of the two prices. In the case where the buyer was charged for the product at the time the sale was arranged with the purchasing system, the purchasing system may credit the difference back to the buyer's account.

Additionally, the purchasing system device 310 may distribute payment, such as by using an Electronic Fund Transfer (EFT) transaction, to the retailer that provided the product to the buyer once the purchasing system receives an indication that the buyer has taken possession of the product at that retailer. If the buyer offer was accepted by a manufacturer (and not a retailer), the purchasing system device 310 can also collect any payment necessary (e.g., a subsidy from the manufacturer). For example, this may be the case when the amount paid to the retailer by the purchasing system exceeds the accepted offer price and collected from the buyer.

The purchasing system device 310 might also collect an additional payment from the seller as a "commission fee" for handling the offer. Such a commission fee could, of course, comprise a fixed percentage of the accepted price and/or a flat fee.

The accepted offer database 1400 may also include: a retailer identifier 1420; a redemption status 1430; a supplemental offer identifier 1440; and a supplemental offer status 1450.

The purchasing system device 310, which may have handled a buyer offer, may also track the fulfillment, acceptance, and redemption of buyer offers. According to one embodiment of the present invention, the purchasing system device 310 collects and disburses payment for each product sold through the system as appropriate. For example, the purchasing system device 310 may: (i) collect payment from a buyer when the buyer's offer is fulfilled by a seller; (ii) disburse payment for the product to the retailer at which the offer is redeemed; and (iii) collect a commission fee from the seller that accepted the buyer's offer.

Because a particular voucher may be redeemable at several retailers, the disbursement of payment may be finalized once the buyer takes possession of the product at a local retailer.

That is, when the purchasing system device 310 determines that the buyer has taken possession of the product (e.g., a retailer notifies the purchasing system device 310, either in substantially real time or periodically, of the vouchers that have been redeemed in their stores), it finalizes the collection and disbursement of funds between the appropriate parties and updates the redemption status 1430 as appropriate (e.g., to "redeemed" for the retailer identifier 1420 associated with the store that provided the product to the buyer and to "invalid" for all other retailer identifiers 1420).

According to another embodiment of the present invention, the redemption status 1430 further reflects that a voucher is associated with a number of different products (e.g., the redemption status 1430 may be "redeemed" for a television and "pending" for a VCR). In another embodiment, a voucher may be redeemable for one of several products (not shown in FIG. 14), depending on the retailer at which the buyer takes possession of the product.

Settlement Price Database

FIG. 15 is a tabular representation of a portion of a settlement price database 1500 that may be stored at the purchasing system device 310 according to an embodiment of the present invention. The settlement price database 1500 stores the settlement price expected by each retailer for each product sold through the purchasing system device 310. As shown in FIG. 15, the settlement price database 1500 may include a product identifier 1510 together with a number of retailer identifiers 1520, 1522, 1524 and associated settlement prices 1530, 1532, 1534. The settlement price database 1500 may be used, for example, to determine the lowest settlement price associated with a product as described with respect to FIG. 9E.

According to another embodiment of the present invention, the purchasing system device 310 uses this database to determine how much it owes a retailer at which a purchasing system voucher was redeemed. In other embodiments, this database may be used by the purchasing system device 310 to select retailers. For example, if a buyer offer price of $175 was accepted by the manufacturer and retailer A has an agreement to receive $200 for the offered product, while retailer B has an agreement to receive $210, the purchasing system device 310 may determine that the voucher is only redeemable at retailer A to minimize the loss to the manufacturer and possibly to boost revenue earned by the purchasing system for its role as a transaction facilitator.

Note that in addition to an arrangement between the retailer and the purchasing system to specify, for example, a product and the settlement price, the retailer may also have an arrangement directly with a product manufacturer. An arrangement between a retailer and a manufacturer may specify an additional subsidy amount that the manufacturer will provide to the retailer for one or more of the manufacturer's products, which could result in the retailer agreeing to accept a lower settlement price from the purchasing system.

By way of example, consider a retailer that typically sells a particular manufacturer and model television for a retail price of $200. The retailer can enter into an agreement with the purchasing system to honor vouchers for that television in exchange for a settlement price of $180. The retailer might agree to accept $180 to increase sales, or potential sales, from buyers sent to store by the purchasing system.

The retailer may also make an agreement with the television manufacturer to receive $10 for each television provided to a buyer when a voucher is redeemed. The manufacturer may, for example, provide such a subsidy to encourage the retailer to agree to a lower settlement price with the purchasing system—increasing the likelihood that the television will be sold through the purchasing system device 310. Note that the settlement price does not need to be less than the retail price, and the manufacturer could provide a subsidy directly to the purchasing system instead of, or in addition to, the retailer.

Seller Product Database

FIG. 16 is a tabular representation of a portion of a seller product database 1600 that may be stored at a seller device 510 according to the routing embodiment of the present invention. The seller product database 1600 may be used by the seller to determine whether or not a buyer offer will be accepted. As shown in FIG. 16, the seller product database 1600 may include: a product identifier 1610; a product category 1620; product features 1630; and a minimum price 1640.

Collected Demand Database

Figure 17:
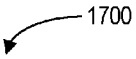
FIG. 17 is a tabular representation of a portion of a collected demand database according to an embodiment of the present invention.

FIG. 17 is a tabular representation of a portion of a collected demand database 1700 that may be stored at the seller device 510 according to the routing embodiment of the present invention. The collected demand database 1700 may be used to record the demand for various products, and whether or not offers for the products were accepted or rejected by the purchasing system device 310. As shown in FIG. 17, the collected demand database 1700 may include: a product category 1710; product features; an offer price 1730; and an offer status 1740.

The collected demand database 1700 may be used by the purchasing system device 310 to run reports for sellers (e.g., manufacturers). The collected demand database 1700 may also be used to determine if certain products should be added to the system or if certain minimum acceptable prices should be lowered. According to another embodiment, a collected demand database 1700 may instead be stored at one or more seller devices 510.

The seller or purchasing system (if the minimum price is set by the purchasing system) may adjust (e.g., lower) the minimum selling price if there is a huge demand that cannot be met because minimum selling price is to high (e.g., buyer named prices are typically lower than the minimum selling price). Similarly, the minimum selling price may also be increased if buyers typically name prices that are higher than the minimum price.

Retailer Transactions Database

FIG. 18 is a tabular representation of a portion of a record of the retailer transactions database 1800 that may be stored at a retailer device 410 according to an embodiment of the present invention. The retailer transaction database 1800 may store information about each transaction processed by the retailer. As shown in FIG. 18, the retailer transactions database 1800 may include: a retailer offer identifier 1802; a time 1804 at which the transaction occurred; a POS terminal 1806; an operator identifier 1808; a total 1810; and a payment type 1812. The retailer transactions database 1800 may also include a product identifier 1820 and a product price 1830. According to one embodiment of the present invention, the product price 1830 simply points to a record of the purchasing system transaction database 1900, instead of showing the retail price (e.g., the "0-1 P" product price shown in FIG. 18).

Note that the transaction illustrated in the record shown in FIG. 18 includes a product ("P304-44") for which a purchasing system voucher was presented. Such a purchasing system transactions can be flagged, if desired, for easy reporting. For example, if each transaction has a unique identifier a purchasing system transaction may begin with a special number (e.g., 99-). Note that transactions involving the redemption of vouchers may be performed separately from normal retail transactions, if desired.

Purchasing System Transactions Database

FIG. 19 is a tabular representation of a portion of a purchasing system transactions database 1900 that may be stored at the retailer device 410 according to an embodiment of the present invention. The purchasing system transactions database 1900 may store information regarding each purchasing system voucher processed by the retailer. As shown in FIG. 19, the purchasing system transactions database 1900 may include: a retail transaction identifier 1910; a redemption code 1920; a product identifier 1930; a payment expected 1940 (e.g., the settlement price associated with the product); and a payment status 1950, such as "pending" or "received." Recall that the payment 1940 expected may depend on whether the retailer is acting as the seller in addition to acting as the store where the buyer is taking possession of the product.

Pricing Database

FIG. 20 is a tabular representation of a portion of a pricing database 2000 that may be stored at the retailer device 410 according to an embodiment of the present invention. The pricing database 2000 may contain the retailer's retail price 2020 for each product carried (as shown by a product identifier 2010) along with a settlement price 2030 for the product. The pricing database 2000 may be used by the retailer, for example, to determine the price to be charged to a typical buyer (i.e., the retail price 2020) and the price to be expected from the purchasing system in exchange for providing the product to a buyer when redeeming a voucher (i.e., the settlement price) 2030. Which of the values will be used may also depend on whether the retailer is acting as the seller in addition to acting as the store where the buyer is taking possession of the product.

Pseudo Credit Card Account Numbers as Redemption Codes

FIGS. 21A to 21D are tabular representations of portions of databases that may reside at the purchasing system device 310 and be used to issue, track and authorize the redemption of redemption codes in the format of a credit card account number, in accordance with one embodiment of the present invention. Note that a retailer may want to determine the validity of a voucher at the POS to prevent fraudulent use, such as over-redemption of a voucher, by unscrupulous buyers. For example, consider a buyer who establishes a $200 price with a manufacturer for a television. A hold is put on the buyer's credit card for $200, and a voucher for the television is issued to the buyer. The buyer prints out three copies of the voucher and redeems all three at various retailers, and each of the retailer settles with the purchasing system device 310 off-line or through a back channel at the end of the day. The purchasing system device 310 determines that it now owes the retailers an additional $400 (for the two additional, unauthorized transactions). However, the purchasing system device 310 may find that the additional $400 charge cannot be authorized because the buyer is over his or her credit limit. As will now be explained, an advantage of these embodiments of the present invention is that a retailer can verify a voucher at the POS when a customer is attempting to take possession of a product using a voucher (including a pseudo credit card account number) without special equipment. According to one embodiment, the retailer may communicate with the purchasing system 310 at the time of redemption over the existing banking network using a CAT that is typically connected to each POS at the retailer. Of course, the retailer may instead communicate directly with the purchasing system at the time of redemption through other networks, such as the Internet.

According to this embodiment of the present invention, the purchasing system device 310 acts as a one-time, or "pseudo," credit card account number issuer. That is, the redemption code may look like a credit card number (e.g., 1111-2222-3333-4444) to a POS device located at a retailer. As is known, a CAT device typically sends a credit card number to one of a number of credit card clearing houses for authorization, which in turn uses the first four digits of the credit card to route the authorization request. In this embodiment, the purchasing system may be assigned a unique four digit identifier (used as the first four digits of the pseudo credit card number redemption code) that can be recognized by credit card clearing houses. The buyer uses the issued pseudo credit card number to redeem his product at a retailer.

If each issued and outstanding pseudo credit card number redemption code is to be associated with a unique transaction, the purchasing system device 310 may keep track of available pseudo credit card numbers. For example, FIG. 21A is a tabular representation of a portion of an available redemption code database 2110 that may include a redemption code 2111 and a status 2112 (e.g., available or issued).

When a seller is found to fulfill the buyer offer, the purchasing system device 310 issues the buyer a 16-digit identifier, in the format of a pseudo credit card account number. The first four digits of the account number identify the purchasing system device 310 as the issuer. The account number is a one-time use "pseudo" account number, good only for the settlement price. In this embodiment, the voucher may include: (i) the issued redemption code in the format of a payment number; (ii) the product identifier and description; and (iii) the retailers at which the voucher is redeemable.

For example, FIG. 21B is a tabular representation of a portion of an issued redemption code database 2120 that may be stored at the purchasing system device 310. The issued redemption code database 2120 may include: a pseudo credit card number redemption code 2121; a status 2122 (redeemed/unredeemed); an offer identifier 2123; and a number of retailer identifiers 2124, 2125, 2126 indicating which retailers are associated with each redemption code. Note that a redemption code may be associated with either a single retailer or a number of retailers.

In addition, FIG. 21C is a tabular representation of a portion of a buyer payment database 2130 that may be stored at the purchasing system device 2130. The buyer payment database 2130 may include: an offer identifier 2131; a payment identifier 2132 (e.g., the buyer's real credit or debit card number, checking account number, or an electronic cash identifier); an authorized amount 2133; and a charged amount 2134. Note the amount authorized may be different from the amount that is actually charged to the buyer's financial account. This may occur whenever unforeseen transaction scenarios arise at the point of redemption necessitating an adjusted price, such as, for example: (i) a penalty imposed on the buyer for failing to take possession of the product within a predetermined time; or (ii) the buyer taking possession of the product in a state or city having a higher or lower sales tax.

Figure 21D:

For example, FIG. 21D illustrates a transaction database 2140 that may be stored at the purchasing system device 310 according to an embodiment of the present invention. The transaction database 2140 may include: an offer identifier 2141; a retailer identifier 2142; a product identifier 2143, such as a Universal Product Code (UPC) or a SKU identifier; a seller identifier 2144; an established price 2145; an initial additional charge 2146; a subsequent additional charge 2147; and a final price 2148. As can be seen in FIG. 21D, transaction "9032" involved an accepted offer price of $200. The purchasing system device 310 initially assumed an additional charge of $16, based on the 8% sales tax in the buyer's home state. The buyer, however, took possession of the product in a different sate and the actual sales tax was only 6.5% (or $13). The final price charged to the buyer's financial account, therefore, was only $213. As is also shown in FIG. 21D, the final price 2148 may also be greater than the established price 2145 plus the initial additional charge 2146 (e.g., transaction "9034").

Vouchers

Figure 22:
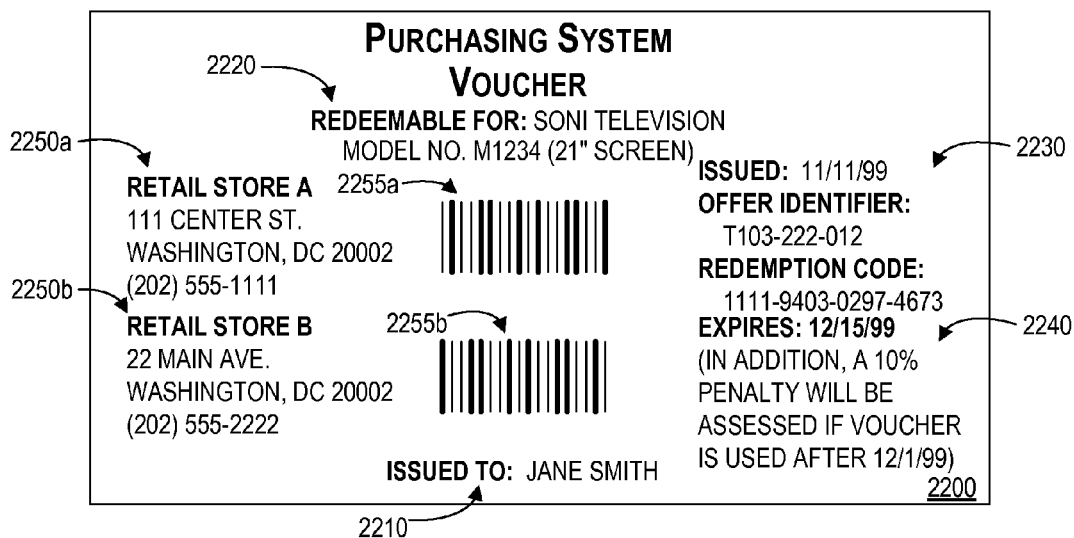
FIG. 22 illustrates a purchasing system voucher according to an embodiment of the present invention.

The purchasing system device 310 outputs redemption information, including supplemental offer information and information that the buyer needs to take possession of the product at a retailer. The information may be transmitted to the buyer in the form of an electronic message enabling the creation of a coupon-like voucher that may include a bar code. As shown in FIG. 22, which illustrates a purchasing system voucher 2200 according to an embodiment of the present invention, information about the purchase can also be printed on the voucher.

For example, the information printed on the purchasing system voucher 2200 can include: the name of the buyer 2210; a description of the product being purchased 2220 (perhaps with an identifier, such as a bar code, not shown in FIG. 22); and a field 2230 listing the issue date, offer identifier and redemption code associated with the voucher 2200; and expiration date and/or penalty information 2240. Note that a number of different products 2220 may be listed on a voucher. This may be necessary, for example, if multiple products are being purchased or if different retailers use different bar codes, model names, etc. for a single product.

The buyer may have the option of going to a number of different retailers listed on the voucher 200 to take possession of the product. For example, the voucher 2200 shown in FIG. 22 lists a number of different retailers 2250a, 2250b and associated retailer identifiers 2255a, 2255b. Of course, when the seller is a retailer the voucher 2200 might only be redeemable through that retailer (e.g., a specific retail store, a subset of retail stores in a national chain, or all retail stores in a national chain).

According to one embodiment of the present invention, the price being paid by the buyer is not included on the voucher 2200. Thus, if the accepting seller is a manufacturer, the retailer that provides the product to the buyer will not be aware of the price the manufacturer accepted for the product. The retailer is only aware of the settlement price paid by the purchasing system for honoring the voucher.

A bar code on the voucher (not shown in FIG. 22) may also include a product identifier. In such an embodiment, a cashier at the POS terminal can scan the voucher 2200 along with the product and, if the product identifier encoded into the bar code matches the scanned product identifier, have the transaction locally authorized. Alternatively, the bar code may serve as a pointer to a record in a database, either stored locally at the retailer or remotely at the purchasing system device 310. Using the bar code, the transaction may be authorized based on whether the data stored in a database matches the current transaction (i.e., the voucher is redeemable at that retailer for that product).

Instead of a printed voucher 2200, the redemption information may instead simply be a number or alphanumeric identifier provided to the buyer. In this case, the buyer could write the information down (such as when receiving the information over the telephone) and bring the number to the retailer when taking possession of the product.

According to another embodiment of the present invention, redemption information may be, for example, information encoded using, for example, cryptographic techniques. Applicable encryption techniques are described in "Applied Cryptography: Protocols, Algorithms, and Source Code in C," by Bruce Schneier. The information may also be stored electronically, such as in a smart-card type device, PDA or removable memory device. A single voucher 2200 may be redeemable at a number of different retailers 2250a, 2250b or separate vouchers can be printed for each retailer. In this case, when one voucher is redeemed other vouchers can be made invalid.

According to another embodiment of the present invention, the voucher also serves as a Record Of Charge (ROC). For example, the purchasing system may place a hold, or "freeze," on the buyer's credit card account when sending the redemption information to the buyer. As used here, a freeze is any pre-authorization of a charge that will be made to the buyer's account at a later time.

The buyer then prints out the voucher/ROC and brings it to a retailer. Once the retailer submits the ROC to the merchant bank, the buyer's account is charged and the purchasing system may receive payment for the transaction and provides payment to the retailer for allowing the buyer to take possession of a product. According to another embodiment, the ROC may indicate the retailer's merchant identifier as the entity to which the funds should be transferred.

Purchasing System Methods

Figure 23:
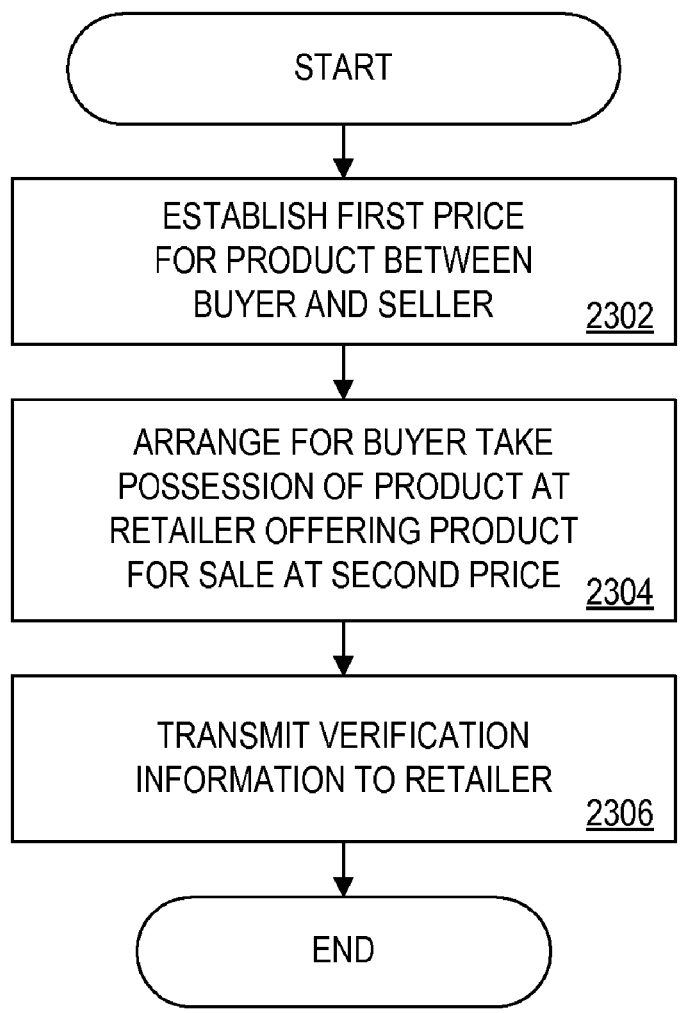
FIG. 23 is a flow chart illustrating a method in which a buyer takes possession of a product at a retailer according to an embodiment of the present invention.

FIG. 23 is a flow chart illustrating a method in which a buyer takes possession of a product at a retailer according to an embodiment of the present invention. The flow chart in FIG. 23, as well as the other flow charts discussed herein, are not meant to imply a fixed order to the steps; an embodiment of the present invention can be practiced in any order that is practicable. At 2302, the purchasing system establishes a first price for a product between a buyer and seller. The purchasing system arranges for the buyer to take possession of the product at a retailer that offers the product for sale at a second price 2204. At 2206, the purchasing system transmits verification information to the retailer, authorizing the retailer to allow the buyer to take possession of the product.

Figure 24:
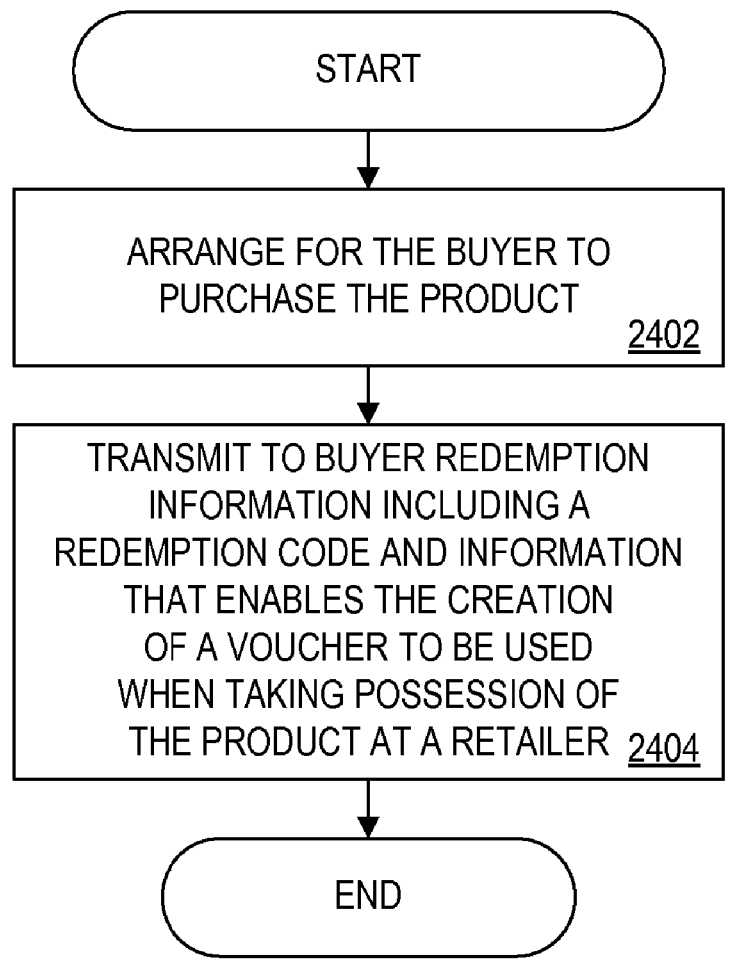
FIG. 24 is a flow chart illustrating a method in which a buyer takes possession of a product at a retailer according to another embodiment of the present invention.

FIG. 24 is a flow chart illustrating a method in which a buyer takes possession of a product at a retailer according to another embodiment of the present invention. At 2402, the purchasing system arranges for the buyer to purchase a product, such as by receiving and accepting a buyer offer. At this point, information about the purchase may be stored to be used later when the buyer takes possession of the product at a retailer. The purchasing system transmits redemption information to the buyer at 2404. The redemption information can include a redemption code and information that enables the creation of a voucher that lets the buyer take possession of the product at a retailer.

Figure 25:
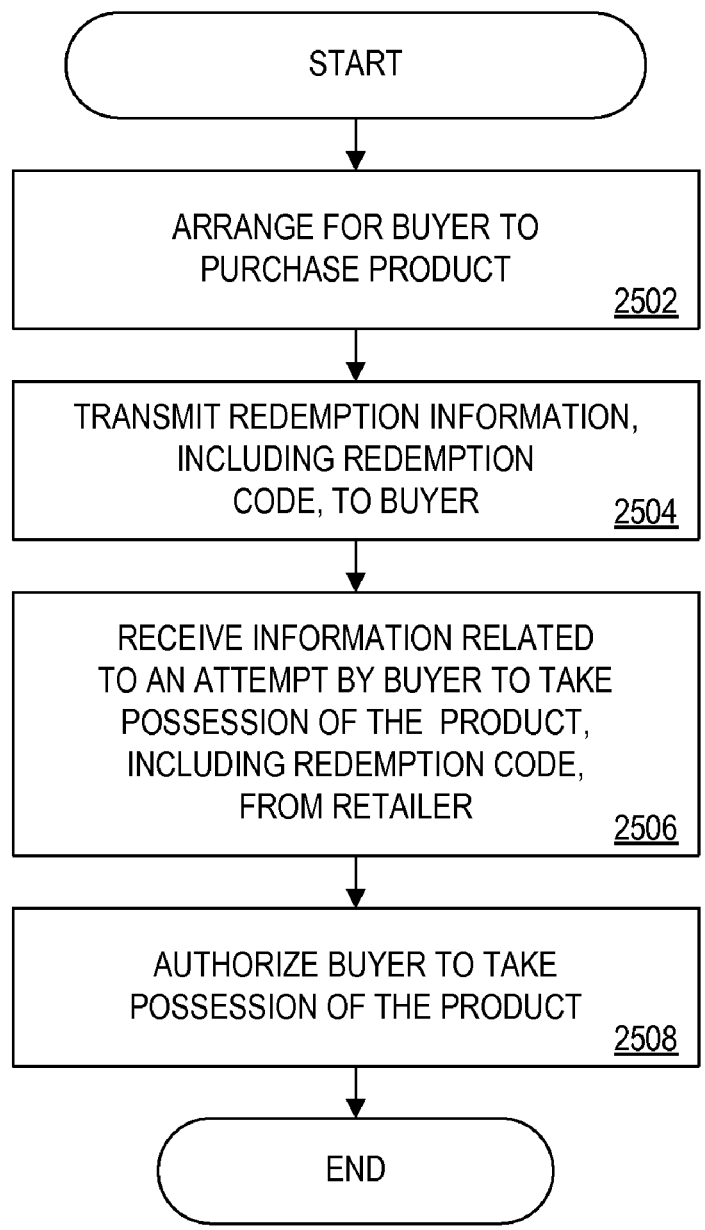
FIG. 25 is a flow chart illustrating a method in which a buyer takes possession of a product at a retailer according to another embodiment of the present invention.

FIG. 25 is a flow chart illustrating a method in which a buyer takes possession of a product at a retailer according to another embodiment of the present invention. At 2502 the purchasing system arranges for the buyer to purchase a product. Redemption information, including a redemption code, is transmitted at 2504. At 2506, the purchasing system receives information related to an attempt to take possession of the product, including the redemption code, from a retailer. The purchasing system authorizes the buyer to take possession of the product at 2508.

Figure 26A:
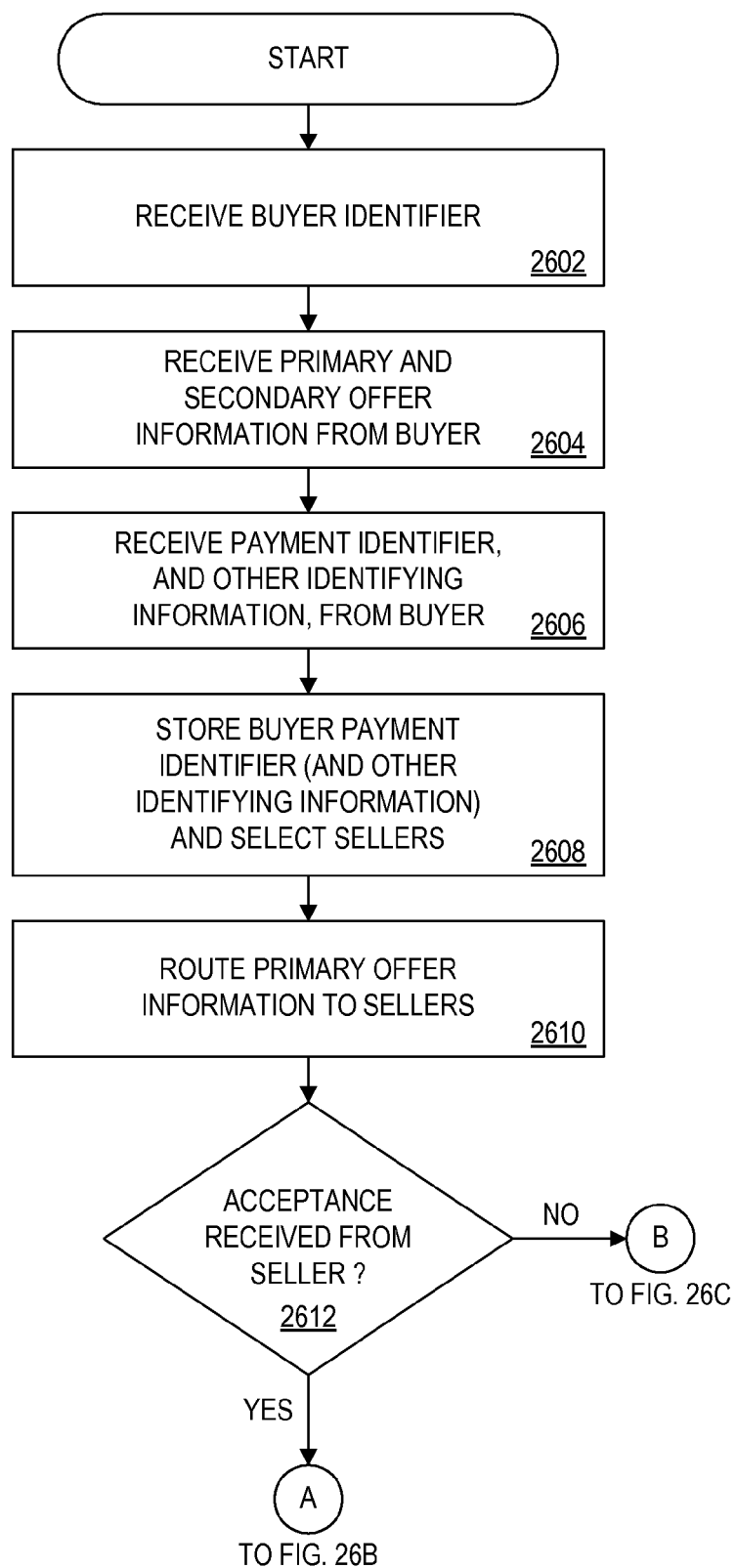
FIGS. 26A to 26C are flow charts illustrating a method in which a buyer takes possession of a product at a retailer according to another embodiment of the present invention.
Figure 26B:
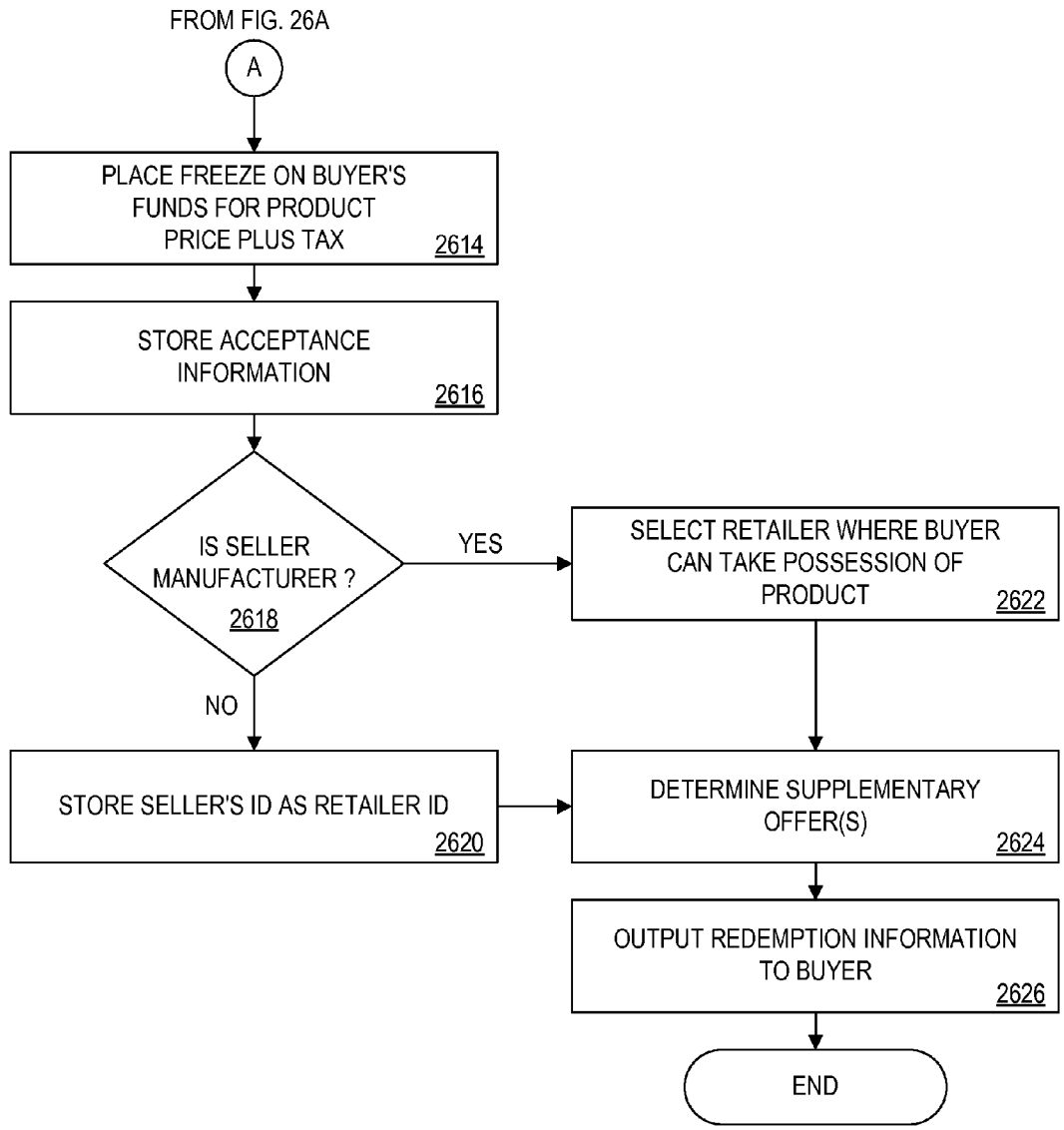
Figure 26C:
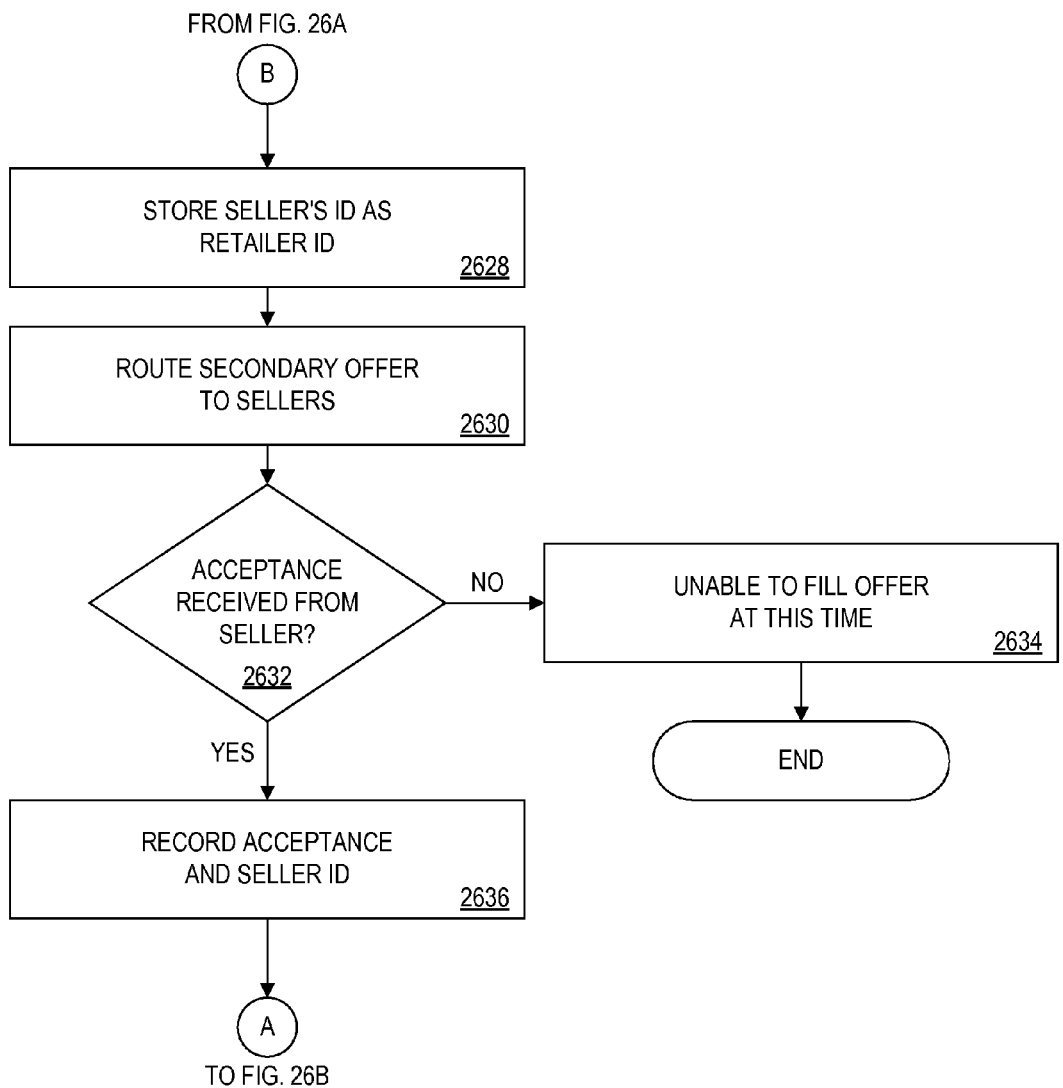

FIGS. 26A to 26C are flow charts illustrating, from the purchasing system's perspective, a method in which a buyer takes possession of a product at a retailer according to an embodiment of the present invention. At 2602, the purchasing system receives a buyer identifier through a communication network such as the Internet. Primary offer information is received from the buyer at 2604 (e.g., product category, selected features, price buyer is ready to pay). If desired, secondary offer information from buyer may also be received at 2604 (i.e. trade-off features and/or prices, and whether buyer is willing to be bound to the secondary offer). A payment identifier and other identifying information (e.g., credit card number, name, telephone number, and e-mail address) is also received from the buyer at 2606. This information may be saved, along with the buyer offer information, at the purchasing system at 2608.

According to the routing embodiment of the present invention, the buyer's primary offer may be routed to one or more sellers, such as one or more manufacturers and retailers, at 2608 and 2610. The sellers may be selected, for example, based on who typically carries items in the product category or the distance between the buyer and each seller. According to another embodiment of the present invention, the purchasing system itself determines if the buyer offer will be accepted.

At 2612 it is determined if an acceptance of the primary offer has been received from a seller. When multiple sellers accept the buyer offer, the purchasing system may, for example: (i) select the first seller to respond; (ii) present the buyer with a choice of sellers; or (iii) select the seller based on predetermined priority rules (e.g., the purchasing system selects the seller that offers the highest commission or the seller that has accepted the most offers within the past month). If no seller accepts the buyer offer, the secondary offer may be submitted as described with respect to FIG. 26C.

Referring now to FIG. 26B, when the buyer offer has been accepted by a seller a freeze may be placed on the buyer's funds for the amount of the product price, plus any applicable tax amount calculated based on buyer's location at 2614. At 2616, acceptance information (e.g., seller identifier) regarding offer is stored by the purchasing system.

If the seller is a retailer at 2618, the purchasing system may simply use the seller's identifier as the retailer identifier at 2620.

If the seller is not a retailer (e.g., is a manufacturer) at 2618, a retailer where the buyer can take possession of the product may be selected at 2622. The retailer may be selected based on, for example: the accepted price; the product; and/or the geographical location (e.g., home address) of the buyer. For example, if the product is a television, a participating retailer that has an established contract with the manufacturer of the television purchased by the buyer may be selected. The selection of the retailer may additionally be based on the offered price for the product. A manufacturer may have a different subsidy price with different retailers for the same make/model television. Since, in one embodiment, the manufacturer (via the purchasing system device 310) pays the retailer the settlement price, the manufacturer would prefer that the buyer takes possession of the product at a retailer with a low settlement price. For example, a manufacturer has a contract price with retailer A of $200 for the Manufacturer X television and a contract price of $190 with retailer B for the Manufacturer X television. A buyer offers $175 for the Manufacturer X television. The manufacturer accepts. The manufacturer would naturally prefer that the buyer take possession of the television at retailer B, because the manufacturer would only need to pay retailer B $15 ($190−$175=$15) instead of the $25 it would need to pay retailer A ($200−$175=$25). Note that a retailer may also be selected based on the settlement prices the purchasing system has established for the product with various participating retailers that carry the product. For example, the purchasing system may select the one or two retailers whose settlement prices are the lowest.

The purchasing system may also, at 2624, determine and store one or more supplementary offers to present to the buyer. As discussed above, the selection of a supplemental offer (or offers) to include in the redemption information may be based on, by way of example only, the product manufacturer, the product, the buyer and the price of the product.

Finally, redemption information is output to the buyer at 2626, along with any supplemental offer information, in the form of a printable voucher with a unique identifier, which may be in the form of a bar code. If desired, the offer price may be left off the printed voucher so that the retailer will not be aware of the price paid by the buyer.

Referring now to FIG. 26C, when no seller accepts the primary buyer offer, the secondary offer may be retrieved at 2628 and routed to sellers at 2630 (such as the same group of sellers that received the primary offer). If the secondary offer is accepted at 2632, the relevant information is recorded at 2636 and the process continues as it would for a primary offer. If no seller accepts the secondary offer at 2632, the purchasing system is unable to fill the offer at 2634 and the process ends.

Using the Purchasing System to Purchase a Product

To help describe to operation of a purchasing system device 310 according to an embodiment of the present invention, one example of how the purchasing system device 310 may be used will now be provided. Consider a buyer who visits a purchasing system Web site and selects, or types in, "television" as the desired product category. The buyer is then taken through a series of questions that refine the buyer's offer.

In particular, the buyer is presented with a selection of classes of televisions. Each class may include a brief description and an exemplary set of the manufacturers and models within the class. In other words, each class is a subset of the television category and may be an indication of a separate pricing/quality/manufacturer tier. The buyer selects the class that most closely matches the buyer's budget and expectations. When selecting a product class, the buyer is, in effect, agreeing to accept any television within that class for the "established" price—assuming the television has appropriate product features as will now be described. The established price (i.e., the buyer price) may be set by the system and accepted by the buyer or named by the buyer and accepted by the system.

The buyer is also presented with a selection of possible features. For example, television related features may include: (i) a remote control; (ii) surround sound; (iii) cable ready; (iv) picture-in-picture; and (v) screen size. The buyer selects the features the television must include, and, according to some embodiments of the present invention, optional features (or even features must not be included).

The buyer then enters the price he or she is ready to pay or agrees to a price presented by the purchasing system. The buyer may then enter payment information (thereby guaranteeing to purchase a television that matches his criteria) and other identifying information (e.g., name, telephone number, e-mail address). The buyer may then be taken through a series of questions and/or conditions. In other words, the buyer can have some input in establishing one or more of the following conditions:

the "offer expiration date," or how long the purchasing system device 310 has to find the television;

the retailers at which the buyer would take possession of the product (such as a geographical range from the buyer's home, or specific retailers that may or may not be included);

a penalty imposed if the buyer does not take possession of the product, such as a flat fee or percentage of the offered price if the buyer does not take possession of the product within a predefined time period (the buyer may also agree to have the product shipped at the buyer's expense);

whether the buyer would rather take possession of the product at a retailer or simply have the product shipped (in which case a shipping fee may either be included in, or added to, the offer price); and acceptable price/feature trade-offs (secondary offers).

The purchasing system device 310 can then use these conditions to create a buyer offer—or to send a "counter" offer to the buyer when a television with the buyer's preferred features cannot be found. The purchasing system device 310 could also generate an appropriate counter-offer by querying the database of available inventory based on the product information specified in the buyer's offer. A counter-offer may also generated based on information received from a potential seller.

By way of example, consider a buyer that offers $300 for a "class 1" camera having a zoom lens and a tripod. If the purchasing system device 310 does not find a match for such a product it may query the database for a "class 1" camera with just a zoom lens for $250. If a substitute product is found, the purchasing system device 310 presents the option of purchasing it to the buyer. The counter-offer may be presented to the buyer in real time or at a later date (e.g., when inventory becomes available later). The counter-offer message may be sent using, for example, regular mail, e-mail, the Web, a facsimile machine, a telephone, a PDA or a beeper.

The trade-off questionnaire process may also be a valuable demand collection tool, as well as a good way to determine the perceived value of a feature. If desired, the buyer can decide whether or not to be bound by substitute products that the purchasing system device 310 finds based on the trade-off answers.

The final primary and secondary offer specifications are then confirmed by the buyer and are submitted to the purchasing system device 310 for processing. According to one embodiment of the present invention, the offer is routed to manufacturers and/or retailers that carry the product. According to another embodiment of the present invention, the purchasing system device 310 itself determines whether the buyer offer will be accepted.

Assume that a manufacturer accepts the buyer offer and transmits a message to the purchasing system device 310. The purchasing system device 310 records the transaction in a database, charges the buyer's credit card for the amount of the offer price, and issues the buyer a bar coded voucher to be redeemed for the television at a retailer. The voucher may only be valid, for example, at retailers having an agreement with the manufacturer to accept vouchers for that product.

A list of retailers may be printed on a single voucher along with contact information (such as an address and a phone number to let the buyer double-check that the product is in stock). The buyer may be instead be issued a number of separate vouchers, each voucher being redeemable at a different retailer. Supplemental or additional offers at a retailer or merchant can also be included in the voucher.

If the buyer cannot find the television at any participating retailer, the purchasing system device 310 may provide the buyer assistance with: (i) locating the product; (ii) voiding the transaction; (iii) finding a substitute product; or (iv) having the product shipped, perhaps at the purchasing system's cost.

The buyer brings the voucher to a participating retailer and brings the product to the POS terminal or register. According to one embodiment of the present invention, the POS register has an Internet, or other network (e.g., a credit card network), connection to the purchasing system device 310. The cashier scans or inputs into the network a redemption code, such as a bar code included on the voucher along, in some embodiments, with the product bar code. The POS opens a link to the purchasing system device 310 to verify the redemption code and to authorize the transaction. The link may be automatically opened by the system's recognition of the redemption code, or the cashier may actuate a "purchasing system" button to open the connection. A signal is sent to the purchasing system device 310 including the redemption code and, perhaps, the product identifier and a retailer identifier.

Additionally, an offer identifier may be contained in the redemption code—or otherwise included on the voucher—and may be transmitted to the purchasing system 310 for verification. The offer identifier may be an identifier that uniquely identifies the particular buyer offer that was accepted (i.e. the particular buyer, seller and product). In this way, for example, if a buyer loses a voucher the purchasing system device 310 can void the lost redemption code and assign a new redemption code. The purchasing system device 310 may use the same offer identifier with the new redemption code to help track the transaction.

Alternatively, the POS register may send the information to another retailer processor that links to the purchasing system device 310. According to another embodiment, the POS register may retrieve the information at a retailer database into which the purchasing system device 310 periodically loads data. For additional security, the buyer's name or other identifier may be printed directly on the voucher and the cashier may be prompted to ask to check the buyer's identification before accepting the voucher.

The purchasing system device 310 retrieves the record associated with the received redemption code received from the accepted offer database 1400 and determines whether the redemption code received is valid and redeemable at the retailer form which it was received. In some embodiments, the purchasing system device 310 may also verify that the redemption code is redeemable with respect to a received product identifier. If so, the purchasing system device 310 sends a verification to the POS register and stores the redemption information, such as a transaction identifier generated by the retailer. This information may be important for verifying transaction disputes at a later time, for unwinding transactions of goods that are returned by a buyer, or for tracking redemption patterns of buyers (e.g., as where most buyers take possession of products, or how long it typically takes before a buyer takes possession of a product).

The POS register receives the verification signal from the purchasing system device 310 and processes the transaction. The buyer is issued a receipt which that contains, for example: (i) the store price; (ii) the product identifier; (iii) the voucher code; and (iv) an "amount due $0.00." If the amount authorized by the retailer is less than the amount charged to the buyer, the purchasing system device 310 may also credit the buyer's account at this time.

Alternate Embodiments

FIGS. 1 to 26 describe only some of possible embodiments according to the present invention. Several other embodiments will now be briefly described to illustrate various applications of the present invention. These examples are presented only to demonstrate the wide applicability of the present invention. The examples do not constitute a definition of all possible embodiments or all possible applications.

Those skilled in the art will understand that there are many more applications of the present invention consistent with the present disclosure. Further, although the following examples are briefly described for clarity, those skilled in the art will understand how to make any changes, if necessary, to the above-described apparatus and methods to accommodate these and other embodiments and applications.

According to one embodiment of the present invention, a buyer may be required to pay part of, or all of, a commission fee to the purchasing system. For example, a buyer may pay $1 for each submitted offer. In another example, the buyer may pay a fixed fee or a fixed percentage of the offer price (or whichever is greater) to the purchasing system device 310 when a buyer offer is accepted.

According to another embodiment of the present invention, when a buyer offer is accepted, a retailer scans the product bar code—or enters an ID number—into a "reservation" system and puts the product behind the counter at the service desk until the buyer arrives. For example, the retailer may have implemented a Telxon Wireless Retail Management System, which includes a wireless remote scanning inventory device. Thus, store personnel, upon receiving an offer for a product, may accept the offer and take the product off the shelf. The product bar code may be using, for example, a PTC 960SL Wireless Mobile Information Manager, deducting the product from inventory and reserving it in association with the buyer identifier. The buyer may present his identifier upon arrival at the retailer (e.g., the buyer's voucher identifier serves as the buyer and reservation identifier) and be given the product.

According to still another embodiment of the present invention, the final amount charged to the buyer's financial account may be different from the amount of the hold put on the buyer's funds at the time of the seller's acceptance. Note that the charge for the product may not be charged to the buyer's credit card until the buyer takes possession of the product at a local retailer. Such an embodiment may be useful where the final price for the product (e.g., POS terminal price at the time of redemption) is different than the price established online. For example, the buyer may be attempting to redeem the product in a different tax area than the one used to calculate the final price. In another example, the particular retailer the buyer is attempting to redeem the voucher at my be having a sale on the particular product, and the sale price may be lower than the price established online with the manufacturer. If the buyer is guaranteed the lower of these two prices, the buyer's final price will be lower than the price established online. In yet another example, the buyer may have a predetermined window of time within which to redeem his voucher for the product at the price established online. The price may increase (e.g., a penalty may be imposed) if the buyer waits to redeem the product.

According to yet another embodiment of the present invention, instead of being charged the price of the product online at the point of a seller's acceptance of a buyer's offer, the buyer may be allowed to pay the established price directly to the retailer when he or she arrives at the retailer to take possession of the product. In such an embodiment, the buyer would "reserve" an established price online (rather than purchase the product online and take possession at a local retailer). The purchasing system device 310 would store the buyer's primary offer information in a similar manner to that described with respect to other embodiments—but would not require the buyer to guarantee payment when submitting the buyer offer. Once the buyer offer is accepted by a seller, the acceptance would be stored at the purchasing system device 310. A voucher may be printed for the buyer in the above described manner, with the addition of the offer price. When the buyer attempts to redeem the voucher at a local retailer, the retailer: (i) retrieves the reserved price from the purchasing system device 310 or from a local database; or (ii) reads the needed information from the voucher. The retailer collects the online price from the buyer at the POS and communicates the redemption to the purchasing system device 310, either in real time or in a batch process at a later time. The retailer and the purchasing system device 310 then settle the transfer of payment as necessary.

In another embodiment of the present invention, the retailer does not open a back-channel with the purchasing system device 310 during the transaction. Instead, the information regarding the redemption of the voucher (e.g., the product identifier, the retailers at which it is redeemable, the accepted price) is encoded onto the voucher itself. Such encoding may be in the form of, for example, a one or two-dimensional bar code.

According to another embodiment of the present invention, only retailers with current inventory (based on real time inventory checks) or who potentially have the product in stock (based on purchase orders from the manufacturer, or daily inventory notification downloads) will receive a buyer offer.

Another embodiment of the present invention lets the buyer select a time window and geographic region within which the buyer will take possession of the product. The purchasing system determines which stores will have the product during the specified time period based on, for example, statistical likelihood. If the buyer does not take possession of the product within the time window, the purchasing system device 310 may, for example: (i) invalidate the voucher charge the buyer a penalty; or (ii) increase the price of the product. The price may be increased, for example, by predefined increments for each day the buyer fails to take possession of the product.

According to still another embodiment of the present invention, an extra fee may be charged for "guaranteed" availability at local store. When submitting an offer, the buyer checks off a "guaranteed availability at a particular retailer" button. Upon receiving an acceptance of the buyer's offer, the purchasing system device 310 determines which, if any, retailer currently has the product in stock and communicates with the retailer to have the product put aside for the buyer (this may be done, for example, via e-mail or facsimile). The extra fee that the buyer pays for this guaranteed availability may be disbursed (the entire or partial amount) to the retailer which puts the product aside.

It is also possible, according to another embodiment of the present invention, for the seller to ship the product to the buyer if the buyer cannot find the product in a local retailer within a predefined time period. In this case, the seller may "guarantee" the product to the buyer. If the buyer cannot find the product, a purchasing system service representatives may help track the product down. If the product cannot be found, the purchasing system device 310 notifies the manufacturer, who ships the product to the buyer at no extra charge.

According to another embodiment of the present invention, the voucher contains commands that change the retail price to the price named by the buyer. The command may be, for example, determine an appropriate amount to subtract from the retail price such that the product costs $X. The voucher may also contain a command that prompts the POS to instruct the buyer to swipe the credit card used to bind the buyer offer. The POS then verifies that the credit card has the same number that is embedded in the voucher's bar code. If so, the price is applied to the product and the scanned credit card can be used to make the purchase. This lets the buyer's credit card act as a private key.

According to another embodiment of the present invention, the purchasing system device 310 tracks the redemption rate of vouchers at retailers. When a week has passed and the buyer has not taken possession of the product, the purchasing system generates an e-mail that lets the buyer either cancel the contract or have the product shipped. Also, if a buyer has used the voucher a "thank you" message can be sent to the buyer (e.g., via e-mail) along with other types of offers (e.g., for additional products the buyer may be interested in purchasing).

In a similar way, a buyer may enter a credit or frequent shopper card when making a purchase at the POS and the purchasing system device 310 may determine if a reservation exists for another product the store typically stocks. If the buyer does have a reservation, the POS can prompt the cashier to remind the buyer about the reservation.

Another embodiment of the present invention is directed to manufacturers that sell slightly altered products through different retailers, such as products with different model numbers and/or slightly different features. In this case, the voucher issued to the buyer may be valid for different types of products depending on the retailer. The identifier (e.g., make/model number) of each product may be printed directly on the voucher next to the corresponding retailer name, leaving it up to the buyer or store personnel to ensure that the correct product is redeemed.

Similarly, the voucher may contain several bar codes, one for each retailer, that contain the encoded product identifier corresponding to each retailer. According to another embodiment, a separate voucher may be issued for each retailer and, once it is determined by the purchasing system device 310 that the buyer has redeemed one voucher, the other associated vouchers can be voided. For example, each voucher can have the same voucher identifier or redemption code, and when the purchasing system receives a signal at a retailer indicating that a redemption code has been redeemed, it invalidates any corresponding vouchers with the same redemption code.

According to still another embodiment of the present invention, a redemption code may be redeemable for products from different sellers. For example, several sellers may have agreed to accept a buyer's offer. Instead of selecting one seller to fulfill the buyer's offer, the purchasing system device 310 may give the buyer the option of selecting any of the accepting sellers. This option may be presented to the buyer directly at the Web site, before a redemption code is issued (in which case the redemption code would be issued for whichever seller's product the buyer elects), or the redemption code may be issued for different sellers (and/or different products) and the buyer indicates his selection at the point of redemption (i.e. by selecting which retailer and/or which product).

According to another embodiment of the present invention, the purchasing system presents the buyer with a number of retailers that have the product available, and the associated price at each retailer, letting the buyer select one of the prices. For example, a buyer may be willing to pay a little more for a product if he or she can take possession of the product at a retailer located near his or her home. In another embodiment of the present invention, the purchasing system device 310 selects retailers based on distance from the buyer's home address.

According to another embodiment of the present invention, prices available to a buyer through the purchasing system device 310 vary based on the buyer (e.g., the buyer's transactional history with the purchasing system device 310) or the buyer's location (e.g., based on a telephone number area code or the buyer's home address ZIP code). For example, the settlement price may be based on the number of transactions previously completed by the buyer with the purchasing system (e.g., if the buyer previously completed no transactions the minimum selling price is $200, if the buyer previously completed 1 transaction the minimum price is $195, and so on). A "complete" transaction may comprise, for example: (i) submitting an offer to the purchasing system device 310; (ii) having an offer accepted by the purchasing system device 310; or (iii) redeeming a voucher at a retailer.

If a seller specifies a certain quantity of a product available in a location to be sold through the purchasing system device 310, a certain number of redemption codes may be issued based on a statistical likelihood of redemption. That is, the number of redemption codes issued may be greater than the allocated available supply, and the redemption codes may be authorized for redemption at the retailer POS until the designated supply is depleted. If a buyer attempts to redeem a voucher after the supply has been depleted, the purchasing system device 310 may transmit a counter-offer to the buyer at the POS.

According to another embodiment of the present invention, instead of specifying a settlement price, a seller can specify a maximum subsidy amount that that will be provided to the purchasing system device 310 for each product sold. Thus, when determining whether to accept a buyer's offer for a given product, the purchasing system device 310 may determine: (i) the subsidy amount provided by the manufacturer for the product; and (ii) the settlement price due to a retailer for the product. If, for example, the offer plus the subsidy amount is at least equal to the settlement price, the purchasing system device 310 may accept the buyer offer. The purchasing system device 310 may also, in some cases, determine that a monetary loss up to a predetermined amount is acceptable in order to increase the volume of sales. In this case, the purchasing system device 310 would accept an buyer's offer if the buyer's price plus the manufacturer's subsidy amount was not below the predetermined acceptable loss amount (in effect, the purchasing system device 310 is further subsidizing the buyer's purchase).

According to another embodiment of the present invention, the redemption information sent from the purchasing system to the buyer is similar to a product manufacturer coupon. That is, a voucher can be recognized by a retailer to be worth, for example, the difference between the retail price for the product and the buyer price. By way of example, a buyer may arrange with the purchasing system to purchase a television for $190. The buyer brings a voucher to a retailer that normally sells the product for $200 (i.e., the retail price). In this case, the retailer may recognize that the voucher is redeemable for $10 towards the purchase of the product. If the buyer brought the voucher to another retailer at which it was redeemable, where the product was normally sold for $210, that retailer would recognize that the voucher is redeemable for $20. In other words, in such an embodiment, the actual value that the voucher is redeemable for depends on the retail price of the retailer at which the buyer takes possession of the product. The retailer may then be subsequently reimbursed the difference between the retail price and the buyer price by the purchasing system.

According to another embodiment of the present invention, instead of the purchasing system transmitting redemption information to the buyer, the redemption information is instead sent from the buyer to the purchasing system. For example, the buyer may supply his or her name, address, social security number, telephone number and/or a password to the purchasing system. In this case, the buyer can provide the redemption information to the retailer to take possession of the product.

According to another embodiment of the present invention, the purchasing system may establish a price between a buyer and seller for a product that fulfills at least one product requirement without specifying a particular product that will be provided to the buyer. For example, the purchasing system may establish that the buyer will pay $200 for a 21 inch screen television with a remote control. The product requirement may also, for example, describe a suggested retail price or average retail price associated with the product that will be provided to the buyer without specifying the particular product. Note that the price established between the buyer and the seller (e.g., the $200) may be proposed by the purchasing system, the seller or the buyer. A particular product (e.g., a particular model television available from a particular manufacturer) is then selected and provided to the buyer at the retailer. Note that either the purchasing system, the seller or the retailer may select the particular product. If the retailer is to select the particular product, a voucher identifying the product requirements may be transmitted to the buyer. If the purchasing system or seller is to select the particular product, the voucher may, if desired, identify the particular product that has been selected.

Such an embodiment may be used, for example, by a retailer to sell products through the purchasing system. The retailer may provide a product to a buyers for a price below the product's retail price in exchange for the right to select the particular product (e.g., manufacturer and model number) that will be provided to the buyer (although the buyer still, of course, determines at least some of the general product requirements). For example, a buyer may indicate that he or she wants a 21" to 25" color television from any manufacturer. The buyer may further indicate a willingness to wait up to six months to get such a television. A retailer may be willing to establish a price representing 50% of the retail price for such a television, because the retailer now has this demand for a television that may be collected, if desired (e.g., by pooling the demand of a number of buyers). Moreover, the demand can be fulfilled anytime within the next six months, and the retailer can use distressed inventory to fulfill the demand.

Redemption Systems and Methods

Figure 27:
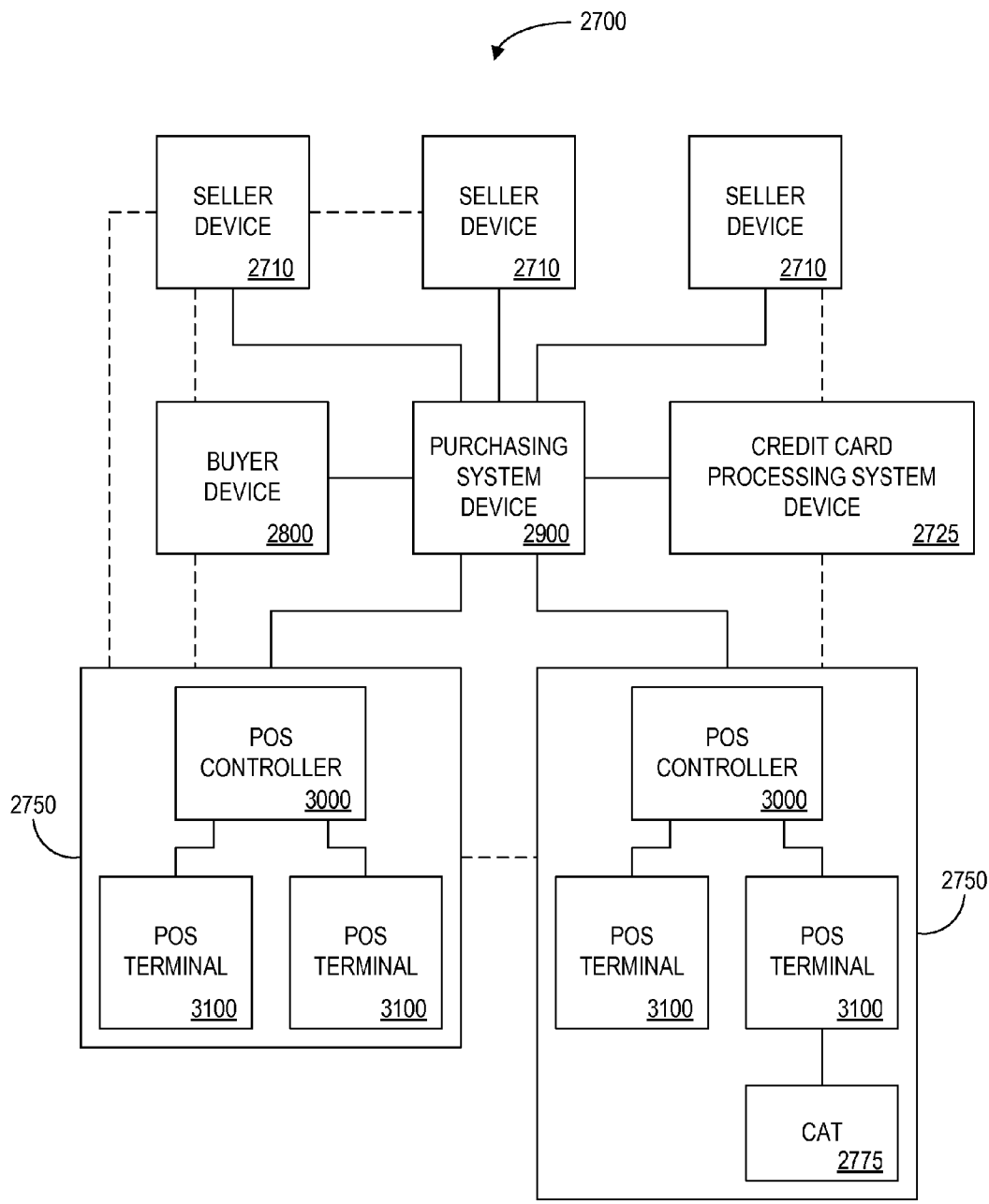
FIG. 27 is a block diagram overview of a system in which a buyer takes possession of a product at a retailer according to an embodiment of the present invention.

Some embodiments of the present invention are directed to redemption systems and methods wherein a buyer takes possession of a product at a retailer. Turning now in detail to the drawings, FIG. 27 is a block diagram overview of a redemption system 2700 according to one embodiment of the present invention. The system 2700 includes a buyer device 2800 coupled to a purchasing system device 2900. The devices may be coupled, for example, through a communication network. As used herein, a "communication network" may be, for example, a Local Area Network (LAN), a Wide Area Network (WAN), a Public Switched Telephone Network (PSTN), or an Internet Protocol (IP) network such as the Internet, an intranet or an extranet. Moreover, as used herein, communications include wireless protocols, such as those enabled by cellular, satellite, or radio technology.

In one embodiment of the present invention, the buyer device 2800 communicates with a remote Web-based purchasing system device 2900 (e.g., a server) through the Internet. Although embodiments of the present invention will be described with respect to information exchanged using a Web site, according to other embodiments of the present invention information may instead be exchanged using, for example: a telephone; a facsimile machine; e-mail; a WEBTV® interface; a cable network interface; and/or a wireless device. Information exchanged between a buyer and the purchasing system device 2900, as well as between a retailer and the purchasing system device 2900, may also use a Voice Response Unit (VRU) or Interactive VRU (IVRU). Examples of IVRUs include the Vision 2001 and the Insight IVR/Web from Interactive Voice Technologies, Corp. and the OmniVox for Windows NT from APEX Voice Communications. In general, an IVRU lets a user of a DTMF (Dual Tone Multi-Frequency) tone generating telephone, also known as "push button" telephone, communicate with a computer. The DTMF signals received from a user's telephone are interpreted by the IVRU, which also communicates with the user by generating and transmitting voice or other audio signals, such as a list of IVRU menu options.

A buyer device 2800 may be, for example, a Personal Computer (PC), a Personal Digital Assistant (PDA), a wired or wireless telephone, a one-way or two-way pager, a kiosk, an Automated Teller Machines (ATM), a watch enabled to communicate through a network, or any other appropriate communication device.

According to one embodiment of the present invention, the purchasing system device 2900 receives a buyer offer, including a buyer-defined offer price, related to a product to be purchased. The buyer offer may be "binding" in that a buyer cannot revoke an offer that has been accepted by a seller. One example of a buyer offer, called a Conditional Purchase Offer (CPO), is described in U.S. Pat. No. 5,794,207 and U.S. patent application Ser. No. 08/889,319, the entire contents of which are hereby incorporated by reference. A CPO may be, for example, an electronic message from a buyer including an offer price for a product. If a seller agrees to the CPO, the buyer pays the offer price to the purchasing system, and the product is provided to the buyer by a retailer. The purchasing system, in turn, provides a payment to the retailer for providing the product to the buyer. Such a payment to the retailer will be referred to herein as a "settlement" price or amount, and may be equal to, less than or more than the retail price the retailer typically charges customers for the product.

In addition to an offer price, the buyer offer can include other information, such as a product category, a product class, a product manufacturer and model number, or at least one product feature. For example, the buyer offer may indicate that the buyer will pay $500 (the offer price) for a television (the product category) made by a well-respected manufacturer and having a 32 inch screen (the product class) and surround sound (a product feature).

Note that, according to different embodiments of the present invention, a purchasing system price can be established using any method, such as by having the purchasing system offer the buyer a particular product for a particular price (e.g., a particular model television for $200). According to one embodiment of the present invention, the purchasing system may offer the buyer a product having certain characteristics (selected, for example, by the buyer or the purchasing system) for a particular price (e.g., a 31 inch screen television with surround sound for $300) while leaving other features unspecified (e.g., a product manufacturer).

According to one embodiment of the present invention, the purchasing system device 2900 arranges for the buyer to purchase the product from a "seller," such as a product manufacturer, a retailer, the purchasing system or any other party. The purchasing system device 2900 also arranges for the buyer to take possession of the product at a retailer.

It should be noted that, as used herein, a "product" may be, for example, a new or used consumer product such as an electronic device. A product may also be any other good or service that a buyer can take possession of at a retailer. In the case of a service, the product may be, for example, a car tune-up that the buyer "takes possession of" at (i.e., receives the service from) a car service center. A product may also be a package of multiple items and/or services. For example, a product may be a television and a Video Cassette Recorder (VCR). In this case, the purchasing system could arrange for the buyer to take possession of both items at a single retailer or at different retailers. U.S. patent application Ser. No. 08/923,683 filed Sep. 4, 1997 and entitled "Conditional Purchase Offer (CPO) Management System for Packages" (97-065), the entire content of which is hereby incorporated by reference, discloses methods of providing packages of products to buyers.

As used herein, a "retailer" may be any entity capable of providing a product to a buyer. For example, a retailer might be a single retail shop, a chain of consumer electronic "superstores," one or more retail stores within a chain, a franchisee, a franchiser, a distributor, or even a warehouse where products are stored.

According to an embodiment of the present invention, the buyer pays the purchasing system in exchange for the right to take possession of the product at the retailer. The retailer receives a payment, which may or may not be based on the amount paid by the buyer, from a party other than the buyer, such as the purchasing system or product manufacturer, in exchange for providing the product to the buyer.

In another embodiment of the present invention, the purchasing system device 2900 communicates with the buyer device 2800 to establish a first price for a product between the buyer and a seller. The purchasing system device 2900 also arranges for the buyer to take possession of the product at a retailer, different than the seller, that offers the product for sale at a second price. Verification information, which enables the retailer to authorize the buyer to take possession of the product, is transmitted from the purchasing system device 2900 to a retailer. The verification information may be, for example, a "one way hash" function transmitted to the retailer (either once or periodically). Applicable functions are described in Bruce Schneier, "Applied Cryptography: Protocols, Algorithms, and Source Code in C" (John Wiley & Sons, Inc., 2nd Ed. 1996). The retailer may then evaluate a redemption code provided by the buyer, using the one way hash function, to determine if the buyer is authorized to take possession of the product.

The verification information may also be, for example, a response to information (sent from the retailer device 2750 to the purchasing system device 2900) about an attempt to take possession of a product, or a batch of authorized codes sent to the retailer device 2750 each night. The buyer provides a payment, based on the first price, to the purchasing system in exchange for the right to take possession of the product at the retailer. The purchasing system, in turn, provides a payment (e.g., the settlement price) to the retailer for allowing the buyer to take possession of the product.

According to another embodiment of the present invention, the purchasing system device 2900 arranges for a buyer to purchase a product and transmits redemption information, including a "redemption code," to the buyer device 2800. As used herein, a "redemption code" may be, for example, a unique alphanumeric sequence of digits. In general, however, the redemption code may be anything capable of representing, such as a one or two dimensional bar code, the right of the buyer to take possession of the product at a retailer. As used herein, the phrase "bar code" includes any machine-readable information. The redemption code can also include information about the transaction, such as the buyer's identity, a product identifier, a price or an applicable tax rate. In addition, the redemption information can also include information that enables the creation of a voucher. For example, a printer attached to the buyer device 2800 may be used to print a coupon-like voucher including the redemption code.

According to still another embodiment of the present invention, information related to an attempt to take possession of the product, including the redemption code, is sent from the retailer device 2750 to the purchasing system device 2900. In this case, the purchasing system device 2900 responds with verification information authorizing the buyer to take possession of the product. Those skilled in the art will recognize that the purchasing system device 2900 may communicate with the buyer device 2800 and the retailer device 2750 through different communication networks.

A more detailed description of one embodiment of the present invention will now be provided. The purchasing system device 2900 arranges for the buyer to purchase the product, for example, when a buyer offer is received from the buyer device 2800 through the Internet. The purchasing system device 2900 may or may not route information about the buyer offer to, for example, a number of seller devices 2710.

Based on the buyer offer (such as a price, a product category and a product class), the purchasing system device 2900 may select a particular product (such as a product manufacturer and model number) from a plurality of possible products. In addition to the buyer offer, the purchasing system device 2900 may consider other factors when selecting a particular product, such as, for example: (i) the expected availability of products at retailers; (ii) the actual availability of product at retailers-which may be done by communicating with the retailer devices 2750; (iii) retail prices of products at various retailers—which again may be done by communicating with the retailer devices 2750; (iv) subsidy information associated with products; and (v) retailer settlement prices. As used herein, a "subsidy" may be, for example, an amount a party (such as a manufacturer, a retailer or the purchasing system) is willing to contribute towards the buyer's purchase of a product. A subsidy may also be, for example, an amount a party is willing to contribute towards the sale of a product (or a number of different products) to a number of buyers.

By way of example, consider a buyer who sends the purchasing system device 2900 an offer to purchase a 35 millimeter (mm) camera for $150. The purchasing system device 2900 and/or the seller devices 2710 may determine that cameras produced by two different manufacturers can be used to fulfill the buyer's offer. Both cameras are available at a retailer for the same settlement price of $175. One of the manufacturers, however, has agreed to provide a $35 manufacturer subsidy for each camera sold. In this case, the purchasing system device 2900 may select the camera produced by that manufacturer to accept the buyer's offer and realize a $10 gain (i.e., the buyer's offer price of $150 less the retailer's settlement price of $175 plus the manufacturer subsidy of $35).

The purchasing system device 2900 may likewise select one or more retailers from a plurality of possible retailers. In this case, the purchasing system device 2900 may consider, for example: (i) the geographic location of the buyer; (ii) the geographic location of the retailers; (ii) the expected availability of the product at various retailers; (iii) the actual availability of the product at various retailers; (iv) retail prices of the product at various retailers; (iv) retailer subsidy information; and (v) retailer settlement prices.

To determine whether or not the buyer offer is acceptable and/or how the buyer offer will be accepted (e.g., which product at which retailer), the purchasing system device 2900 may compare the offer price with one or more settlement prices associated with a product that successfully meets the buyer's offer information. A settlement price may be, for example, the amount that must be provided to a retailer by the purchasing system in exchange for providing a product to a buyer. A potential seller may also have a minimum acceptable price, which is the lowest price that the seller (as opposed to the retailer) will let the product be sold for (e.g., to prevent brand name dilution). In making this comparison, the purchasing system device 2900 may also take into account supplemental price information, such as a manufacturer subsidy amount, a retailer subsidy amount, a purchasing system subsidy amount, and/or a "third-party" subsidy amount associated with the product. As used herein, a third-party subsidy amount may be, for example, an amount that a third-party agrees to provide in exchange for a promise regarding, an action by, or information about the buyer. For example, a credit card issuing bank may agree to add $50 towards the purchase of a home stereo if a buyer submits a credit card application. See, for example, U.S. patent application Ser. No. 08/943,483 filed Oct. 3, 1997 and entitled "System and Method for Facilitating Acceptance of Conditional Purchase Offers" (97-072) and U.S. patent application Ser. No. 09/219,267 filed Dec. 23, 1998 and entitled "Method and Apparatus for Facilitating Electronic Commerce Through Providing Cross-Benefits During a Transaction." The entire contents of these applications are hereby incorporated by reference.

According to embodiments of the present invention, the purchasing system device 2900 also arranges for the buyer to take possession of the product at a retailer. This may be done, for example, by sending to the buyer redemption information, including a redemption code such as a "pseudo" credit card number, debit card number or a checking account number. A redemption code may be a "pseudo" credit card number if, for example, it can be entered into (and processed by) a retailer device, such as a Credit Authorization Terminal (CAT), in the same manner as a traditional credit card number. The redemption information can also include a condition that must be met by the buyer, such as a geographic limitation or an expiration date. Penalty information, such as a 10% increase in the price of the product, may also be included in the event the buyer violates a condition associated with the sale. The redemption information can also enable the creation of a coupon-like voucher. For example, the redemption information may let the buyer print a voucher that can be presented to the retailer when taking possession of the product.

Note that the redemption information may include information associated with a number of products, as well as a number of retailers. For example, a single voucher might indicate that the buyer can take possession of a VCR at either of three local retailers. In this case, the voucher may be redeemable for one of several different products, depending on the retailer at which the buyer takes possession of the product. Accordingly, the redemption information (e.g., a voucher), may include several different Stock Keeping Unit (SKU) numbers, model names and/or model numbers. According to another embodiment, the voucher may include several separate products (e.g., a television or a VCR) or several equivalent products (e.g., several different television brands, more than one of which may be available at a single retailer). The redemption information may also enable the creation of multiple vouchers. The multiple vouchers may each include the same redemption code or different redemption codes. For example, if the buyer can only redeem one of the vouchers there can be a single redemption code. However, if the buyer can redeem more than one voucher for more than one product (e.g., the buyer purchased a package or combination of products) each voucher may have a different redemption code corresponding to each of the products the buyer purchased.

The redemption information may also include supplemental offer information. For example, the voucher may let the buyer purchase three VCR tapes for $1 if the buyer takes possession of a VCR at a particular retailer. According to one embodiment of the present invention, the supplemental offer may have a separate associated redemption code and be on a separate voucher.

According to one embodiment of the present invention, when the buyer presents a voucher to a retailer, the retailer device 2750 sends information related to an attempt to take possession of the product (such as the redemption code included on the voucher) to the purchasing system device 2900.

A retailer device 2750 may comprise, for example, Point Of Sale (POS) devices, such as a POS controller 3000 that communicates with POS terminals 3100 and the purchasing system device 2900 during the redemption process. A POS terminal 3100 may include an optical bar code scanner (to read bar codes on products and/or vouchers), a card reader (to read cards, such as cards that have magnetizable strips on which data can be recorded) and a keypad (e.g., one used by an employee of the retailer to enter credit card numbers). One such card reader is the OMNI™ 1450 payment terminal, manufactured by VeriFone, Inc., which includes a built-in, magnetic-stripe reader, a Personal Identification Number (PIN) entry pad (e.g., one used buy a buyer to enter a debit card PIN) and an integrated smart card reader. The retailer devices 2750 also may comprise, for example, a CAT 2775 coupled to the POS terminal, and inventory systems that periodically update the purchasing system device 2900.

The purchasing system device 2900 and retailer device may communicate in substantially real time during the redemption of a voucher. That is, the retailer device 2750 may connect to the purchasing system device 2900 when a buyer is attempting to take possession of the product. In another embodiment, the purchasing system device 2900 and the retailer device 2750 communicate on a periodic (e.g., every night at midnight) or non-periodic (e.g., when a new redemption code is generated) basis. For example, the purchasing system device 2900 can periodically communicate with each retailer device 2750 regarding buyer redemption codes, redeemable at the retailer, that have been issued. Likewise, the retailer device 2750 can in turn transmit to the purchasing system device 2900a list of the redemption codes that have been redeemed at the retailer during the day. In some embodiments, the retailer is also the seller who accepts a buyer's offer. In such an embodiment, the retailer device 2750 may perform the function of a potential seller device 2710 or be in communication with another server that performs the function of a potential seller device 2710.

When the retailer device 2750 sends information related to an attempt to take possession of the product (such as a redemption code) to the purchasing system device 2900, the information can be used to authorize the buyer to take possession of the product.

For example, the retailer device 2750 may send an authorization request to the purchasing system through a credit card processing system device 2725. The credit card processing system device 2725 may be, for example, a server operated by an entity that manages financial accounts and/or authorizes transactions, such as First Data Corp. Such entities are also known as credit card transaction processing corporations and may process (e.g., authorize and settle payment for) transactions being paid by a credit, debit or charge card.

The purchasing system device 2900 can send a verification back to the retailer device 2750 (e.g., through the credit card processing system device 2725) authorizing the retailer to let the buyer take possession of the product. The purchasing system device 2900 may also provide a payment to the retailer in exchange for providing the product to the buyer. In this case, of course, the amount paid to the retailer may or may not be equal to the offer amount paid by the buyer. For example, suppose the purchasing system arranges for a buyer to purchase a television for $300, and the buyer takes possession of the television at a retailer (one of several indicated on the voucher) that typically sells that television for $320. In this case, the purchasing system may pay the full retail price (i.e., $320) to the retailer (e.g., the settlement price).

In one embodiment of the present invention, the purchasing system may obtain (e.g., purchase) a plurality of financial account identifiers (e.g., identifiers that identify credit, debit and/or charge accounts). Each of the financial account identifiers may identify the purchasing system as the issuer of the financial account. For example, the first few digits of the financial account identifier may identify the purchasing system. The purchasing system may store these financial account identifiers in memory.

The purchasing system may also obtain plastic cards in the size and shape of credit and debit cards, each of the plastic cards having one of the financial account identifiers imprinted or embossed thereon. Each of the plastic cards may further include a magnetic stripe, with one of the financial account identifiers being included on the stripe. In such embodiments, a customer who arranges to purchase a product via the purchasing system and subsequently take possession of the product at a retailer may be provided with one of the financial account identifiers stored in memory that is not yet associated with another customer. Alternately, the purchasing system may make the plastic cards available at various locations and a customer, before arranging to purchase a product via the purchasing system, may obtain one of these cards and, upon arranging to purchase a product via the purchasing system, may provide to the purchasing system the financial account identifier of the card. The purchasing system may then retrieve the financial account identifier provided by the customer from memory and associated the financial account identifier with the customer.

When a customer purchases a product via the purchasing system in this embodiment, an available balance associated with the financial account identifier associated with the customer may be set to a particular amount. This particular amount may be based on, for example, the expected retail price of the product the buyer is arranging to purchase (plus, e.g., any tax or other charges expected to be paid by the customer when taking possession of the product at a retailer). In some embodiments this amount may be set based on the amount expected to be paid by the customer when taking possession of the product at a retailer plus another amount (e.g., a percentage of the amount expected to be paid by the buyer or a predetermined amount).

The financial account identifiers may comprise, for example, sixteen numerals readable by a card authorization terminal (CAT) of a point of sale (POS) device. The first four numerals, for example, may identify the purchasing system as the entity that manages the financial account associated with the financial account identifier.

Thus, for example, when the buyer is taking possession of the product at a retailer the buyer may bring the product to a POS device of the retailer and present the financial account identifier as payment. The financial account identifier may be entered into the CAT of the POS device (e.g., by typing it in or by swiping the magnetic stripe). The CAT may then communicate with a credit card transaction processing corporation to authorize the use of the financial account identifier as payment for the product. For example, the CAT may communicate the transaction total along with the financial account identifier to the credit card transaction processing corporation.

The credit card transaction processing corporation may recognize the financial account as being associated with the purchasing system (e.g., based on the first four digits of the financial account) and thus route the request to the purchasing system. The purchasing system, upon receiving the authorization request, may retrieve the available balance associated with the financial account and determine whether the transaction total is not greater than the available balance. Additionally, an expiration date may be associated with the financial account (e.g., the expiration date may be set by the purchasing system as being a predetermined time from the time the buyer arranged to purchase the product). Thus, the purchasing system may further determine whether the current date is not after the expiration date. If the purchasing system determine that the transaction may be authorized (e.g., the available balance is at least equal to the transaction total and the expiration date is not before the current date), the purchasing system may communicate an authorization of the transaction to the credit card transaction processing corporation, which in turn may communicate the authorization to the retailer CAT. A denial of authorization may be determined and communicated similarly.

In some embodiments, once the purchasing system authorizes the transaction, the purchasing system may set the available balance associated with the financial account identifier of the authorized transaction to zero (such that the customer cannot use the financial account identifier for another transaction). In other embodiments, the purchasing system may reduce the available balance but not set it to zero. In still other embodiments, the purchasing system may not set the available balance to zero or reduce it until further confirmation is received (e.g., from the retailer and/or the buyer) that the buyer has successfully obtained possession of the product.

In one or more embodiments, a financial account identifier may remain associated with a particular buyer such that, when the buyer subsequently arranges to purchase another product via the purchasing system, the available balance associated with the financial account may again be reset to an amount based on the charges expected to be paid by the buyer upon taking possession of the other product at a retailer.

In one or more embodiments, the purchasing system, upon setting an available balance of a financial account and/or an expiration date of a financial account, may communicated this information to one or more credit card transaction processing corporations. In such embodiments, the credit card transaction processing corporations may thus have sufficient information to provide or deny an authorization request for a transaction without forwarding the request immediately to the purchasing system.

In addition to the communications discussed above, it will be appreciated that any two or more of the devices comprising the redemption system 2700 may communicate if desired (as shown, by way of examples, by the dashed lines in FIG. 27). For example, two retailer devices 2750 may communicate with respect to inventory information or when a buyer takes possession of a product. Moreover, a retailer device 2750 may communicate with a seller device 2710 with respect to a subsidy amount, a substitute product or a supplemental offer. Similarly, two seller devices 2710 may communicate with respect to substitute products or supplemental offers. Likewise, a seller device 2710 or retailer device 2750 may communicate with the credit card processing system device 2725 with respect to a credit card account associated with the buyer. As a final example, a buyer device 2800 may communicate with a retailer device 2750 with respect to the redemption code (as explained herein) or for any other reason.

Note also that some or all of the actions associated with the purchasing system device 2900 may be performed by a retailer, a product manufacturer, or a party other than the retailer and product manufacturer.

Purchasing System Vouchers

As previously noted, the purchasing system device 2900 may output redemption information, including supplemental offer information and information that the buyer needs to take possession of the product at a retailer. The information can be transmitted to the buyer in the form of an electronic message (e.g., a block of code executable by the buyer device) enabling the creation (e.g., printing) of a voucher. As shown in FIG. 22, which illustrates a purchasing system voucher 20 according to an embodiment of the present invention, information about the purchase can also be printed on the voucher.

For example, the information printed on the purchasing system voucher 20 can include: the name of the buyer 21; a description of the product (or products) being purchased 22; a field 23 listing an issue date, an offer identifier and a redemption code associated with the voucher 20; and an expiration date and/or penalty information 24. Note that a number of different products 22 may be listed on a voucher. This may be necessary, for example, if multiple products are being purchased or if different retailers use different bar codes and model names for essentially the same product.

The buyer may have the option of going to a number of different retailers listed on the voucher 20 to take possession of the product. For example, the voucher 20 shown in FIG. 22 lists a number of different retailers 25a, 25b and associated retailer identifiers 26a, 26b. Note that the retailer identifiers 26a, 26b may also encode other information, such as, for example, redemption codes and product identifiers. Of course, when the seller is a retailer the voucher 20 may only be redeemable through that retailer (e.g., a specific retail store, a subset of retail stores in a national chain, or all retail stores in a national chain).

According to one embodiment of the present invention, the price being paid by the buyer is not included on the voucher 20. Thus, if the seller is not the retailer, the retailer that provides the product to the buyer will not be aware of the price the seller accepted, or the buyer established, for the product. Thus, in this embodiment of the present invention, the retailer is only aware of the settlement price paid by the purchasing system for honoring the voucher.

One or more bar codes on the voucher (e.g., bar codes in place of or in addition to the retailer identifier 26a, 26b) may also include the redemption code and a product identifier. In such an embodiment, a cashier at the POS terminal 3100 can scan the voucher 20 along with the product and, if the product identifier encoded into the bar code matches the scanned product identifier, the transaction can be locally authorized. Alternatively, a bar code may serve as a pointer to a record in a database, either stored locally at the retailer or remotely at the purchasing system device 2900. Using this bar code, the transaction may be authorized based on whether the data stored in a database matches the current transaction (i.e., the voucher is redeemable at that retailer for that product).

Instead of a printed voucher 20, the redemption information may instead simply be a number or alphanumeric identifier provided to the buyer. In this case, the buyer could write the information down (such as when receiving the information over the telephone) and bring the number to the retailer when taking possession of the product.

According to another embodiment of the present invention, redemption information may be, for example, information encoded using, for example, cryptographic techniques. Applicable encryption techniques are described in Bruce Schneier, "Applied Cryptography: Protocols, Algorithms, and Source Code in C" (John Wiley & Sons, Inc., 2nd Ed. 1996). The information may also be stored electronically, such as in a smart-card type device, a PDA or a removable memory device. A single voucher 20 may be redeemable at a number of different retailers 25a, 25b—or separate vouchers can be printed for each retailer. In this case, when one voucher is redeemed the remaining vouchers can be made invalid.

According to another embodiment of the present invention, the voucher 20 also serves as a Record Of Charge (ROC). For example, the purchasing system may place a hold, or "freeze," on the buyer's credit card account when sending the redemption information to the buyer. As used herein, a freeze is any pre-authorization of a charge that will be made to the buyer's account at a later time. The buyer then prints out the voucher/ROC and brings it to a retailer. The retailer may then forward the voucher/ROC to the credit card processing system device 2725. That is, the frozen portion is only reserved until the buyer takes possession of the product at a retailer, at which point the purchasing system requests that funds be transferred from the buyer's account. Other "freezing" methods are practiced in the hotel industry (e.g., a price is authorized when the buyer reserves a room, but funds are not transferred until the buyer checks out). Note that a hotel may authorize a price higher than the rate the buyer agreed to pay for the room to cover supplemental services such as telephone charges, in-room movies and in-room dining service.

According to this embodiment of the present invention, the purchasing system 2700 uses a merchant identifier associated with the purchasing system and receives payment for the transaction from the credit card processing system. The purchasing system then provides payment to the retailer for allowing the buyer to take possession of a product. According to another embodiment, the voucher/ROC may instead indicate the retailer's merchant identifier as the entity to which the funds should be transferred (e.g., directly).

The redemption system 2700 devices will now be explained in greater detail with respect to FIGS. 28 to 31.

Buyer Device

Figure 28:
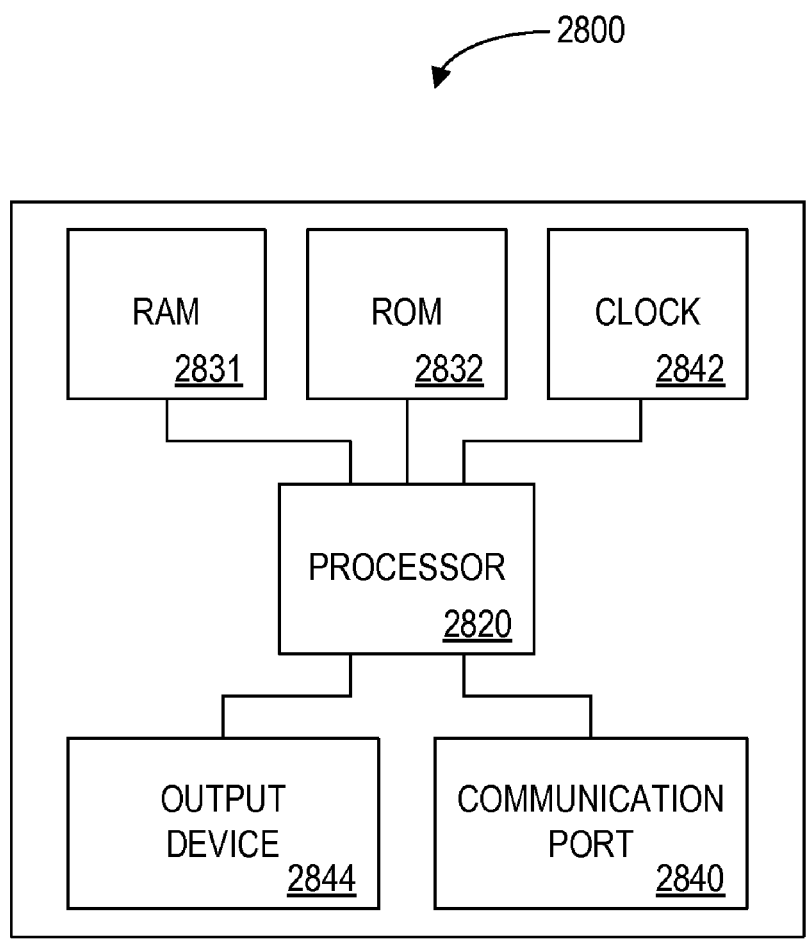
FIG. 28 is a block schematic diagram of a buyer device according to an embodiment of the present invention.

FIG. 28 illustrates a buyer device 2800 that is descriptive of the device shown in FIG. 27 according to an embodiment of the present invention. As will be appreciated, portions of the descriptions of the various elements described with respect to FIG. 28 will also be applicable to the other devices comprising the redemption system 2700. The buyer device 2800 comprises a processor 2820, such as one or more Pentium® processors, coupled to: a communication port 2840 configured to communicate through a communication network (not shown in FIG. 28); a clock 2842; and an output device 2844, such as a display or printer. The communication port 2840 may be used to communicate with, for example, the purchasing system to access a Web site and submit an offer to purchase a product as instructed by the user of the buyer device.

The processor 2820 is also in communication with Random Access Memory (RAM) and Read Only Memory (ROM) data storage devices 2831, 2832. The data storage devices 2831, 2832 may instead comprise any appropriate storage device, including combination of magnetic, optical or semiconductor memory.

The data storage devices 2831, 2832 store a program for controlling the processor 2820. The processor 2820 performs instructions of the program, and thereby operates in accordance with the present invention. For example, the processor 2820 may execute a Web browser application program.

The program may be stored in a compressed, uncompiled and/or encrypted format. The program furthermore includes program elements that may be necessary, such as an operating system, a database management system and "device drivers" used by the processor 2820 to interface with peripheral devices. Appropriate device drivers and other necessary program elements are known to those skilled in the art and are not described in detail herein.

As previously noted, the output device 2844 may comprise a printer, and this printer may be used to a print a purchasing system voucher, such as a voucher including a redemption code. If the buyer device 2800 is not attached to a printer, the buyer may write down the redemption code or store the code in the buyer device 2800 or another device, such as a portable buyer device. For example, the buyer may write down a redemption code and input the code at the retailer device 2750 (including a retailer kiosk). A retailer device 2750 may communicate with the purchasing system device 2900, such as through an Internet connection, and access a database record associated with the transaction based on the redemption code. The retailer device 2750 could then print the voucher for the buyer, if desired.

According to another embodiment of the present invention, the buyer can take possession of the product without using a printed voucher. For example, the buyer may simply tell the POS terminal 3100 operator the redemption code. The operator inputs the redemption code using the POS terminal 3100 and the process continues as if the buyer used a printed voucher. Also, if the buyer stores the redemption code in a portable buyer device (e.g., a PDA), the buyer may communicate the redemption code directly from the buyer device to the POS terminal 3100, such as by using an Infra-Red (IR) communication link.

Purchasing System Device

Figure 29:
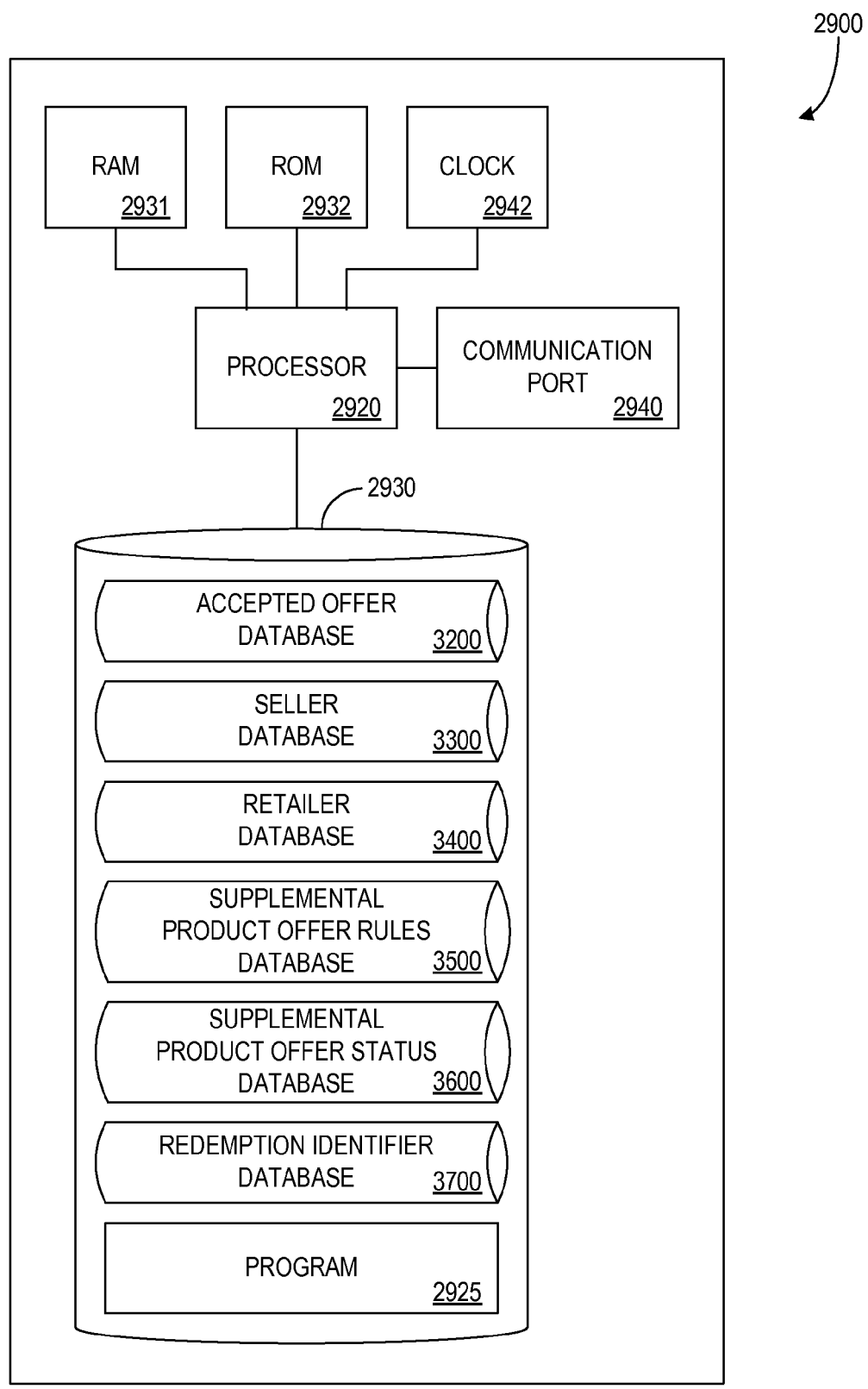
FIG. 29 is a block schematic diagram of a purchasing system device according to an embodiment of the present invention.

FIG. 29 illustrates a purchasing system device 2900 that is descriptive of the device shown in FIG. 27 according to an embodiment of the present invention. The purchasing system device 2900 comprises a processor 2920 coupled to: a communication port 2940 configured to communicate through a communication network (not shown in FIG. 29); a clock 2942; and RAM and ROM storage devices 2931, 2932. The communication port 2940 may be used to communicate with, for example: (i) a plurality of seller devices 2710; (ii) a plurality of buyer devices 2800; (iii) a plurality of retailer devices 2750; and or a plurality of credit card processing system devices 2725. The sellers may comprise, for example, product manufacturers and/or retailers. The buyers may comprise individuals who "log onto" a Web site and submit offers to purchase products. Such a Web site could be, for example: (i) hosted by the purchasing system device 2900 or (ii) hosted by a server coupled to the purchasing system device 2900.

The processor 2920 is also in communication with a data storage device 2930. The data storage device 2930 comprises an appropriate combination of magnetic, optical and/or semiconductor memory, and may include Random Access Memory (RAM), Read-Only Memory (ROM) and/or a hard disk drive. The processor 2920 and the storage device 2930 may each be: (i) located entirely within a single computer or other computing device; (ii) connected to each other by a remote communication medium, such as a serial port cable, telephone line or wireless frequency transceiver; or (iii) a combination thereof. In one embodiment, the purchasing system device 2900 may comprise one or more computers that are connected to a remote database server.

The data storage device 2930 stores a program 2925 for controlling the processor 2920. The processor 2920 performs instructions of the program 2925, and thereby operates in accordance with the present invention. For example, when a buyer offer is received, the purchasing system device 2900 may arrange for the buyer to purchase a product and take possession of the product at a retailer. Note that, as used herein, information may be "received" by, for example: (1) the purchasing system device 2900 from a buyer device 2800; or (2) a software application or module within the purchasing system device 2900 from another software application, module or any other source.

As shown in FIG. 29, the storage device 2930 also stores: an accepted offer database 3200 (described in detail with respect to FIG. 32A); a seller database 3300 (described in detail with respect to FIG. 33); a retailer database 3400 (described in detail with respect to FIG. 34); a supplemental product offer rules database 3500 (described in detail with respect to FIG. 35); a supplemental product offer status database 3600 (described in detail with respect to FIG. 36); and a redemption identifier database 3700 (described in detail with respect to FIG. 37). The schematic illustrations and accompanying descriptions of the databases presented herein are exemplary, and any number of other database arrangements could be employed besides those suggested by the figures.

As will now be described, the purchasing system device 2900 shown in FIG. 29 lets a buyer establish a price for a product using a communication network (e.g., through the Internet) with a seller (e.g., a product manufacturer or a retailer) before taking possession of, or "picking up," the product at a convenient retailer. The purchasing system device 2900 may issue the buyer a redemption code, such as a code included on a printed voucher, that is redeemable for the product at one or more "participating" local retailers. That is, the purchasing system has agreements with these retailers such that the retailers agree to honor purchasing system vouchers (either generally or only for specific products).

According to an embodiment of the present invention, each participating retailer establishes a "settlement price" for products sold through the purchasing system. The settlement price is the amount that the purchasing system must provide to the retailer in exchange for honoring a voucher. A retailer may set the settlement price below, at or above the product's retail price. The retailer may, for example, set the settlement price below the retail price for a given product to increase the likelihood of the purchasing system accepting a buyer's offer for the product and arranging for the buyer to take possession of the product at the retailer, thus generating additional traffic for the retailer (i.e., the buyers who come to the store to redeem vouchers).

In another embodiment of the present invention, a product manufacturer (acting as a seller) can bypass a retailer's pricing structure and establish a price for a product directly with a buyer without the burden of delivering the product to the buyer. Similarly, an embodiment of the present invention lets a retailer (acting as a seller) establish a price for a product with a particular buyer without lowering the price for the product typically charged at a retail store. This can attract new buyers without giving a discounted price to other customers who visit the retail store.

Retailer Devices

Figure 30:
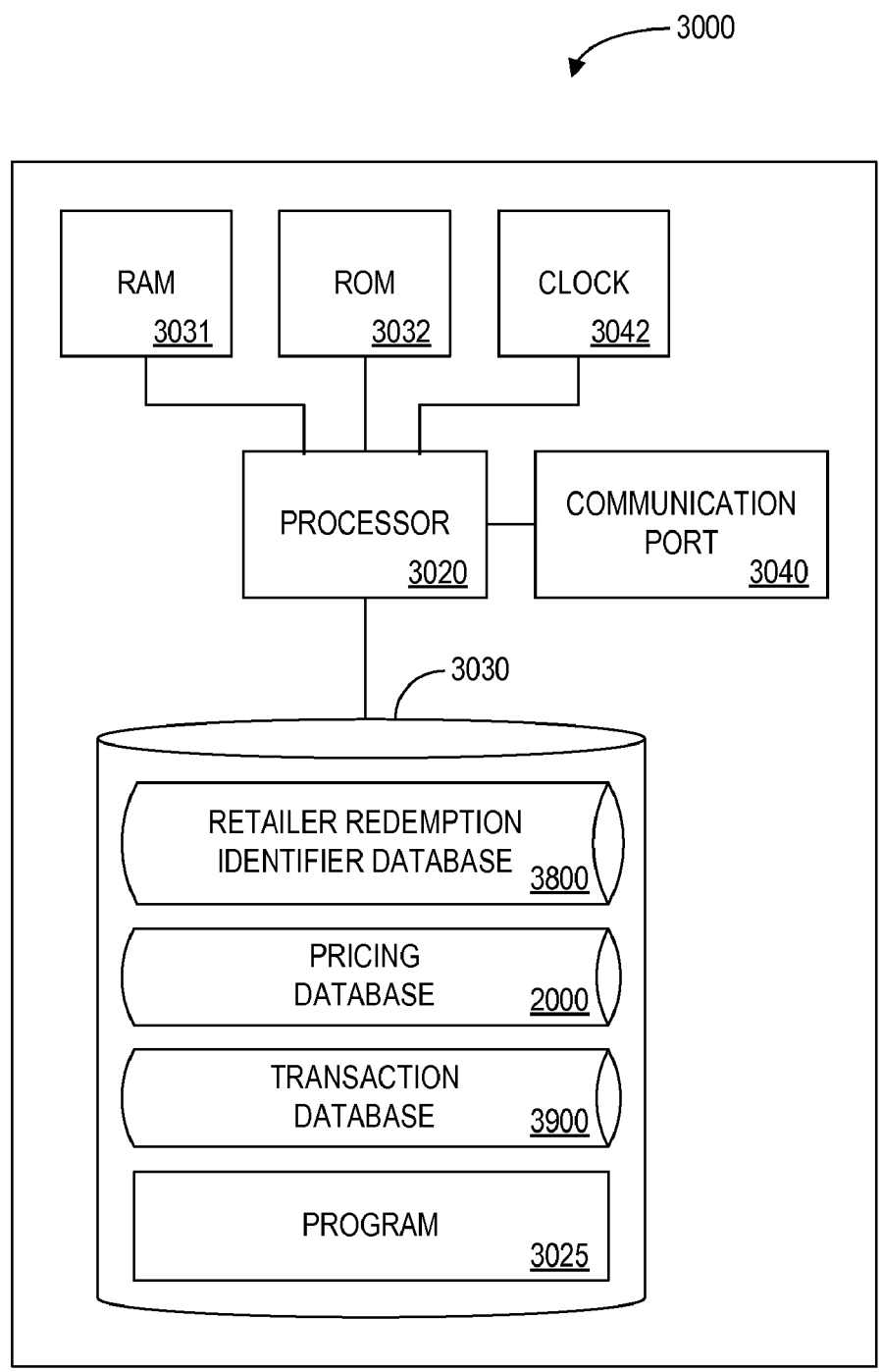
FIG. 30 is a block schematic diagram of a point of sale controller according to an embodiment of the present invention.

FIGS. 4 and 5 illustrate portions of the retailer device 2750 according to one embodiment of the present invention. In particular, FIG. 30 is a block schematic diagram of the POS controller 3000. The POS controller 3000 includes a processor 3020 coupled to: a communication port 3040 (which may, for example, communicate with the POS terminal 3100); a clock 3042; and RAM and ROM storage devices 3031, 3032. The processor 3020 is also coupled to a storage device 3030 that stores a program containing instructions adapted to be executed by the processor 3020 to perform at least one embodiment of the present invention.

As shown in FIG. 30, the storage device 3030 also stores: a retailer redemption identifier database 3800 (described in detail with respect to FIG. 38); a pricing database 2000 (described in detail with respect to FIG. 20); and a transaction database 3900 (described in detail with respect to FIG. 39).

Figure 31:
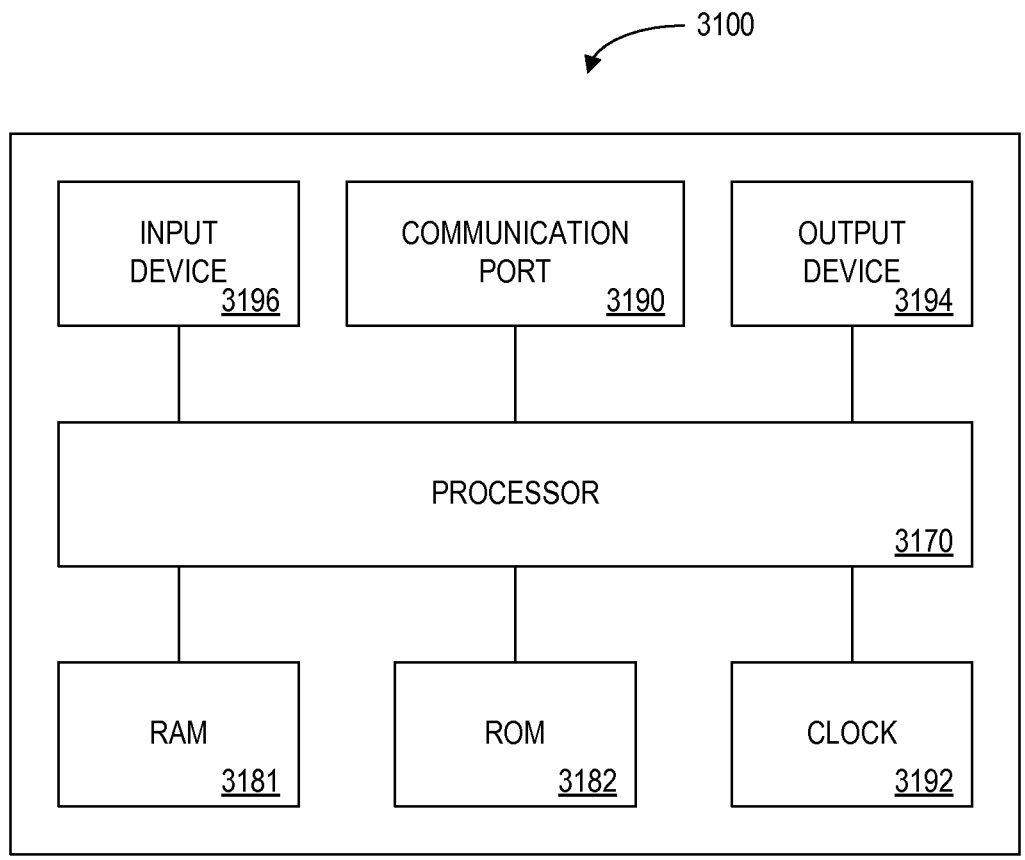
FIG. 31 is a block schematic diagram of a point of sale terminal according to an embodiment of the present invention.

FIG. 31 is a block schematic diagram of the POS terminal 3100. The POS terminal 3100 includes a processor 3170 coupled to: a communication port 3190 (which may, for example, communicate with the POS controller 3000 or the CAT 2775); a clock 3192; RAM and ROM storage devices 3181, 3182; an input device 3196, such as a bar code reader or keypad; and an output device 3194, such as a printer capable of printing a receipt. The storage device 3030 stores a program 3025 containing instructions adapted to be executed by the processor 3020 to perform at least one embodiment of the present invention.

For example, the retailer device 2750 (i.e., the POS controller 3000, the POS terminal 3100 or another device) may receive redemption information from a buyer. The retailer device 2750 may also receive verification information (e.g., information enabling the retailer to authorize the buyer to take possession of the product) from the purchasing system device 2900. The retailer then provides the product to the buyer and receives, from a party different than the buyer, a payment in exchange for providing the product to the buyer. That is, the retailer does not receive payment directly from the buyer and does not, according to one embodiment of the present invention, receive payment of an amount based on the amount the buyer is providing for the right to take possession of the product at the retailer.

The POS controller 3000 is in "communication" with (or is linked to) the purchasing system device 2900 and one or more POS terminals 3100. Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

A retailer that participates in the purchasing system as both a seller and a product provider will need to determine, when a given product is being redeemed, whether or not the retailer is acting as the seller. This may be done using a database or by communicating with the purchasing system. For example, a retailer may both: (i) sell a particular television through a purchasing system; and (ii) let buyers that purchase the television through the purchasing system, from a different seller, take possession of the television at the store. In this case, when a buyer visits the retailer to redeem a voucher, it must be determined whether the retailer should receive from the purchasing system: (i) the buyer price (if the retailer, acting as a seller, sold the television to the buyer through the purchasing system); or (ii) the settlement price (if the retailer is merely letting the buyer take possession of the television at the retail store).

Examples of databases that may be used in connection with the redemption system 2700 will now be described in detail with respect to FIGS. 6 to 10.

Accepted Offer Database

Figure 32A:

Referring to FIGS. 32A and 32B, a table 3200 represents one embodiment of the accepted offer database that may be stored at a purchasing system device 2900 (FIGS. 27 and 3). The table 3200 includes entries identifying buyer offers that have accepted through the purchasing system. The table 3200 also defines fields 3202, 3204, 3206, 3208, 3210, 3212, 3214, 3216, 3218, 3220, 3222, 3224, 3226, 3228 for each of the entries. The fields specify: an offer identifier 3202; a seller identifier 3204; a purchasing system price 3206; a product identifier 3208; a payment protocol 3210; a redemption identifier 3212; a redemption status 3214; an expiration date 3216; a penalty amount 3218; an initial amount 3220; a final amount 3222; authorized retailers 3224; an expected price range 3226 and a redemption retailer 3228.

The offer identifier 3202 may be, for example, an alphanumeric code uniquely associated with a particular buyer or a particular purchasing system transaction. For example, the buyer's payment identifier (e.g. credit card number) may also function as the offer identifier 3202. The seller identifier 3204, the purchasing system price 3206 and the product identifier 3208 are generally associated with identifying the seller, price and product involved in the purchasing system transaction. The payment protocol 3210, redemption identifier 3212 (including a pseudo payment identifier as will be explained in detail), and redemption status 3214 are associated with the buyer providing payment for the product and information associated with the buyer taking possession of the product at a retailer. In addition, the purchasing system may charge the buyer the penalty amount 3218 if the buyer does take possession of the product by the expiration date 3216.

The initial amount 3220 may represent an amount of payment initially determined by the purchasing system device 2900 (which may be, for example, charged or frozen), while the final amount 3222 may represent the amount of payment actually required. The final amount 3222 may be different from the initial amount if, for example, a different tax rate applied to the transaction when the buyer takes possession of the product. The authorized retailers 3224 field lists retailer identifiers associated with one or more retailers at which the buyer may take possession of the product, and the expected price range 3226 represents a range of prices (e.g., retail prices) associated with those retailers. In one embodiment, the retailer authorizes a redemption code by transmitting the redemption identifier, the retailer identifier, and the retailer price for the product the buyer is attempting to take possession of to the purchasing system through a banking network (e.g., using a CAT). If (i) the transmitted retail price is within the expected price range 3226 stored in association with the received redemption identifier, (ii) the redemption status 3214 is not "redeemed"; and (iii) the retailer identifier is listed in the authorized retailers field 3224, the received redemption identifier is verified successfully. In cases where the product identifier of the product the buyer is attempting to take possession of is not transmitted to the verification process, the expected price range 3226 may be used to verify that the product the buyer is attempting to take possession of is the same product the buyer purchased through the purchasing system. Of course, the purchasing system may need access to the relevant retail prices at the participating retailers in order to set the expected price range 3226 appropriately.

Finally, the redemption retailer 3228 may contain the retailer identifier associated with the retailer at which the buyer actually takes possession of the product. Note that if the buyer has not yet taken possession of a product, the redemption retailer 3228 may be set to, for example, "TBD."

Seller Database

Referring to FIG. 33, a table 3300 represents one embodiment of the seller database that may be stored at a purchasing system device 2900 (FIGS. 27 and 3). The table 3300 includes entries identifying sellers that sell products through the purchasing system. The table 3300 also defines fields 3302, 3304, 3306 for each of the entries. The fields specify: a seller identifier 3302; a seller communication address 3304; and an account identifier 3306.

The seller identifier 3302 may be, for example, an alphanumeric code uniquely associated with a particular seller or a particular purchasing system transaction, and may or may not be based on the seller identifier 3204 stored in the accepted offer database 3200. The seller communication address 3304 may be an IP address that is used by the purchasing system device 2900 to communicate transaction-related data to the seller device 2710. In an embodiment where buyer offers are transmitted to at least one seller, this address is used to communicate offers and acceptances. The account identifier 3306 can be used to identify an account to receive funds when a transaction is completed (e.g. after the buyer takes possession of the product at a retailer).

In general, this database may be used, for example, to: (1) identify the seller during the registration processes of FIGS. 11 and 12; and (2) identify accounts for settlement purposes.

Retailer Database

Referring to FIG. 34, a table 3400 represents one embodiment of the retailer database that may be stored at a purchasing system device 2900 (FIGS. 1A and 3). The table 3400 includes entries that identify retailers at which a buyer may take possession of products purchased through the purchasing system. The table 3400 also defines fields 3402, 3404, 3406 for each of the entries. The fields specify: a retailer identifier 3402; a physical location 3404; and a retailer communication address 3406.

The retailer identifier 3402 may be, for example, an alphanumeric code uniquely associated with a particular retailer or a particular purchasing system transaction. The physical location 3404 may be used by the system to determine if a retailer address is geographically close enough to the buyer's address to be included on a voucher, using algorithms which are well known in the art.

The retailer communication address 3406 may be an Internet Protocol (IP) address that is used by the purchasing system to query various retailers to determine, for example, which retailer currently has stock of a given product. Various systems configurations and communication protocols developed by Telxon Corporation of Akron, Ohio can also be used to locate retailer inventory. Accordingly, in one embodiment of this invention a retailer may be selected as a retailer at which a buyer may take possession of a product based on a determination that the retailer currently has the product in inventory.

Supplemental Product Offer Rules Database

Referring to FIG. 35, a table 3500 represents one embodiment of the supplemental product offer rules database that may be stored at a purchasing system device 2900 (FIGS. 27 and 3). The table 3500 includes entries identifying supplemental offers that may be provided to a buyer that purchases a product through the purchasing system. The table 3500 also defines fields 3502, 3504, 3506, 3508, 3510, 3512, 3514 for each of the entries. The fields specify: an offering party identifier 3502; a supplemental product identifier 3504; a supplemental product offer identifier 3506; a supplemental product discount 3508; supplemental product offer rules 3510; supplemental product offer content 3512; and an offer expiration date 3514.

As used herein, a "supplemental" offer includes an offer provided to a buyer by the purchasing service on behalf of a retailer or a manufacturer. A condition of the buyer's acceptance of the supplemental offer may be, for example, taking possession of the product purchased through the purchasing system. For example, a retailer may wish to provide supplemental product offers along with the redemption code. That is, information about the supplemental offer may be included on the purchasing system voucher. In an embodiment where the buyer is not bound to take possession a product from a particular retailer, an offer may encourage the buyer to visit the offering retailer to take possession of the product. Moreover, supplemental offers may encourage a buyer to spend more at a retailer from which he or she take possession of the product. The offering party identifier 3502 can identify, for example, a retailer or a seller. That is, either type of party can offer supplemental product offers to the buyer. The supplemental product offer content 3512 is printed on the buyer's purchasing system voucher 20. Note that the voucher 20 may have a separate redemption code associated with each supplemental offer according to one embodiment of the present invention.

Supplemental Product Offer Status Database

Figure 36:
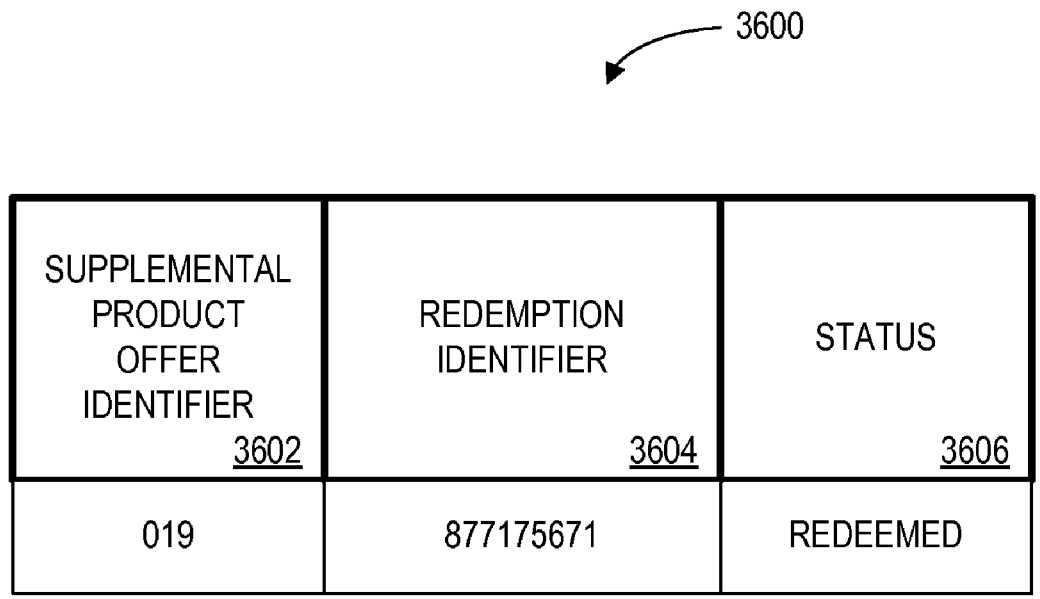
FIG. 36 is a tabular representation of a portion of a supplemental product offer status database according to an embodiment of the present invention.

Referring to FIG. 36, a table 3600 represents one embodiment of the supplemental offer status database that may be stored at a purchasing system device 2900 (FIGS. 1A and 3). The table 3600 includes entries identifying supplemental offers that have been provided to buyers. The table 3600 also defines fields 3602, 3604, 3606 for each of the entries. The fields specify: a supplemental product offer identifier 3602; a redemption identifier 3604; and a status 3606. The supplemental product offer identifier 3602 may be, for example, a unique alphanumeric code associated with a supplemental offer or product.

For example, as shown in the first record of the supplemental offer status database 3600, the supplemental offer having a supplemental product offer identifier 3602 of "019" as a redemption identifier 3604 of "877175671" and a status 3606 of "redeemed."

Methods that may be used in connection with the redemption system according to an embodiment of the present invention will now be described in detail with respect to FIGS. 11A to 20B.

Redemption Identifier Database

Referring to FIG. 37, a table 3700 represents one embodiment of the redemption identifier database that may be stored at a purchasing system device 2900 (FIGS. 1A and 3). The table 3700 includes entries identifying redemption identifiers that have been generated by the purchasing system device 2900. The table 3700 also defines fields 3702, 3704, 3706, 3708 for each of the entries. The fields specify: a redemption identifier 3702; a retailer identifier 3704; an expected retailer amount 3706; and a status 3708.

The redemption identifier 3702 may be, for example, a unique alphanumeric code associated with a particular retailer (or a group of retailers) at which a particular buyer may take possession of a particular product purchased through the purchasing system. According to one embodiment of the present invention, the redemption identifier 3702 may be, for example, a sixteen digit pseudo credit card account number (as shown in the second and third records in the table 3700). Note, however, that the redemption identifier 3702 may instead be any other type of identifier, as shown in the first record in the table 3700. The redemption identifier database 3700 may be used by the purchasing system device 2900, for example, to track the status of outstanding redemption codes. For example, each redemption identifier 3702 may be associated with a one or more retailer identifiers 3704, each having an associated expected retailer amount 3706

(e.g., an appropriate settlement price or retail price) and the status 3708 of the redemption identifier (e.g., "pending," "redeemed").

Retailer Redemption Identifier Database

Referring to FIG. 38, a table 3800 represents one embodiment of the retailer redemption identifier database that may be stored at a POS controller 3000 (FIGS. 27 and 4) or elsewhere in the retailer device 2750. The table 3800 includes entries identifying redemption identifiers that may be redeemed at that particular retailer. The table 3800 also defines fields 3802, 3804, 3806, 3808 for each of the entries. The fields specify: a redemption identifier 3802; a status 3804; a product identifier 3806; and a dates valid range 3808. The retailer redemption identifier database 3800 may be used, for example, when the retailer device 2750 locally (e.g., without sending a request to the purchasing system device 2900) determines whether a buyer is authorized to take possession of a product according to one embodiment of the present invention. For example, the purchasing system device 2900 may periodically send information to the retailer device 2750 to update information in this table.

The redemption identifier 3802 may be, for example, a redemption code generated by the purchasing system device 2900. Each redemption identifier 3802 may be associated with a status 3804 such as "pending" or "redeemed." According to one embodiment of the present invention, if the buyer loses a purchasing system voucher, the status 3804 associated with the voucher may be set to "canceled" to prevent someone else from taking possession of the buyer's product. In addition, the retailer redemption identifier database 3800 may use the product identifier 3806 and the dates valid range 3808 to make sure that a buyer is taking possession of an appropriate product at an appropriate point in time.

Transaction Database

Referring to FIG. 39, a table 3900 represents one embodiment of the transaction database that may be stored at a POS controller 3000 (FIGS. 27 and 4) or elsewhere in the retailer device 2750. The table 3900 includes entries identifying a transaction. The table 3900 also defines fields 3902, 3904, 3906, 3908, 3910 for each of the entries. The fields specify: a transaction identifier 3902; a time 3904; a product identifier 3906; a payment method 3908; and a payment status 3910. The transaction database 3900 may be used by the retailer device 2750, for example, to record information about each transaction.

The transaction identifier 3902 may be, for example, a unique alphanumeric code associated with a specific transaction. The time 3904 may reflect the time and date that the transaction took place. The product identifier 3906 may reflect one or more products that were involved in the transaction and the payment method 3908 may reflect the method of payment that was used with respect to those products (e.g., "cash," or "redemption identifier"). Finally, the payment status 3910 may indicate the status of the payment with respect to the transaction associated with the transaction identifier 3902.

Methods that may be used in connection with the redemption system according to an embodiment of the present invention will now be described in detail with respect to FIGS. 11A to 20B.

Redemption System Methods

Figure 40A:
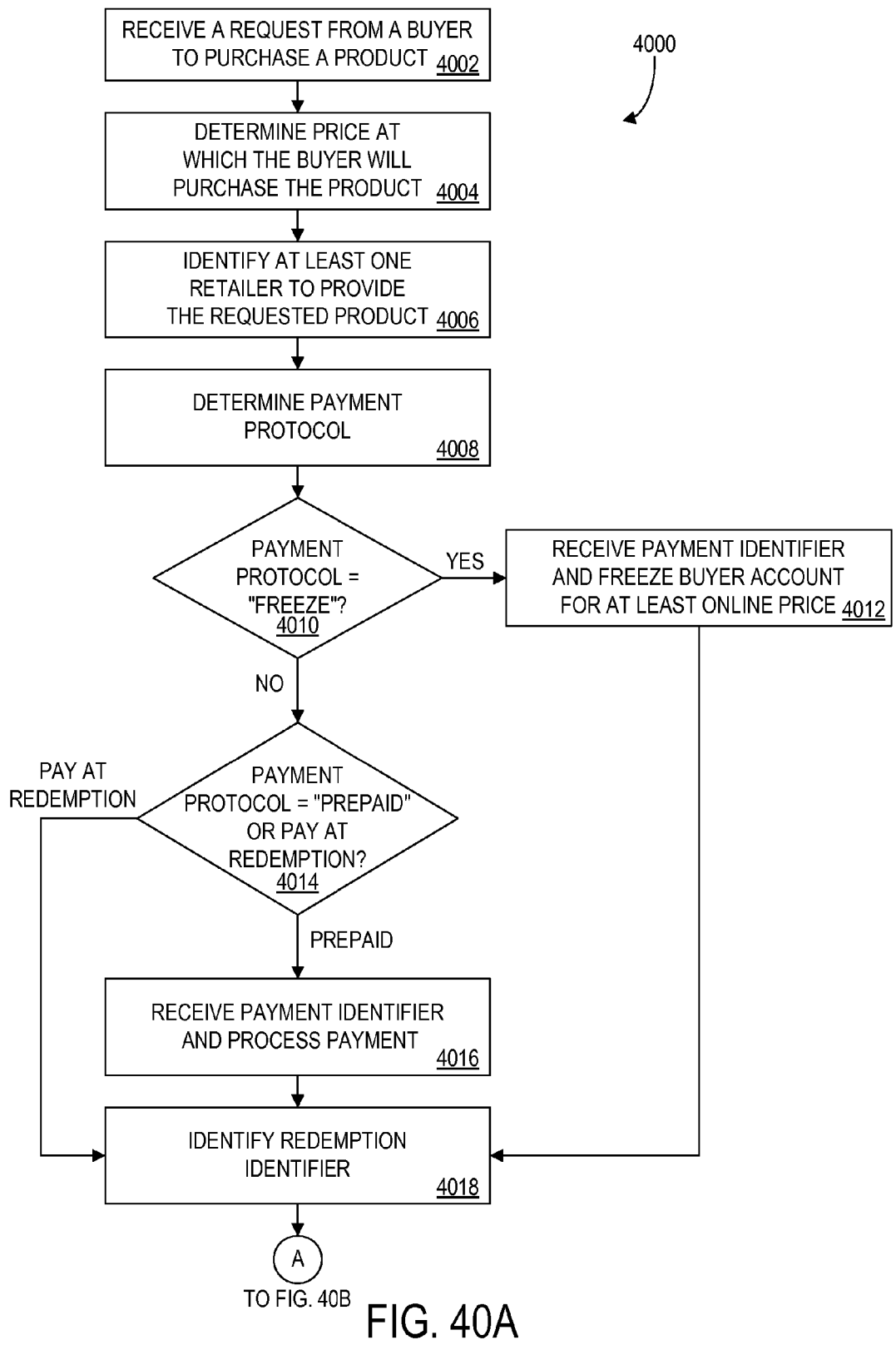
FIGS. 40A and 40B are a flow charts illustrating a general registration method according to an embodiment of the present invention.
Figure 40B:
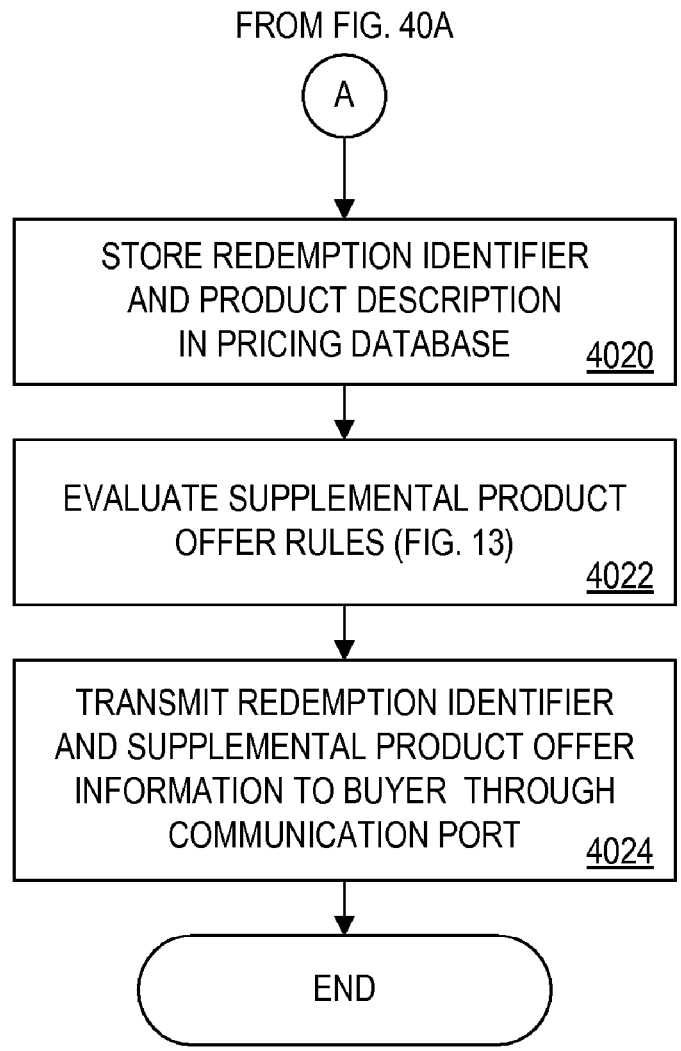

FIGS. 40A and 40B are flow charts illustrating a general registration method 4000 performed by the purchasing system device 2900 according to an embodiment of the present invention. The flow charts in FIGS. 40A and 40B, as well as the other flow charts discussed herein, are not meant to imply a fixed order to the steps, and embodiments of the present invention can be practiced in any order that is practicable. At 4002, a request to purchase a product is received from a buyer. For example, the buyer may submit a request using any conventional user-interface, such as a Web page or IVR menu.

The buyer and purchasing system establish or determine a price at which the buyer will purchase the product at 4004. In the buyer-offer embodiment, this may be achieved by identifying at least one seller who accepts a buyer-defined price. In a seller-driven pricing embodiment, this may be achieved by receiving an indication that the buyer finds a seller-defined product price acceptable and wishes to purchase the product. At 4006, the purchasing system identifies at least one retailer at which the buyer can take possession of the product. In one embodiment, the seller is the retailer and this may be automatically accomplished (e.g., when the retailer at which the buyer can take possession of the product is the seller). In an embodiment where the seller is not the retailer (e.g., a product manufacturer is the seller), this may be achieved by querying a database to identify, for example: (i) a retailer who currently has stock of the requested product; (ii) a retailer within a particular (perhaps buyer-specified) geographical area (e.g., 10 miles from the buyer's home address); and (iii) a retailer that typically carries the product.

A payment protocol is determined at 4008, and if the payment protocol requires at 4010 that the buyer's account be frozen for at least the purchasing system price, a payment identifier is received and the buyer's account is frozen at 4012. The act of freezing can be achieved, for example, by: (i) sending a request to the bank identified by the buyer's payment identifier to retain funds for at least the purchasing system price until the buyer take possession of the product; or (ii) processing a charge to the buyer's account using a conventional CAT protocol but not depositing the ROC until the buyer redeems the product. An amount greater than the purchasing system price may be frozen to create a "cushion" to cover unforeseen transaction scenarios at the retailer, such as when a penalty is applied to the transaction because the buyer takes possession of the product after a predetermined period of time.

If the payment protocol requires at 4014 that the buyer provides payment for the product at the time the buyer's offer is accepted, the buyer's payment identifier is received and the purchasing system immediately processes the payment at 4016. For example, the purchasing system device 2900 may seek an authorization from a remote credit card processing system 2725. In this case, the purchasing system device 2900 would receive the buyer's credit card and process payment for the determined price in a conventional manner. According to another embodiment, the purchasing system device 2900 receives a digital cash bit stream and processes it according to the required protocol. For a detailed explanation of various digital cash protocols, see Donald O'Mahony, "Electronic Payment Systems" (Artech House Publishers, 1997).

At 4018, a redemption identifier may be generated, received from the buyer or retrieved from a database. For example, a sixteen digit numerical code may generated where the first four digits are recognized by a credit card association to identify the purchasing system, as discussed above. A redemption code could also be generated by the applying a hash formula to data elements identifying the transaction, or the buyer may simply supply a buyer-defined password. The buyer-defined password may be a PIN that is additional to the redemption identifier.

At 4020, the redemption identifier and product description are stored in the purchasing system accepted offer database 3200. This data can subsequently be retrieved to authorize the buyer to take possession of the product.

Supplemental product offer rules are evaluated at 4022, as described in detail with respect to FIGS. 13 and 17, and the redemption identifier and any supplemental product offer information are transmitted to the buyer at 4024 before the process ends.

Figure 41A:
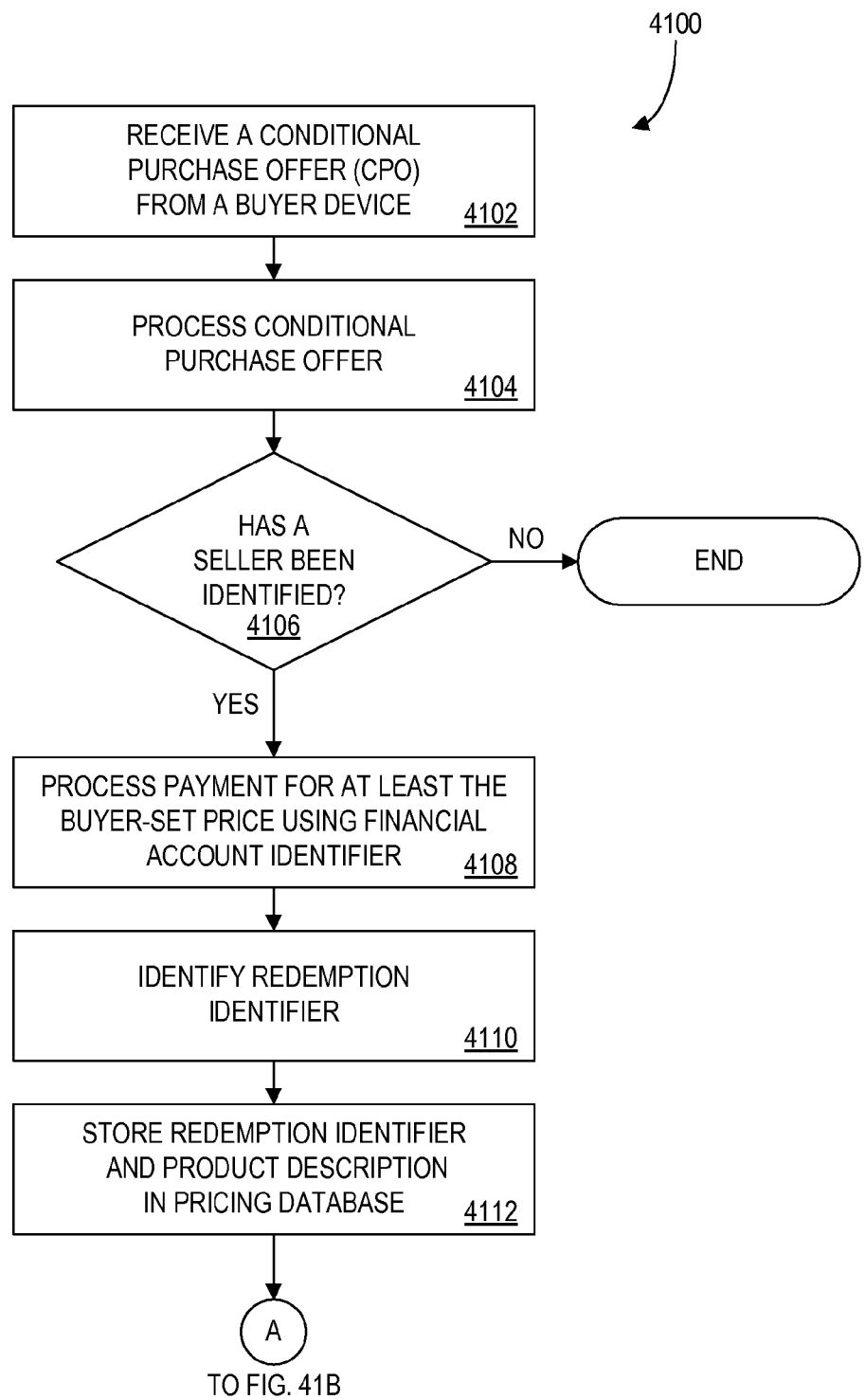
FIGS. 41A and 41B are flow charts illustrating a registration method according to another embodiment of the present invention.
Figure 41B:
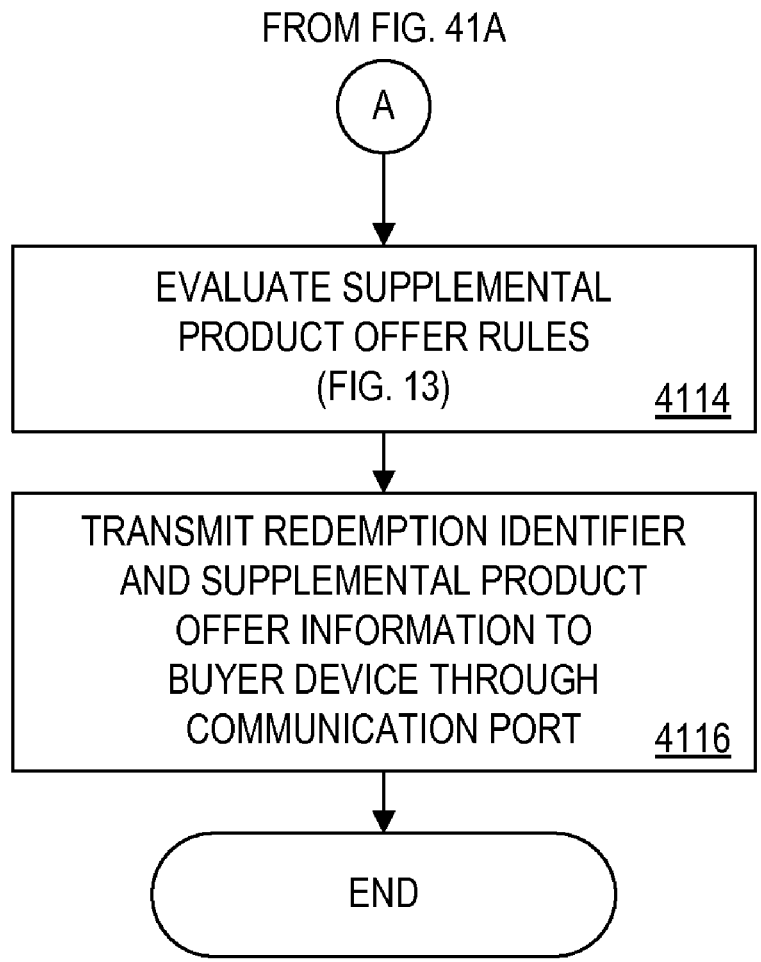

FIGS. 41A and 41B are flow charts illustrating a registration method 4100 performed by the purchasing system device 2900 according to another embodiment of the present invention. A buyer offer (including, for example, a payment identifier, a description of a desired product, and a buyer-defined price) is received from a buyer at 4102. The received buyer offer is processed at 4104. This may be achieved, for example, by transmitting the buyer offer to a plurality of potential sellers to see if any seller will accept the buyer offer. In another embodiment, this is achieved by querying a locally-stored database of seller rules or data to determine if a seller would accept the buyer's offer. If no seller can be found at 4106, the process ends. At this point, according to one embodiment of the present invention, the purchasing system may attempt to offer the buyer a third party subsidy or a package of products.

If a seller is found at 4106, payment for at least the established price is processed at 4108 using the payment identifier. According to one embodiment of the present invention, an amount at least equal to the purchasing system price is frozen at this point in a manner similar to the one discussed with respect to FIG. 40A. According other embodiments, the payment is processed by immediately seeking an authorization from a remote credit card processing system or by adhering to a digital cash transfer protocol.

At 4110, a redemption identifier may be generated, received from the buyer, or retrieved from a database. At 4112, the redemption identifier and product description are stored in the accepted offer database 3200. Supplemental product offer rules are evaluated at 4114, as described in detail with respect to FIGS. 13 and 17, and the redemption identifier and any supplemental product offer information are transmitted to the buyer at 1616 before the process ends.

Figure 42:
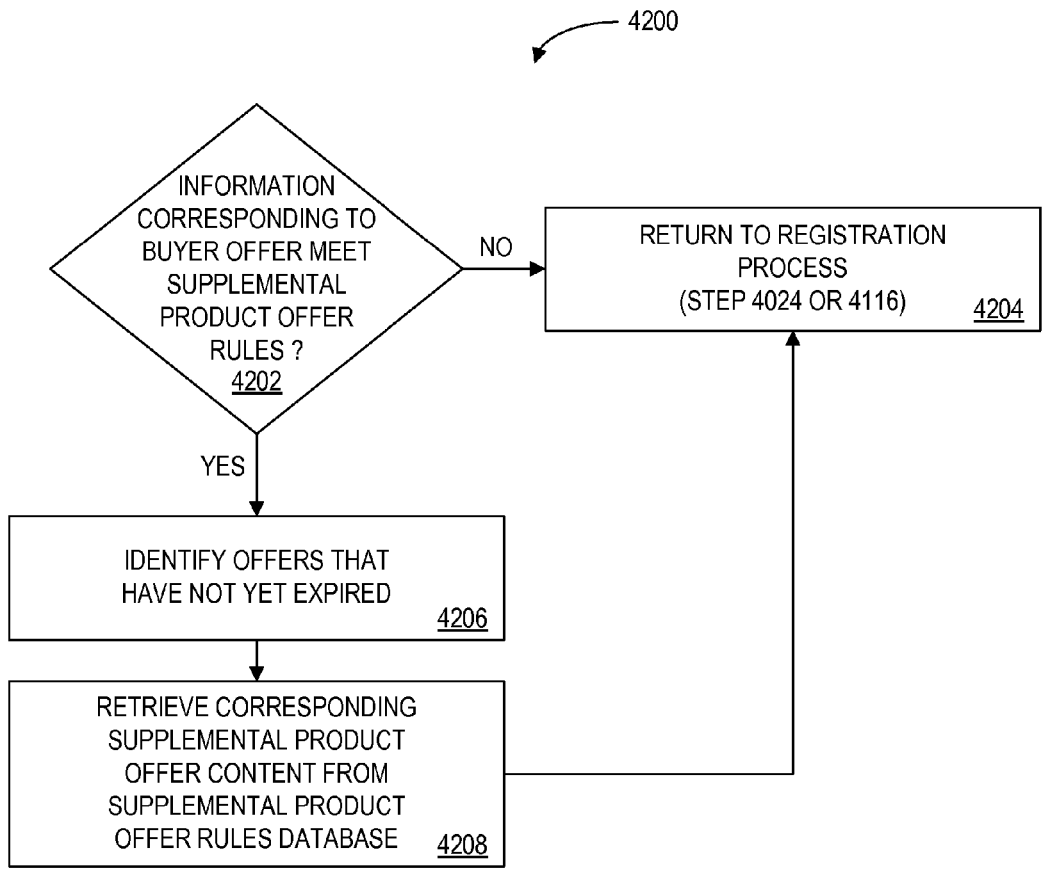
FIG. 42 is a flow chart illustrating a supplemental offer rules evaluation method according to an embodiment of the present invention.
Figure 43A:
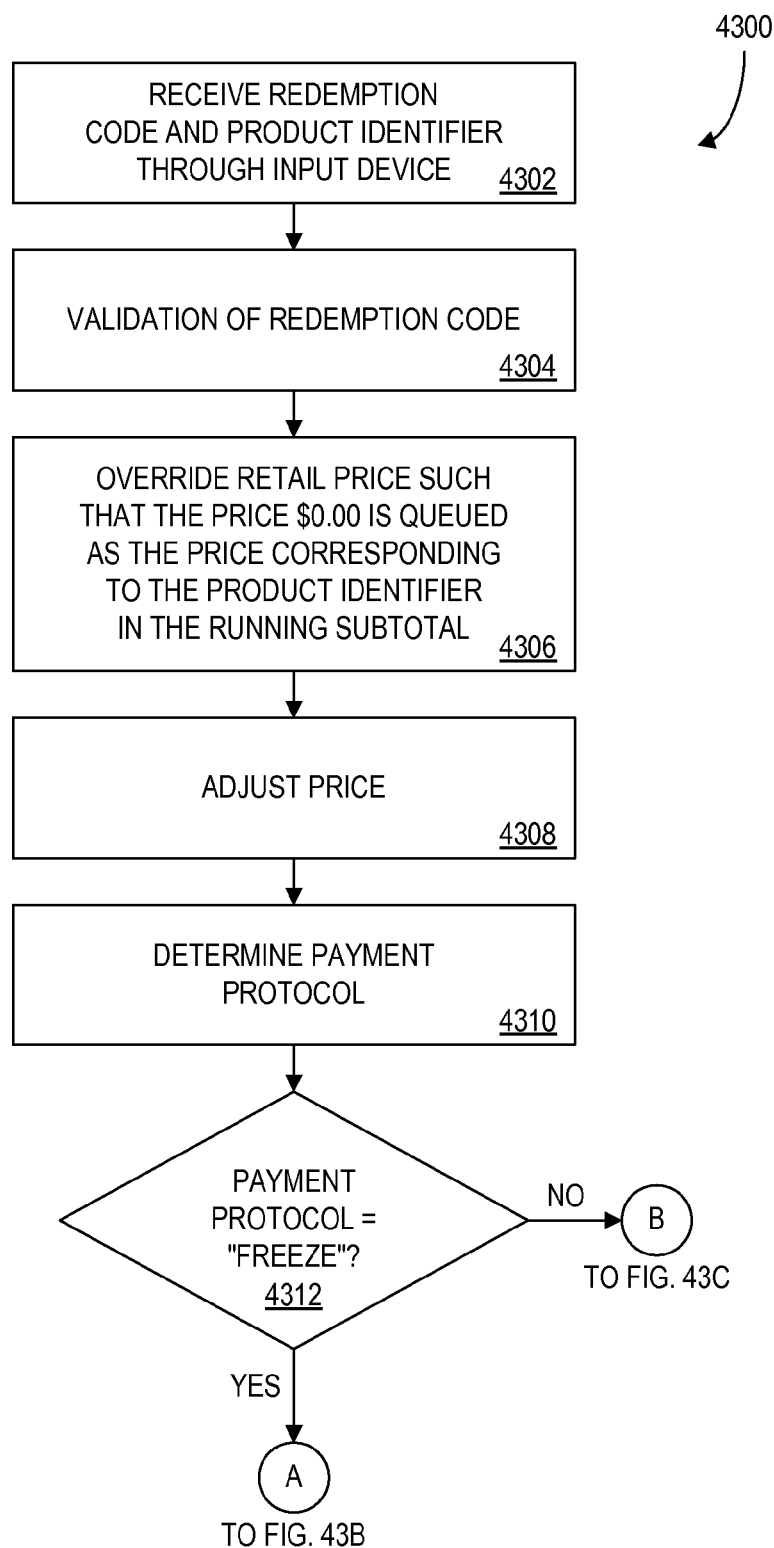
FIGS. 43A to 43D are flow charts illustrating a point of sale redemption method according to an embodiment of the present invention.
Figure 43B:
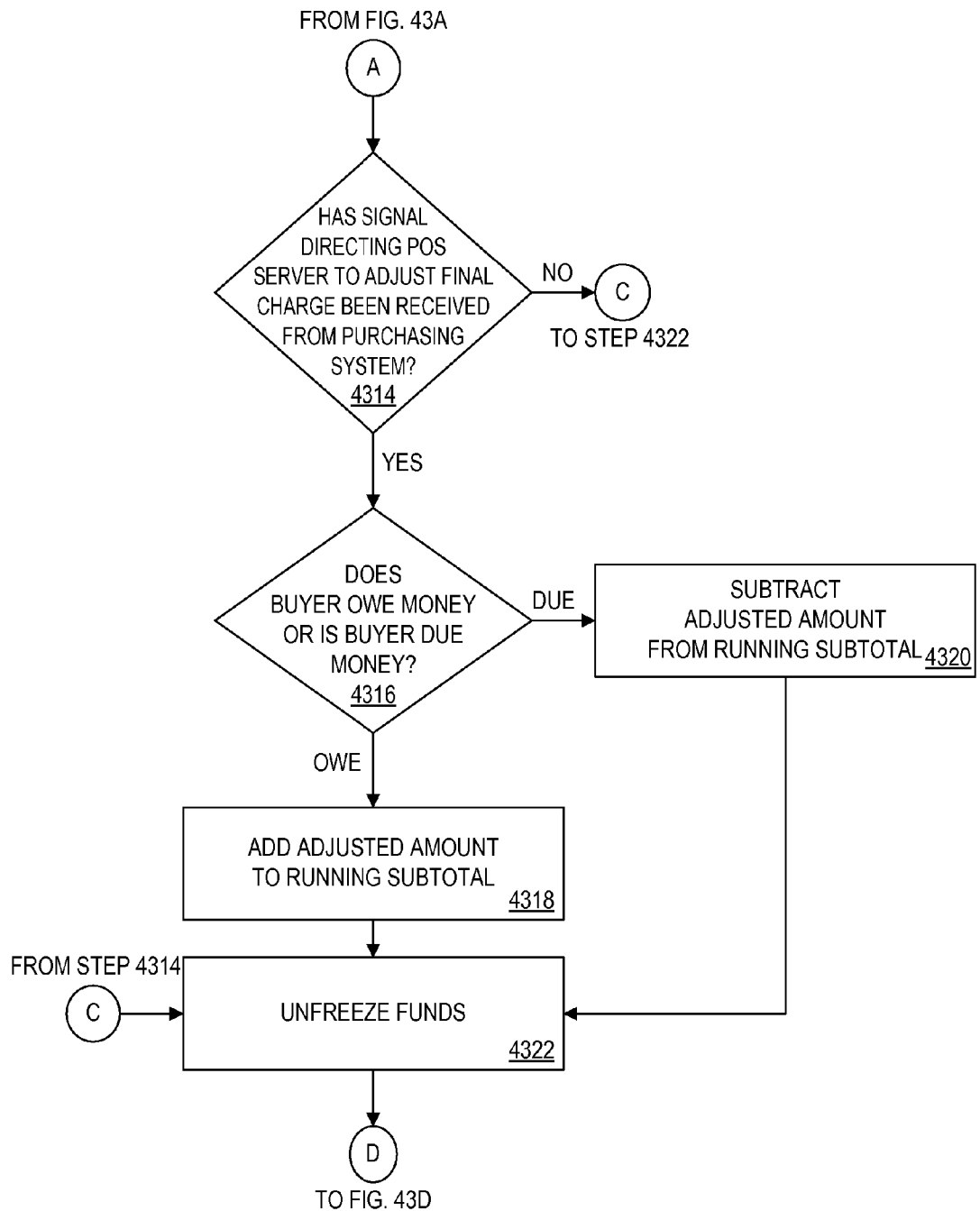
Figure 43C:
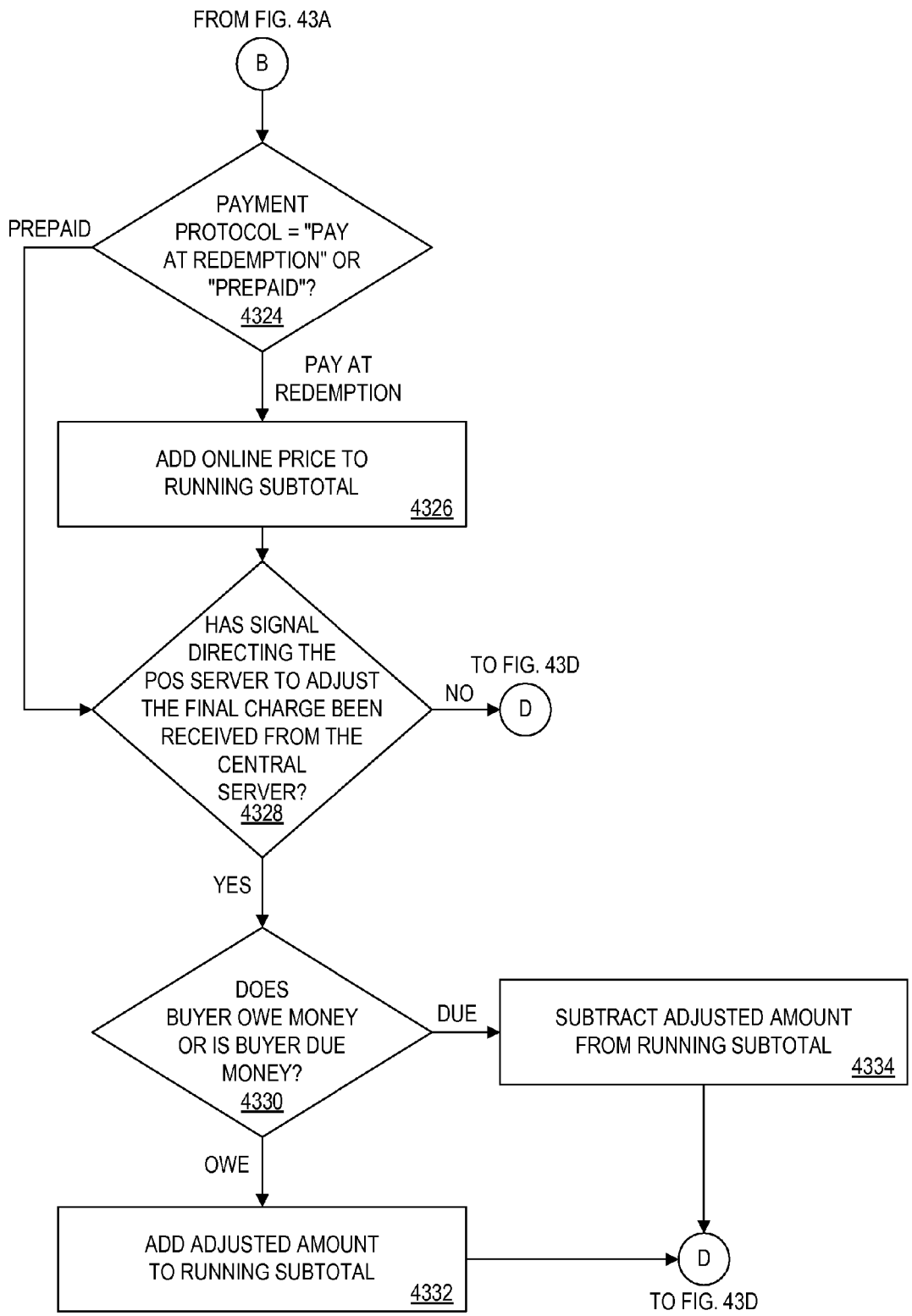
Figure 43D:
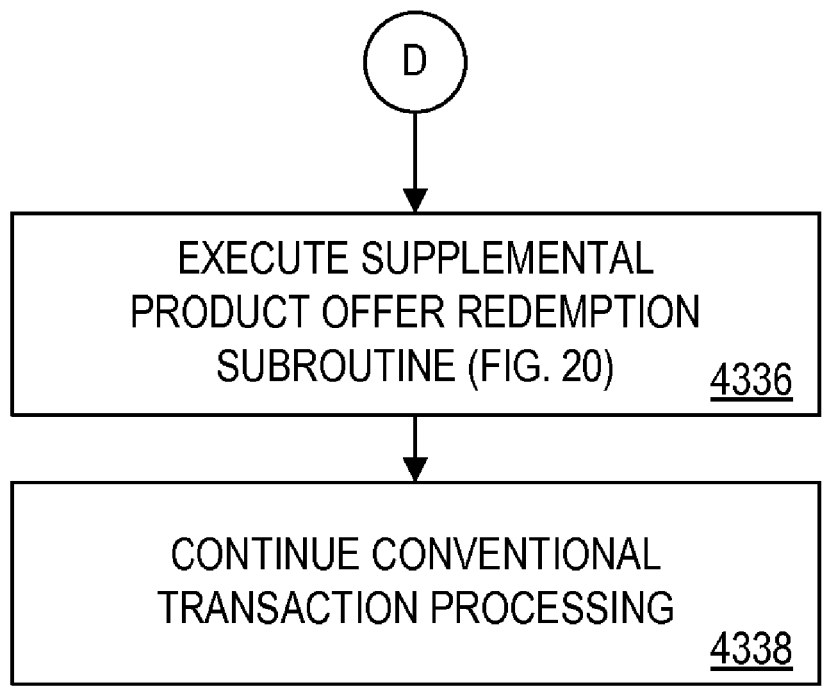

FIG. 42 is a flow chart illustrating a supplemental offer rules evaluation method 4200 performed by the purchasing system device 2900 to determine if a supplemental product offer should be given to a buyer along with the redemption code according to an embodiment of the present invention. Initially, it is determined at 4202 whether or not information related to the purchasing system transaction meets supplemental product offer rules (as stored, for example, in the supplemental product offer rules database 3500). For example, the system may determine if the product being purchased qualifies for any supplemental product offers. If no supplemental product offers are found, the registration process continues at 4204 (e.g., at 4024 of FIG. 40B or 1616 of FIG. 41B).

If one or more supplemental product offers are found at 4202, supplemental offers that have not expired are identified at 4206 by comparing the system date to the corresponding supplemental offer expiration dates 3514 in the supplemental product offer rules database 3500. At 4208, the offer information is retrieved for the non-expired, qualifying supplemental offers and the registration process continues. Note that instead of performing step 4206, expired supplemental offers may simply be deleted from the appropriate databases (e.g., will not be found in the first place).

FIGS. 43A to 43D are flow charts illustrating a point of sale redemption method 4300 performed by the POS controller 3000 according to an embodiment of the present invention. Note that some or all of this process may instead be performed by the POS terminal 3100. This process may also be executed before, during or after other products have been scanned at the POS terminal 3100. That is, the buyer may be allowed to purchase additional products (not purchased through the purchasing system) from the retailer in the same transaction. At 4302, redemption code and product identifier information are received through an input device. In one embodiment, the redemption code merely signals to the retailer that the retail price should not be charged yet. However, if the product identifier is received before the redemption code, the system may initially add the retail price to the running subtotal of the transaction. If this is the case, the system may later remove the retail price from the running subtotal and await authorization and/or validation of the redemption code. According to another embodiment of the present invention, the difference between retail price and the established price may be credited to the running subtotal.

At 3904, the redemption code is validated. Methods to validate the redemption code are described in detail with respect to FIGS. 45, 47 and 48. At 4306, the POS controller 3000 over-rides the retail price of the product such that a price of $0.00 is queued for the product in the running subtotal. In other words, the retail price may be replaced with the price "$0.00" when the redemption code is validated, and "$0.00" may be printed on the receipt at the end of the transaction routine. If the redemption code is not validated, the POS controller 3000 may process the transaction normally such that the retail price (e.g., a price retrieved from the pricing database 2000) is added to the running subtotal.

Figure 44A:
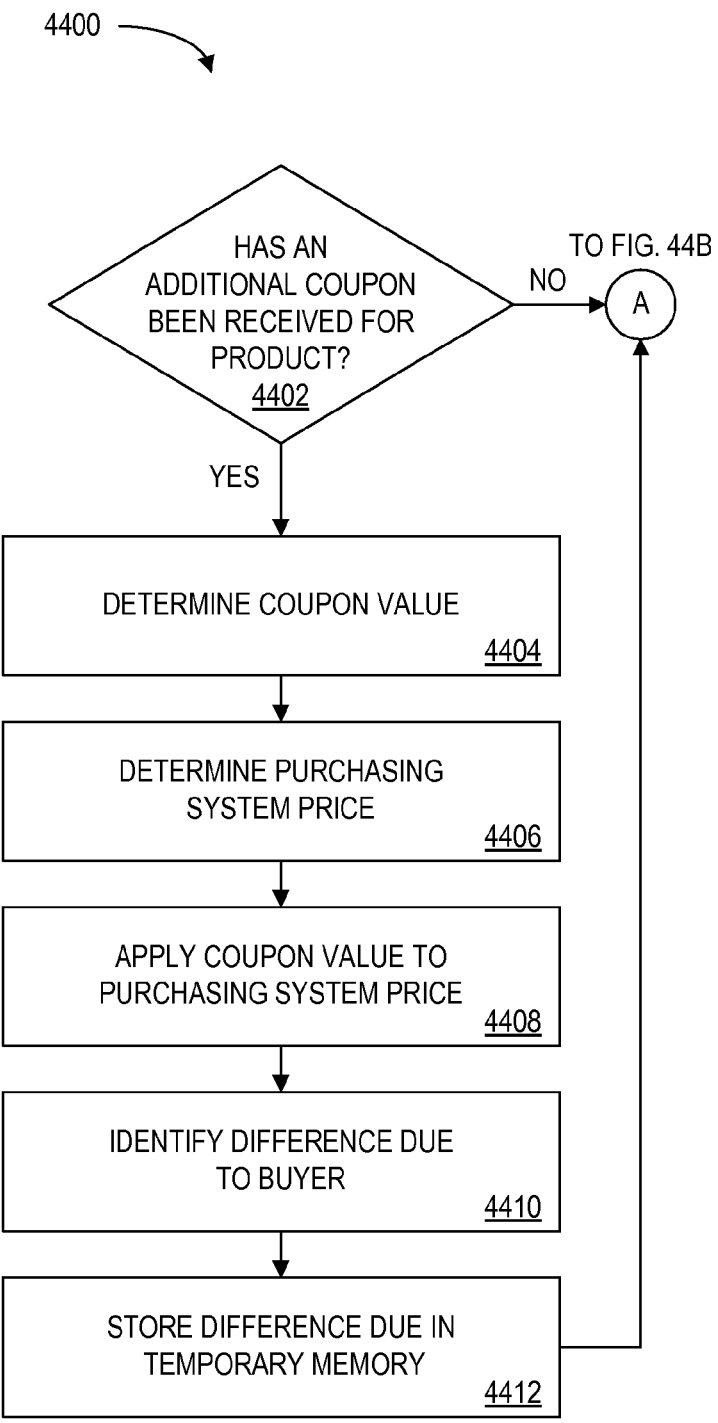
FIGS. 44A to 44C are flow charts illustrating a price adjustment method according to an embodiment of the present invention.
Figure 44B:
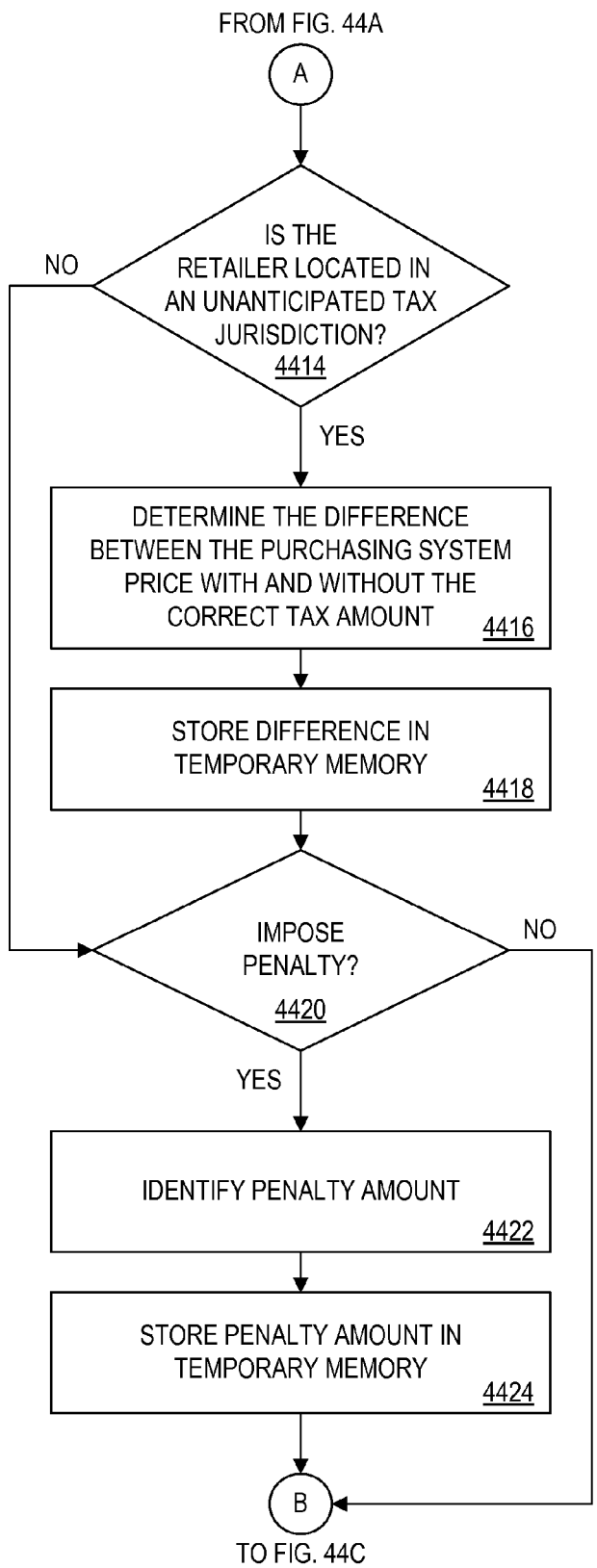

At 4308, the price of the product is adjusted to determine if the buyer should pay more or less than the purchasing system price to account for unforeseen transaction scenarios as described herein (e.g., a penalty, a tax, a coupon). FIGS. 44A to 44B describes a price adjustment method according to one embodiment of the present invention. The price adjustment may be performed in a manner such that the purchasing system price is not disclosed to the retailer. Accordingly, the price adjustment may be performed by the purchasing system device 2900. In this case an "initiation" step can be performed by the POS controller 3000, such as be sending a signal to the purchasing system device 2900 to perform the price adjustment. According to another embodiment of the present invention, the POS controller 3000 would transmit transaction conditions (e.g., date of redemption and retail price associate with a product) to the purchasing system device 2900, and the purchasing system device 2900 would determine whether any price adjustment is appropriate.

The purchasing system device 2900 may charge or credit any unforeseen amount to the buyer's payment identifier, or instruct the POS controller 3000 to charge or credit the buyer. The price adjustment may instead be performed by the POS controller 3000.

The POS controller 3000 then determines a payment protocol at 4310 (e.g., frozen, prepaid or pay-at-redemption), such as by using the payment protocol field 3210 of the accepted offer database 3200. For example, a signal may be received from the purchasing system device 2900 indicating the payment protocol, or instructions may be read from an encrypted or bar-coded redemption voucher.

If the payment protocol is such that the buyer's account had previously been frozen at 4312, it is determined at 4314 whether a signal has been received from the purchasing system device 2900 directing the POS terminal 3100 to adjust the product price or final charge. Note that all price adjustments may be handled by the purchasing system device 2900 such that the purchasing system device 2900 either credits or debits the initially provided payment identifier as appropriate. However, if the price adjustment is not handled by the purchasing system device 2900, the purchasing system device 2900 may instruct the POS controller 3000 to charge or credit the buyer. Because the buyer's account may be "frozen" for an amount greater than the purchasing system price, the price adjustment may not need an additional authorization from the credit card processing system device 2725. Thus, the POS controller 3000 may be directed to charge an additional amount if unforeseen transaction scenarios are such that both: (i) the final charge amount (e.g., after the method of FIGS. 40A and 40B is performed) is greater than the frozen amount; and (ii) the purchasing system device 2900 has instructed the POS terminal 3100 to charge the difference to the customer.

If a signal directing the POS controller 3000 to adjust the price or final charge has not been received at 4314, the process continues at 4322. If a signal directing the POS controller 3000 to adjust the price has been received at 4314, the price adjustment details are determined. If the adjusted price is such that the buyer owes money at 4316, the adjusted amount is added to the running subtotal at 1418. Thus, at the end of the transaction, the buyer can be charged the additional amount in addition to the prices of any other products that were purchased.

If the adjusted price is such that the buyer is due money at 4316, the adjusted amount is subtracted from the running subtotal at 4320. Thus, at the end of the transaction the buyer can use the credit as payment for any additional purchases. If, after adding any credit due to the subtotal, a credit is still due to the customer, the POS controller 3000 can facilitate the rebate of the adjusted amount by either: (i) authorizing an instant cash rebate (e.g., using currency from a cash register drawer); (ii) issuing a store-credit voucher; or (iii) processing a "charge-back" to the customer's credit card.

Funds that were reserved by the purchasing system when the customer arranged to purchase the product are unfrozen at 4322. This may be achieved by transmitting a signal (possibly including the redemption code) to the purchasing system device 2900 indicating that the product has been redeemed. At this point, the purchasing system 2700 may unfreeze the funds by depositing a bank draft. The purchasing system 2700 may also unfreeze the funds by signaling the credit card processing system device 2725 or the buyer's bank that the funds should be relinquished. Or, in the embodiment where the redemption voucher acts as a ROC, the retailer 3000 forward the voucher directly to the credit card processing system, which authorizes the debiting of the previously "frozen" funds and credits the retailer's account with their "merchant bank." Note that this step of unfreezing the funds may be eliminated in embodiments where the buyer pays the entire amount to the retailer when taking possession of the product.

If the payment protocol at 4312 and 4324 indicates that the buyer is to pay at redemption, the purchasing system price is added to the running subtotal at 4326. The purchasing system price can be obtained by the POS controller 3000 by, for example: (i) querying the purchasing system device 2900; or (ii) reading the price from a redemption voucher (e.g., from a bar code on the redemption voucher).

If the payment protocol indicates that the buyer has either prepaid or is to pay at redemption, it is determined at 4328 if a signal has been received from the purchasing system device 2900 directing the POS controller 3000 to adjust the price or final charge. The price adjustment may be performed, for example, by the POS controller 3000 or by the purchasing system device 2900. When performed by the purchasing system device 2900, the purchasing system device 2900 may communicate a signal to the POS controller 3000 to adjust the final charge such that the buyer provides to the retailer either more or less than the purchasing system price.

If a signal directing the POS controller 3000 to adjust the final charge has not been received at 4328, the process continues at 1436. If a signal directing the POS controller 3000 to adjust the final charge has been received at 1428, the price adjustment details are determined. As before, the adjusted amount may be added to or subtracted from the running subtotal at 4330, 4332, 4334.

At 4336, any supplemental product offer redemption is processed (e.g., as described with respect to FIGS. 49A and 49B) before the conventional transaction processing (e.g., totaling the purchase amounts and adding taxes) is resumed at 4338.

Note that the amount authorized may be different than the amount that is actually charged to the buyer's financial account. This might be the case to account for unforeseen transaction scenarios that arise when the buyer takes possession of the product at a retailer, such as, for example: (i) a penalty imposed on the buyer for failing to take possession of the product within a predetermined time; (ii) the buyer taking possession of the product in a state or city having a higher or lower sales tax; or (iii) the retail price for the product being lower than the buyer price established through the purchasing system. That is, the amount finally paid by the buyer may be different than the purchasing system price agreed upon between the buyer and the seller through the purchasing system. For example, an additional discount (e.g., coupon) may be presented at the point of redemption, necessitating an adjusted price. Thus, a price adjustment may yield a final charge to the customer that is more or less than the purchasing system price.

Consider, for example, a purchasing system transaction involving an accepted offer price of $200. The purchasing system device 2900 initially assumed an additional charge of $16, based on the 8% sales tax in the buyer's home state. The buyer, however, took possession of the product in a different state and the actual sales tax was only 6.5% (or $13). The final price charged to the buyer's financial account, therefore, is only $213.

Figure 44C:
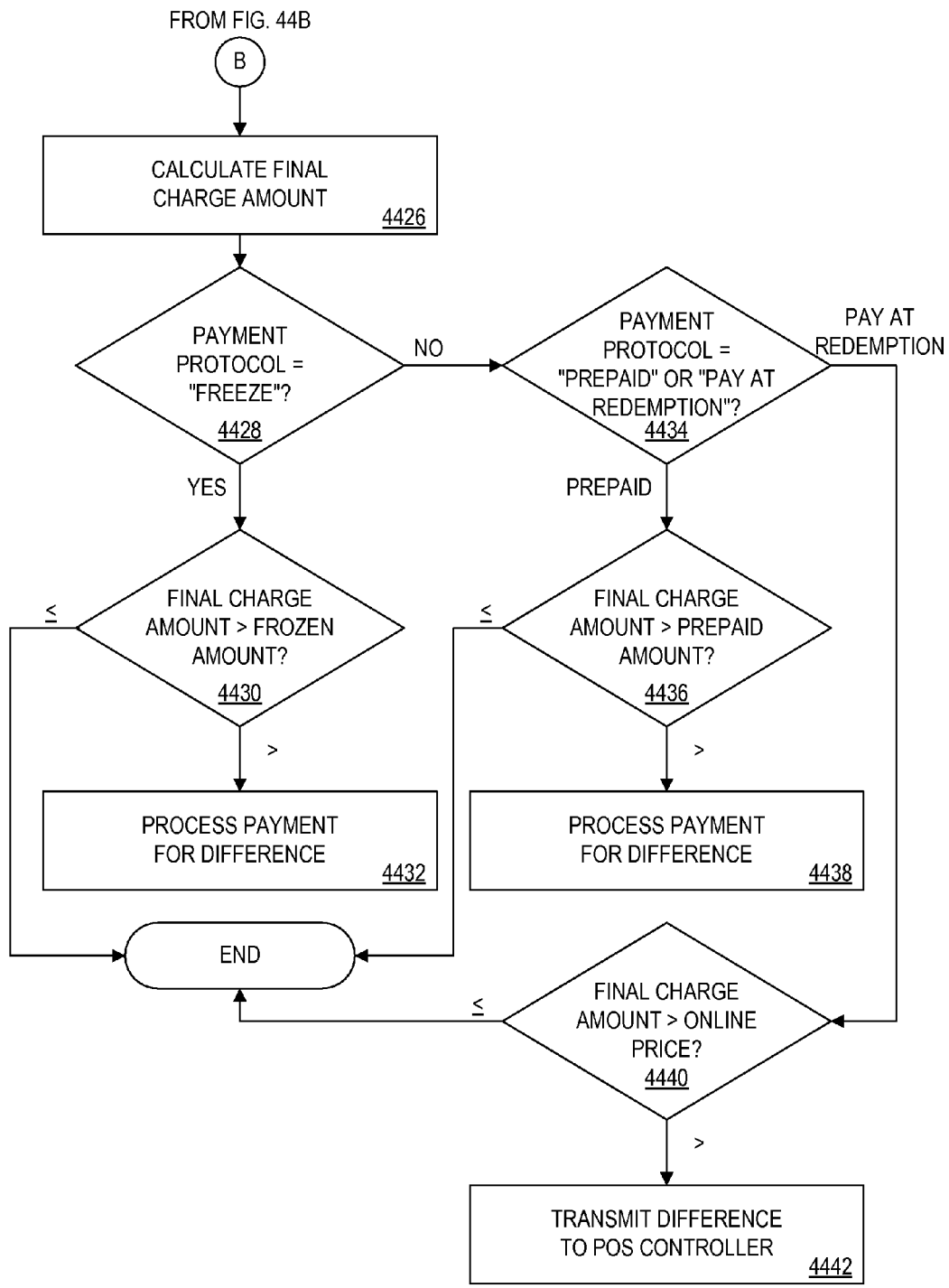

In particular, FIGS. 44A to 44C are flow charts illustrating a price adjustment method 4400 performed by, for example, the purchasing system device 2900 or the POS controller 3000 according to an embodiment of the present invention. Note that because the amount frozen may be more than the purchasing system price (to reserve a "cushion" for unanticipated transaction scenarios), the result of this process may be that the buyer is not charged an amount above the amount originally frozen.

If it is determined that an additional coupon has been received for the product at 4402, the value of the additional coupon is determined at 4404. This may be accomplished by conventional processes, such as by using software developed by Catalina Marketing Corporation. The purchasing system price is determined at 4406. If performed by the purchasing system device 2900, a simple query to the purchasing system price database 3200 (FIGS. 32A and 32B), using the redemption identifier as a search item, may retrieve the purchasing system price. If the POS controller 3000 performs this process, the purchasing system price may be determined by transmitting a request for the purchasing system price to the purchasing system device 2900. The coupon value is applied to the purchasing system price at 4408, and the difference due to the buyer is determined and stored at 4410, 4412.

At 4414, it is determined if the retailer is located in an unanticipated tax jurisdiction. One way this step can be accomplished is by using the redemption code to identify the buyer in a buyer database. The zip code of the buyer stored in the buyer database may then be compared to the zip code of the retailer (e.g., the physical location field 3404 of the retailer database 3400). If the zip codes are such that the buyer lives in a different state than the retailer, the tax rate of the retailer's state is used. This may also be accomplished by adding a "tax rate" field to the retailer database 3400 including area-specific tax rates. If the retailer's tax jurisdiction is unanticipated, the difference between the purchasing system price without the correct tax amount applied and the purchasing system price with the correct tax amount applied is determined at 4416 and stored at 4418.

At 4420, it is determined if a penalty will be imposed on the transaction. This may be accomplished by comparing the system date to an expiration date (e.g., a date stored remotely at the purchasing system device 2900 in the accepted offer database 3200 or included on the redemption voucher). If a penalty will be imposed, the penalty amount is identified at 4422 and stored at 4424. Here too, the penalty amount may included in the accepted offer database 3200 or included on a redemption voucher.

The final charge amount is calculated at 4426. This amount may be calculated by taking the purchasing system price and adding any penalty or extra tax amount that may apply and subtracting any applicable coupon value.

If buyer's account was previously frozen as determined at 4428, it is determined if the final charge amount is greater than the frozen amount at 4430. As the frozen amount may be more than the purchasing system price, the final charge amount may still not be greater than the frozen amount. If final charge amount is less than or equal to the frozen amount, no additional money is due from the customer.

If the final charge amount is greater than the frozen amount, payment for the difference is processed at 4432. For example, the purchasing system device 2900 may charge the buyer's financial account for the difference. Alternatively, the purchasing system device 2900 may instruct the POS controller 3000 to charge the buyer for the additional amount, in which case the POS controller 3000 continues processing at 4314.

If the buyer has prepaid for the product at 4434, it is determined if the final charge amount is greater than the prepayment amount at 4436. As before, if the final charge amount is greater than the prepayment amount, payment for the difference is processed at 4438. That is, the purchasing system device 2900 may charge the buyer's financial account for the difference. Alternatively, the purchasing system device 2900 may instruct the POS controller 3000 to charge the buyer for the additional amount.

Finally, if the buyer is to pay at redemption at 4434, it is determined if the final charge amount is greater than the purchasing system price at 4440. If so, the difference is transmitted to the POS controller 3000.

Figure 45:
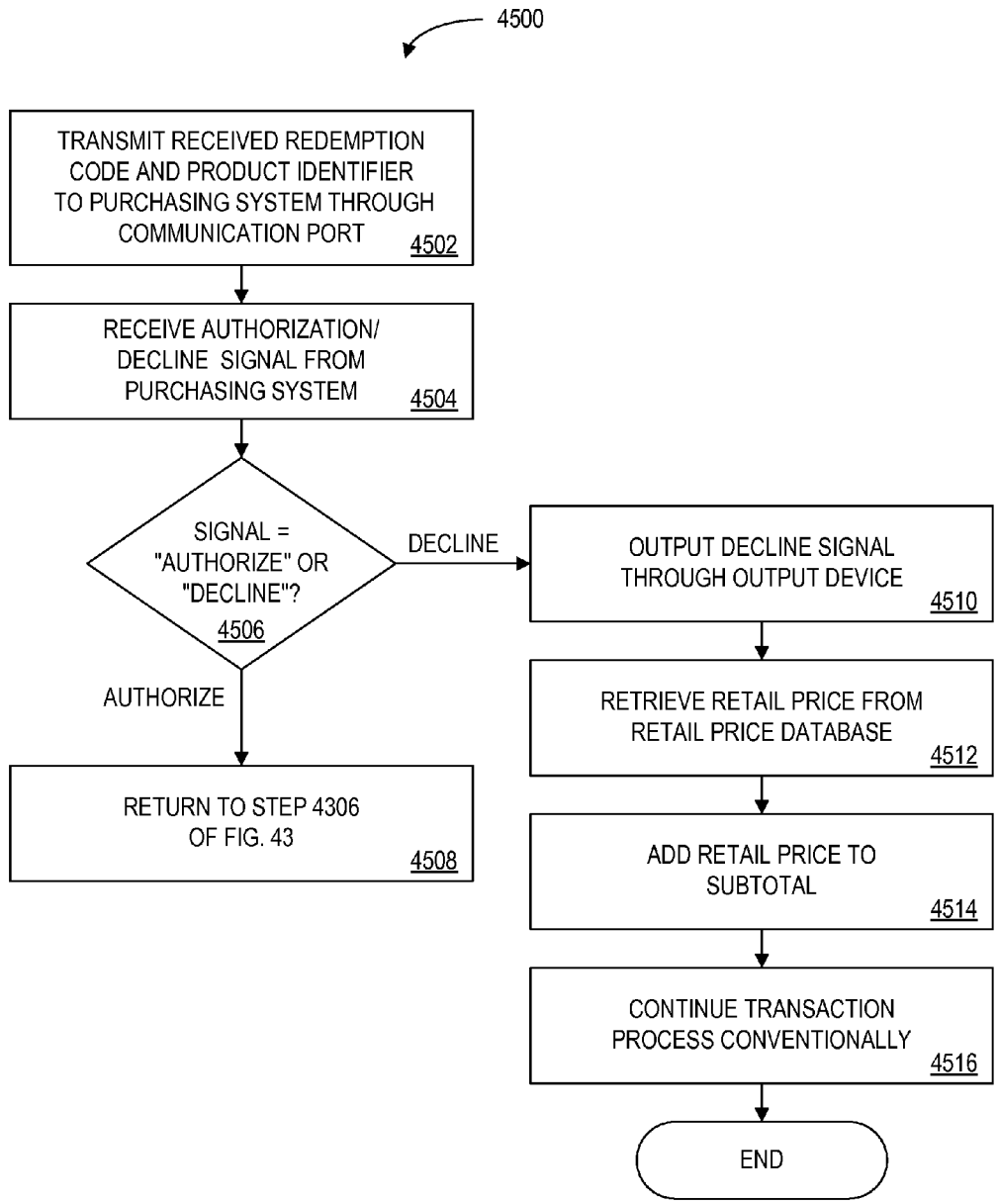
FIG. 45 is a flow chart illustrating a redemption validation method according to an embodiment of the present invention.

FIG. 45 is a flow chart illustrating a redemption validation method 4500 performed by the POS controller 3000 according to an embodiment of the present invention. According to this embodiment of the present invention, redemption codes are verified through a "back channel" communication to the purchasing system device 2900.

At 4502, the received redemption code is transmitted to the purchasing system device 2900 along with a product identifier. At this point, the purchasing system device 2900 may perform the method described with respect to FIG. 46. At 4504, an authorization or decline signal is received from the purchasing system device 2900.

If a decline signal is received at 4506, the signal is output to a retailer employee or the buyer at 4510 (e.g., using a printed message or visual display). In this case, the retail price for the product is retrieved at 4512 and added to the subtotal at 4114 before the transaction is processed conventionally at 4516. If an authorization signal is received from the purchasing system device 2900, the method as described starting with 4306 is performed.

Figure 46:
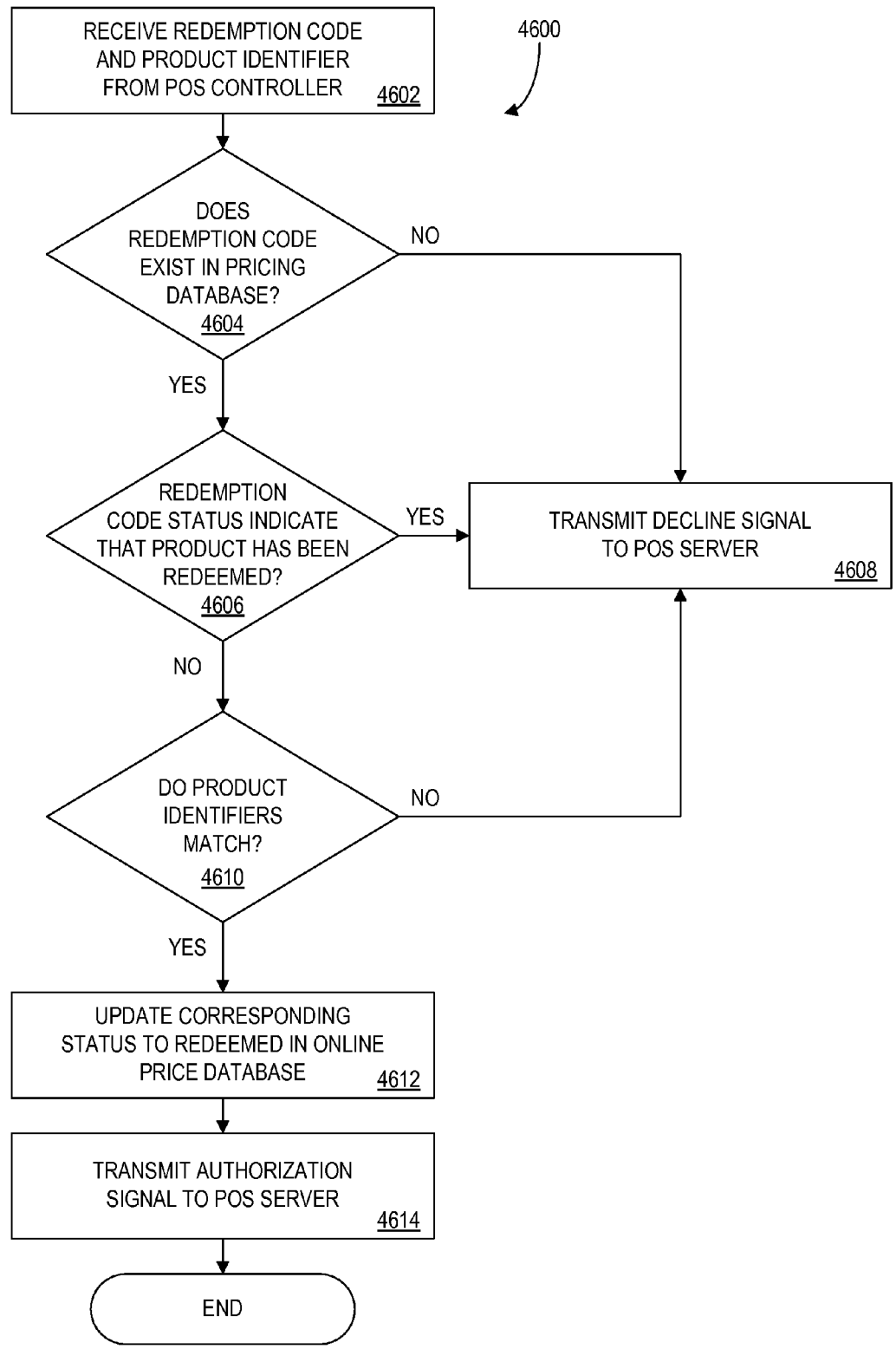
FIG. 46 is a flow chart illustrating a redemption validation method according to an embodiment of the present invention.

FIG. 46 is a flow chart illustrating a redemption validation method 4600 performed by the purchasing system device 2900 according to an embodiment of the present invention. According to this embodiment of the present invention, redemption codes are received through a "back channel" communication from the POS controller 3000. At 4602, a redemption code and product identifier are received from the POS controller 3000. It is determined, at 4604, if the redemption code exists in the accepted offer database 3200. If not, at 4208a decline signal is transmitted to the POS controller 3000. If so, the status corresponding to the redemption code in the accepted offer database 3200 is evaluated at 4606 to determine if the buyer has already taken possession of the product (e.g., at another retailer). If so, at 4608 a decline signal is transmitted to the POS controller 3000.

It is also determined, at 4610, if the product identifier matches the product identifier in the accepted offer database 3200. If not, a decline signal is transmitted to the POS controller 3000 at 4608. Otherwise, the status in the accepted offer database 3200 is updated to "redeemed" at 4612, and an authorization signal is transmitted to the POS controller 3000.

Figure 47:
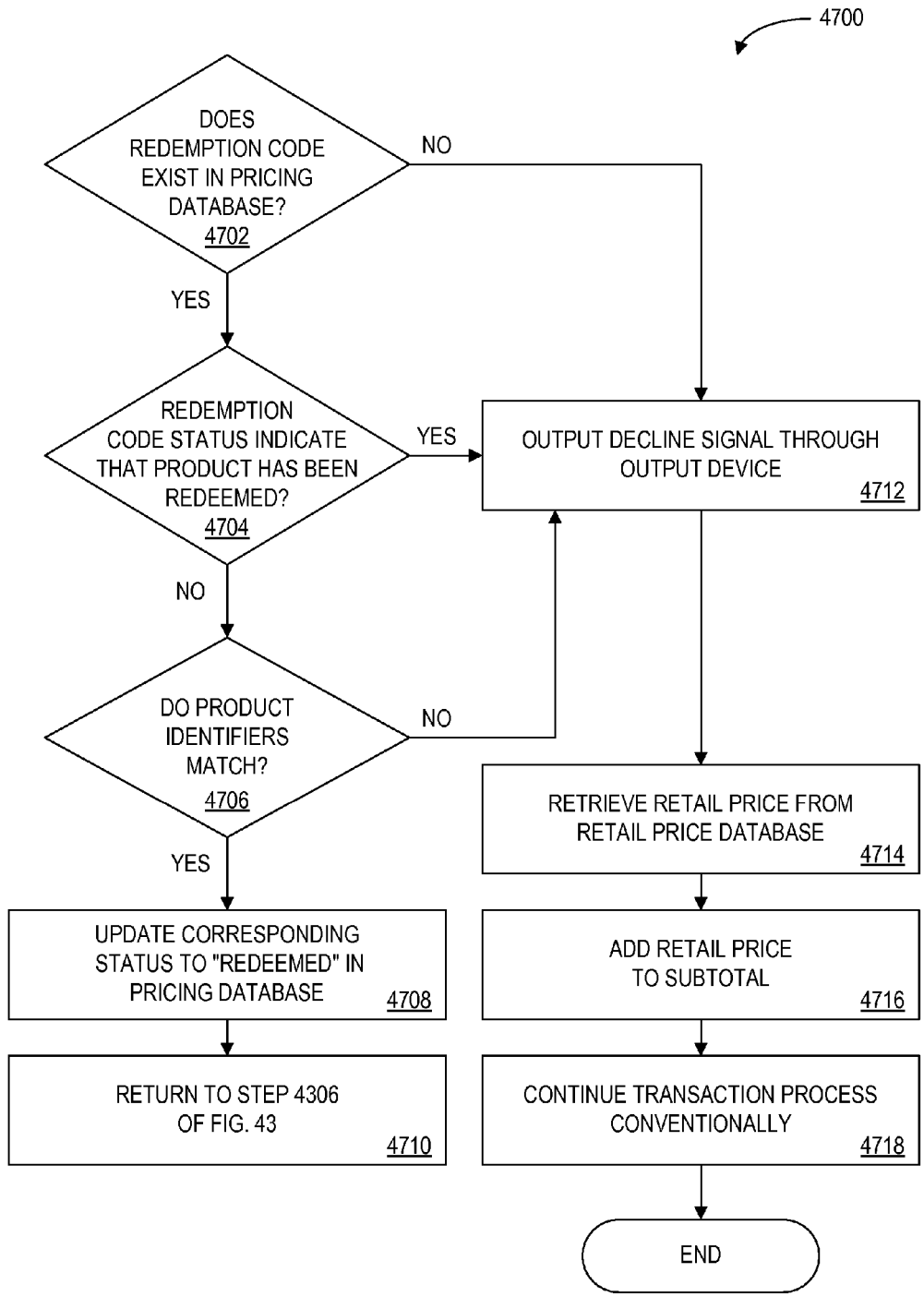
FIG. 47 is a flow chart illustrating another redemption validation method according to an embodiment of the present invention.

FIG. 47 is a flow chart illustrating another redemption validation method 4700 performed by the POS controller 3000. According to this embodiment of the present invention, a "local" pricing database 2000 (e.g., stored a the retailer and not at the purchasing system) is queried to determine whether a redemption code is valid. Such a local database may contain essentially the same data as the accepted offer database 3200 stored at the purchasing system device 2900. As such, the operator of the POS controller 3000 (e.g., the retailer) may periodically update the purchasing system device 2900 (e.g., with a batch process) to let the purchasing system device 2900 track the redemption of vouchers.

As before, at 4702, 4704, 4706 it is determined if: (i) the redemption code exists; (ii) the redemption status is not "redeemed"; and (iii) the product identifiers match. If any of these conditions are not met, a decline signal is output at 4712. In this case, the retail price for the product is retrieved at 4714 and added to the subtotal at 4716 before the transaction is processed conventionally at 4718.

If all of the above three conditions are met, the status in the local database is updated to "redeemed" at 4708, and the steps described beginning with 4306 are performed.

Figure 48:
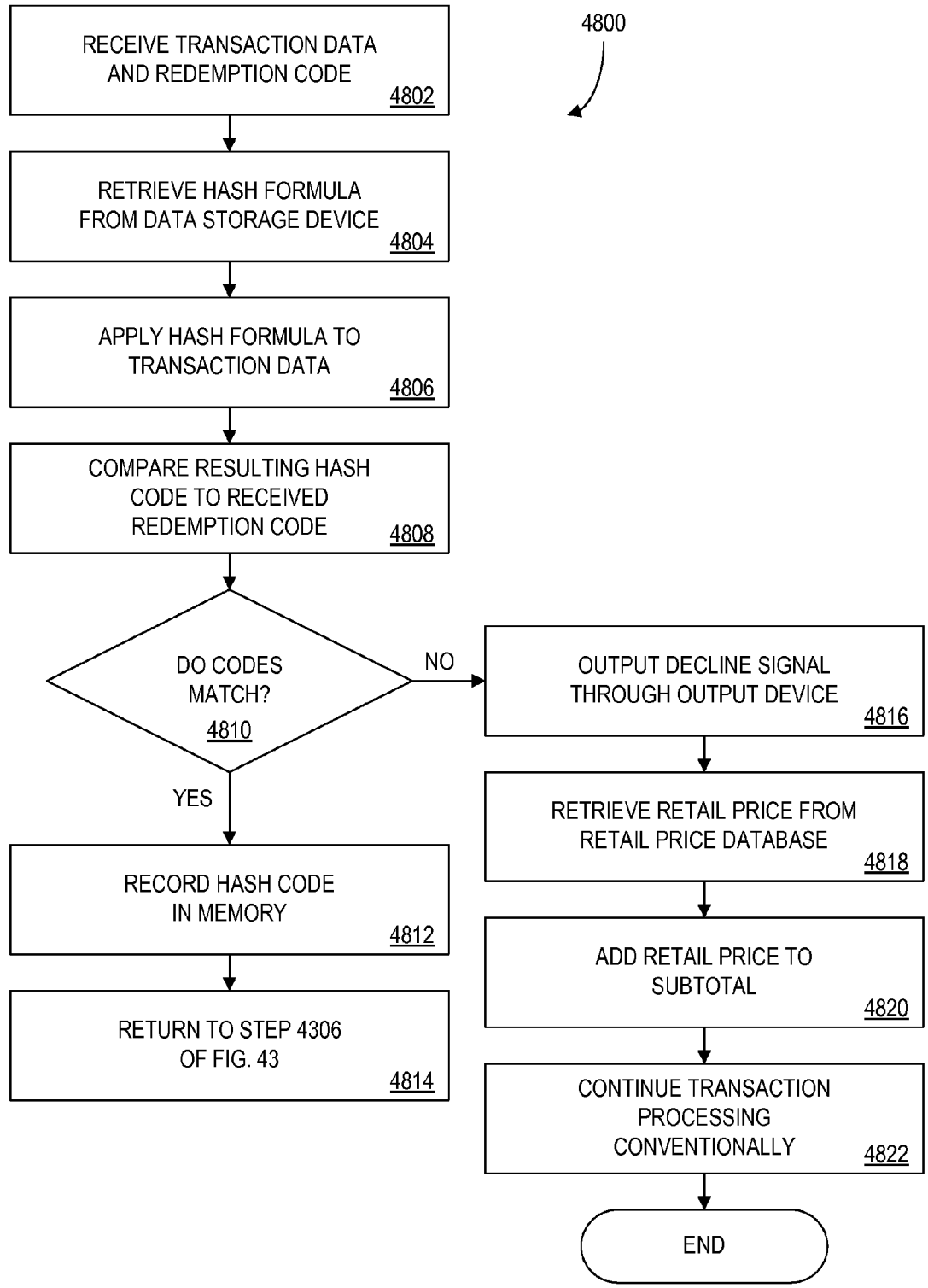
FIG. 48 is a flow chart illustrating another redemption validation method according to an embodiment of the present invention.

FIG. 48 is a flow chart illustrating another redemption validation method 4800 performed by the POS controller 3000. According to this embodiment of the present invention, a hash code is recreated and matched to the received redemption code. Here too, the operator of the POS controller 3000 (e.g., the retailer) may periodically update the purchasing system device 2900 (using a batch process) to let the purchasing system track the redemption of vouchers. At 4802, transaction data and a redemption code are received. Note that the transaction data may include the buyer's credit card number, the retailer identifier, or other data elements that are used in the attempt verify the redemption code. A hash formula is retrieved from data storage device at 4804 and applied to the transaction data at 4806. Note that the hash function may be considered "verification information," sent from the purchasing system device 2900 to the retailer device 2750, that enables the retailer to authorize a buyer (or a number of buyers) to take possession of products purchased through the purchasing system.

The resulting hash code is compared to the received redemption code at 4808. If there is not a match at 4810, a decline signal is output at 4816. In this case, the retail price for the product is retrieved at 4818 and added to the subtotal at 4820 before the transaction is processed conventionally at 4822. If the hash codes match at 4812, the redemption code may optionally be stored in memory at 4812 and the steps described beginning with 4306 are performed.

Figure 49A:
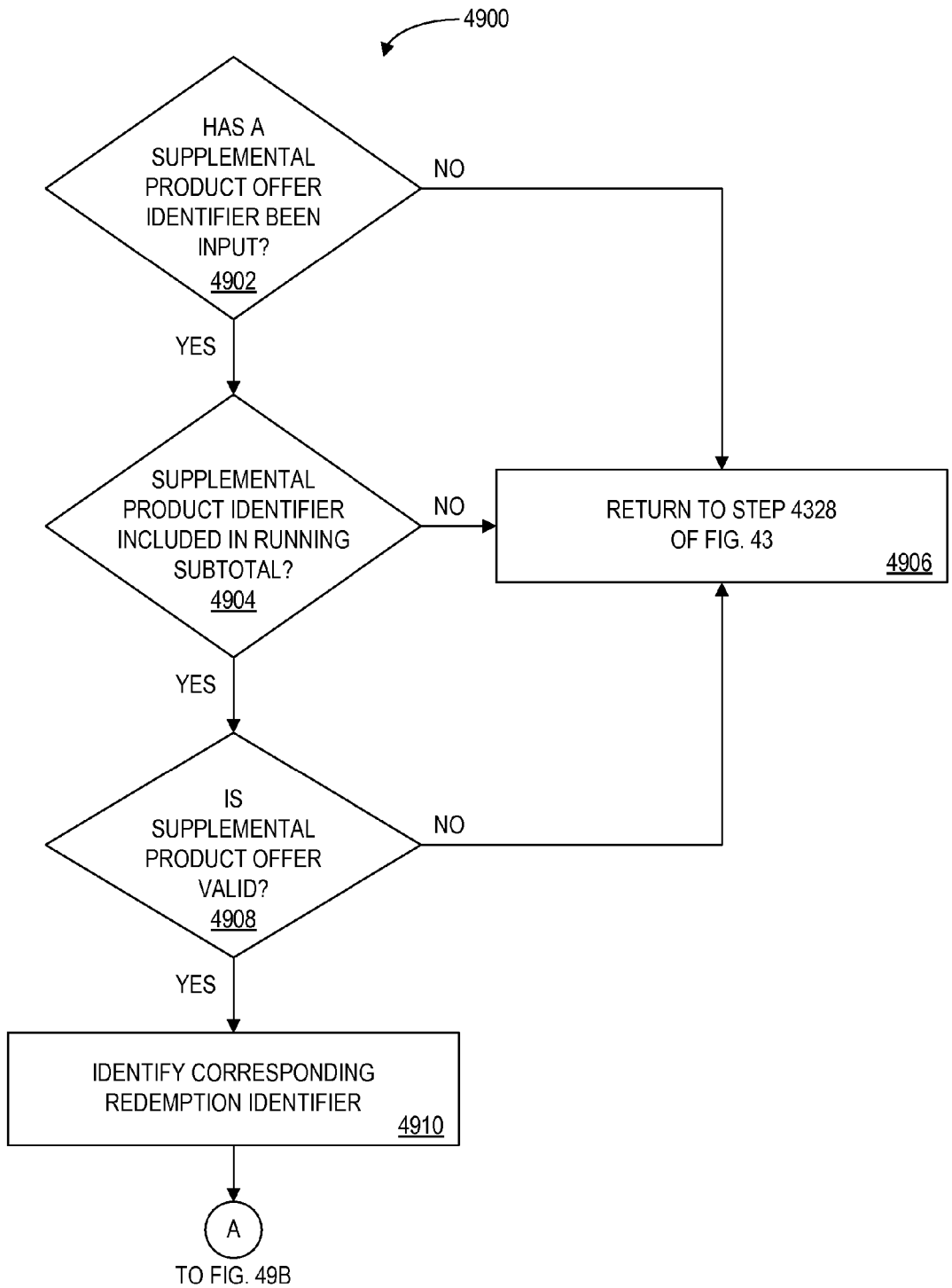
FIGS. 49A and 49B are flow charts illustrating a supplemental offer validation method according to an embodiment of the present invention.
Figure 49B:
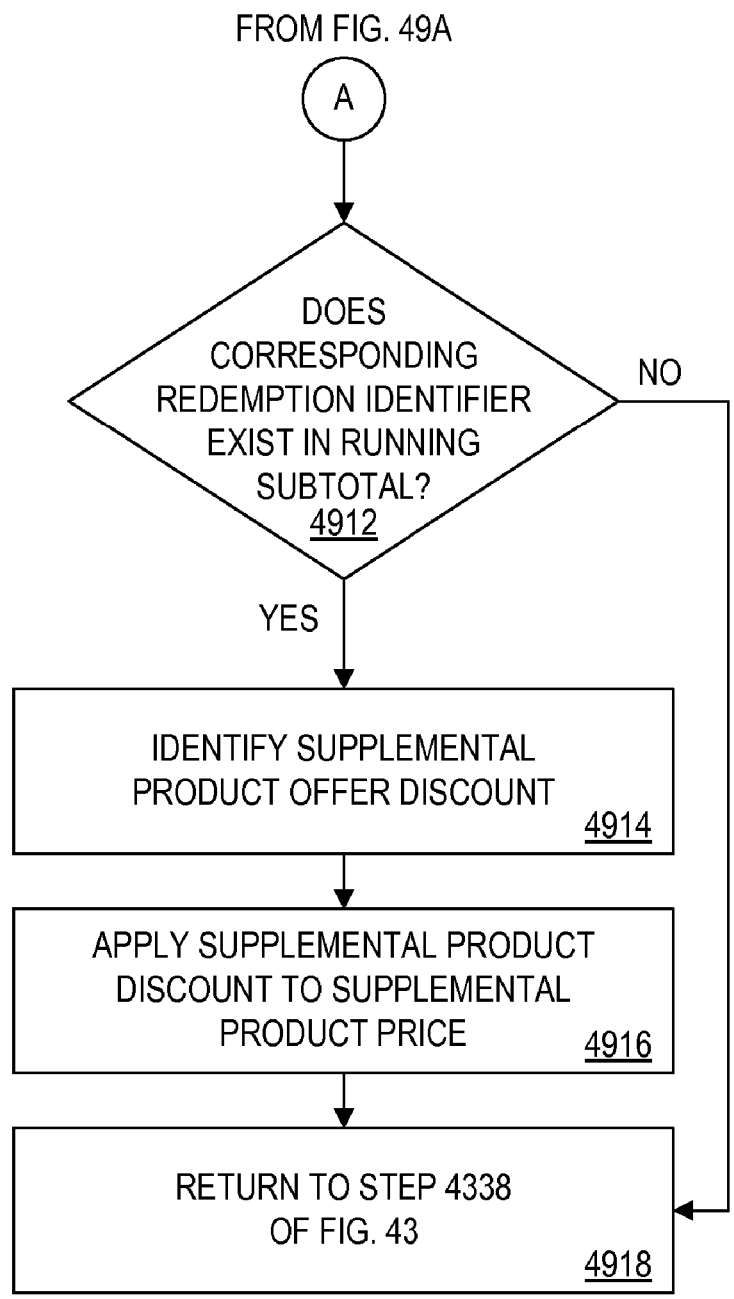

FIGS. 49A and 49B are flow charts illustrating a supplemental offer validation method 4900 performed by the POS controller 3000 according to another embodiment of the present invention. Initially, it is determined at 4902, 4904, 4906 whether: (i) a supplemental product offer identifier has been input; (ii) a supplemental product identifier has been included in a running subtotal; and (iii) the supplemental product offer is valid. For example, the supplemental product offer rules database 3500 and supplemental product offer status database 3600 may be used to determine if a supplemental product offer exists, if the supplemental product offer has been not redeemed, what the supplemental product is, and if the supplemental product offer has not expired. The POS controller 3000 may instead store this data locally, if desired.

If any of these conditions are not met at 4906, the steps described beginning with 4328 are performed. On the other hand, if all of these conditions are met the redemption identifier corresponding to the supplemental product offer is identified at 4910. Again, this may be done using the supplemental product offer status database 3600.

At 4912, it is determined if that redemption identifier exists in the running subtotal (to make sure that the buyer took possession of, or is taking possession of, the product before taking advantage of the supplemental product offer). If not, the process described beginning with step 4338 is performed. If so, the supplemental product offer discount is determined (e.g., using the supplemental product offer rules database 3500) at 4914 and applied to the supplemental product price (as identified through conventional POS protocols) at 4916 before the process described beginning with step 4338 is performed. Note that the discount can be applied using coupon/discount redemption software. Note also that the buyer may be allowed to take advantage of the supplemental offer on a different day, or from a different retailer.

Figure 50:
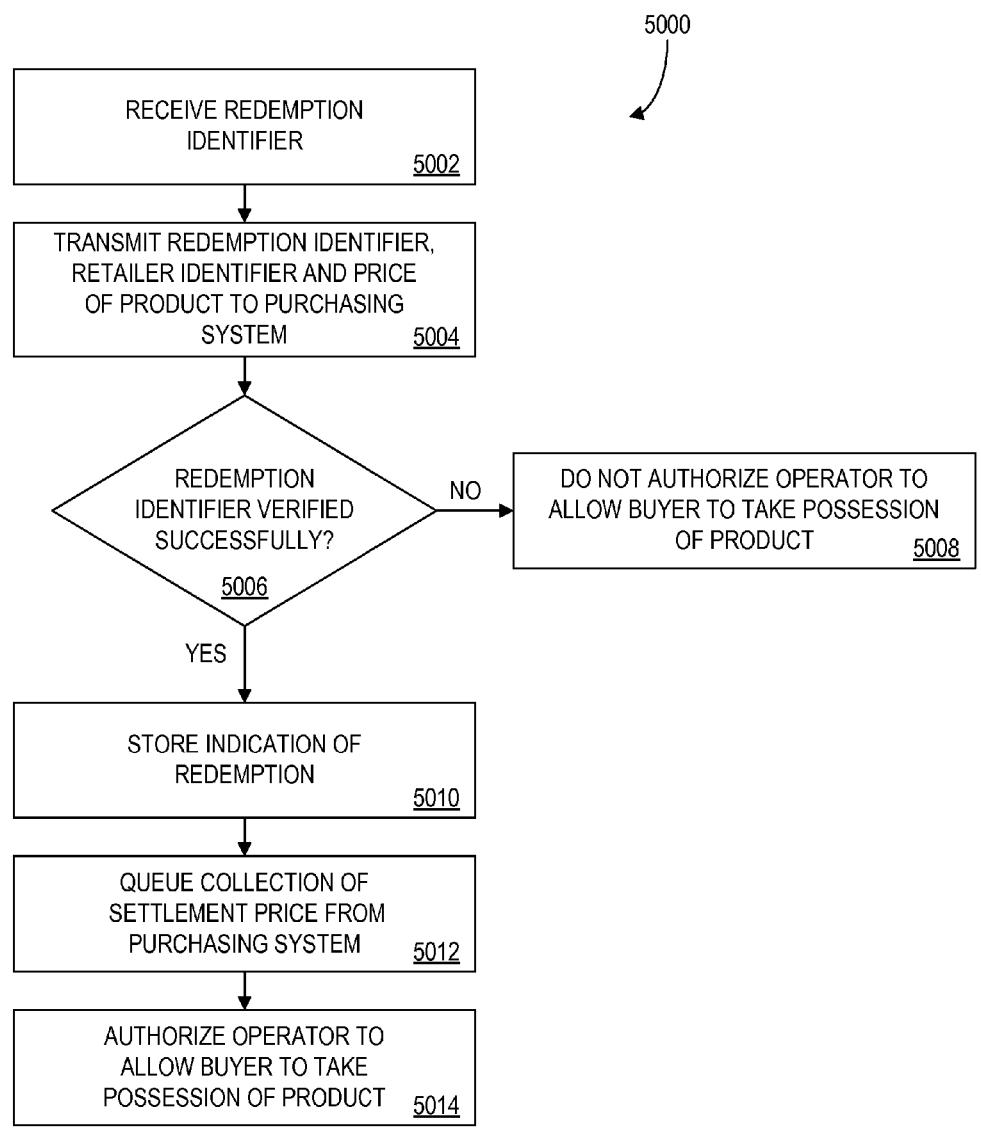
FIG. 50 is a flow chart illustrating a redemption validation method that may be performed by the retailer according to another embodiment of the present invention.

FIG. 50 is a flow chart illustrating a redemption validation method 5000 that may be performed by the retailer device 2750 according to another embodiment of the present invention. At 5002 a redemption identifier is received when a buyer attempts to take possession of a product at the retailer. The retailer device 2750 transmits the redemption identifier, along with a retailer identifier identifying the retailer and the price of the product to the purchasing system device 2900 at 5004. If the redemption identifier is not successfully verified at 5006, the retailer does not authorize the operator to allow the buyer to take possession of the product at 5008.

If the redemption identifier is successfully verified at 5006, an indication of redemption is stored at 5010 and the collection of the settlement price from the purchasing system is queued at 5012. The retailer then authorizes the operator to allow the buyer to take possession of the product at 5014.

Figure 51:
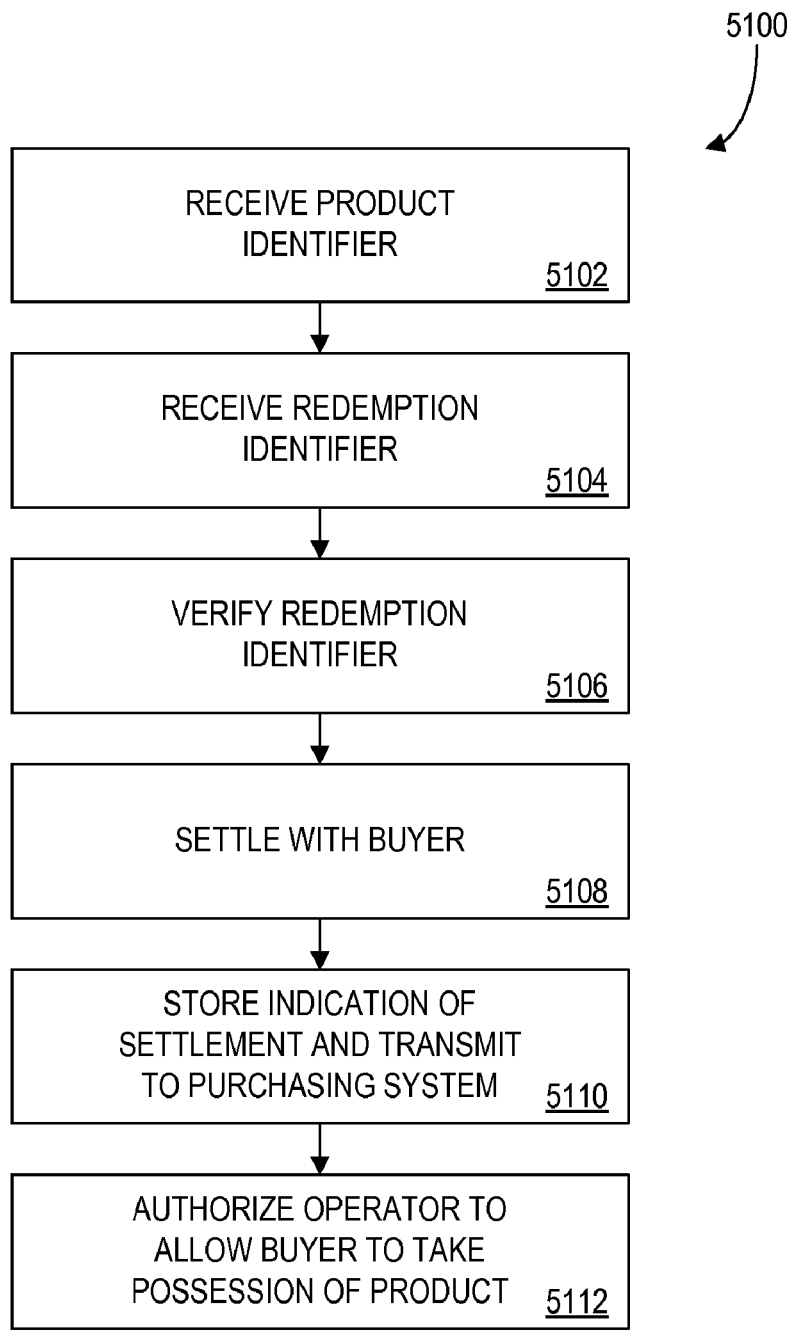
FIG. 51 is a flow chart illustrating the collection and disbursement of payment with respect to a buyer that may be performed by the retailer according to another embodiment of the present invention.

FIG. 51 is a flow chart illustrating the collection and disbursement of payment 5100 with respect to a buyer that may be performed by the retailer device 2750 according to another embodiment of the present invention. At 5102 and 5104 a product identifier and a redemption identifier are received when a buyer attempts to take possession of a product at the retailer. The redemption identifier is verified at 5106 and the retailer "settles" with the buyer at 5108. That is, the retailer may provide a payment to the buyer if appropriate or may instead receive a payment from the buyer. For example, if the buyer needs to provide a penalty payment because the buyer is taking possession of the product more than a predetermined time after arranging to purchase the product through the purchasing system, the buyer may be required to provide a payment to the retailer (e.g., using either cash, a credit card or any other method of payment) or to the purchasing system (according to another embodiment of the present invention). An indication of the settlement is stored and transmitted to the purchasing system device 2900 at 5110. At this point, the buyer is authorized to take possession of the product at 5112.

Figure 52A:
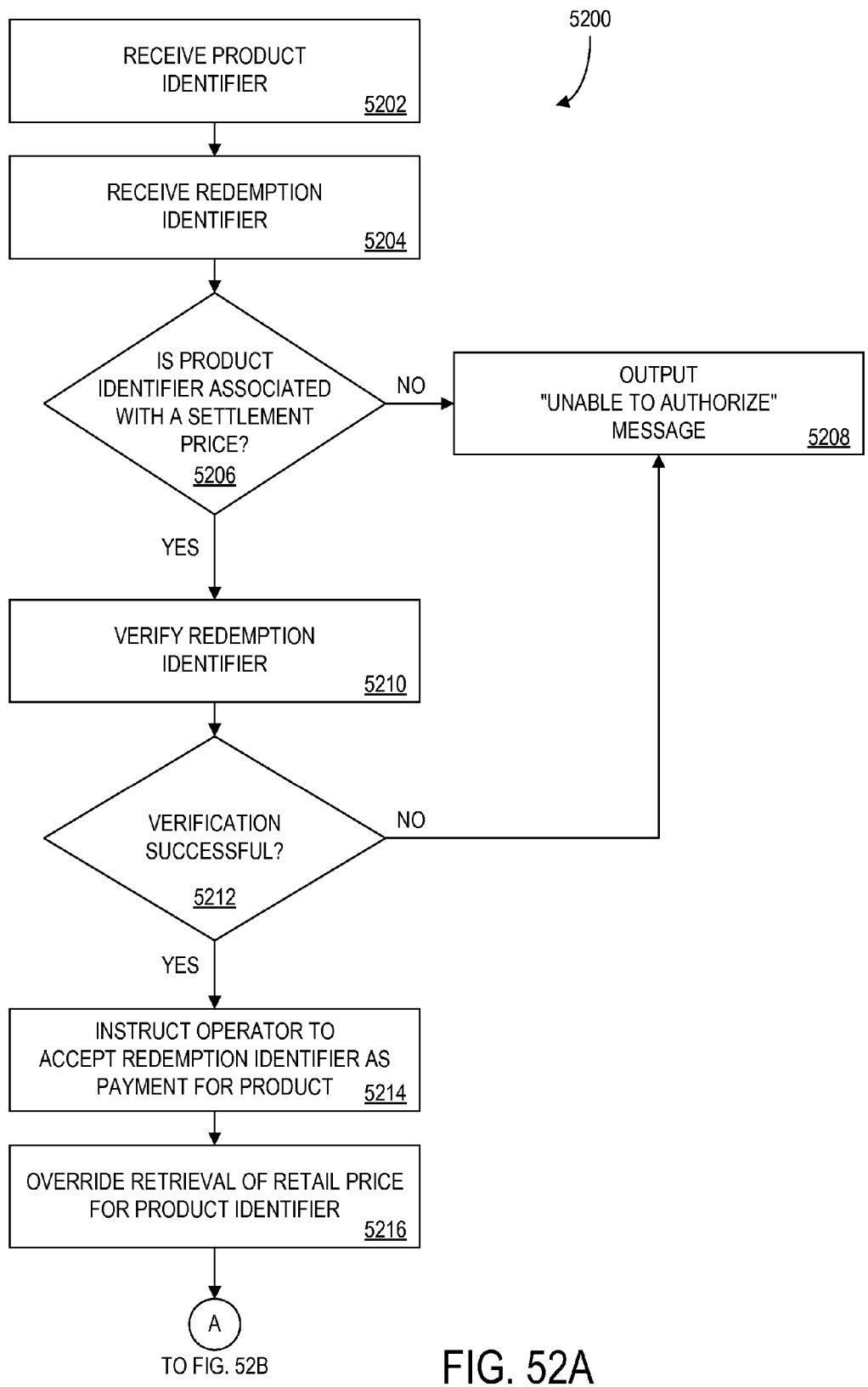
FIGS. 52A and 52B are flow charts illustrating a method of processing a purchasing system transaction that may be performed by the retailer according to another embodiment of the present invention.
Figure 52B:
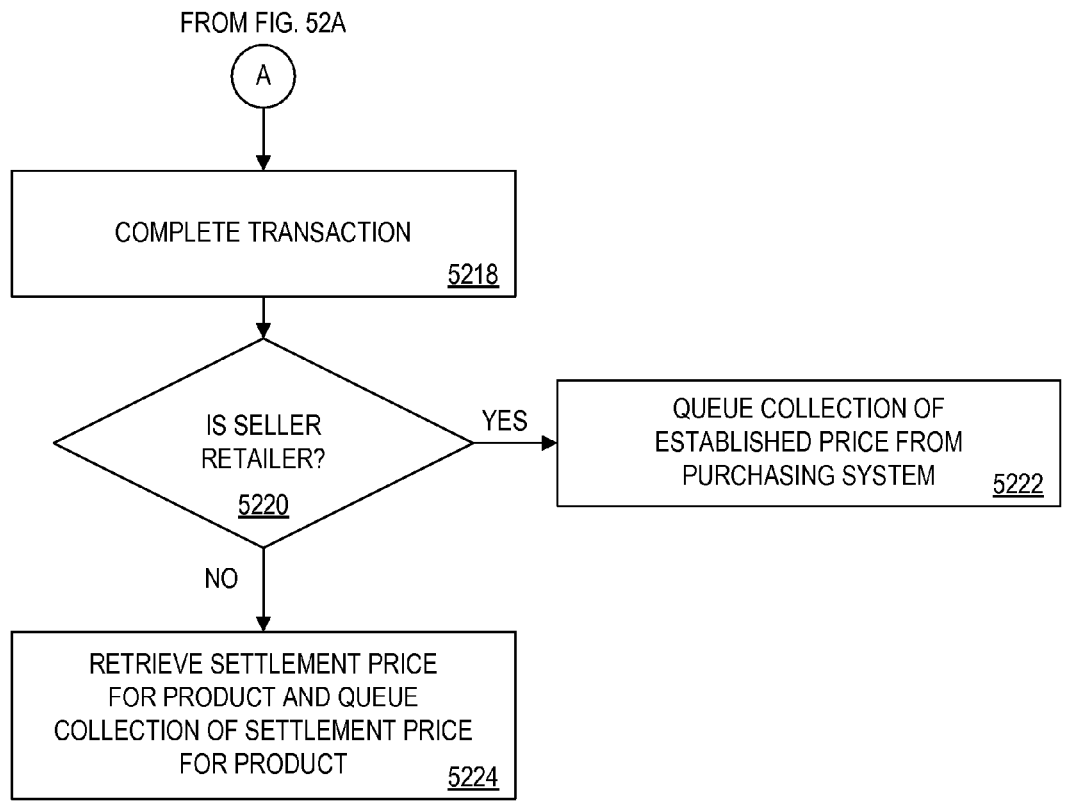

FIGS. 52A and 52B are flow charts illustrating a method 5200 of processing a purchasing system transaction that may be performed by the retailer device 2750 according to another embodiment of the present invention. At 5202 and 5204 a product identifier and a redemption identifier are received when a buyer attempts to take possession of a product at the retailer. If the product identifier is not associated with a settlement price 5206 (e.g., the retailer has not previously arranged with the purchasing system to accept vouchers for this product) an "unable to authorize message" is output at 5208. If the product identifier is associated with a settlement price 5206, the redemption identifier is verified at 5210. If the redemption identifier is not successfully verified at 5212, an "unable to authorize message" is output at 5208. If the redemption identifier is successfully verified at 5212, the operator is instructed to accept the redemption identifier as payment for the product at 5214 and the retailer device 2750 over-rides the retrieval of the retailer price associated with the product identifier at 2716.

The transaction is completed at 5218 and, if the seller is the retailer at 5220, the collection of the buyer price from the purchasing system queued at 5222. If, on the other hand, if the seller is not the retailer at 5220, the collection of the settlement price from the purchasing system queued at 5224.

Figure 53A:
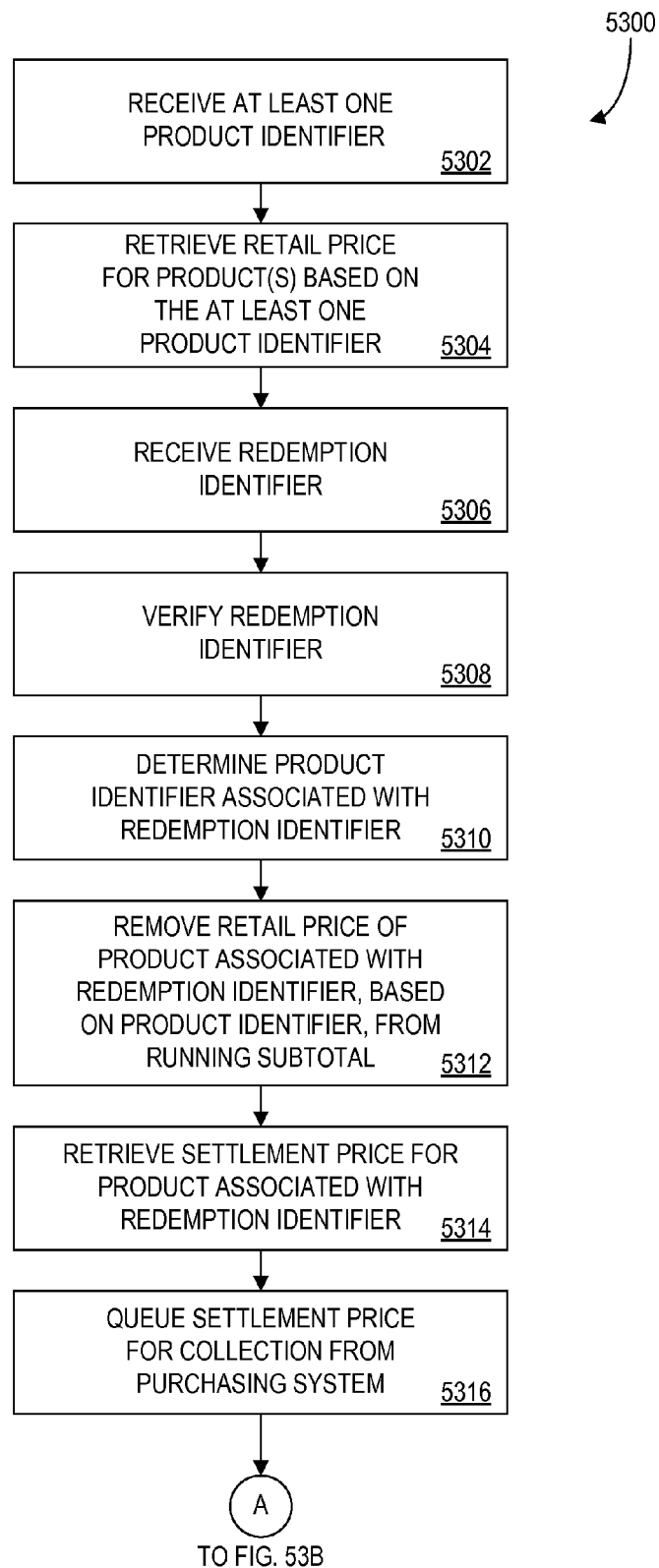
FIGS. 53A and 53B are flow charts illustrating a method of processing a purchasing system transaction that may be performed by the retailer according to another embodiment of the present invention.
Figure 53B:
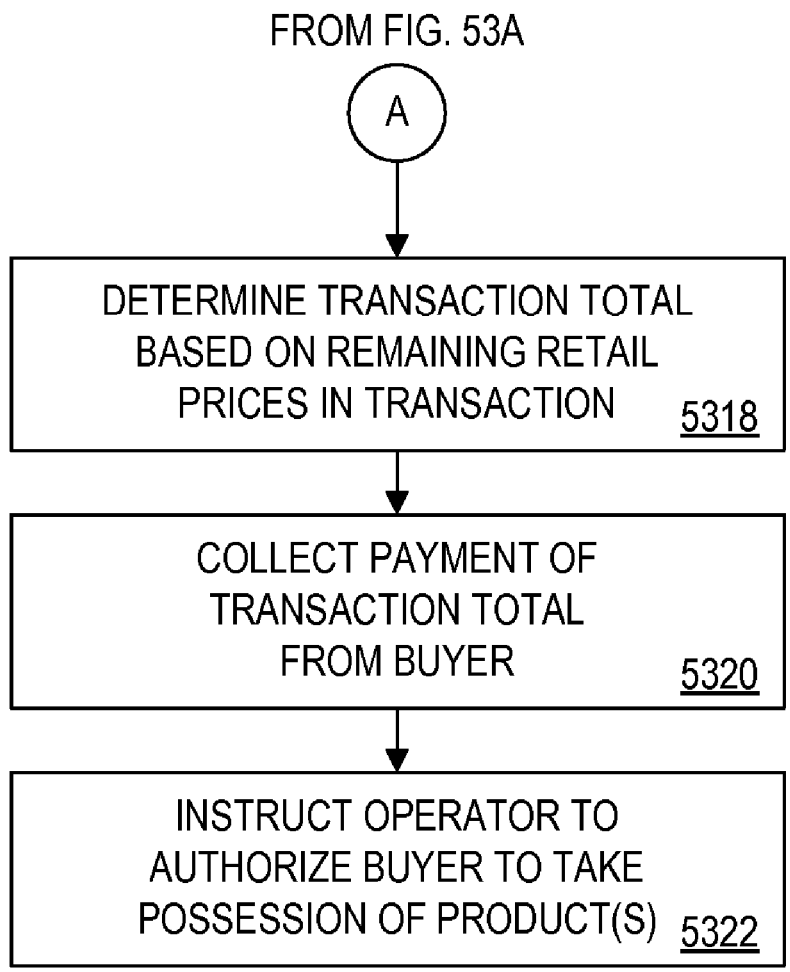

FIGS. 53A and 53B are flow charts illustrating a method 5300 of processing a purchasing system transaction that may be performed by the retailer device 2750 according to another embodiment of the present invention. At 5302 at least one product identifier is received (e.g., the buyer may be both taking possession of product purchased through the purchasing system and purchasing another product directly from the retailer in the same transaction). At 5304, the retailer device 2750 retrieves the retailer price for the products associated with the received identifiers at 5304. A redemption identifier is then received and verified at 5306 and 5308, respectively.

The product identifier associated with the redemption identifier is determined at 5310 and retail price of the product associated with the redemption identifier is removed from the running subtotal at 5312. With respect to that product, the settlement price is retrieved at 5314 and the retailer device queues the settlement price for collection from the purchasing system at 5316.

At 5318 the transaction total is determined based on the remaining retail prices in the transactions (i.e., the products that were not purchased through the purchasing system) and payment of the transaction total is collected from the buyer at 5320. The operator may then be instructed to authorize the buyer to take possession of all of the products at 5322.

Figure 54A:
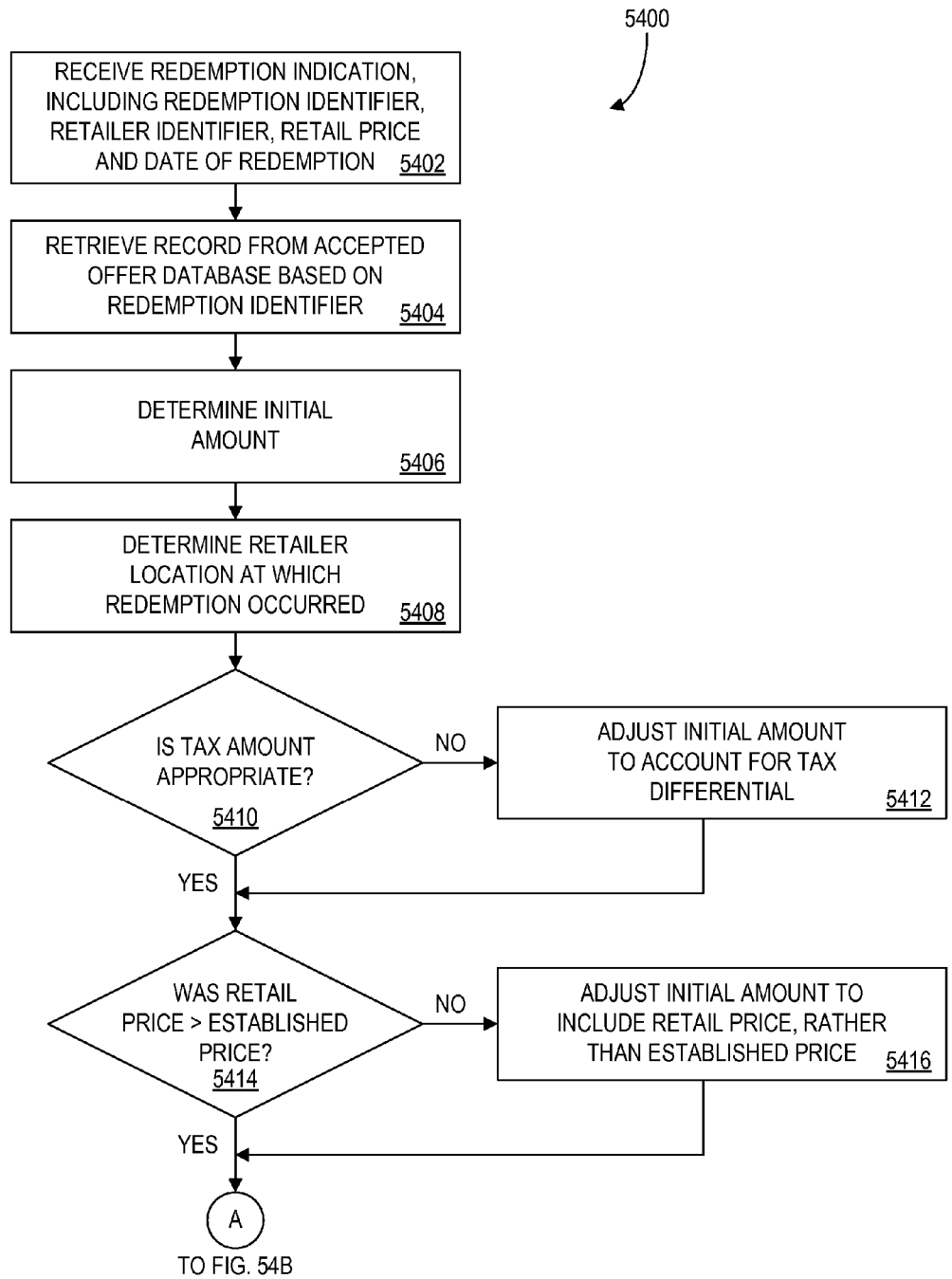
FIGS. 54A and 54B are flow charts illustrating a method of adjusting a price paid by a buyer that may be performed by the purchasing system according to another embodiment of the present invention.
Figure 54B:
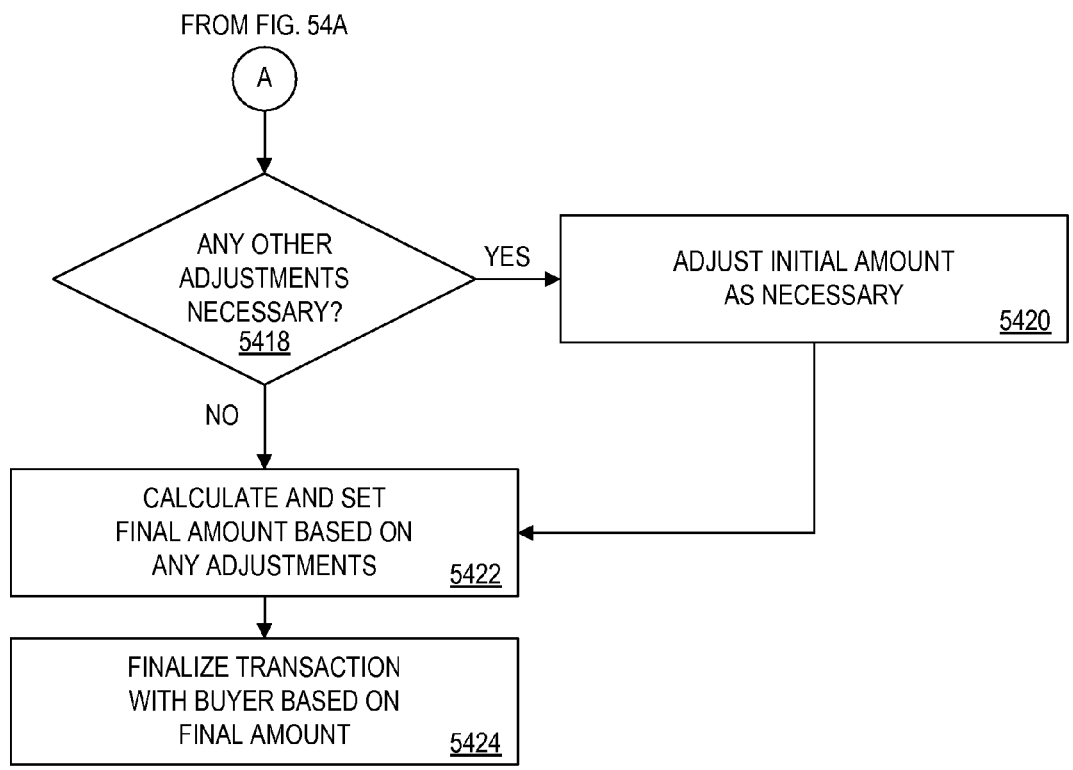

FIGS. 54A and 54B are flow charts illustrating a method 5400 of adjusting a price paid by a buyer that may be performed by the purchasing system device 2900 according to another embodiment of the present invention. A redemption indication associated with a buyer attempting to take possession of a product through the purchasing system is received at 5402, including a redemption identifier, a retailer identifier, a retail price and a date of redemption. At 5404 a record is retrieved from the accepted offer database 3200 based on the redemption identifier. Based on the retrieved record, an initial amount 3220 associated with the product is determined at 5406.

The purchasing system device 2900 then determines the retailer location at which the redemption occurred at 5408 and, based on the location of the retailer, decides if the tax amount applied when the buyer arranged to purchase the product is appropriate. If the tax amount was not appropriate, the initial amount 3220 is adjusted to account for the tax differential at 5412.

The purchasing system device 2900 then decides if the retail price was more than the established price at 5414. If the retail price was not more than the established price at 5414, the initial amount 3220 is adjusted to account for the difference at 5416 (e.g., by using a lower retail price rather than the established price). If any other adjustments are necessary at 5418 (e.g., a coupon or penalty), the initial amount 3220 is again adjusted as necessary at 5420.

At 5422, the final amount 3222 is calculated and stored in the accepted offer database 3200 based on the adjusted initial amount and the transaction is finalized with the buyer at 5424.

Figure 55A:
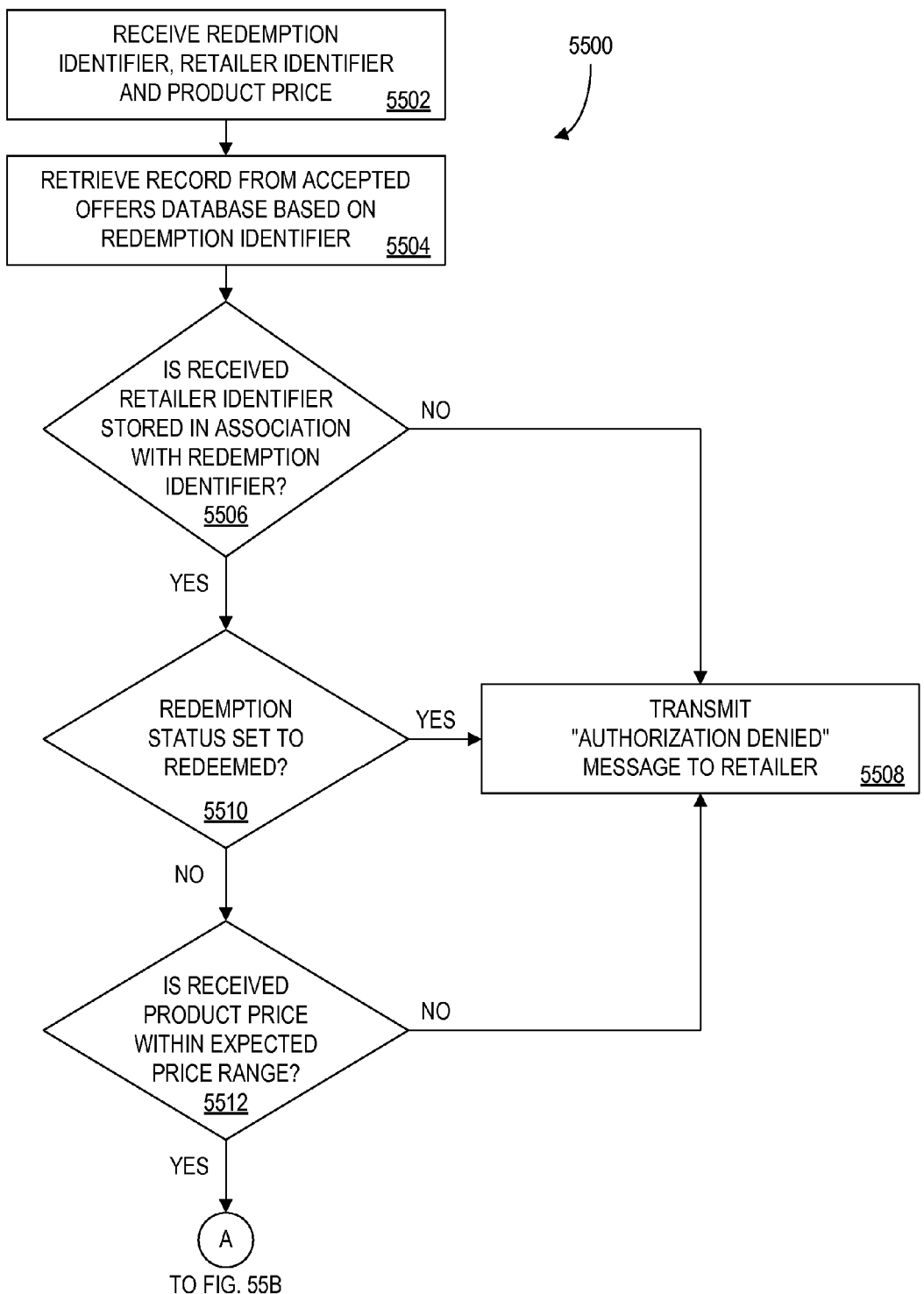
FIGS. 55A and 55B are flow charts illustrating a method of processing a purchasing system transaction that may be performed by the purchasing system according to still another embodiment of the present invention.
Figure 55B:
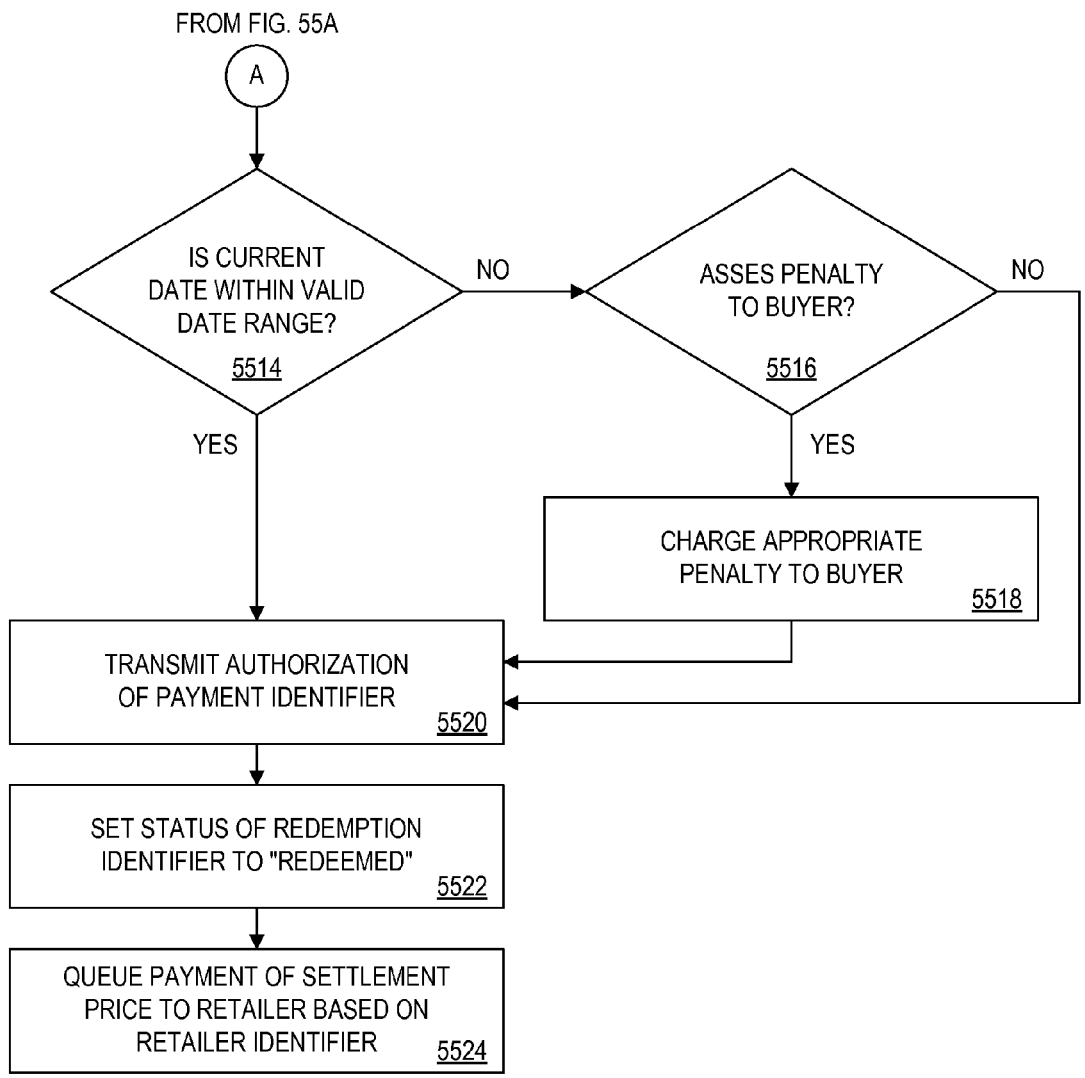

FIGS. 55A and 55B are flow charts illustrating a method 5500 of processing a purchasing system transaction that may be performed by the purchasing system device 2900 according to still another embodiment of the present invention. At 5502, a redemption identifier, retailer identifier and product price are received in connection with a buyer's attempt to take possession of a product at a retailer. Based on the redemption identifier, the appropriate record is retrieved from the accepted offer database 3200 at 5504.

If (i) the received retailer identifier is not found in the accepted offer database 3200 at 5506 (e.g., is not listed in the authorized retailers field 3224); (ii) the accepted offer database 3200 indicates that the buyer has already taken possession of the product at 5510 (e.g., when the redemption status 3214 indicates "redeemed"); or the received product is not in the expected price range at 5512 (e.g., not within the expected price range 3226) then the purchasing system device 2900 transmits an "authorization denied" message to the retailer at 5508. That is, the buyer will not be allowed to take possession of the product.

Otherwise, if the current date not within the valid date range at 5514 (e.g., the current date is later than the expiration date 3216), a penalty may be assessed to the buyer as appropriate at 5516 and 5518.

An authorization of payment identifier is transmitted at 5520 and the redemption status 3214 associated with the redemption identifier is set to "redeemed" in the accepted offer database 3200 at 5522. Finally, the purchasing system device 2900 queues payment of the settlement price to the retailer based on the received retailer identifier at 5524.

Figure 56A:
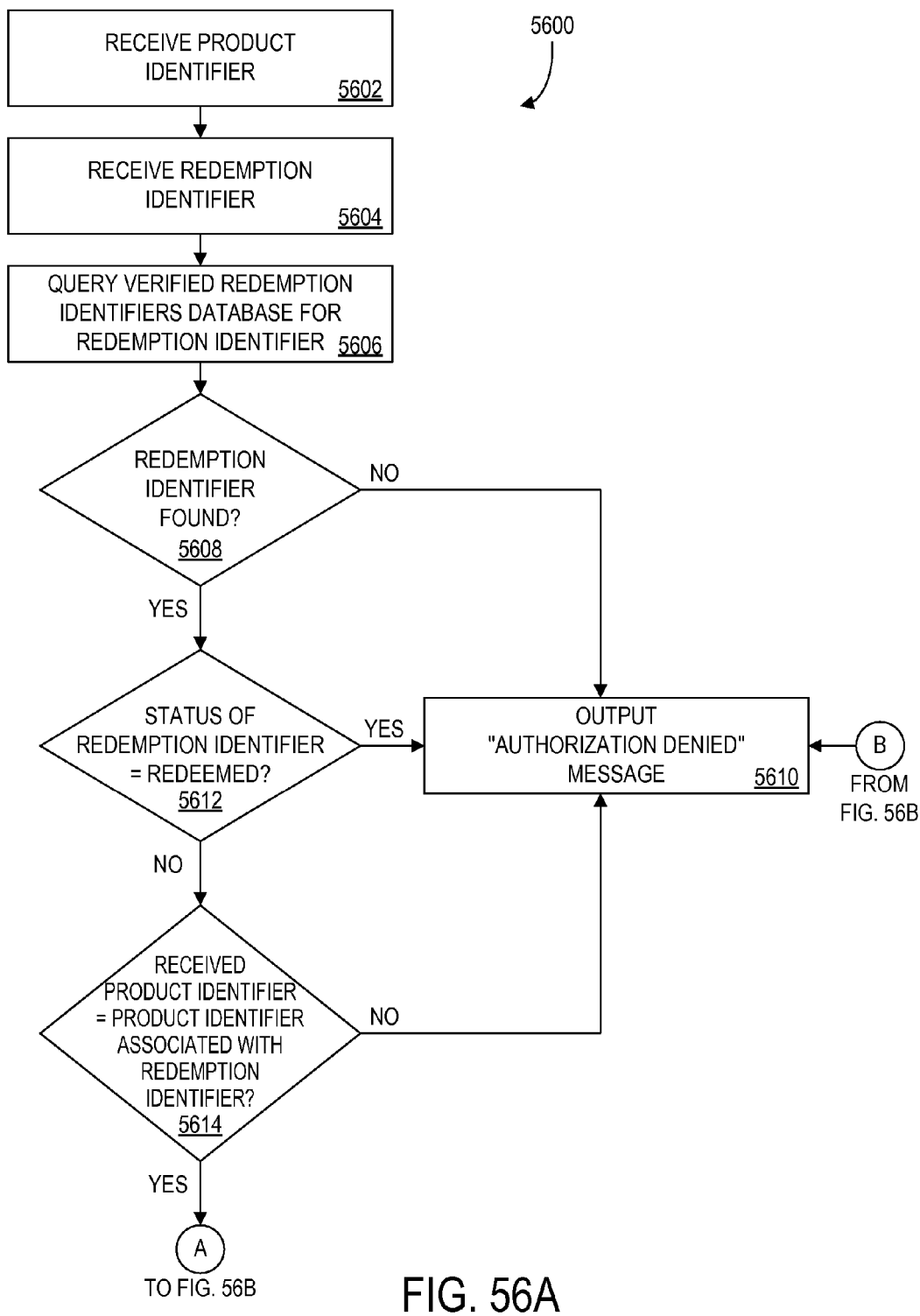
FIGS. 56A and 56B are flow charts illustrating a method of processing a purchasing system transaction that may be performed by the retailer according to yet another embodiment of the present invention.
Figure 56B:
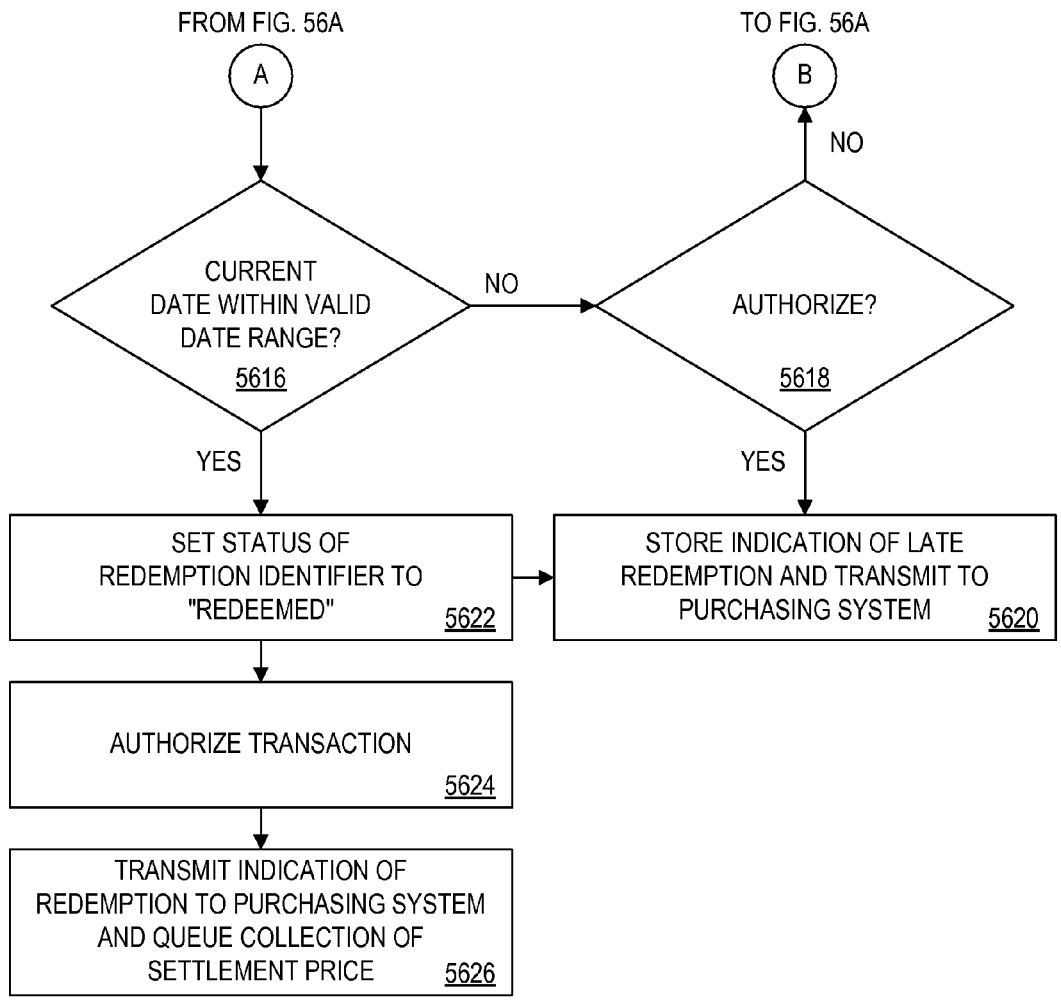

FIGS. 56A and 56B are flow charts illustrating a method 5600 of processing a purchasing system transaction that may be performed by the retailer device 2750 according to yet another embodiment of the present invention. At 5602 and 5604, a product identifier and redemption identifier are received in connection with a buyer's attempt to take possession of a product at a retailer. A retailer redemption identifier database 3800, locally stored at the retailer device 2750, is then queried at 5606. If no record is found having a redemption identifier 3802 corresponding to the received redemption identifier at 1308, an "authorization denied" message is output at 5610.

When a record is found having a redemption identifier 3802 corresponding to the received redemption identifier at 1308, it is determined if the status 3804 of that record is "redeemed" at 5612. If the status is "redeemed" (e.g., the buyer has already taken possession of the product), an "authorization denied" message is output at 5610. Similarly, if at 5614 the received product identifier does not correspond to the product identifier 3806 stored in the retailer redemption identifier database 3800 (e.g., the buyer is attempting to take possession of a product different than the product he or she arranged to purchase through the purchasing system), an "authorization denied" message is output at 5610.

At 5616, if the current date is not within the dates valid range 3808 the retailer device 2750 determines if the buyer is authorized to take possession of the product (e.g., even though the purchasing system voucher has expired) at 5618. If the buyer is not authorized, an "authorization denied" message is output at 5610. If the buyer is authorized at 5618, an indication of late redemption is stored and transmitted to the purchasing system at 5620 (e.g., so that an appropriate penalty may be applied).

At 5622, the status 3804 associated with the received redemption identifier is set to "redeemed" (e.g., to prevent the buyer from taking possession of the product again) and the transaction is authorized at 5624. An indication of redemption is transmitted to the purchasing system at 5626, and the retailer device 2750 queues collection of the settlement price in exchange for providing the product to the buyer.

Pseudo Payment Identifier as Redemption Code

As previously mentioned, according to one embodiment of the present invention the purchasing system device 2900 uses pseudo payment identifiers as redemption codes. Note that a retailer may want to determine the validity of a purchasing system voucher to prevent fraudulent use, such as over-redemption of a voucher, by unscrupulous buyers. For example, consider a buyer who establishes a $200 price with a manufacturer for a television. A hold is put on the buyer's credit card for $200, and a voucher for the television is issued to the buyer. The buyer prints out three copies of the voucher and redeems all three at various retailers, and each of the retailer settles with the purchasing system device 2900 off-line or through a back channel at the end of the day. The purchasing system device 2900 determines that it now owes the retailers an additional $400 (for the two additional, unauthorized transactions). However, the purchasing system device 2900 may find that the additional $400 charge cannot be authorized because the buyer is over his or her credit limit. As will now be explained, an advantage of these embodiments of the present invention is that a retailer can verify a voucher at the POS when a customer is attempting to take possession of a product using a voucher (including a pseudo credit card account number) without special equipment.

According to this embodiment of the present invention, the retailer communicates with the purchasing system 2900 at the time of redemption over the existing banking network using a CAT that is typically connected to each POS terminal 3100 at the retailer. Of course, the retailer may instead communicate directly with the purchasing system at the time of redemption through other networks, such as the Internet.

According to this embodiment of the present invention, the purchasing system device 2900 acts as a "pseudo" credit card account number issuer. That is, the redemption code may look like a sixteen digit credit card number (e.g., 1111-2222-3333-4444) to the POS terminal 3100. As is known, a CAT typically sends a credit card number to a credit card processing system device 2725 for authorization, which in turn uses the first four digits of the credit card number to route the authorization request.

In this embodiment, the purchasing system may be assigned a unique four digit identifier (e.g., to be used as the first four digits of the pseudo credit card account number redemption code) that can be recognized by the credit card processing system device 2725. The buyer uses the issued pseudo credit card account number when taking possession of a product a retailer. For example, the pseudo credit card account number may be printed on a voucher and entered into the CAT by an employee of the retailer.

Note that each issued and outstanding pseudo credit card account number may be associated with a unique transaction, in which case the purchasing system device 2900 may keep track of available pseudo credit card account numbers. Also note that the redemption code may be associated with either a single retailer or a number of retailers.

The purchasing system may associate a spending limit with a pseudo payment identifier, such as a pseudo credit card account number. For example, the purchasing system may arrange for a buyer to take possession of a product at a retailer. The purchasing system may adjusting the spending limit by establishing a minimum spending amount and a maximum spending amount associated with the pseudo payment identifier. These limits may be based on, for example the price the buyer agreed to pay for the product, the price the seller agreed to accept for the product, one or more settlement prices, penalty amounts, and tax amounts. Any supplemental offers may be included in these limits or used to establish additional limits. For example, a pseudo payment identifier may have both a $100 to $120 range (associated with the expected final retail price of the product) and a $180 to $190 range (associated with the expected final retail price of both the product and a supplemental offer).

The information related to the attempt to take possession of the product sent from the retailer to the purchasing system may include a purchase price. The purchasing system would then only send a verification if the purchase price is more than the minimum spending amount and less than the maximum spending amount. Moreover, when the buyer takes possession of the product at the retailer, the spending limits may be re-adjusted (e.g., to zero) to prevent the buyer from receiving another authorization.

FIGS. 27 to 56B describe only some of possible embodiments according to the present invention. Several other embodiments will now be briefly described to illustrate various applications of the present invention. These examples are presented only to demonstrate the wide applicability of the present invention. The examples do not constitute a definition of all possible embodiments or all possible applications. Those skilled in the art will understand that there are many more applications of the present invention consistent with the present disclosure. Further, although the following examples are briefly described for clarity, those skilled in the art will understand how to make any changes, if necessary, to the above-described apparatus and methods to accommodate these and other embodiments and applications.

According to one embodiment of the present invent, a retail price override instruction may be a signal generated when a retailer employee activated a button on the POS terminal 3100 (instead of from the redemption identifier). Such a manual override may then instruct the retailer device 2750 to validate the redemption information. If desired, a price for the product may not be added to the buyer's subtotal until the redemption information has been validated.

According to another embodiment of the present invention, if the buyer does not take possession of the product within a predetermined time, the purchasing system sends an e-mail reminder to the buyer. Alternatively, a POS terminal 3100 could output a reminder (e.g., printed on a receipt) if it recognizes that a buyer of a current, unrelated transaction (e.g., by recognizing a credit card number or a frequent shopper number) has an outstanding purchasing system voucher.

Note that the redemption of a voucher does not have to take place at a retailer's or franchisee's store. In an alternate embodiment, the point of redemption could take place at the buyer's home. That is, a delivery service utilizing cellular packaging-tracking technology (e.g. United Parcel Service) may verify redemption codes upon delivery of the product. The buyer may have pre-paid for the product or provide Cash on Delivery (COD). In this embodiment, the POS terminal 3000 may be a cellular clip-board device carried by a delivery service employee.

According to another embodiment of the present invention, the buyer may pay an extra amount for the privilege of returning a product purchased through the purchasing system. For example, the customer may pay a $10 fee to be allowed to return a product to the retailer. The purchasing system may freeze the $10 amount, and if the customer does not return the item within 30 days, he or she would get $8 back (e.g., a "charge back" to the credit card). If the customer does return the item within 30 days, he or she would be charged the full $10.

According to another embodiment of the present invention, the buyer may pay extra to guarantee that a retailer will have the product in stock. The retailer may, for example, set aside the product for the buyer, perhaps at a customer service counter.

According to another embodiment of the present invention, the buyer may take possession of the product purchased through the purchasing system at a retailer service desk. In this case, a service desk employee may place a telephone call to the purchasing system (e.g., by calling a toll free number).

According to another embodiment of the present invention, a retailer that redeems more than one identical voucher (e.g., when the customer has made an unauthorized a copy of a valid voucher) may fund the cost of the product and sacrifice reimbursement. The retailer may in this case maintain a database to track redeemed vouchers to make sure that vouchers are not being duplicated.

According to another embodiment of the present invention, the purchasing system provides a payment to the buyer when the buyer purchases a product. For example, the purchasing system may arrange for the buyer to purchase a product at a first price. According to this embodiment, the purchasing system would provide a payment to the buyer (e.g., apply a credit to the buyer's credit card account) based on the difference between a retail price associated with the product and the first price. The buyer would then provide a payment based on the retail price to the retailer when taking possession of the product. Consider a buyer that arranges to purchase a CD player through the purchasing system for $80. If the CD player has a retail price of $100, the purchasing system may immediately apply a $20 credit to the buyer's credit card account. The purchasing system may also arrange to receive a payment (e.g., of $20) from another party, such as a seller of the product (including, for example, a retailer or a manufacturer of the product). In this way, the buyer can provide $100 to a retailer when he or she takes possession of the CD player. As a result, the buyer has purchased the CD player for $80 ($100-$20).

Settlement Systems and Methods

The present invention is directed to settlement systems and methods wherein a buyer takes possession of a product at a retailer. Turning now in detail to the drawings, FIGS. 57A to 57C are block diagrams illustrating the distribution of payments according to embodiments of the present invention.

Figure 57A:
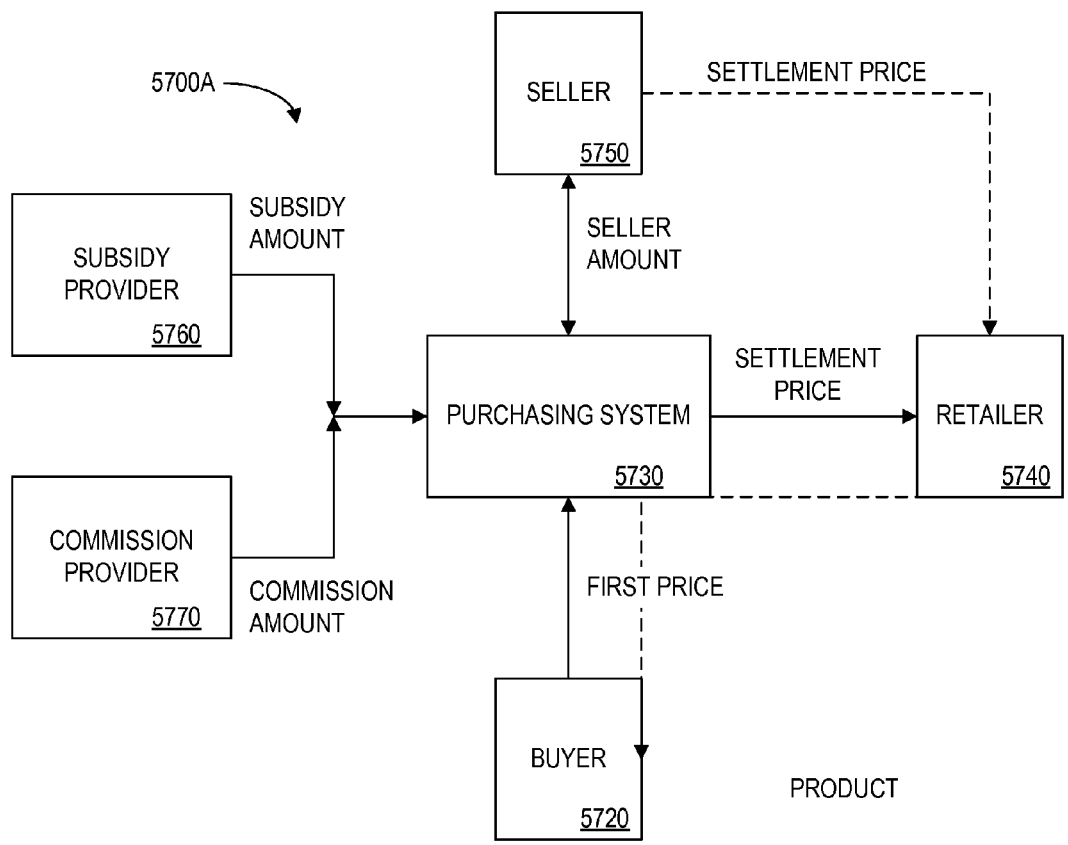
FIGS. 57A to 57C are block diagrams illustrating the distribution of payments between a purchasing system, a buyer, a seller and a retailer according to embodiments of the present invention.
Figure 57B:
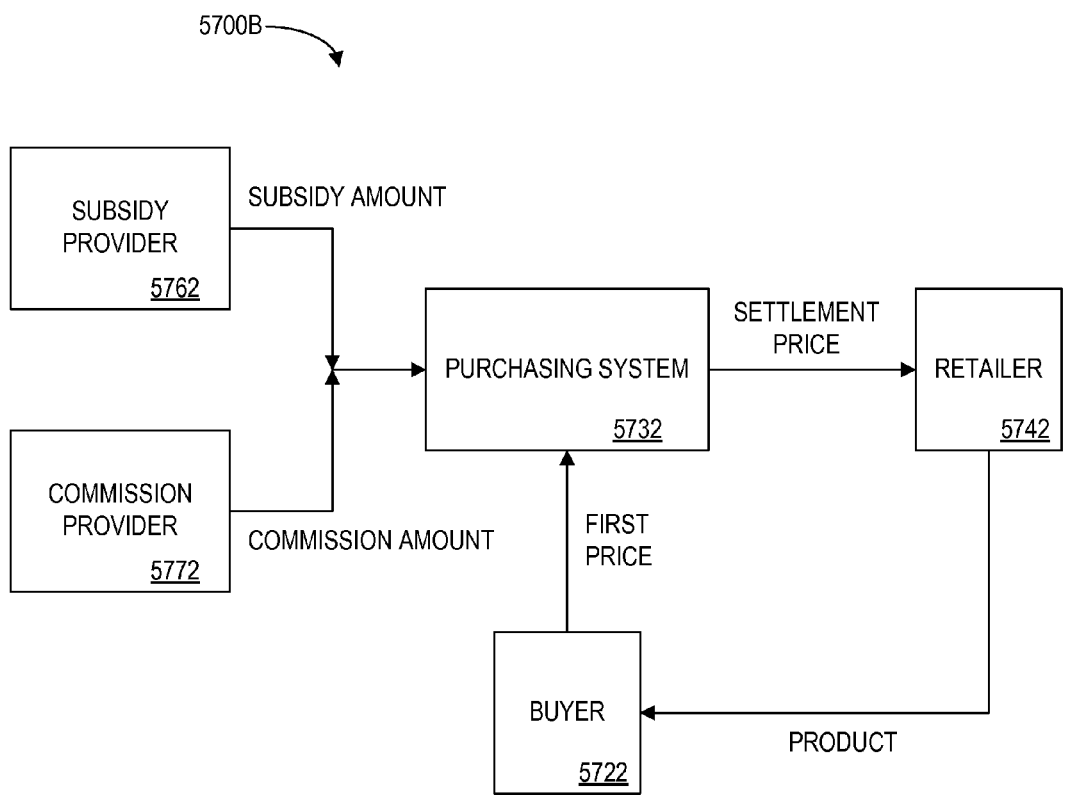
Figure 57C:
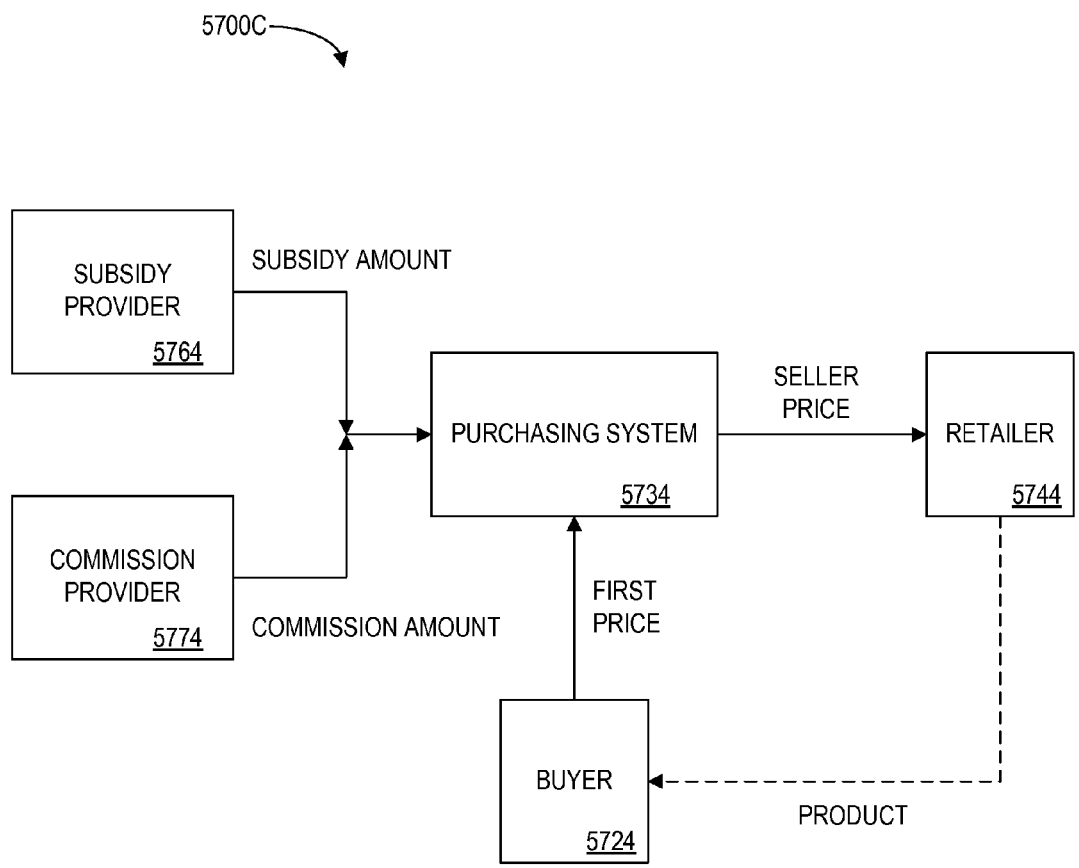

The settlement system 5700A illustrated in FIG. 57A includes a purchasing system 5730 that arranges for a buyer 5720 to purchase a "product" from a seller 5750 at a first price. As used herein, a "product" may be, for example, a new or used consumer product such as an electronic device. A product may also be any other good or service that a buyer can take possession of at a retailer 5740. In the case of a service, the product may be, for example, a car tune-up that the buyer "takes possession of at" (i.e., receives the service from) a car service center. A product may also be a package of multiple items and/or services. For example, a product may be a television and a Video Cassette Recorder (VCR). In this case, the purchasing system 5730 may arrange for the buyer to take possession of both items at a single retailer 5740 or at different retailers.

Note that, as used herein, a "retailer" may be any entity capable of providing a product to a buyer. For example, a retailer might be a single retail shop, a chain of consumer electronic "superstores," one or more retail stores within a chain, a franchisee, a franchiser, or even a warehouse where products are stored.

The actual amount provided from the buyer 5720 to the purchasing system 5730 may not be equal to the first price. For example, the first price may be adjusted based on an applicable tax or penalty, as will be described. In general, from the perspective of the buyer 5720, a payment of an amount associated with the first price is provided to the purchasing system 5730 in exchange for the right to take possession of the product at the retailer 5740.

According to one embodiment of the present invention, the retailer 5740 agrees to provide the product to the buyer 5720 in exchange for a "settlement" price. The settlement price may be, for example, a second price at which the retailer 5740 normally offers the product for sale (i.e., the "retail" price). Note that according to one embodiment of the present invention, the settlement price is a predetermined amount agreed to between, for example, the retailer 5740 and the purchasing system 5730.

The retailer 5740 may accept a settlement price lower than the retail price in order to, for example, have an opportunity to sell additional products to the buyer 5720 when the buyer visits the retailer 5740 to take possession of the product. The retailer 5740 may instead require payment of a settlement price higher than the retail price in order to, for example, compensate the retailer 5740 for the expense of processing a transaction involving the purchasing system 5730. In either case, the settlement price may be based on, for example, a percentage of the retail price or the retail price adjusted by a predetermined amount. Of course, the settlement price does not need to be a function of the retail price.

According to one embodiment of the present invention, the purchasing system 5730 provides a payment of an amount based on the settlement price to the retailer 5740. According to another embodiment of the present invention, the seller 5750 provides a payment of an amount based on the settlement price to the retailer 5740 (as shown by a dashed line in FIG. 57A).

According to an embodiment of the present invention, the settlement price provided to the retailer 5740 may not be equal to the first price provided by the buyer 5720. As a result, payment of a "seller amount" may need to be exchanged between the seller 5750 of the product and the purchasing system 5730. For example, the buyer 5720 may purchase a television from the seller 5750 for $100. The retailer 5740 may provide the television to the buyer in exchange for payment of a settlement price of $90. In this case, the purchasing system 5730 may receive the first price ($100) from the buyer 5720, provide the settlement price ($90) to the retailer 5740 and provide a seller amount to the seller 5750 based on the difference between the first price and the settlement price (i.e., $10). If the retailer 5740 had instead required payment of a $120 settlement price, the seller 5750 may have provided payment of a seller amount ($20) to the purchasing system 5730 instead.

According to another embodiment of the present invention, the buyer 5720 agrees to purchase the product at a first price and the seller agrees to sell the product at a "seller" price which may be different from the first price. In this case, the purchasing system 5730 may profit from the difference between the seller price and the buyer price, if any. As shown in FIG. 57A, the purchasing system may also receive payment of a commission amount from a commission provider 5770. The commission provider 5770 may be, for example, the buyer 5720, the seller 5750, the retailer 5740, a product manufacturer or a combination thereof. The commission amount may be, for example, a percentage of the first price, the seller price or the settlement price, or a predetermined amount.

According to another embodiment of the present invention, a subsidy provider 5760 provides payment of a subsidy amount to subsidize the purchase of the product by the buyer 5720. The subsidy provider 5760 may be, for example, the seller 5750, the retailer 5740, a product manufacturer, a third party or the purchasing system 5730.

By way of example, consider a buyer 5720 who arranges through the purchasing system 5730 to purchase a 35 millimeter (mm) camera from a seller 5750 for $150. The purchasing system 5730 determines that the camera is available at a retailer for a settlement price of $175. A subsidy provider 5760, such as the manufacture of the camera, has agreed to provide a $35 subsidy for each camera sold. In this case, the purchasing system 5730 "settles" the transaction by receiving $150 from the buyer 5720 and $35 from the subsidy provider 5760 and providing $175 to the retailer 5740. In such a scenario, the purchasing system 5730 has collected payment of $185 ($150 from the buyer 5720 and $35 from the subsidy provider 5760) and provided payment of $175, leaving it with an excess of $10. The purchasing system 5730 may retain this $10 as profit, provide the $10 to the manufacturer of the product, store the $10 in associate with the buyer for use as a subsidy amount in a future transaction of the buyer, or any combination thereof.

The settlement system 5700B illustrated in FIG. 57B includes a purchasing system 5732 that sells a product to a buyer 5722 at a first price. That is, the purchasing system 5732 is also acting as the seller 5750 shown in FIG. 57A. As before, the retailer 5742 agrees to provide the product to the buyer 5722 in exchange for payment of a settlement price, and the purchasing system may receive additional payments from a subsidy provider 5762 and a commission provider 5772.

The settlement system 5700C illustrated in FIG. 57C includes a purchasing system 5734 that arranges for a retailer 5744 to sell a product to a buyer 5724 at a first price. That is, the retailer 5744 is also acting as the seller 5750 shown in FIG. 57A. As before, the purchasing system may receive additional payments from a subsidy provider 5764 and a commission provider 5774. In this case, however, the retailer 5744 agrees to provide the product to the buyer 5724 in exchange for payment of a seller price (which may be equal to or based on the first price), not a settlement price.

Thus, the present invention comprises a settlement system and method for collecting and distributing funds amongst buyers, sellers, and retailers participating in transactions through a purchasing system.

Settlement Systems

In one embodiment, a settlement system may comprise the system 10 of FIG. 1A. For example, referring again to FIG. 1A, according to one embodiment of the present invention, the purchasing system device 300 receives a buyer offer, including a buyer-defined offer price, related to a product to be purchased. The buyer offer may be "binding" in that if a seller agrees (perhaps within a predefined period of time from the time the buyer submits his or her offer), the accept the offer the buyer cannot revoke the offer. The buyer provides a payment identifier when submitting his or her offer and agrees that the purchasing system may automatically utilize the payment identifier to collect the buyer defined offer price if a seller accepts the offer. One example of a buyer offer, called a Conditional Purchase Offer (CPO), is described in U.S. Pat. No. 5,794,207 and U.S. patent application Ser. No. 08/889,319, the entire contents of which are hereby incorporated by reference. A CPO may be, for example, an electronic message from a buyer including an offer price for a product. If a seller agrees to the CPO, the buyer pays the offer amount to the purchasing system and takes possession of the product at a retailer. The purchasing system, in turn, provides a payment of the settlement price to the retailer.

In addition to an offer price, the buyer offer can include other information, such as a product category, a product class, one or more product features, or a product manufacturer and product identifier (e.g., model number). For example, the buyer offer may indicate that the buyer will pay $500 (the offer price) for a television (the product category) made by a well-respected manufacturer and having a 32 inch screen (the product class) and surround sound (a product feature).

The buyer offer may be received from a buyer device 200 through the communication network 100, and the purchasing system device 300 arranges for the buyer to purchase the product from a "seller," such as the product manufacturer, a retailer, the purchasing system or any other party. The purchasing system device 300 also arranges for the buyer to take possession of the product at a retailer.

According to an embodiment of the present invention, the buyer pays the purchasing system in exchange for the right to take possession of the product at the retailer. The retailer receives a payment, which may or may not be based on the amount paid by the buyer, from a party other than the buyer, such as the purchasing system or product manufacturer, in exchange for providing the product to the buyer.

In another embodiment of the present invention, the purchasing system device 300 communicates with the buyer device 200 through the communication network 100 to establish a first price for a product between the buyer and a seller. The purchasing system device 300 also arranges for the buyer to take possession of the product at a retailer, different from the seller, that offers the product for sale at a second price. Verification information, which enables the retailer to authorize the buyer to take possession of the product, is transmitted from the purchasing system device 300 to a retailer device 400. The verification information may be, for example, a one way hash function transmitted to the retailer (either once or periodically). The retailer can then evaluate a redemption code provided by the buyer, using the one way hash function, to determine if the buyer is authorized to take possession of the product.

The verification information may also be, for example, a response to information (sent from the retailer device 400 to the purchasing system device 300) about an attempt to take possession of a product, or a batch of authorized codes sent to the retailer device 400 each night. The buyer provides a payment, based on the first price, to the purchasing system in exchange for the right to take possession of the product at the retailer. The purchasing system, in turn, provides payment to the retailer for allowing the buyer to take possession of the product.

According to another embodiment of the present invention, the purchasing system device 300 arranges for a buyer to purchase a product and transmits redemption information, including a "redemption code," to the buyer device 200, such as through the communication network 100. As used herein, a "redemption code" may be, for example, a unique alphanumeric sequence of digits. In general, however, the redemption code may be anything capable of being identified, such as a one or two dimensional bar code, that represents the right of the buyer to take possession of the product at a retailer. As used herein, the phrase "bar code" includes any machine readable information. The redemption information can also include information that enables the creation of a voucher. For example, a printer attached to a PC may be used to print a voucher including the redemption code.

According to still another embodiment of the present invention, information related to an attempt to take possession of the product, including the redemption code, is sent from a retailer device 400 to the purchasing system device 300. In this case, the purchasing system device 300 sends back a verification, authorizing the buyer to take possession of the product, to the retailer device 400. Although FIG. 1A shows the purchasing system device 300 communicating with the retailer device 400 through the same communication network 100 used by the buyer device 200, those skilled in the art will recognize that a different communication network may be used instead.

Figure 57D:
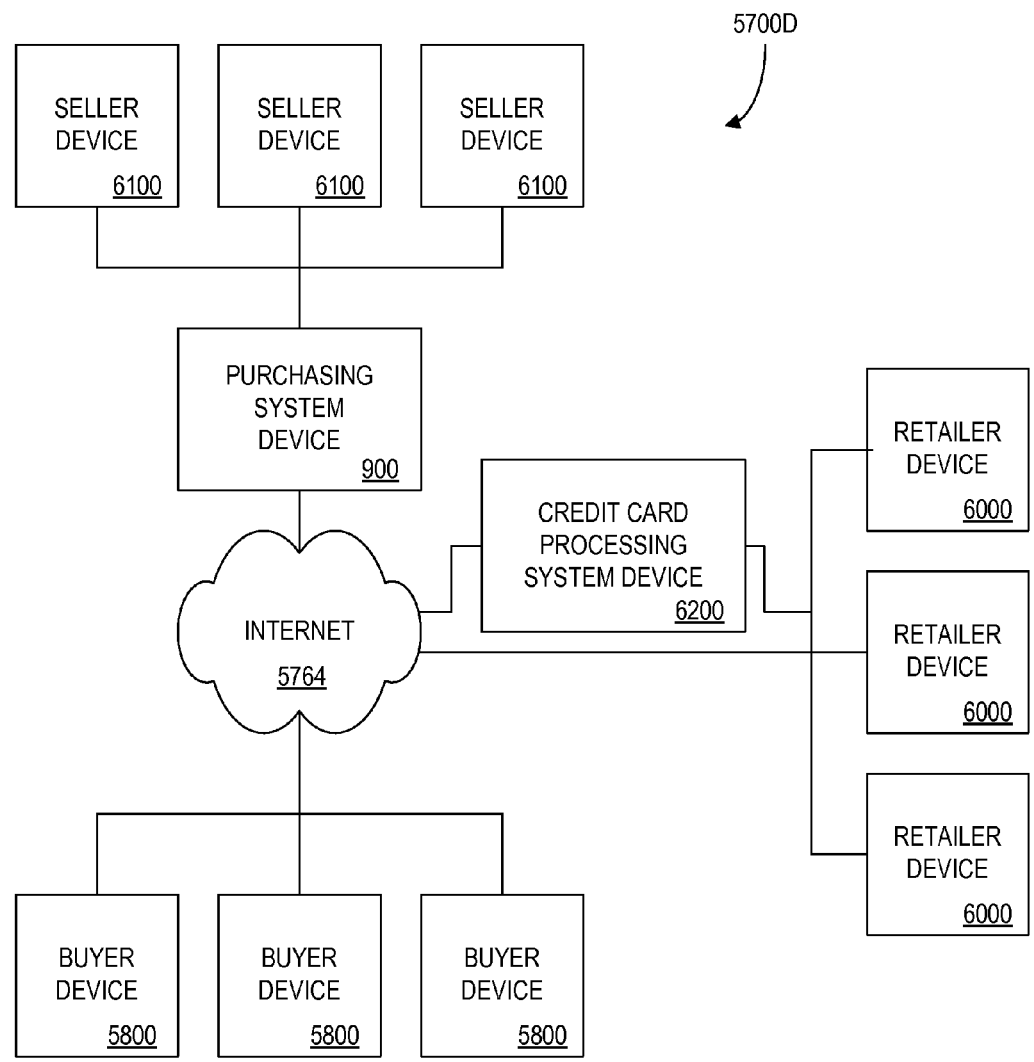
FIG. 57D is a block diagram of a settlement system in which a buyer takes possession of a product at a retailer according to embodiments of the present invention.

A more detailed description of one embodiment of the present invention will now be provided with respect to FIG. 57D. As before, the system 5700D includes a number of buyer devices 5800 (such as PCs executing browser application software) coupled to a remote purchasing system device 5900 (such as a Web server) through the Internet 5746. The purchasing system device 5900 also communicates through the Internet 5746 with a number of seller devices 6100 and retailer devices 6000. Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

Although embodiments of the present invention will be described with respect to information exchanged using a Web site, according to other embodiments of the present invention information may instead be exchanged using, for example: a telephone; a facsimile machine; e-mail; a WebTV interface; a cable network interface, or a wireless device. Information exchanged between a buyer and purchasing system device 5900, as well as between a retailer and the purchasing system device 5900, may also use a Voice Response Unit (VRU) or Interactive VRU (IVRU). Examples of IVRUs include the Vision 2001 and the Insight IVR/Web from Interactive Voice Technologies, Corp. and the OmniVox for Windows NT from APEX Voice Communications. An IVRU lets a user of a DTMF (Dual Tone Multi-Frequency) tone generating telephone, also known as "push button" telephone, communicate with a computer. The DTMF signals received from a user's telephone are interpreted by an IVRU server, and the server may also communicate with the user by generating and transmitting voice or other audio signals, such as a list of IVRU menu options.

The purchasing system device 5900 arranges for the buyer to purchase the product, for example, when a buyer offer is received from a buyer device 200 through the communication network 100.

Based on the buyer offer information, the purchasing system device 5900 may select a particular product (such as a manufacturer and model number) from a plurality of possible products. In addition to the buyer offer information, the purchasing system device 5900 may also consider other factors when selecting a particular product, such as, for example: (i) the expected availability of products at retailers; (ii) the actual availability of product at retailers—which may be done by communicating with the retailer devices 6000; (iii) retail prices of products at various retailers—which again may be done by communicating with the retailer devices 6000; (iv) subsidy information associated with products; and (v) retailer settlement prices. As used herein, a "subsidy" is an amount a party (such as a manufacturer, a retailer or the purchasing system) is willing to contribute towards the buyer's purchase of a product.

The purchasing system device 5900 may likewise select one or more retailers from a plurality of possible retailers. In this case, the purchasing system device 5900 may consider, for example: (i) the location (e.g., address) of the buyer; (ii) the location of the retailers; (ii) the expected availability of the product at various retailers; (iii) the actual availability of the product at various retailers; (iv) retail prices of the product at the retailers; (iv) retailer subsidy information; and (v) retailer settlement prices.

To determine whether or not the buyer offer is acceptable and/or how the buyer offer will be accepted (e.g., which product at which retailer), the purchasing system device 5900 may compare the offer price with the settlement price associated with a product that successfully meets the buyer's offer information. A potential seller may also have a minimum acceptable price, which is the lowest price that the seller (as opposed to the retailer or the purchasing system) will let the product be sold for (e.g., to prevent brand name dilution).

In making this comparison, the purchasing system device 5900 may also take into account supplemental price information, such as a manufacturer subsidy amount, a retailer subsidy amount, a purchasing system subsidy amount, and/or a "third-party" subsidy amount associated with the product. As used herein, a third-party subsidy amount may be, for example, an amount that a third-party agrees to provide towards the purchase of a product in exchange for a promise regarding, an action by, or information about the buyer. For example, a credit card issuer may agree to add $50 towards the purchase of a home stereo if a buyer submits a credit card application to the issuer. See, for example, U.S. patent application Ser. No. 08/943,483 filed Oct. 3, 1997 and entitled "System and Method for Facilitating Acceptance of Conditional Purchase Offers" (97-072), the entire contents of which are hereby incorporated by reference.

According to embodiments of the present invention, the purchasing system device 5900 arranges for the buyer to take possession of the product at a retailer. This may be done, for example, by sending to the buyer redemption information, including a redemption code such as a "pseudo" credit card number, debit card number or a checking account number. A redemption code may be a "pseudo" credit card number if, for example, it can be entered into (and processed by) a retailer device, such as a Card Authorization Terminal (CAT) device, as if it was a real credit card number. In this case, the purchasing system device 5900 may authorize the buyer to take possession of the product using a credit authorization request received from a credit card processing system device 6200.

The redemption information can also include a condition that must be met by the buyer, such as a geographic limitation or an expiration date. Penalty information, such as a 10% increase in the price of the product charged to the buyer, may also be included in the event the buyer violates one of the conditions of the sale. The redemption information may also enable the creation of a coupon-like voucher. For example, the redemption information may let the buyer print out a voucher that can be presented to the retailer when taking possession of the product.

Note that the redemption information may include information associated with a number of products, as well as a number of retailers. For example, a single voucher might indicate that the buyer can take possession of a VCR at either of three local retailers. In this case, the redemption code may be redeemable for one of several different products, depending on the retailer at which the buyer takes possession of the product. Accordingly, the redemption information (e.g., a voucher), may include several different Stock Keeping Unit (SKU) numbers, model names and/or model numbers. According to another embodiment, the voucher may include several separate products (e.g., a television or a VCR) or several equivalent products (e.g., several different television brands, more than one of which may be available at a single retailer).

The redemption information may also include supplemental offer information. For example, the voucher may include an offer to purchase a pack of three VCR tapes for $1 to the buyer if the buyer takes possession of the VCR at a particular retailer.

When the buyer presents the voucher to a retailer, the retailer device 6000 sends information related to an attempt to take possession of the product (such as the redemption code included on the voucher) to the purchasing system device 5900. The retailer devices 6000 may comprise, for example, inventory systems that periodically update the purchasing system device 5900 and/or Point Of Sale (POS) devices, such as a POS controller that communicate with POS terminals (not shown in FIG. 57B) and the purchasing system device 5900 during the redemption process. A POS terminal may include an optical bar code scanner to read bar codes on products and/or vouchers and a card reader to read cards such as magnetic strip cards that have magnetizable strips or surfaces on which data can be recorded. One such card reader is the OMNI™ 1450 payment terminal, manufactured by Veri-Fone, Inc., which includes a built-in, magnetic-stripe reader, a Personal Identification Number entry pad (e.g., one used buy a buyer to enter a debit card PIN) and an integrated smart card reader.

The purchasing system device 5900 may communicate with the retailer device 6000 in substantially real time during the redemption of a voucher. That is, a POS controller may connect to the purchasing system device 5900 when a buyer is attempting to take possession of the product. In another embodiment, the retailer device 6000 and the purchasing system device 5900 communicate periodically, such as every night at midnight. For example, the purchasing system device 5900 may communicate with each retailer device 6000 each day regarding buyer redemption codes, redeemable at the retailer, that have been issued. Likewise, the retailer device 6000 can in turn transmit to the purchasing system device 5900a list of the redemption codes that have been redeemed at the retailer that day. In some embodiments, the retailer is the seller who accepts a buyer's offer. In such an embodiment, the retailer device 6000 could also perform the function of, or be in communication with another server that performs the function of, a potential seller. For example, the retailer device 6000 may be in communication with or perform at least some of the functions of the seller device 6100.

When the retailer device 6000 sends information related to an attempt to take possession of the product (such as a redemption code) to the purchasing system device 5900, the information can be used to authorize the buyer to take possession of the product. That is, the purchasing system device 5900 can send a verification back to the retailer device 6000 authorizing the retailer to let the buyer take possession of the product. The purchasing system device 5900 may also provide a payment to the retailer in exchange for providing the product to the buyer. In this case, of course, the amount paid to the retailer may or may not be equal to the offer amount paid by the buyer. For example, suppose the purchasing system arranges for a buyer to purchase a television for $300, and the buyer takes possession of the television at a retailer (one of several indicated on the voucher) that typically sells that television for $320. In this case, the purchasing system may pay the full retail price (i.e., $320) to the retailer.

The purchasing system device 5900 may communicate with the seller devices 6100, for example, to send information about a buyer offer in attempt to find a seller. The purchasing system device 5900 may also communicate with the seller devices 6100 to determine and distribute seller amounts (e.g., the amount owed to or due from the seller as a result of a sale made through the purchasing system). Such a determination and distribution may be made, for example, on a sale-by-sale or periodic (e.g., batch) basis.

Note that some or all of the actions associated with the purchasing system device 5900 may be performed by a retailer, a product manufacturer, or a party other than the retailer and product manufacturer.

Buyer Device

Figure 58:
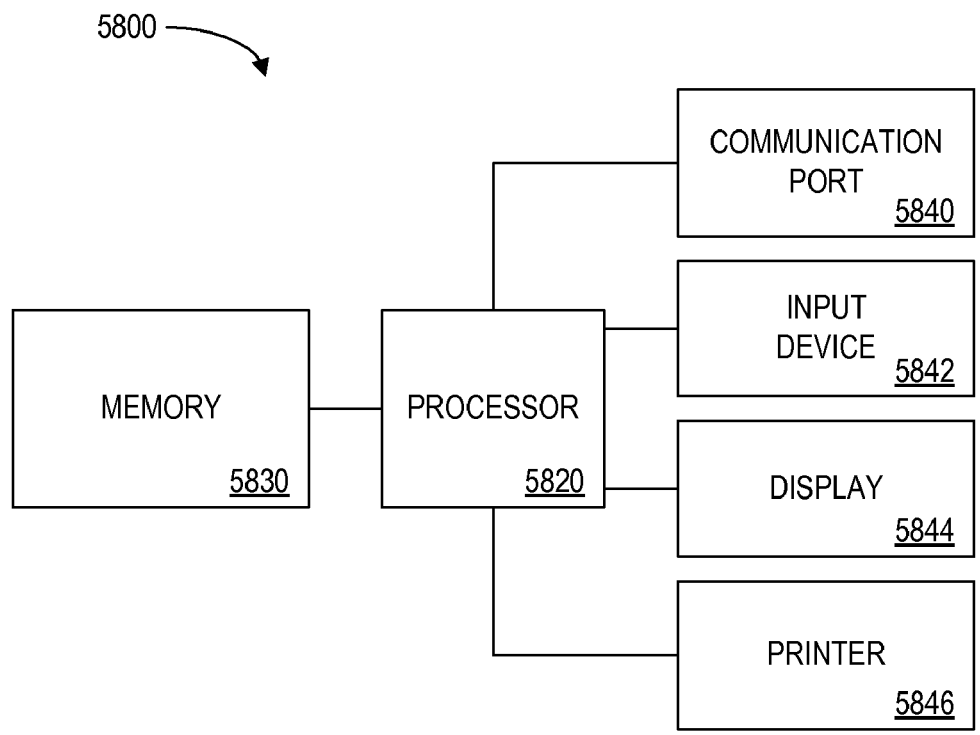
FIG. 58 is a block schematic diagrams of a buyer device according to an embodiment of the present invention.

FIG. 58 illustrates a buyer device 5800 that is descriptive of the buyer device shown in FIG. 57D according to one embodiment of the present invention. The buyer device 5800 comprises a processor 5820, such as one or more Pentium® processors, coupled to: a communication port 5840 configured to communicate through a communication network (not shown in FIG. 58); an input device 5842 (such as a keyboard or mouse); a display 5844; and a printer 5846. The communication port 5840 may be used to communicate with, for example the purchasing system device 5900.

The processor 5820 is also in communication with a memory device 5830. The memory device 5830 comprises an appropriate combination of magnetic, optical and/or semi-conductor memory, and may include Random Access Memory (RAM), Read-Only Memory (ROM) and/or a hard disk. The memory device 5830 stores a program for controlling the processor 5820. The processor 5820 performs instructions of the program, and thereby operates in accordance with the present invention. The program may be stored in a compressed, uncompiled and/or encrypted format and furthermore includes program elements that may be necessary, such as an operating system, a database management system and "device drivers" used by the processor 5820 to interface with peripheral devices. Appropriate device drivers and other necessary program elements are known to those skilled in the art and are not described in detail herein.

By way of example, the program may be a Web browser application used by a buyer to "visit" a purchasing system Web site. The buyer can arrange with the purchasing system to purchase a product from a seller at a first price, and to pay an amount based on the first price to the purchasing system. The buyer may receive redemption information from the purchasing system, such as information that lets the buyer print out a voucher using the printer 5846. The buyer could then provide the voucher to a retailer that offers the product for sale at a second price and take possession of the product.

The printer 5846 shown in FIG. 58 is optional. If the buyer device 5800 does not have the printer 5846 attached, the buyer may write down a redemption code. For example, the buyer may write down a redemption code and input it using a kiosk at the retailer. The kiosk could then communicate with the purchasing system device 5900, such as through an Internet connection, and print a voucher for the buyer.

According to another embodiment of the present invention, the buyer can take possession of the product without using a printed voucher. For example, the buyer may simply tell the POS terminal operator the redemption code. The operator inputs the redemption code using the POS terminal and the process continues as if the buyer had used a printed voucher. Also, if the buyer stores the redemption code in the buyer device 5800 or a portable buyer device (e.g., a PDA or magnetic stripe card), the buyer may communicate the redemption code directly from the buyer device to the POS terminal, such as by using an Infra-Red (IR) communication link.

Purchasing System Device

Figure 59:
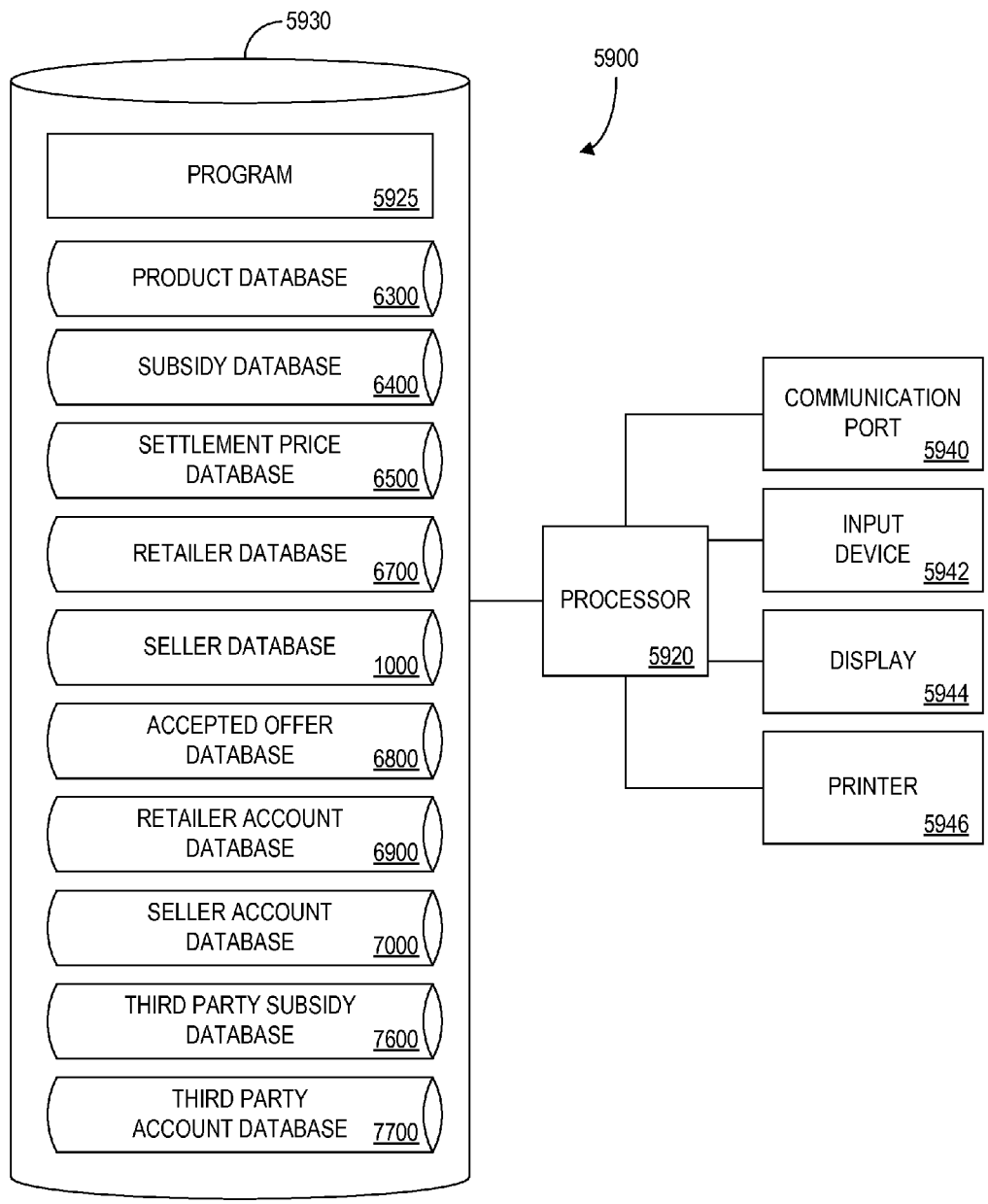
FIG. 59 is a block schematic diagram of a purchasing system device according to an embodiment of the present invention.

FIG. 59 illustrates a purchasing system device 5900 that is descriptive of the purchasing system device shown in FIG. 57D according to one embodiment of the present invention. The purchasing system device 5900 comprises a processor 5920, such as one or more Pentium® processors, coupled to: a communication port 5940 configured to communicate through a communication network (not shown in FIG. 59); an input device 5942 (such as a keyboard or mouse); a display 5944; and a printer 5946. The communication port 5940 may be used to communicate with, for example: (i) a plurality of seller devices 6100; (ii) a plurality of buyer devices 5800; and/or (iii) a plurality of retailer devices 6000. The sellers may comprise, for example, product manufacturers and/or retailers. The buyers may comprise, for example, individuals who access a Web site and submit offers to purchase products (i.e., buyer offers). Such a Web site could be hosted by a server at the purchasing system device 5900 or hosted by a server coupled to the purchasing system device 5900.

The processor 5920 is also in communication with a data storage device 5930. The data storage device 5930 (as well as the other storage devices disclosed herein) may comprise any appropriate combination of magnetic, optical and/or semi-conductor memory, and may include Random Access Memory (RAM), Read-Only Memory (ROM) and/or a hard disk. The processor 5920 and the storage device 5930 may each be (i) located entirely within a single computer or other computing device; (ii) connected to each other by a remote communication medium, such as a serial port cable, telephone line or wireless frequency transceiver; or (iii) a combination thereof. In one embodiment, the purchasing system device 5900 may comprise one or more computers that are connected to a remote server computer for maintaining databases.

The data storage device 5930 stores a program 5925 for controlling the processor 5920. The processor 5920 performs the instructions of the program 5925, and thereby operates in accordance with the present invention, and particularly in accordance with the methods described in detail herein. For example, the processor may arrange through the communications port 5940 for a buyer to purchase a product from a seller at a first price, and to take possession of the product at a retailer, different from the seller, that offers the product for sale at a second price. The processor 5920 may also arrange for the purchasing system to receive from the buyer a payment of an amount based on the first price, and arrange for the retailer to receive payment of an amount based on a settlement price in exchange for providing the product to the buyer.

The program 5925 (as well as the other programs disclosed herein) may be stored in a compressed, uncompiled and/or encrypted format. The program 5925 furthermore includes program elements that may be necessary, such as an operating system, a database management system and "device drivers" used by the processor 5920 to interface with peripheral devices. Appropriate device drivers and other necessary program elements are known to those skilled in the art and are not described in detail herein.

As shown in FIG. 59, the storage device 5930 also stores: a product database 6300 (described in detail with respect to FIG. 63); a subsidy database 6400 (described in detail with respect to FIG. 64); a settlement price database 6500 (described in detail with respect to FIG. 65); a retailer database 6700 (described in detail with respect to FIG. 67); a seller database 1000 (described in detail with respect to FIG. 10A); an accepted offer database 6800 (described in detail with respect to FIG. 68A); a retailer account database 6900 (described in detail with respect to FIG. 69); a seller account database 7000 (described in detail with respect to FIG. 70); a third party subsidy database 7600 (described in detail with respect to FIG. 76); and a third party account database 7700 (described in detail with respect to FIG. 77). The schematic illustrations and accompanying descriptions of these and other databases presented herein are exemplary, and any number of other database arrangements could be employed besides those suggested by the figures.

As will now be described, the purchasing system device 5900 shown in FIG. 59 lets a buyer establish a price for a product online (e.g., through the Internet) with a seller (e.g., a product manufacturer or a retailer) before taking possession of, or "picking up," the product at a convenient retailer. The purchasing system device 5900 may issue the buyer a redemption code, such as code included on a printed voucher, that is redeemable for the product at one or more "participating" local retailers. That is, the purchasing system has agreements with these retailers such that the retailers agree to honor purchasing system vouchers for specific products.

According to an embodiment of the present invention, each participating retailer establishes "settlement prices" for those products it will exchange for vouchers. The settlement price is the amount that the purchasing system must provide to the retailer in exchange for honoring a voucher. A retailer may set the settlement price below, at or above the product's retail price. The retailer may, for example, set the settlement price below the retail price for a give product to increase the likelihood of the purchasing system accepting a buyer's offer for the product and arranging for the buyer to take possession of the product at the retailer, thus generating additional traffic for the retailer (i.e., the buyers who come to the store to take possession of product purchased through the purchasing system).

In another embodiment of the present invention, a product manufacturer (acting as a seller) can bypass a retailer's pricing structure and establish a price for a product directly with a buyer without the burden of delivering the product to the buyer. Similarly, an embodiment of the present invention lets a retailer (acting as a seller) establish a price for a product with a particular buyer without lowering the price for the product typically charged at a retail store. This can attract new buyers without giving a discounted price to all customers who visit the retail store.

According to an embodiment of the present invention, the purchasing system device 5900 arranges for a buyer to purchase a product from a seller at a first price. This may be done, for example, by receiving a buyer offer, included a buyer-defined first price, and information about the product to be purchased. Note that, as used herein, information may be "received" by, for example: (1) the purchasing system device 5900 from a buyer device 5800; or (2) a software application or module within the purchasing system device 5900 from another software application, module or any other source. The purchasing system device 5900 may then decide whether or not a buyer offer will be accepted or information about the buyer offer may be routed to one or more seller devices 6100. Systems and methods related to such a decision are more fully described in U.S. patent application Ser. No. 09/337,906 filed Jun. 22, 1999 and entitled "Purchasing Systems and Methods Wherein a Buyer Takes Possession at a Retailer of a Product Purchased Using a Communication Network" (99-013).

A buyer offer received by the purchasing system device 5900 may include, for example: (i) product requirements; (ii) a buyer-defined offer price; and (iii) a payment identifier (e.g., a credit card account number). The buyer can specify product requirements by providing, for example: (i) a category of product (e.g., a television); (ii) a class of product (e.g., class 1 encompassing the top three manufacturers or all 21 inch screen televisions); (iii) a product manufacturer of a product; (iv) a model number of a product; and/or (v) features that the product must include (e.g., surround sound).

The buyer's product requirements determine which products stored in the product database 6300 (if any) can be used to accept the buyer offer. If the purchasing system device 5900 finds a product that matches the buyer's offer, the purchasing system device 5900 decides whether or not to accept the offer (such as by comparing the buyer price, adjusted for any subsidies, with the settlement price).

According to another embodiment of the present invention, the purchasing system device 5900 arranges for a buyer to purchase a particular product by offering a product at a seller-defined price to the buyer. The buyer then simply indicates that the price is acceptable and arranges to purchase the product (e.g., by providing a payment identifier). According to still another embodiment of the present invention, the purchasing system offers a product having at least one product requirement (e.g., a 27" television and surround sound from a well-known manufacturer) at a seller-defined price to the buyer—without specifying the particular product that will be used to fulfill the requirement. In this case, the product requirements may be selected by the buyer, the purchasing system or a seller.

The purchasing system device 5900 also arranges for a buyer to take possession of the product at a retailer that offers the product for sale at a second price. This may be done, for example, by sending redemption information to the buyer, including a redemption code and information that enables the creation of a purchasing system voucher.

According to an embodiment of the present invention, the purchasing system receives from the buyer a payment of an amount based on the first price. The payment may be received, for example, using a payment identifier supplied by the buyer. The payment may be received, for example, at a time based on when the purchasing system device arranges for the buyer to purchase the product. The payment may instead be received, if desired, at a time based on when the buyer takes possession of the product at the retailer (in which case the buyer may not be charged interest until after he or she takes possession of the product).

The purchasing system device 5900 also arranges for the retailer to receive payment of an amount based on a settlement price in exchange for providing the product to the buyer, such as by communicating with the retailer device 6000.

Retailer Device

Figure 60:
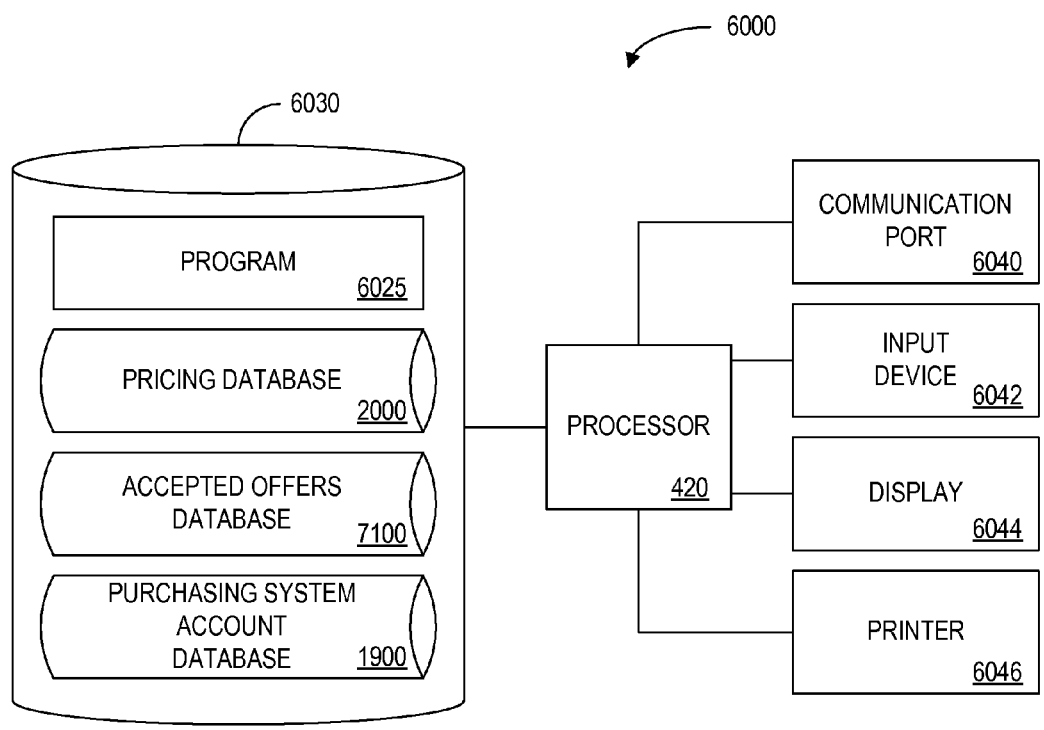
FIG. 60 is a block schematic diagram of a retailer device according to an embodiment of the present invention.

FIG. 60 is a block schematic diagram of a retailer device 6000 according to an embodiment of the present invention. The retailer device 6000 includes a processor 6020 (e.g., one or more Pentium® computers) coupled to: a communication port 6040 (which may be used to communicate through a communication network, not shown in FIG. 60); an input device 6042 (such as a keyboard, a mouse, a touch screen, an entry pad, a bar code reader, a magnetic stripe reader and a smart card reader); a display 6044 (such as a monitor or alphanumeric display); and a printer 6046 (such as a printer capable of printing a receipt or coupon). The processor 6020 is also coupled to a storage device 6030 that stores a program 6025 containing instructions adapted to be executed by the processor 6020 to perform at least one embodiment of the present invention.

The processor 6020 of the retailer device 6000 may also communicate with a POS controller and/or a number of POS terminals (not shown in FIG. 60). In another embodiment, the retailer device 6000 itself may be a POS controller or a POS terminal.

As shown in FIG. 60, the storage device 6030 also contains a pricing database 2000 (described in detail with respect to FIG. 20); an accepted offers database 7100 (described in detail with respect to FIG. 71); and a purchasing system account database 7200 (described in detail with respect to FIG. 72).

The accepted offers database 7100 may include, for example, buyer offers made through the purchasing system that have been accepted. The purchasing system account database 7200 may include, for example, an amount of payment expected in exchange for providing a product to a buyer. The pricing database 2000 may include, for example: the products the retailer will provide to buyers that purchase the product through the purchasing system; a retail price for each of those products; and a settlement price for each of those products. The settlement price may be used, for example, to determine the amount of payment the retailer expects from the purchasing system in exchange for providing a product to a buyer. If the retailer is the seller that accepted a buyer offer, the settlement price may not be needed.

In addition, a retailer that participates in the purchasing system as both a seller and a product provider may need to determine, when a given product is being provided to a buyer, whether or not the retailer is acting as the seller. This may be done using a database or by communicating with the purchasing system device 5900. For example, a retailer may both: (i) sell a particular television through a purchasing system; and (ii) let buyers, who purchased the television through the purchasing system from a different seller, take possession of the television at the retailer's store. In this case, when a buyer visits the retailer to take possession of a product, it must be determined whether the retailer should receive from the purchasing system: (i) a seller price (which may be equal to or based on the first price established by the buyer through the purchasing system); (ii) the buyer price (if the retailer, acting as a seller, sold the television to the buyer through the purchasing system); or (iii) the settlement price (if the retailer is merely letting the buyer take possession of the television at the retailer's store).

Seller Device

Figure 61:
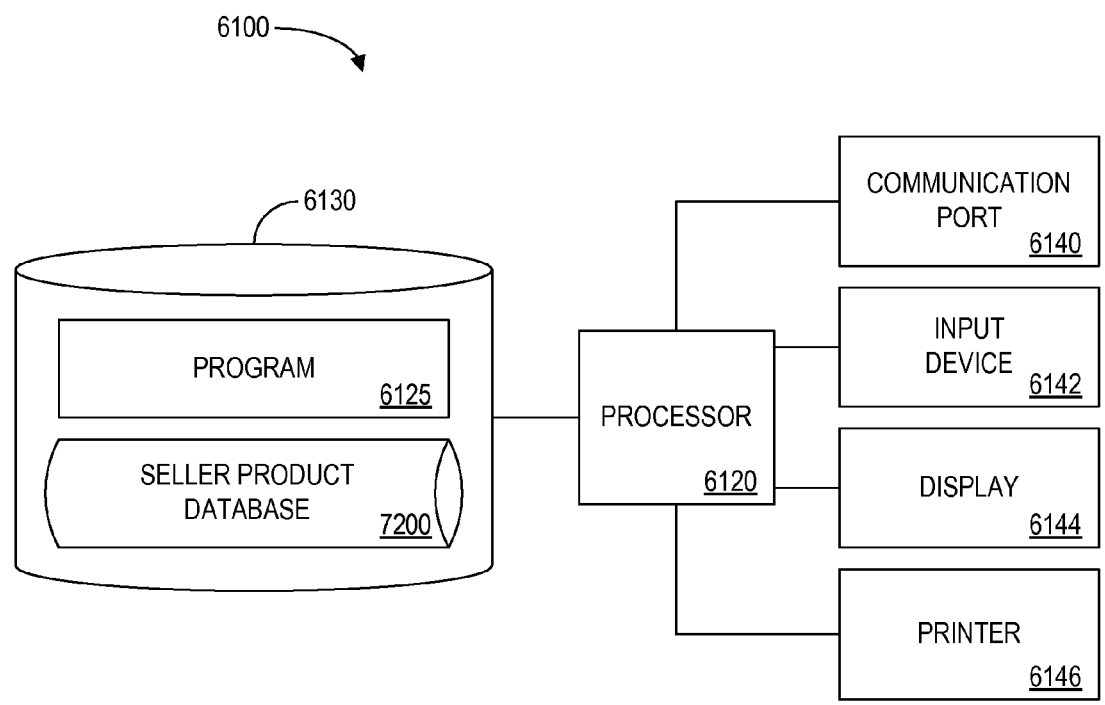
FIG. 61 is a block schematic diagram of a seller device according to an embodiment of the present invention.

FIG. 61 is a block schematic diagram of a seller device 6100 according to an embodiment of the present invention. The seller device 6100 includes a processor 6120 (such as one or more Pentium® processors) coupled to: a communication port 6140 (which may be configured to communicate through a communication network, not shown in FIG. 61); an input device 6142 (such as a keyboard or mouse); a display 6144 (such as a monitor); and a printer 6146 (such as a laser printer). The processor 6120 is also coupled to a storage device 6130 that stores a program 6125 containing instructions adapted to be executed by the processor 6120 to perform at least one embodiment of the present invention.

The seller device 6100 communicates with the purchasing system device 5900 using the communication port 6140, for example, to send information to be added to the product database 6300. The information may include, for example: (i) what products the seller wants sold through the purchasing system; (ii) the settlement price that the seller is willing to accept for each of the products (if the seller is the retailer); (iii) in one embodiment, the quantity of a product that is available for sale through the purchasing system and/or the region in which the product or quantity of the product is available; and (iv) a minimum acceptable price (e.g., when the seller is a product manufacturer). The seller device 6100 may receive such data from the seller's personnel via the input device 6142. Alternatively, the seller device 6100 may, based on a program or subroutine, determine: (i) what products to offer for sale through the purchasing system; (ii) the settlement prices for those products; and (iii) the quantity and regions of availability of the products. The seller device 6100 may make such a determination based on, for example, the seller's current inventory and revenue management rules or predetermined rules input by the seller's personnel. Note that the seller may determine which products to offer a subsidy amount for based on current or predicted sales or other market conditions (e.g., a new model being introduced). The seller may also indicate subsidy information on a transaction basis (e.g., how much of a subsidy the seller is willing to provide for each product sold through the purchasing system) and/or on a product basis (e.g., a maximum amount the seller is willing to provide across a number of products sold).

The seller device 6100 additionally receives data from the purchasing system device 5900 through the communication port 6140. The received data may include: (i) the amount of payment owed by (or due to) the seller for products sold through the purchasing system; and (ii) reports regarding the demand for products and prices offered for the products from buyers using the purchasing system device 5900. Such data may be provided to the seller's personnel on the display 6144 or reports printed out with the printer 6146.

As shown in FIG. 61, the storage device 6130 also contains a seller product database 7200 (described in detail with respect to FIG. 72), which may identify the products available for sale through the purchasing system device 5900. The seller device 6100 may also store the "collected demand" for products (or for product descriptions that match the seller's products) directly as buyer offers are received from the purchasing system device 5900. For example, the purchasing system device 5900 may have 100 outstanding offers for a particular television model at a certain average price. While a seller may not wish to sell a single television at that price, it may agree to do so because the sale will involve 100 televisions (and therefore provide sufficient profit).

According to one embodiment of the present invention, when a buyer offer is received by the seller device 6100, the seller device 6100 queries the seller product database 7200 to determine, for example, whether: (i) there is a record whose product description successfully fulfills the product specified in the buyer's offer; and (ii) the offer price is at least equal to minimum acceptable price for that product. If the query results in a product that fulfills the buyer's offer, the seller accepts the offer and transmits the acceptance to the purchasing system device 5900.

A seller may add inventory to the seller product database 7200 database: (i) automatically, for example, based on market conditions, such as the seller's current inventory or sales data (e.g., how many units of a particular product have sold within a predefined time period); or (ii) manually, on an ad hoc basis (e.g., based on current sales and inventory or on what the seller currently wishes to promote). According to one embodiment, when inventory of a product remains essentially stagnant for a predefined amount of time (i.e., the product is not selling well), the product is automatically made available to the purchasing system or the minimum acceptable price associated with that product may be reduced (such as by 10%).

Note that in the case where the retailer is the seller, the seller device 6100 and the retailer device may be the same device, and the storage device 6130 may contain the databases shown both in FIGS. 4 and 5. In other words, the functions of the seller device 6100 and the retailer device 6000 may be combined into one device or divided amongst the seller devices 6100 and retailer devices 6000 in ways other than described herein.

Credit Card Processing System Device

Figure 62:
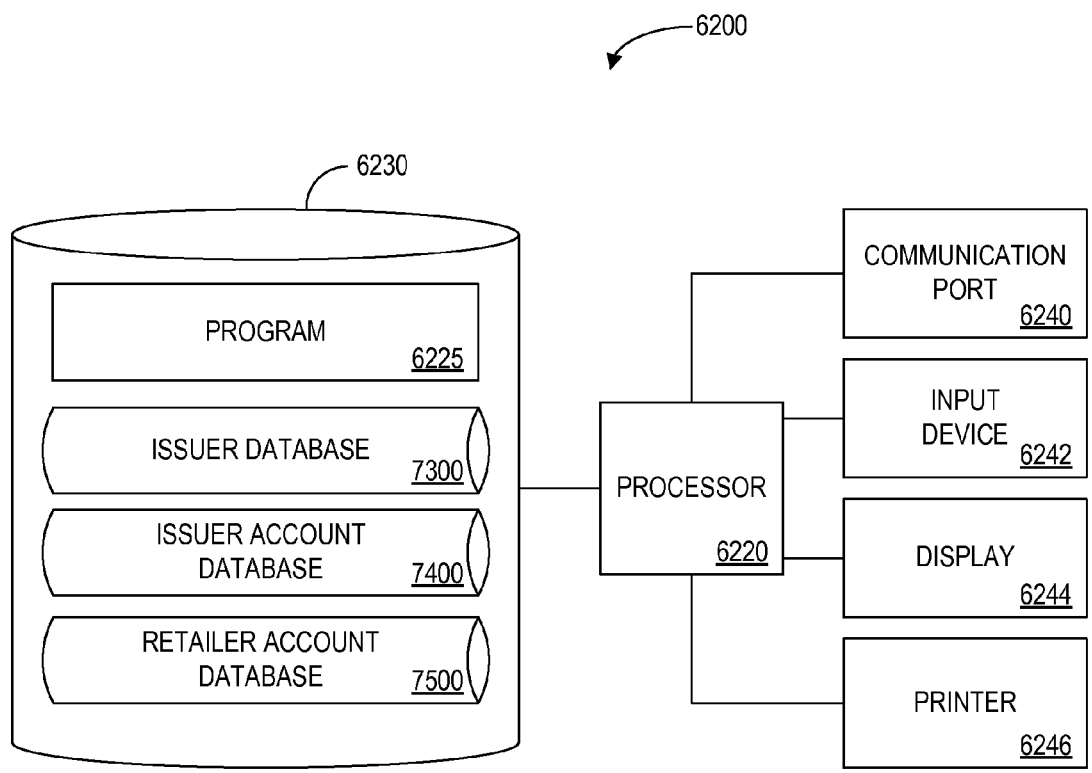
FIG. 62 is a block schematic diagram of a credit card processing system device according to an embodiment of the present invention.

FIG. 62 is a block schematic diagram of a credit card processing system device 6200 according to one embodiment of the present invention. The credit card processing system device 6200 includes a processor 6220 (such as one or more Pentium® processors) coupled to: a communication port 6240 (which may be configured to communicate through a communication network, not shown in FIG. 62); an input device 6242 (e.g., a keyboard and mouse); a display 6244 (e.g., a monitor); and a printer 6246. The processor 6220 is also coupled to a storage device 6230 that stores a program 6225 containing instructions adapted to be executed by the processor 6220 to perform at least one embodiment of the present invention.

The credit card processing system device 6200 communicates with the purchasing system device 5900 and the retailer device 6000 using the communication port 6140.

As shown in FIG. 62, the storage device 6230 also contains an issuer database 7300 (described in detail with respect to FIG. 73); an issuer account database 7400 (described in detail with respect to FIG. 74); and a retailer account database 7500 (described in detail with respect to FIG. 75).

One embodiment of the present invention is directed to the use of a pseudo payment identifier, such as a pseudo credit card number, as a redemption code. In the conventional credit card market, each credit card issuer is assigned a unique four digit identifier. When a customer uses a credit card at a retailer, the retailer transmits the customer's account number (a sixteen digit number) to the credit card issuer through a CAT to authorize the purchase. The retailer authorizes: (i) that the customer has an account with the issuer that is in good standing (e.g., the card has not been reported stolen); and (ii) there is enough available funds in the account to cover the present purchase. The retailer sends the purchase amount, the credit card number, and the retailer identifier along with the request for authorization. The request for authorization is transmitted to a credit card processing system that determines the issuer of the credit card account (using the first four digits of the account number), and, in many cases, forwards the request for authorization to the appropriate issuer. The issuer checks the account, based on the account number received, and sends an approval or denial signal to the credit card processing system, which forwards the signal to the retailer. If the transaction is approved, the issuer may also place a "freeze" on the amount of funds in the customer's account equal to the transmitted purchase amount. As used here, a freeze is any pre-authorization of a charge that will be made to the buyer's account at a later time.

Note that the customer's account has not been actually charged at this point. Subsequently, on a periodic basis (e.g. once per night or week), the retailer sends a Record of Charge (ROC) to the credit card processing system, which transmits the ROC to the appropriate issuer for collection of funds. The credit card processing system transmits the funds received from the issuer to the retailer, and the issuer charges the appropriate customer accounts for the appropriate amounts, based on the received ROC. That is, the freeze or authorization for the purchase amount is removed from the account and replaced with an actual charge. The actual charge may be less than the authorized amount (e.g., the retailer may have authorized more than the actual purchase amount).

Note that the participating retailers may not have a direct (e.g., Internet) connection to the purchasing system. According to one embodiment of the present invention, the retailer uses the credit card networks and methods described above to authorize a redemption code.

For example, the purchasing system may register with the credit card processing system as an issuer, and be assigned a unique four digit code. The purchasing system then issues redemption codes that are in the format of a conventional sixteen digit credit card account code, with the first four digits identifying the purchasing system. When a customer arrives at a retailer to take possession of a product, the retailer enters the redemption code into the CAT as if it was a conventional credit card account number. The retailer transmit the redemption code and an appropriated retailer identifier to a credit card processing system. The credit card processing system recognizes that the purchasing system is the "issuer" of the card (by the first four digits of the redemption code) and transmits a request for authorization to the purchasing system, including the redemption code and the retailer identifier. The purchasing system retrieves the buyer's record, based on the received redemption code, and checks to see whether the redemption code is valid (e.g. has been issued but not yet redeemed), and that the received retailer identifier identifies one of the retailer identifiers stored in association with the redemption code. If so, the purchasing system marks the redemption code as "redeemed" and transmits an approval, or authorization, signal to the credit card processing system, which then forwards it to the retailer. When the retailer receives the authorization, the buyer is authorized to take possession of the product. The retailer may also store the redemption code, product identifier, and other transaction data for subsequent settlement with the purchasing system.

According to another embodiment of the present invention, the retailer treats the purchasing system voucher as a ROC. That is, the retailer periodically sends redeemed purchasing system vouchers to the credit card processing system for collection of funds. The credit card processing system forwards both conventional ROCs and purchasing system vouchers to the appropriate issuer as indicated by account identifiers. Accordingly, the credit card processing system forwards the purchasing system vouchers to the purchasing system.

When the purchasing system receives a voucher, it charges the buyer's account as appropriate. According to one embodiment, the purchasing system freezes the funds in the buyer's account upon accepting the buyer's offer and does not charge the account until it receives the voucher from the retailer. Alternatively, the purchasing system charges the buyer's account: (i) when the buyer's offer is approved; or (ii) when the request for authorization is received from a retailer. The purchasing system transfers the appropriate amount of funds to the retailer (e.g. the total of the settlement prices for the products included on the received vouchers). If necessary, the purchasing system may also collect or transmit funds to the manufacturer at this time.

Note that a retailer may want to determine the validity of a voucher at the POS to prevent fraudulent use, such as over-redemption of a voucher, by unscrupulous buyers. For example, consider a buyer who establishes a $200 price with a manufacturer for a television. A hold is put on the buyer's credit card for $200, and a voucher for the television is issued to the buyer. The buyer prints out three copies of the voucher and redeems all three at various retailers, and each of the retailer settles with the purchasing system device 5900 off-line or through a back channel at the end of the day. The purchasing system device 5900 determines that it now owes the retailers an additional $400 (for the two additional, unauthorized transactions). However, the purchasing system device 5900 may find that the additional $400 charge cannot be authorized because the buyer is over his or her credit limit. One advantage of the embodiments of the present invention that utilize the banking network to verify redemption codes is that a retailer can verify a redemption code at the POS without additional equipment other than what the retailer typically uses in conventional transactions. According to this embodiment, the retailer may communicate with the purchasing system device 5900 at the time of redemption over the existing banking network using a CAT that is typically connected to each POS at the retailer. Of course, the retailer may instead communicate directly with the purchasing system at the time of redemption through other networks, such as the Internet. Note also that each issued and outstanding pseudo credit card number redemption code may be associated with a unique transaction, and, according to one embodiment of the present invention, the purchasing system device 5900 tracks available pseudo credit card numbers. In another embodiment, a printed voucher may include: (i) the issued redemption code in the format of a payment number; (ii) the product identifier and description; and (iii) the retailers at which the redemption code is redeemable. Note that a redemption code may be associated with either a single retailer or a number of retailers.

Product Database

As will now be described, FIG. 63 is a tabular representation of a portion of a product database 6300 that may be stored at the purchasing system device 5900 (as described with respect to FIG. 59) according to an embodiment of the present invention. The table 6300 includes entries defining products that may be sold through the purchasing system. The table 6300 also defines fields 6302, 6304, 6306, 6308 for each of the entries. The fields specify: a product identifier 6302; a minimum acceptable price 6304; a seller identifier 6306; and a retailer identifier 6308. Those skilled in the art will understand that the table 6300 (as well as the other tables discussed herein) may include any number of entries and fields and data arrangements other than that described with respect to FIG. 63 (as well as described with respect to the other FIGS. included herein).

The product identifier 6302 may be, for example, an alphanumeric field that uniquely identifies each product available through the purchasing system. The product identifier 6302 may identify a specific product (e.g., a particular television), a specific type of product (e.g., a particular product manufacturer and model number), or a plurality of products that fulfill a product requirement (e.g., televisions with 25" to 27" screens).

The minimum acceptable price 6304 is the amount below which the product will not be sold. The minimum acceptable price 6304 may be set by the seller or by the purchasing system, based on, for example, the settlement price and a subsidy amount provided by the seller. The minimum acceptable price may be used, for example, by a product manufacturer to protect against brand name dilution.

The seller identifier 6306 may be, for example, an alphanumeric field that uniquely identifies the seller of the product, and the retailer identifier 6308 may be an alphanumeric field that uniquely identifies one or more retailers at which a buyer can take possession of the product associated with the product identifier 6302. The retailer identifier 6308, which may be provided by the seller, can represent retail stores at which a product is usually available. The retailer identifier may, for example, identify a particular retailer store (e.g., based on retailer name and address) or may identify a chain of sores (e.g., just name, regardless of address). The purchasing system may also generate this list by asking a retail store which products are available at that store. The list could also be based on, for example, the product category (e.g., televisions should be available at a consumer electronics superstore) or historical inventory patterns and trends of known retailers. The list could be based on which retailers have agreed to let purchasing system buyers take possession of the product (corresponding to the product identifier) in exchange for a settlement price. The list could further include retailers who have agreed to act as sellers of the corresponding product. For example, product "132-01" can be obtained at any of the five retailers listed in the retailer identifier 6308 (i.e., in the first two records).

According to another embodiment of the present invention, the seller (e.g., the product manufacturer) may also provide a subsidy amount (not shown in FIG. 63). Note that both the purchasing system and the manufacturer may have a minimum acceptable price associated with a product. In this case, both prices may be stored or only the higher of the two prices may be stored.

It should be noted that some products may be picked up at one of several retailers, as indicated by the multiple entries in the retailer identifier field 6308. However, if the retailer is the seller, the retailer identifier field may only contain a single entry for that retailer (as shown in the second entry in the table 6300).

It should be noted that product "P132-01" has two different associated minimum selling prices, one associated with a retailer seller and one associated with a manufacturer seller (as shown in by the first two entries in the table 6300). If the purchasing system generates revenue from the margin between the buyer's price and the settlement price, a buyer offer may be accepted using the lowest possible minimum acceptable price 6304. Considering product "P132-01", for example, if a buyer names a price of $200 and one seller has an associated minimum acceptable price 6304 of $110 and another seller has a minimum acceptable price 6304 of $190, the purchasing system may accept the buyer offer using the seller with the $110 minimum selling price, because that may increase the purchasing system's profit.

The minimum acceptable price 6304 may be set by the purchasing system in another embodiment of the present invention based on, for example, the settlement price(s) associated with the product and any subsidy amounts associated with the product. For example, a product having a settlement price of $200 and a subsidy amount of $20 may be assigned a minimum acceptable price 6304 of $220.

Subsidy Database

Referring to FIG. 64, a table 6400 represents an embodiment of the subsidy database that may be stored at the purchasing system device 5900 (FIG. 59). The table 6400 includes entries defining products that may be sold through the purchasing system. The table 6400 also defines fields 6402, 6404, 6406 for each of the entries. The fields specify: a product identifier 6402; a subsidy amount 6404; and a seller identifier 6406.

In addition to the product identifier 6402 (which may be based on, or similar to, the product identifier 6302 described with respect to FIG. 63) and the seller identifier 6406 (which may be based on, or similar to, the seller identifier 6306 described with respect to FIG. 63), the table 6400 includes the subsidy amount 6404 the seller is willing to provide to the purchasing system to subsidize a buyer's purchase of the product. For example, the seller "S13204" shown in FIG. 64 will provide $50 towards a buyer's purchase of a product with the identifier of "P132-01."

Note that a product may be available from different sellers who provide different subsidy amounts. Note also that a seller may in fact offer no subsidy amount for a product. In this case, the product/seller may not be stored in the subsidy database—or may be stored with a subsidy amount 6404 of "$0." The seller may also, according to one embodiment of the present invention, provide a maximum subsidy amount per period of time (e.g., $50 per purchase up to $5,000 per month). This information could be tracked by the purchasing system device 5900.

According to one embodiment of the present invention, the purchasing system may not need to use all of a subsidy amount (including a subsidy amount from a seller or a third party subsidy amount) to arrange for a buyer to purchase a product. In this case, the portion of the subsidy amount that is not needed may be, for example, kept by the purchasing system (e.g., for an additional profit) or provided to the buyer. According to another embodiment, the portion of the subsidy amount that is not needed for the present transaction may be placed into an account associated with the buyer. In this way, the buyer may be allowed to use this extra amount to subsidize another purchase made through the purchasing system.

Note also that a seller may set a minimum acceptable price (e.g., to prevent name brand dilution) and yet still agree to provide subsidies toward purchases of the product to increase sales volume.

Settlement Price Database

Referring to FIG. 65, a table 6500 represents an embodiment of the settlement price database that may be stored at the purchasing system device 5900 (FIG. 59). The table 6500 includes entries defining products that may be sold through the purchasing system. The table 6500 also defines fields 6502, 6504, 6506 for each of the entries. The fields specify: a product identifier 6502; a retailer identifier 6504; and a settlement price 6506.

In addition to the product identifier 6502 (which may correspond to, be based on, or similar to, the product identifier 6302 described with respect to FIG. 63), the table 6500 includes the retailer identifier 6504 which uniquely identifies a retailer at which the product is, or should be, available and a settlement price 6506 representing the amount that must be provided to the retailer in exchange for providing the corresponding product to the buyer. For example, $150 must be provided to the retailer "R218-99" shown in FIG. 65 in exchange for providing a product with the identifier of "P132-01" to a buyer. Note that a product may be available from different retailers who require different settlement prices.

According to an embodiment of the present invention, the purchasing system device 5900 uses this database to determine the amount of payment to be provided to the retailer at which a buyer took possession of a product. In other embodiments, this database may be used by the purchasing system device 5900 to select retailers, such as to determine the lowest settlement price associated with a product. For example, if a buyer offer price of $175 was accepted by the manufacturer and retailer A has an agreement to receive $200 for the offered product, while retailer B has an agreement to receive $210, the purchasing system device 5900 may determine that the buyer may only take possession of the product at retailer A to minimize the loss to the manufacturer—and possibly to boost revenue earned by the purchasing system for its role as a transaction facilitator.

Note that in addition to an arrangement between the retailer and the purchasing system to specify, for example, a product and the settlement price, the retailer may also have an arrangement directly with a product manufacturer. An arrangement between a retailer and a manufacturer may specify an additional subsidy amount that the manufacturer will provide to the retailer for one or more of the manufacturer's products. This, of course, could result in the retailer agreeing to accept a lower settlement price from the purchasing system.

By way of example, consider a retailer that typically sells a particular manufacturer and model television for a retail price of $200. The retailer can enter into an agreement with the purchasing system to honor vouchers for that television in exchange for a settlement price of $180. The retailer might agree to accept $180 to increase sales, or potential sales, from buyers sent to store by the purchasing system.

The retailer may also make an agreement with the television manufacturer to receive $10 for each television provided to a buyer when a redemption code is redeemed. The manufacturer may, for example, provide such a subsidy to encourage the retailer to agree to a lower settlement price with the purchasing system—increasing the likelihood that the television will be sold through the purchasing system device 5900. Note that the settlement price does not need to be less than the retail price, and the manufacturer could provide a subsidy directly to the purchasing system instead of, or in addition to, the retailer.

FIG. 66 illustrates the first record 6350 from the product database 6300, the first record 6450 from the subsidy database 6400, and the first four records 6550 from the settlement price database 6500, to illustrate how a minimum acceptable price may be calculated by the purchasing system device 5900.

As shown in the subsidy database record 6450, the subsidy amount for the product "P132-01" is $50. As shown in the product database records 6550, the settlement prices from various retailers for this product are $150, $145, $160, and $150. Thus, the highest settlement price the purchasing system may have to provide to a retailer for the product is $160. If a buyer takes possession of the product at retailer "R084-34," the purchasing system may need $110 from the buyer to break even on the sale (i.e., $110 from the buyer+$50 subsidy from the manufacturer=$160, which is the settlement price for retailer "R084-34"). Accordingly, the purchasing system device 5900 set the minimum acceptable price at $110 as shown in the product database record 6350. If the buyer takes possession of the product at retailer "R218-99," "R982-19" or "R753-93," the purchasing system would derive a profit of $10, $15, and $10, respectively (assuming the purchasing system keeps the difference).

According to one embodiment of the present invention, the purchasing system only collects an amount required to break even on the transaction (although a separate commission fee may be charged). Thus, the purchasing system may not collect the entire subsidy amount available form the seller, but instead collect only as much as the purchasing system needs to avoid a loss. In other words, the subsidy amount may be a maximum subsidy amount that the purchasing system may collect.

The purchasing system may even determine that a loss is acceptable on some transactions, and thus lower the minimum acceptable price. The purchasing system may, for example, determine the minimum acceptable price based on an average or lowest settlement price.

Retailer Database

Referring to FIG. 67, a table 6700 represents an embodiment of the retailer database that may be stored at the purchasing system device 5900 (FIG. 59). The table 6700 includes entries defining a particular retailer at which a buyer make take possession of a product purchased through the purchasing system. The table 6700 also defines fields 6702, 6704, 6706, 6708 for each of the entries. The fields specify: a retailer identifier 6702; a retailer name 6704; a retailer type 6706; and a retailer address 6708.

The retailer database 6700 may be used by the purchasing system device 5900 to retrieve information about a retailer. In particular, the retailer database 6700 may store identifiers and contact information of retailers, as well as the retailer type 6706 reflecting whether only a single store (as opposed to or all stores) in a chain participate in the purchasing system program. According to another embodiment of the present invention, instead of indicating which individual stores in a chain participate, the retailer database 6700 may store an indication which stores in a chain do not participate, or store a separate table of all available stores in a chain.

The purchasing system device 5900 can use this database, for example, to retrieve retailer contact information to be printed on the voucher. The information may be also used to determine if a retailer is close enough to a buyer to be included on the voucher, using algorithms which are well known in the art.

Seller Database

In one or more embodiments, the purchasing system device 5900 may store in memory 5930 a seller database, such as seller database 1000 illustrated in FIG. 10A. The purchasing system device 5900 may use the seller database 1000 to determine the seller type (i.e., whether the seller is a manufacturer or a retailer) and other information pertaining to a seller (such as the seller address for offer routing purposes or billing).

The seller database 1000 may be used, for example, to determine whether a number of settlement prices (in the case of a manufacturer seller type) or a single price (associated with a retailer seller type) should be used when determining whether or not a buyer offer will be accepted. In addition, when the purchasing system authorizes a retailer to provide a product to a buyer, this database may be used to determine whether or not the seller is the retailer (such as by using the seller type 1030). In the case of a seller other than the retailer, the settlement price is provided to the retailer. On the other hand, when the retailer also acted as the seller, a seller price (which may be based on, or equal to, the first price) may instead be provided to the retailer. If the seller was a retailer—but not the same retailer at which the buyer took possession of the product—the settlement price may still be provided to the retailer at which the buyer took possession of the product.

Accepted Offer Database (Stored at Purchasing System Device)

Referring to FIGS. 68A and 68B, a table 6800 represents an embodiment of the accepted offer database 6800 that may be stored at the purchasing system device 5900 (FIG. 59). The table 6800 includes entries defining a transaction (i.e., a buyer's purchase of a product through the purchasing system). The table 6800 also defines fields 6801, 6802, 6804, 6806, 6808, 6810, 6812, 6814, 6816, 6817, 6818, 6820, 6822, 6824 for each of the entries. The fields specify: an offer identifier 6801; a redemption code 6802; a buyer name 6804; a buyer e-mail address 6806; a buyer postal address 6808; a buyer's price 6810; an offer status 6812; a seller identifier 6814; an authorized retailer identifier 6816; a redemption retailer identifier 6817; a product identifier 6818; an authorized amount 6820; a charged amount 6822; and a payment identifier 6824.

When a buyer offer is accepted by a seller, or fulfilled by the purchasing system, the purchasing system device 5900 may communicate the acceptance to the appropriate buyer device 5800 and store the details of the accepted offer in the accepted offer database 6800. For example, the offer identifier 6801, the redemption code 6802, the buyer name 6804, the buyer e-mail address 6806, the buyer postal address 6808, the buyer's price 6810, the seller identifier 6814, the authorized retailer identifier 6816, the product identifier 6818 and the payment identifier 6824 may all be stored at this time. In addition, the offer status 6812 may be updated at this time (e.g., to "accepted").

The purchasing system device 5900 may then collect payment from the buyer, such as by using the payment identifier 6824. For example, a hold may be immediately placed on the buyer's funds (e.g., authorizing a credit line of the credit card account) for the offer price and the amount authorized 6820. The buyer's account may not actually be charged, as reflected in the charged amount 6822, until the buyer takes possession of the product. The purchasing system device 5900 may instead charge the buyer's account when the offer is accepted, if desired.

It should be noted that the amount of funds charged or put on hold (i.e., authorized or "frozen") may be greater than the offer price. For example, an expected sales tax, such as a tax based on the buyer's home address, may be added to the offer price. In addition, the amount of frozen funds may be greater than offer price to account for unforeseen circumstances that may subsequently occur. For example, a penalty may be imposed on the buyer if the buyer does not take possession of the product by a certain date or within a predetermined period of time. The amount of the penalty, in this case, may be based on a cost associated with shipping the product to the buyer.

As a result, in one embodiment of the present invention, if the purchasing system device 5900 charges the buyer's account when the offer is accepted, the charged amount 6822 may not be correct based on the actual redemption conditions of the transaction at the retailer. For example, the retailer may determine that the buyer has waited too long to take possession of the product and a penalty amount needs to be assessed to the buyer. In this case, the purchasing system device 5900 may place an additional charge on the buyer's account to correct the amount.

In another example, the buyer may arrive at the retailer to take possession of a product purchased through the purchasing system only to realize that the retailer is currently offering the product at a clearance price below the first price (e.g., the price the buyer agreed to pay for the product through the purchasing system). The purchasing system may have not been aware of the retailer's plans to offer the product at the clearance price which the first price was established with the buyer. In such a case, the purchasing system may determine the difference between the clearance price and the first price and refund the buyer the difference (plus any resulting difference in the sales tax). The settlement system may provide such a refund to the customer by placing a credit equal to the difference (and any difference in sales tax) onto the buyer's financial account that was originally charged for the purchase.

If any penalty is imposed on the buyer the penalty amount could be disbursed to, for example: (i) the settlement system; (ii) the retailer at which the buyer takes possession of the product; (iii) the retails at which the buyer could have taken possession of the product; (iv) the seller (e.g., a product manufacturer); or (v) any combination thereof.

According to an embodiment of the present invention, collecting payment (based on the actual redemption conditions) may comprise charging the offer price using the payment identifier 6824 (e.g., associated with a credit card account, debit account, checking account or electronic currency protocol) provided with the buyer offer. According to another embodiment, the appropriate amount is charged to a financial account provided by the buyer at the retailer (which may be different from the payment identifier stored in this database) when the buyer takes possession of the product.

Note that when a buyer goes to a retailer to take possession of a product, it is possible that he or she will find that the retailer's in-store price is less than the price arranged with the purchasing system (e.g., the item may be on sale). In this case, the purchasing system can guarantee, if desired, the buyer that he or she will be charged the lower of the two prices. Thus, the purchasing system device 5900 may compare the product's retail price at the time of redemption with the buyer's price, and make sure that the buyer's financial account is only charged the lower of the two prices. In the case where the buyer was charged for the product at the time the sale was arranged with the purchasing system, the purchasing system may credit the difference back to the buyer's account.

Additionally, the purchasing system device 5900 may distribute payment, such as by using an Electronic Fund Transfer (EFT) transaction, to the retailer that provided the product to the buyer (i.e., one of the retailers listed in the authorized retailer identifier 6816) when the purchasing system receives an indication that the buyer has taken possession of the product. If the buyer offer was accepted by a seller (besides the retailer), the purchasing system device 5900 can also collect any payment necessary (e.g., a subsidy from the manufacturer). For example, this may be the case when the amount paid to the retailer by the purchasing system exceeds the buyer's price 6810.

The purchasing system device 5900 might also collect an additional payment from the seller as a "commission fee" for handling the offer. Such a commission fee could, of course, comprise a fixed percentage of the buyer price (or seller, settlement or retail price) and/or a flat fee.

The purchasing system device 5900 may also track the fulfillment, acceptance, and redemption of buyer offers. According to the present invention, the purchasing system device 5900 collects and disburses payment for products sold through the system as appropriate. For example, the purchasing system device 5900 may: (i) collect payment from a buyer when the buyer's offer is fulfilled by a seller; (ii) disburse payment for the product to the retailer at which the redemption code is redeemed; and (iii) collect a commission fee from the seller that accepted the buyer's offer.

Because a particular redemption code may be redeemable at several retailers, the disbursement of payment may be finalized once the buyer takes possession of the product at a local retailer. That is, when the purchasing system device 5900 determines that the buyer has taken possession of the product (e.g., a retailer notifies the purchasing system device 5900, either in substantially real time or periodically, of the redemption codes that have been redeemed in their stores), the collection and disbursement of funds between the appropriate parties is finalized and the offer status 6812 is updated as appropriate (e.g., to "redeemed" for the redemption code 6802).

Note that, as illustrated in FIGS. 68A and 68B, the buyer's price 6810 (e.g., the price the buyer established when arranging to purchase the product to the purchasing system) may be different than the authorized amount 6820. For example, the transaction having an offer identifier 6801 of "O332-001" involved a buyer's price of $300 and an authorized amount of $330. The extra $30 may act as a cushion against conditions, unforeseen at the time the buyer established the price, that may exist when the buyer takes possession of the product (e.g., the an unexpected tax amount). Similarly, the charged amount 6822 of $319.50 may be yet another amount, based on the conditions that actually existed when the buyer took possession of the product. Note that, in the embodiment where the buyer is charged at the time of acceptance of a buyer offer, instead of an "authorized amount" and "charged amount" an "initial charged amount" and "final charged amount" may be stored instead.

Retailer Account Database (Stored at Purchasing System)

Referring to FIG. 69, a table 6900 represents an embodiment of the retailer account database that may be stored at the purchasing system device 5900 (FIG. 59). The table 6900 includes entries defining a retailer at which a buyer may take possession of a product purchased through the purchasing system. The table 6900 also defines fields 6902, 6904, 6906, 6908, 6910, 6912 for each of the entries. The fields specify: a retailer identifier 6902; a total paid by, to date 6904; a total paid to, to date 6906; a current amount owed by 6908; a current amount due to 6910; and a last billing date 6912.

The retailer account database 6900 may be used by the purchasing system device 5900 to track how much has been paid by 6904 the corresponding retailer to the purchasing system, to date, and how much has been paid to 6906 the corresponding retailer from the purchasing system, to date. For example, the retailer having a retailer identifier 6902 of "R192-05" has paid a total of $53,250 to the purchasing system "to date" (e.g., since participating in the purchasing system or the beginning of the current financial year). Moreover, the purchasing system has paid a total of $73,900 to that retailer during this time.

The retailer account database 6900 may also be used to track how much is currently owed by 6908 the corresponding retailer to the purchasing system in relation to the last billing date 6912. This amount may be computed, for example, by totaling the amounts related to each completed purchasing system transaction involving that retailer. Likewise, the retailer account database 6900 may be used to track how much is due to 6910 the corresponding retailer from the purchasing system in relation to the last billing date 6912. Of course, the current amount owed by 6908 and current amount due to 6910 may be associated with different last billing dates, if appropriate. The last billing date 6912 may reflect, for example, monthly, weekly or hourly billing.

In general, the purchasing system device 5900 tracks the total of settlement prices for redeemed redemption codes or buyer prices with respect to each retailer (for those transactions where the retailer is the seller). Note that an account with a retailer may instead be settled on a per-transaction basis when the buyer takes possession of the product (e.g., in substantially real time).

Note that instead of having, for example, both the current amount owed by 6908 and a current amount due to 6910 amounts, the purchasing system may instead simply track a "settlement amount" for each retailer that reflects, for example, a positive value when money is due to the retailer and a negative value when money is due to the purchasing system.

Seller Account Database

Referring to FIG. 70, a table 7000 represents an embodiment of the seller account database that may be stored at the purchasing system device 5900 (FIG. 59). The table 7000 includes entries defining a seller that may sell a product to a buyer through the purchasing system. The table 7000 also defines fields 6902, 6904, 6906, 6908, 6910, 6912 for each of the entries. The fields specify: a seller identifier 7002; a total paid by, to date 7004; a total paid to, to date 7006; a current amount owed by 7008; a current amount due to 7010; and a last billing date 7012.

The seller account database 7000 may be used by the purchasing system device 5900 to track how much has been paid by 7004 the corresponding seller to the purchasing system, to date, and how much has been paid to 7006 the corresponding seller from the purchasing system, to date. For example, the seller having a seller identifier 7002 of "S23456" has paid a total of $567,890 to the purchasing system "to date" (e.g., since participating in the purchasing system or the beginning of the current financial year). Moreover, the purchasing system has paid a total of $55,670 to that seller during this time.

The seller account database 7000 may also be used to track how much is currently owed by 7008 the corresponding retailer to the purchasing system in relation to the last billing date 7012. This amount may be computed, for example, by totaling the amounts related to each completed purchasing system transaction involving that seller. Likewise, the seller account database 7000 may be used to track how much is due to 7010 the corresponding seller from the purchasing system in relation to the last billing date 7012. Of course, the current amount owed by 7008 and current amount due to 7010 may be associated with different last billing dates, if appropriate. The last billing date 7012 may reflect, for example, monthly, weekly or hourly billing.

In general, the purchasing system device 5900 tracks the total of seller amounts for redeemed redemption codes. Note that an account with a seller may instead be settled on a per-transaction basis when the buyer takes possession of the product (e.g., in substantially real time).

Pricing Database

In one or more embodiments, the retailer device 6000 may store a pricing database such as the pricing database 2000 (FIG. 20). The pricing database 2000 may be used by the retailer device 6000 to determine the retail price 2020 and the settlement price 2030 for each product. In general, the settlement price may 2030 be less than, equal to, or more than the retail price 2020 for a product. The settlement price 2030 may also be based on the retail price 2020 (i.e., 95% of the retail price for products having a retail price less than $100 and 90% for all other products). In this case, a separate settlement price field 2030 may not be needed or may instead be used to store a formula (e.g., settlement price=1.01× retail price).

The pricing database 2000 may be used by the retailer, for example, to determine the price to be charged to a typical buyer (i.e., the retail price 2020) and the price to be expected from the purchasing system in exchange for providing the product to a buyer when taking possession of a product (i.e., the settlement price 2030). Whether the retailer will receive the settlement price 2030 may also depend on whether the retailer is acting as the seller.

Accepted Offer Database (Stored at Retailer Device)

Referring to FIG. 71, a table 7100 represents an embodiment of the accepted offer database 7100 that may be stored at a retailer device 6000 (FIG. 60). The table 7100 includes entries defining accepted buyer offers wherein the retailer is the seller. The table 7100 also defines fields 7101, 7102, 7104, 7106, 7108 for each of the entries. The fields specify: an offer identifier 7101; a redemption code 7102; a product identifier 7104; a buyer's price 7106; and a status 7108.

Each time the retailer accepts a buyer's offer as a seller, the offer identifier 7101, the redemption code 7102, the product identifier 7104, and the buyer's price (e.g., "first price") 7106 are stored in this database. The status 7108 may also be set to "pending" at this time. The database 7100 may be populated directly by the purchasing system device 5900 (e.g., every time a buyer's offer is filled with the retailer as the seller or periodically on a batch basis). This may be accomplished, for example, by periodically taking a "snapshot" of the data (e.g., every 15 minutes) and storing the data regarding filled offers to accepted offer database 7100. According to another embodiment, purchasing system device 5900 may automatically e-mail the retailer device 6000 as needed with each newly accepted offer so that the retailer device 6000 can update this database.

The retailer may use this database, for example, when a redemption code is received from a buyer taking possession of a product using a purchasing system voucher. The retailer device 5900 creates a new record in the purchasing system account database 1900 (described with respect to FIG. 19) each time a purchasing system redemption code is redeemed. The retailer device then determines the amount owed by the purchasing system in exchange for honoring the voucher. If the retailer was the seller associated with a particular voucher, the amount provided to the retailer is based on the buyer's price. Thus, the retailer device 6000 checks the accepted offers database 7100 to determine whether the retailer has accepted the buyer's price associated with the redemption code of a given transaction. If not, the purchasing system provides the settlement price for the product to the retailer.

Purchasing System Account Database

In one or more embodiments, the retailer device 6000 (FIG. 60) may store a database of purchasing system accounts, such as purchasing system account database 1900 of FIG. 19. The retailer device 6000 may use this database to store information regarding each redeemed purchasing system redemption code. For example, the amounts stored in the payment expected field 1940 which have a corresponding payment status 1950 of "pending" may be totaled when the retailer sends a "bill" to the purchasing system for funds that are due to the retailer (e.g., directly or through a credit card processing system).

Seller Product Database

Referring to FIG. 72, a table 7200 represents an embodiment of the seller product database that may be stored at a seller device 6100 (FIG. 61). The table 7200 includes entries defining a product sold by the seller through the purchasing system. The table 7200 also defines fields 7202, 7204, 7206 for each of the entries. The fields specify: a product identifier 7202; a subsidy amount 7204; and a quantity sold 7206.

The product identifier 7202 may be, for example, a unique alphanumeric string that identifies a product sold through the purchasing system. The subsidy amount 7204 may be a number reflecting the amount of subsidy a seller has agreed to provide towards the sale of a product. The quantity sold 7206 may be a number reflect the number of products that have been sold through the purchasing system.

According to one embodiment of the present invention, the seller uses this database to track the subsidy amounts 7204 it has agreed to provide to the purchasing system. According to another embodiment of the present invention, the seller may use this database to determine whether or not to accept a buyer's offer (especially if a manufacturer seller has knowledge of the retail price of a given product).

For example, in one embodiment of the present invention, the buyer offers may be routed to the sellers that determine whether or not to accept them. In this case, the subsidy amount 7204 may be stored locally at the seller devices 6100 and the purchasing system may not be aware of the subsidy amounts 7204 the seller is willing to provide. Also, in this case the seller may indicate to the purchasing system what product could potentially be used to fulfill the offer (e.g., by sending an appropriate product identifier to the purchasing system). In response to that the purchasing system may retrieve the settlement price(s) for the product, based on the product identifier, and inform the seller of the maximum seller amount or subsidy amount that may be required. The maximum seller amount or subsidy amount may be based on the highest settlement price the purchasing system may have to provide to a retailer, depending on the retailer at which the buyer elects to take possession of the product. The seller may then, based on this maximum seller or subsidy amount, determine whether or not to accept the buyer offer. The seller may make this determination by, for example, comparing the maximum seller amount or subsidy amount received from the subsidy amount 7204 stored in the database 7200 and accepting the buyer's offer if the maximum subsidy amount or seller amount is not greater than the subsidy amount 7204.

The quantity sold field 7206 of this database may: (i) reflect the number of units of a given product that the purchasing system has sold to date; or (ii) the number of units allotted to the purchasing system (e.g., if a manufacturer limits the quantity that may be sold through the purchasing system).

Issuer, Issuer Account and Seller account Databases
(Stored at Credit Card Processing System Device)

FIGS. 73 to 75 may be used, as described with respect to FIG. 62, in a "pseudo payment identifier as redemption code" embodiment of the present invention. Referring to FIG. 73, a table 7300 represents an embodiment of the issuer database that may be stored at a credit card processing system device 6200 (FIG. 62). The table 7300 includes entries defining a credit card issuer. The table 7300 also defines fields 7302, 7304, 7306 for each of the entries. The fields specify: an issuer identifier 7302; an issuer name 7304; and an issuer address 7306.

The issuer identifier 7302 may be, for example, a unique alphanumeric string associated with a credit card issuer. The issuer name 7304 may be, for example, an alphanumeric string containing the name of the credit card issuer associated with the issuer identifier 7302. The issuer address 7306 may be, for example, an alphanumeric string that may be used to communicate with the credit card issuer associated with the issuer identifier 7302.

Referring to FIG. 74, a table 7400 represents an embodiment of the issuer account database that may be stored at a credit card processing system device 6200 (FIG. 62). The table 7400 includes entries defining a credit card issuer. The table 7400 also defines fields 7402, 7404, 7406 for each of the entries. The fields specify: an issuer identifier 7402; an amount owed 7404; and a payment due date 7406.

The issuer identifier 7402 may be, for example, a unique alphanumeric string associated with a credit card issuer and may or may not be based on the issuer identifier 7302 stored with respect to the issuer database 7300. The amount owed 7404 may be a number indicating an amount that is owed with respect to the credit card issuer associated with the issuer identifier 7402. The payment due date 7406 may be a date indicating the date by which payment of some or all of the amount owed 7404 may be required with respect to the credit card issuer associated with the issuer identifier 7402.

The issuer database 7300 and issuer account database 7400 may be used by the credit card processing system to identify and track how much is owed by each credit card issuer, including the purchasing system.

Referring to FIG. 75, a table 7500 represents an embodiment of the retailer account database that may be stored at a credit card processing system device 6200 (FIG. 62). The table 7500 includes entries defining a retailer that provides to a buyer a product purchased through the purchasing system. The table 7500 also defines fields 7502, 7504, 7506, 7508, 7510 for each of the entries. The fields specify: a retailer identifier 7502; an issuer identifier 7504; an amount due 7506; an issuer identifier 7508; and an amount due 7510.

The retailer identifier 7502 may be a unique alphanumeric string associated with a retailer. The retailer associated with the retailer identifier 7502 may have an amount due 7506, 7510 with respect to one or more credit card issuers associated with issuer identifier 7504, 7508. Of course, a due date may also be associated with each of these amounts if appropriate. The retailer account database 7500 may be used by the credit card processing system to track how much is owed to each retailer from each credit card issuer, including the purchasing system.

Third Party Subsidy and Third Party Account Databases

Note that the purchasing system may receive a third party subsidy amount from a third party subsidy provider. The third party subsidy amount may be an amount provided by a third party towards a buyer's purchase of a product through the settlement system. For example, an online securities trading company may offer to contribute $30 towards a buyer's purchase of a camera if the buyer opens a trading account. Referring to FIG. 76, a table 7600 represents an embodiment of the third party subsidy database 7600 that may be stored at a purchasing system device 5900 (FIG. 59). The table 7600 includes entries defining a third party that provides a subsidy towards a buyer's purchase of a product through the purchasing system. The table 7600 also defines fields 7602, 7604, 7606, 7608 for each of the entries. The fields specify: a third party subsidy identifier 7602; a third party subsidy description 7604; a third party subsidy amount 7606; and a third party identifier 7608.

The third party subsidy identifier 7602 may be a unique alphanumeric string that identifies a particular third party subsidy. The third party subsidy description 7604 may be any information (e.g., text based, graphic, audio-visual) describing the third party subsidy associated with the third party subsidy identifier 7602. The third party subsidy amount 7606 may be number associated with an amount the third party subsidy associated with the third party subsidy identifier 7602 is willing to contribute towards the buyer's purchase of a product. The third party identifier 7608 may be a unique alphanumeric string that identifies a particular third party subsidy provider that is offering the third party subsidy associated with the third party subsidy identifier 7602. Note that a single third party may be offering a number of different third party subsidies.

Referring to FIG. 77, a table 7700 represents an embodiment of the third party account database 7700 that may be stored at a purchasing system device 5900 (FIG. 59). The table 7700 includes entries defining a third party. The table 7700 also defines fields 7702, 7704, 7706 for each of the entries. The fields specify: a third party identifier 7702; a third party address 7704; and an amount due from third party 7706. The third party identifier 7702 may be a unique alphanumeric string associated with a third party subsidy provider (and may or may not be based on the third party identifier 7608 described with respect to the third party subsidy database 7600). The third party address 7704 may be an alphanumeric string associated with a way of communicating (e.g., postal address, e-mail address) with the third party associated with the third party identifier 7702. The amount due from third party 7706 may be a number associated with an amount that the third party associated with the third party identifier 7702 should provide to the purchasing system (e.g., for all third party subsidy offers).

These databases 7600, 7700 track how much is owed to the purchasing system by each third party subsidy provider. The purchasing system device 5900 may update this database, for example, every time: (i) a buyer accepts a third party offer or satisfies a third party condition, such as by applying for a credit card to subscribing to a magazine; or (ii) a payment is made to the purchasing system by a third party.

For example, the buyer submits an offer which includes a price of $150. Before the offer is submitted to one or more sellers, the buyer is presented with an invitation to open a credit card account, for which the buyer will receive $25 towards the current purchase. The buyer accepts the offer and fills out a credit card application online. The $25 (i.e., the amount of the third party subsidy) is added to the buyer's price by the purchasing system before an attempt is made to fill the buyer's offer. Thus, if a product exists in the product database 6300 that fulfills the buyer's requirements and has an associated minimum acceptable price of $165, the buyer's offer may only be acceptable if the $25 is used. According to an embodiment of the present invention, when the buyer's offer is not accepted by the purchasing system, the $25 is not provided to the buyer in another form (i.e., the $25 is used to increase a buyer's price but is not directly paid to the buyer).

Settlement System Methods

Figure 78:
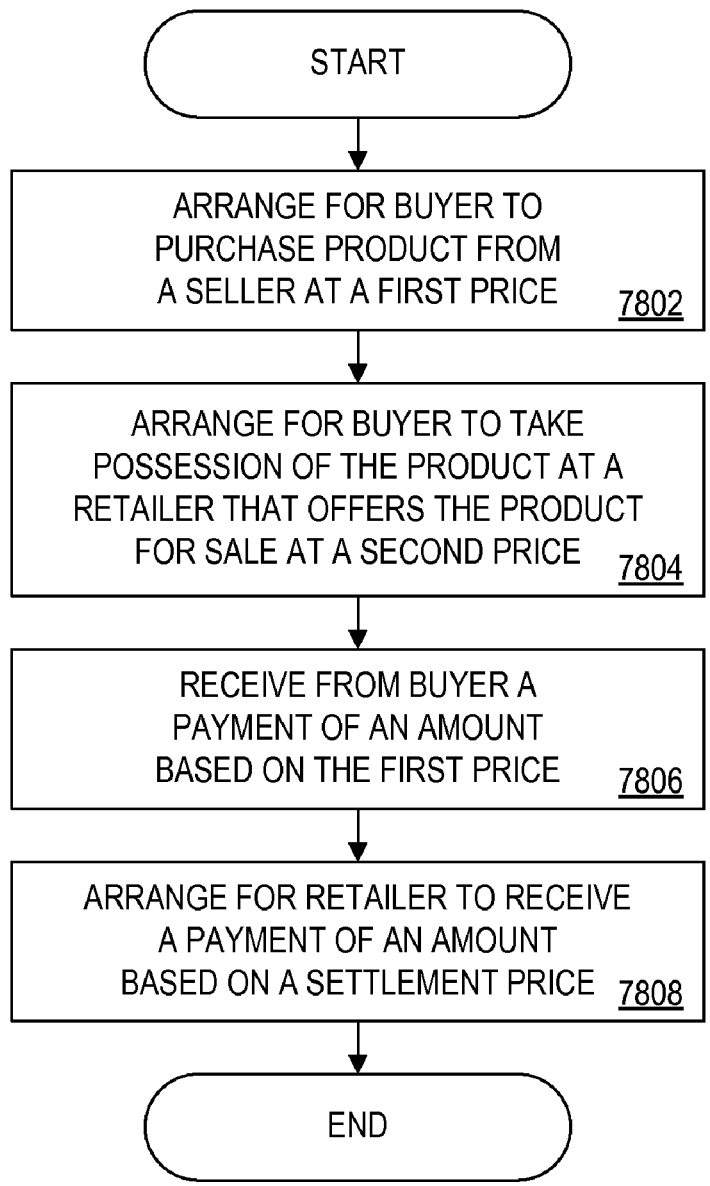
FIG. 78 is a flow chart illustrating a settlement system method in which a buyer takes possession of a product at a retailer according to an embodiment of the present invention.

FIG. 78 is a flow chart illustrating a settlement system method, with respect to the purchasing system device 5900, in which a buyer takes possession of a product at a retailer according to an embodiment of the present invention. The flow chart in FIG. 78, as well as the other flow charts discussed herein, are not meant to imply a fixed order to the steps; an embodiment of the present invention can be practiced in any order that is practicable.

At 7802, the purchasing system arranges for a buyer to purchase a product form a seller at a first price, and arranges for the buyer to take possession of the product at a retailer that offers the product for sale at a second price at 7804. According to one embodiment of the present invention, the seller may be a party different from the retailer (e.g., a product manufacturer or the purchasing system itself).

The purchasing system also receives from the buyer a payment of an amount based on the first price at 7806. The actual amount received may differ from the first price if, for example, a tax, penalty or commission is imposed on the sale. At 7808, the purchasing system arranges for the retailer to receive a payment of an amount based on a settlement price. According to one embodiment of the present invention, the retailer receives this payment from the purchasing system. According to another embodiment of the present invention, the retailer receives this payment from another party, such as the seller.

Figure 79:
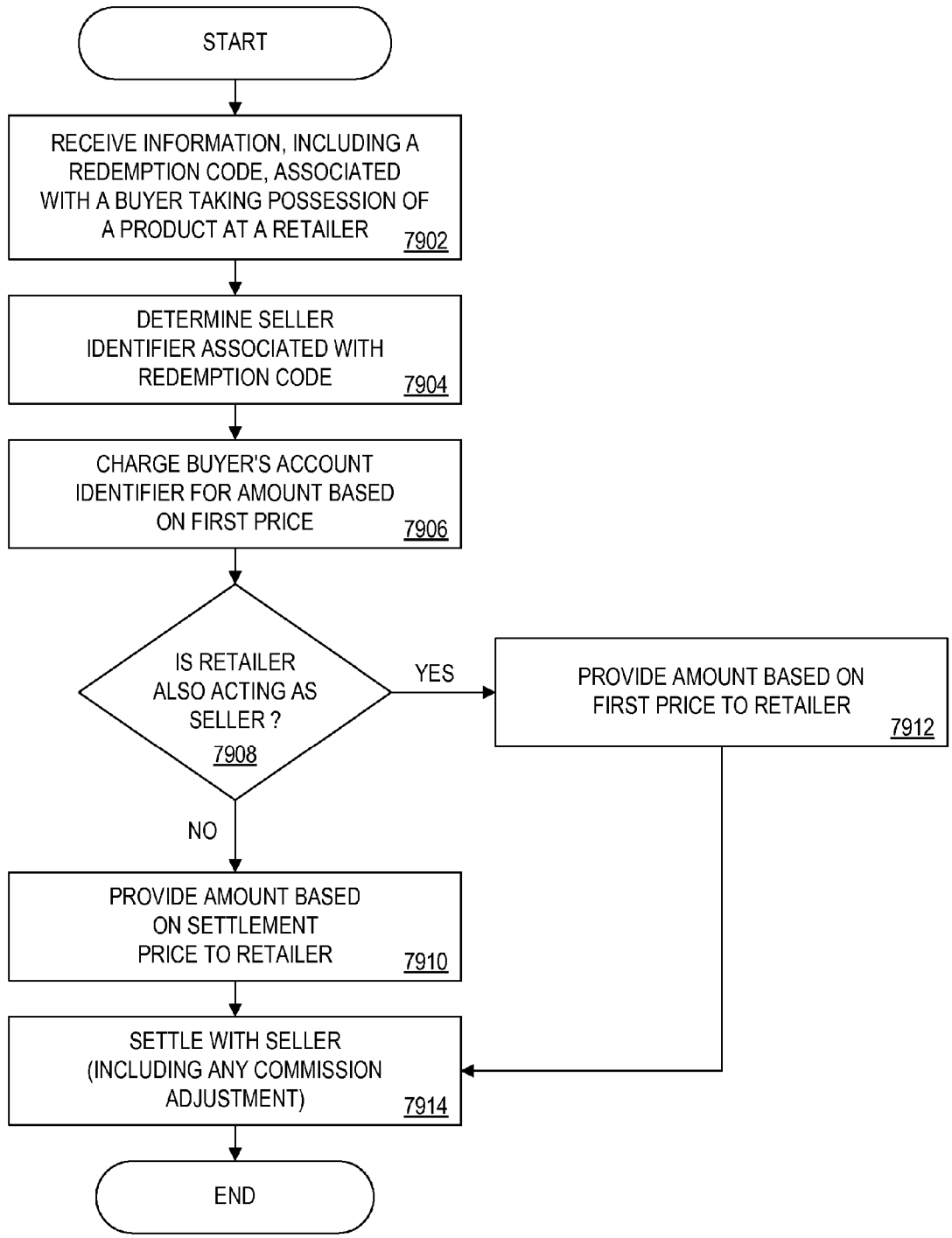
FIG. 79 is a flow chart illustrating a purchasing system method according to an embodiment of the present invention.

FIG. 79 is a flow chart illustrating a purchasing system method according to an embodiment of the present invention. At 7902, the purchasing system receives information, including a retailer identifier and a redemption code, associated with a buyer taking possession of a product at a retailer. At 7904, the seller identifier associated with the redemption code is determined, and the buyer's account identifier is charged an amount based on the first price at 7906. Additional charges, such as a sales tax and a commission, may also be applied if appropriate.

If the purchasing system determines that the seller is also the retailer at 7908, an amount based on the first price is provided to the retailer at 7912. If the seller is not the retailer at 7908, an amount based on the settlement price is provided to the retailer at 7910. According to one embodiment of the present invention, the retailer also provides a commission amount to the purchasing system (which may be subtracted from the first price or the settlement price).

The purchasing system then receives any payments and/or a commission amount from the seller at 7914 (e.g., if the first price exceeded the settlement price). Depending on the seller price, the settlement price and the buyer price (and on whether the purchasing system or seller provided a settlement price to the retailer), the purchasing system may instead provide a payment to the seller instead (e.g., if the settlement price exceeded the first price).

Figure 80A:
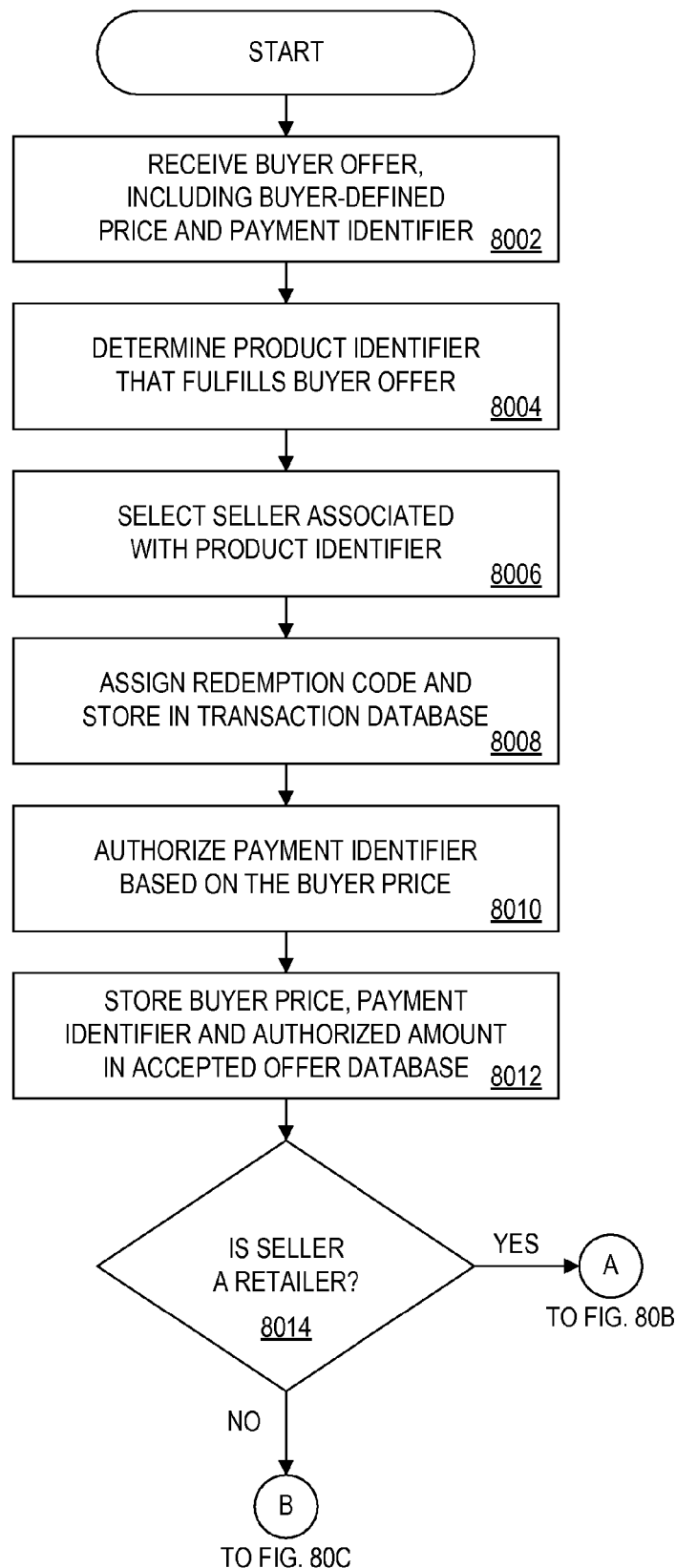
FIGS. 80A to 80C are flow charts illustrating a purchasing system method according to another embodiment of the present invention.
Figure 80B:
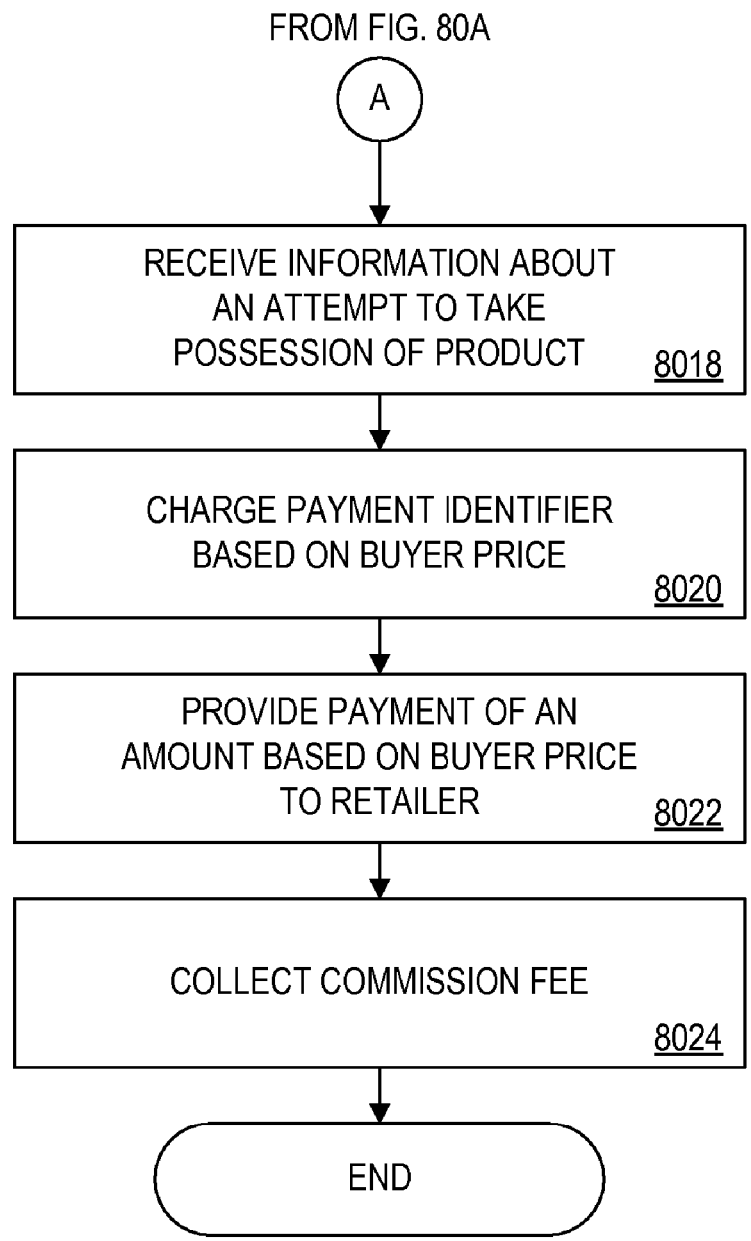
Figure 80C:
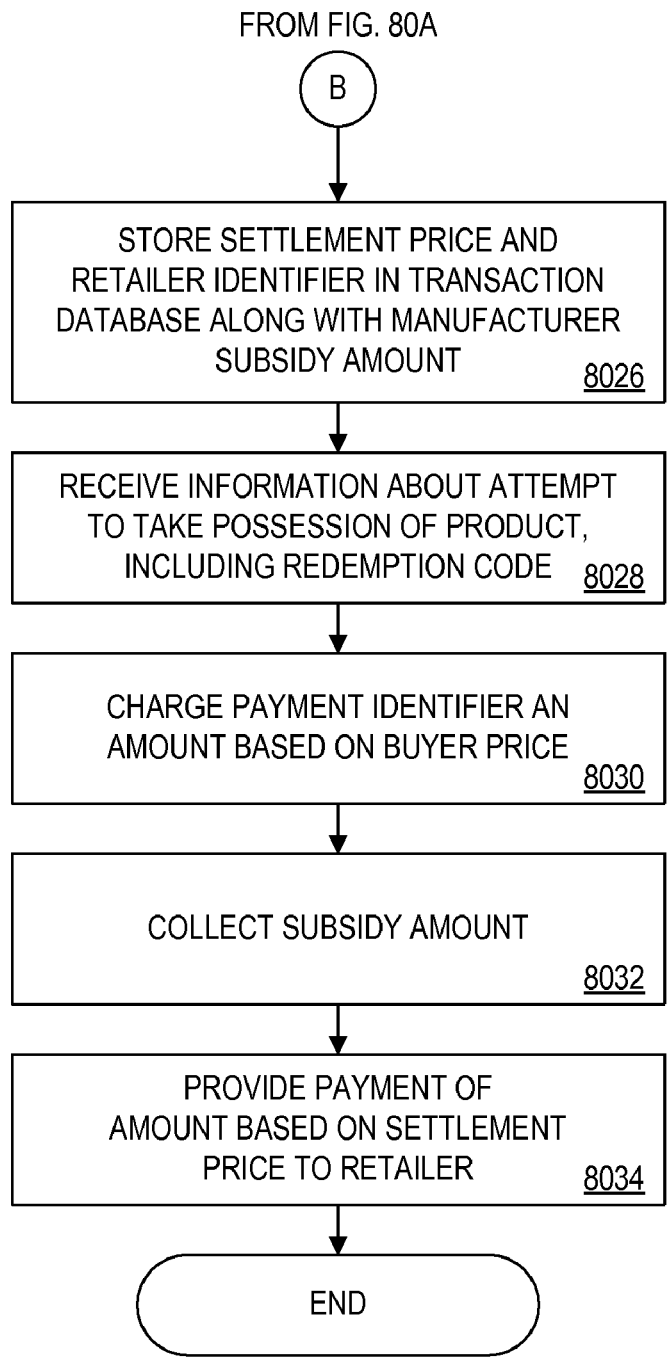

FIGS. 80A to 80C are flow charts illustrating a purchasing system method, including subsidy amounts, according to another embodiment of the present invention. At 8002, a buyer offer is received, including a buyer price and a payment identifier. The purchasing system determines a product identifier that fulfills the buyer offer at 8004 and selects a seller associated with that product at 8006.

Note that when a third party subsidy is involved in a transaction, the value of the third party subsidy may be added to the buyer's price before the purchasing system attempts to find a product that fulfilled the buyer's offer.

At 8008, a redemption code is assigned to the transaction and stored in a new record of the accepted offer database 6800 in association with the product identifier and the seller identifier. At 8010, the purchasing system authorizes the buyer's payment identifier for an amount equal to the buyer's price and any applicable sales tax. At 8012, the buyer's price, the payment identifier, and the authorized amount are stored in the buyer's record of the accepted offer database 6800.

If it is determined that the seller is a retailer at 8014, the method shown in FIG. 80B is performed as will now be described. Information about an attempt to take possession of the product is received from the retailer at 8018, and the payment identifier is charged an amount based on the buyer price at 8020. At 8022, a payment of an amount based on the buyer price is provided to the retailer, and the purchasing system collects a commission fee (if any) at 8024 before the process is complete.

If it is determined that the seller is not a retailer at 8014 (as shown in FIG. 80A), the method shown in FIG. 80C is performed as will now be described. A manufacturer's subsidy amount corresponding to the product identifier (if any) is determined at 8026, and information about an attempt to take possession of the product is received from a retailer at 8028. The buyer's payment identifier is charged an amount based on the buyer price at 8030. At 8032, the purchasing system collects a commission fee (if any), and a payment of an amount based on the settlement price is provided to the retailer and at 8034 before the process is complete.

According to another embodiment of the present invention, instead of transmitting payments for each individual transaction, the purchasing system provides a batch payment. For example, the purchasing system may receive a bill for a batch of transactions from each given retailer periodically. This may be done, for example, through a credit card processing system.

Figure 81:
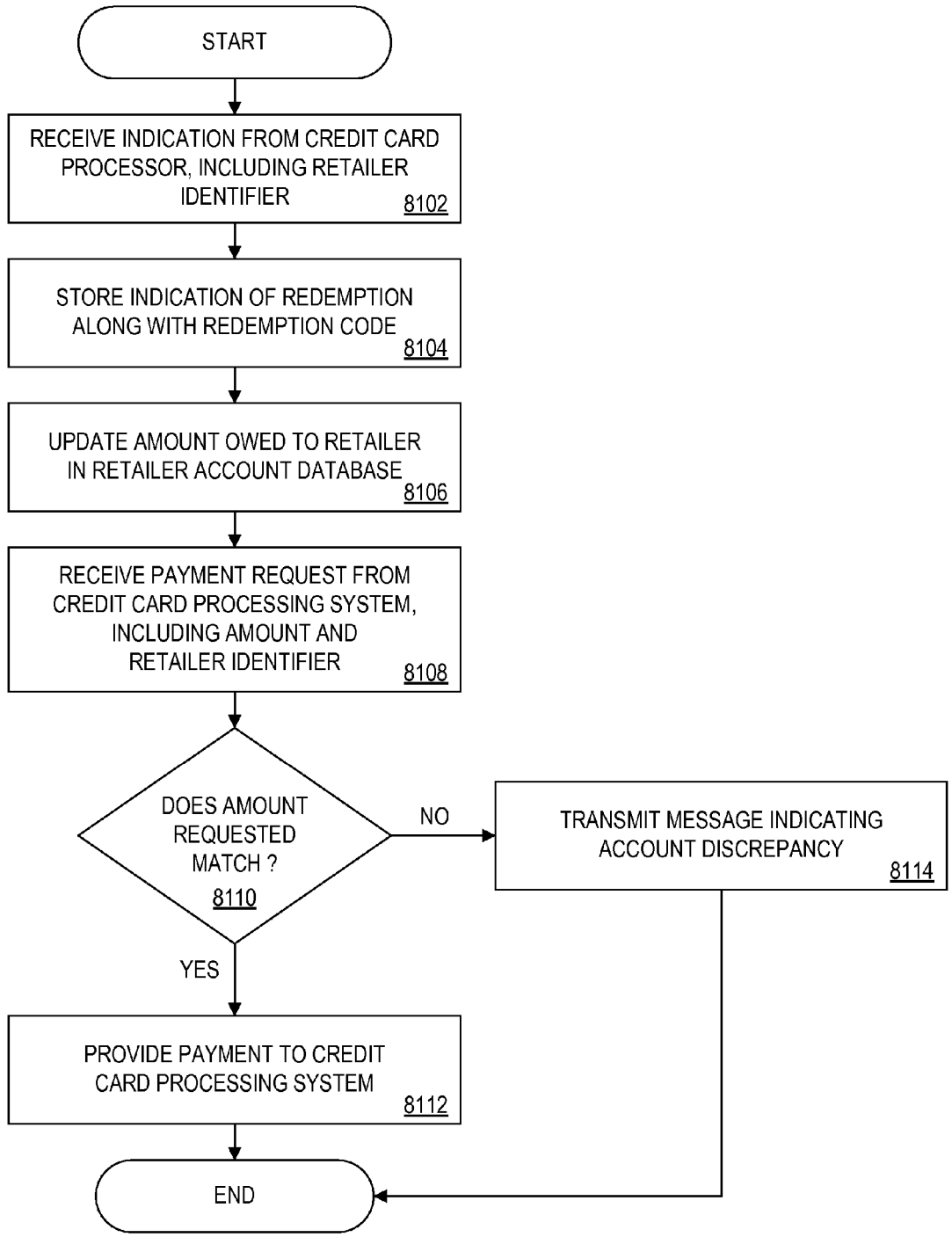
FIG. 81 is a flow chart illustrating a pseudo payment identifier batch settlement method according to an embodiment of the present invention.

FIG. 81 is a flow chart illustrating a pseudo payment identifier batch settlement method according to one embodiment of the present invention.

According to this embodiment, the purchasing system tracks the redemption of products from each retailer. Note that a bill may not be received, but instead a credit card processing system may be authorized to debit an account associated with the purchasing system as necessary. Such an arrangement may be made, in fact, between any of the parties disclosed herein (e.g., sellers, retailers). Upon receiving a periodic bill from a credit card processing system, the purchasing system verifies that the amount requested from the retailer agrees with the predicted amount indicated by redeemed records. In particular, at 8102 the purchasing system receives an indication, including a retailer identifier, from a credit card processing system that a buyer has redeemed a purchasing system voucher. An indication of redemption is stored along with the redemption code at 8104.

At 8106, the purchasing system updates the amount owed to the retailer (based on the received retailer identifier) in the retailer's record of the seller account database 6900, such as by using the settlement price for the product associated with that retailer. At 8108, a payment request is received from the credit card processing system, including a payment amount and a retailer identifier.

If the amount of the payment request matches the amount indicated in the seller account database 6900 at 8110, the appropriate amount is provided to the credit card processing system (to be provided to retailer) at 8112. If, on the other hand, the amounts do not match at 8110, a message indicating an account discrepancy is sent to the retailer or the credit card processing system at 8114.

Figure 82:
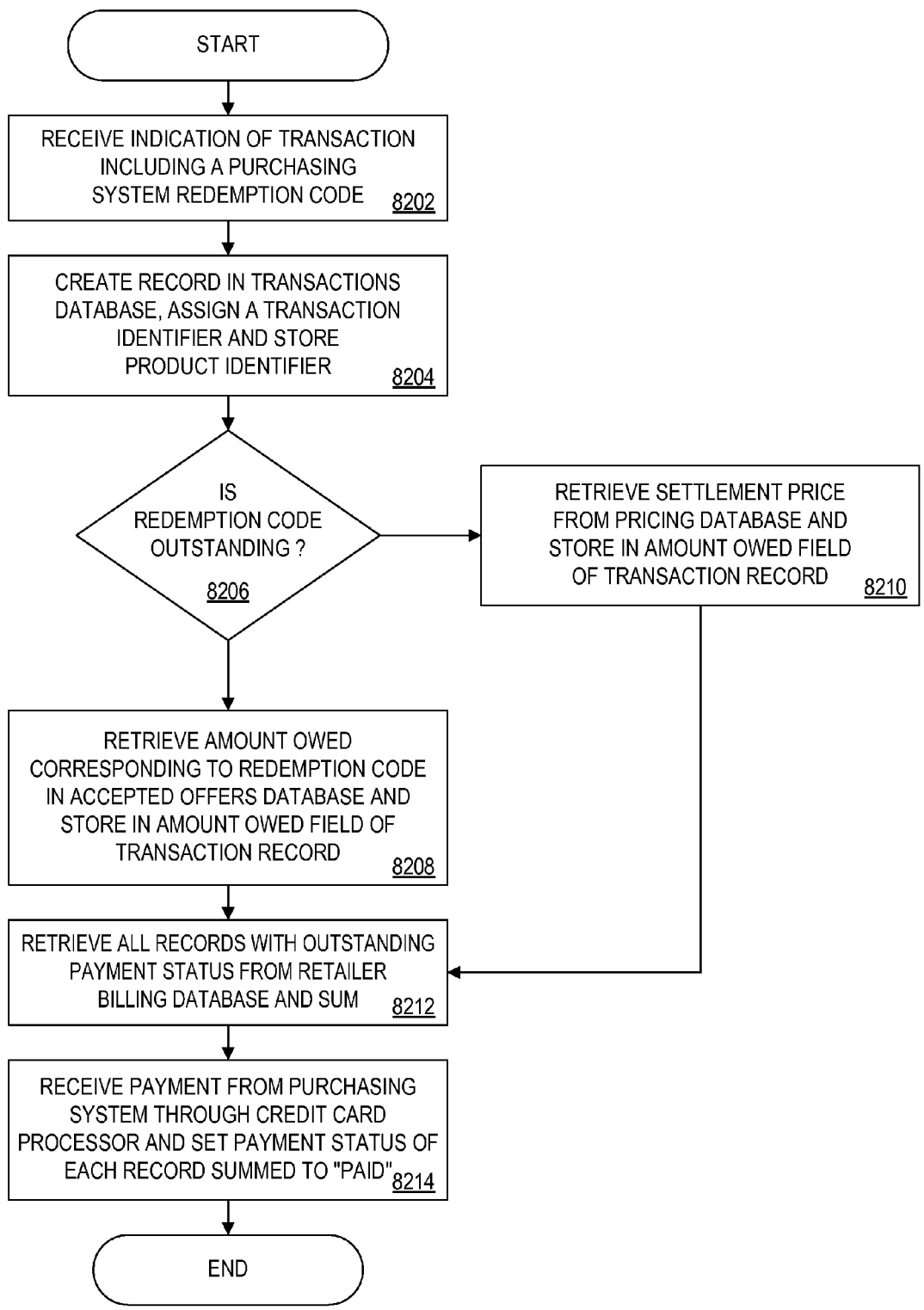
FIG. 82 is a flow chart illustrating a retailer method according to an embodiment of the present invention.

FIG. 82 is a flow chart illustrating a retailer method according to an embodiment of the present invention. The retailer receives an indication of a transaction, including a purchasing system redemption code, from a buyer at 8202 and assigns a transaction identifier. A transaction record is created in the purchasing system account database 7200, and the transaction identifier is stored along with the product identifier included in the transaction at 8204.

If the redemption code matches an outstanding redemption code in the accepted offer database 7100 at 8206, the retailer retrieves the settlement price corresponding to the product from the pricing database 2000 and stores it in the expected payment field 1808 of the purchasing system account database 7200 at 8208. If the redemption code matches an outstanding redemption code in the accepted offers database 7100 at 8206, the retailer retrieves the buyer's price from the accepted offer database and 7100 stores it in the expected payment field 1808 of the purchasing system account database 7200 at 8210.

The retailer retrieves all records with outstanding payment status from the purchasing system account database 7200 at 8212. These amounts owed are added, and the result is included in a payment request is transmitted to the purchasing system. (e.g., through a credit card processing system). When payment is received, the appropriate payment status fields 1810 are updated at 8214.

Figure 83:
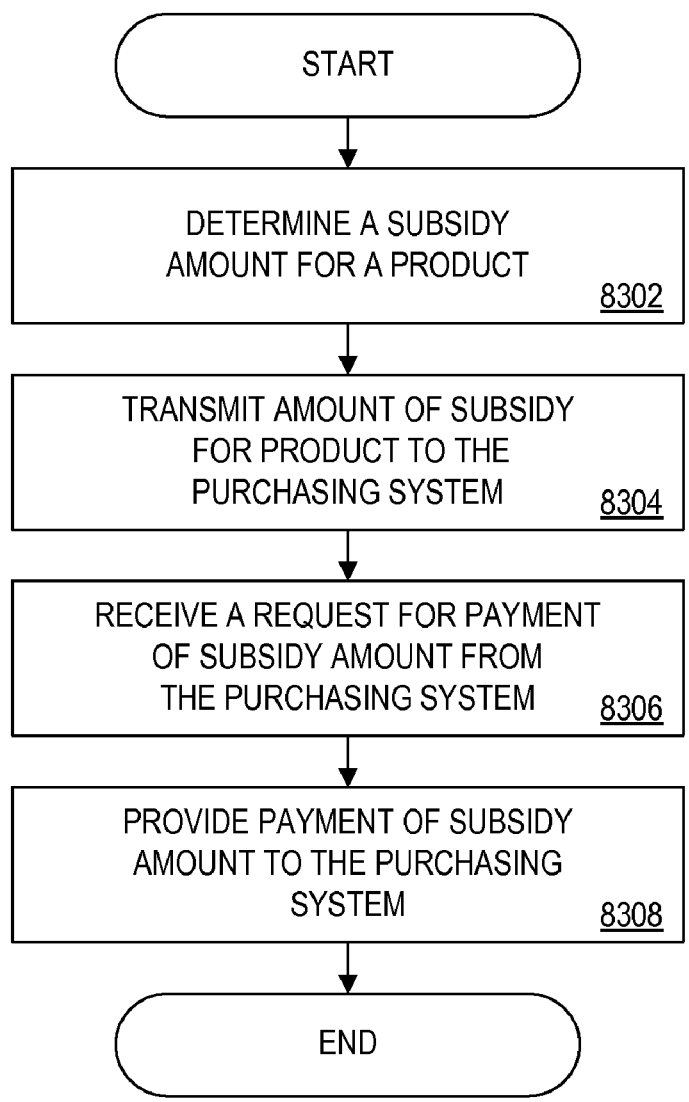
FIG. 83 is a flow chart illustrating a seller method according to an embodiment of the present invention.

FIG. 83 is a flow chart illustrating a seller method, where the seller is different from the retailer, according to an embodiment of the present invention. The seller determines a subsidy amount for a product, if any, at 8302. The subsidy amount for the product is transmitted to the purchasing system at 8304. At 8306, the seller receives a request for funds from the purchasing system and provides payment of the subsidy amount at 8308. At the time of requesting funds, the purchasing system may also transmit an indication of the offers that have been accepted using the manufacturer's products, with a detailed account of how much is owed for each accepted offer (e.g., how the amount of requested funds was determined). A manufacturer may be interested in such information to assess and predict demand for a product, or a type of product.

Note that if a manufacturer specifies a quantity of a product to be sold through the purchasing system, the manufacturer may pre-pay the subsidy amounts for the whole quantity products. For example, if the manufacturer provides the purchasing system with 100 units of a product and a $50 subsidy for each unit, the manufacturer may simply prepay the $5,000 (100×$50=$5,000) to the purchasing system. If the purchasing system has not sold the 50 units within a predetermined period of time, the purchasing system may repay a portion of the prepayment, according to one embodiment of the present invention.

FIGS. 1 to 30 describe only some of possible embodiments according to the present invention. Several other embodiments will now be briefly described to illustrate various applications of the present invention. These examples are presented only to demonstrate the wide applicability of the present invention. The examples do not constitute a definition of all possible embodiments or all possible applications. Those skilled in the art will understand that there are many more applications of the present invention consistent with the present disclosure. Further, although the following examples are briefly described for clarity, those skilled in the art will understand how to make any changes, if necessary, to the above-described apparatus and methods to accommodate these and other embodiments and applications.

According to one embodiment of the present invention, a buyer may be required to pay part of, or all of, a commission fee to the purchasing system. For example, a buyer may pay $1 for each submitted offer. In another example, the buyer may pay a fixed fee or a fixed percentage of the offer price (or whichever is greater) to the purchasing system device 5900 when a buyer offer is accepted.

According to another embodiment of the present invention, when a buyer offer is accepted a retailer scans the product bar code—or enters an ID number—into a "reservation" system and puts the product behind the counter at the service desk until the buyer arrives. For example, the retailer may have implemented a Telxon Wireless Retail Management System, which includes a wireless remote scanning inventory device. Thus, store personnel, upon receiving an offer for a product, may accept the offer and take the product off the shelf. The product bar code may be using, for example, a PTC 960SL Wireless Mobile Information Manager, deducting the product from inventory and reserving it in association with the buyer identifier. The buyer may present his identifier upon arrival at the retailer (e.g., the buyer's voucher identifier serves as the buyer and reservation identifier) and be given the product.

According to yet another embodiment of the present invention, instead of being charged the price of the product online at the point of a seller's acceptance of a buyer's offer, the buyer may be allowed to pay the established price directly to the retailer when he or she arrives at the retailer to take possession of the product. In such an embodiment, the buyer would "reserve" an established price online (rather than purchase the product online and take possession at a local retailer). The purchasing system device 5900 would store the buyer's primary offer information in a similar manner to that described with respect to other embodiments—but would not require the buyer to guarantee payment when submitting the buyer offer. Once the buyer offer is accepted by a seller, the acceptance would be stored at the purchasing system device 5900. A voucher may be printed for the buyer in the above described manner, with the addition of the offer price. When the buyer attempts to redeem the redemption code at a local retailer, the retailer: (i) retrieves the reserved price from the purchasing system device 5900 or from a local database; or (ii) reads the needed information from the voucher. The retailer collects the online price from the buyer at the POS and communicates the redemption to the purchasing system device 5900, either in real time or in a batch process at a later time. The retailer and the purchasing system device 5900 then settle the transfer of payment as necessary.

In another embodiment of the present invention, the retailer does not open a back-channel with the purchasing system device 5900 during the transaction. Instead, the information regarding the redemption of the redemption code (e.g., the product identifier, the retailers at which it is redeemable, the accepted price) is encoded onto the voucher itself. Such encoding may be in the form of, for example, a bar code.

According to another embodiment of the present invention, only retailers with current inventory (based on real time inventory checks) or who potentially have the product in stock (based on purchase orders from the manufacturer, or daily inventory notification downloads) will receive a buyer offer or be listed on a purchasing system voucher.

Another embodiment of the present invention lets the buyer select a time window and geographic region within which the buyer will take possession of the product. The purchasing system determines which stores will have the product during the specified time period based on, for example, statistical likelihood. If the buyer does not take possession of the product within the time window, the purchasing system device 5900 may, for example: (i) invalidate the voucher charge the buyer a penalty; or (ii) increase the price of the product. The price may be increased, for example, by predefined increments for each day the buyer fails to take possession of the product.

According to still another embodiment of the present invention, an extra fee may be charged for "guaranteed" availability at local store. When submitting an offer, the buyer checks off a "guaranteed availability at a particular retailer" button. Upon receiving an acceptance of the buyer's offer, the purchasing system device 5900 determines which, if any, retailer currently has the product in stock and communicates with the retailer to have the product put aside for the buyer (this may be done, for example, via e-mail or facsimile). The extra fee that the buyer pays for this guaranteed availability may be disbursed (the entire or partial amount) to the retailer which puts the product aside.

It is also possible, according to another embodiment of the present invention, for the seller to ship the product to the buyer if the buyer cannot find the product in a local retailer within a predefined time period. In this case, the seller may "guarantee" the product to the buyer. If the buyer cannot find the product, a purchasing system service representatives may help track the product down. If the product cannot be found, the purchasing system device 5900 notifies the manufacturer, who ships the product to the buyer at no extra charge.

According to another embodiment of the present invention, the voucher contains commands that change the retail price to the price named by the buyer. The command may be, for example, to determine an appropriate amount to subtract from the retail price such that the product costs $X. The voucher may also contain a command that prompts the POS to instruct the buyer to swipe the credit card used to bind the buyer offer. The POS then verifies that the credit card has the same number that is embedded in the voucher's bar code. If so, the price is applied to the product and the scanned credit card can be used to make the purchase. This lets the buyer's credit card act as a private key.

According to another embodiment of the present invention, the purchasing system device 5900 tracks the redemption rate of vouchers at retailers. When, for example, a week has passed and the buyer has not taken possession of the product, the purchasing system generates an e-mail that lets the buyer either cancel the contract (maybe in exchange for a penalty amount) or have the product shipped. Also, after a buyer has taken possession of the product, a "thank you" message can be sent from the purchasing system (e.g., via e-mail) along with other types of offers (e.g., for additional products the buyer may be interested in purchasing).

In a similar way, a buyer may present a credit card or frequent shopper card when making a purchase at the POS, and the purchasing system device 5900 may determine if a reservation exists for another product the store typically stocks. If the buyer does have a reservation, the POS can prompt the cashier to remind the buyer about the reservation.

Another embodiment of the present invention is directed to manufacturers that sell slightly altered products through different retailers, such as products with different model numbers and/or slightly different features. In this case, the voucher issued to the buyer may be valid for different types of products depending on the retailer. The identifier (e.g., make/model number) of each product may be printed directly on the voucher next to the corresponding retailer name, leaving it up to the buyer or store personnel to ensure that the buyer takes possession of the correct product.

Similarly, the voucher may contain several bar codes, one for each retailer, that contain the encoded product identifier corresponding to each retailer. According to another embodiment, a separate voucher may be issued for each retailer and, once it is determined by the purchasing system device 5900 that the buyer has redeemed one voucher, the other associated voucher be voided. For example, each voucher can have the same voucher identifier or redemption code, and when the purchasing system receives a signal at a retailer indicating that a redemption code has been redeemed, it invalidates any corresponding vouchers with the same redemption code.

According to still another embodiment of the present invention, a redemption code may be redeemable for products from different sellers. For example, several sellers may have agreed to accept a buyer's offer. Instead of selecting one seller to fulfill the buyer's offer, the purchasing system device 5900 may give the buyer the option of selecting any of the accepting sellers. This option may be presented to the buyer directly at the Web site, before a redemption code is issued (in which case the redemption code would be issued for whichever seller's product the buyer elects), or the redemption code may be issued for different sellers (and/or different products) and the buyer indicates his selection at the point of redemption (i.e., by selecting which retailer and/or which product).

According to another embodiment of the present invention, the purchasing system presents the buyer with a number of retailers that have the product available, and the associated price at each retailer, letting the buyer select one of the prices. For example, a buyer may be willing to pay a little more for a product if he or she can take possession of the product at a retailer located near his or her home. In another embodiment of the present invention, the purchasing system device 5900 selects retailers based on distance from the buyer's home address.

According to another embodiment of the present invention, prices available to a buyer through the purchasing system device 5900 vary based on the buyer (e.g., the buyer's transactional history with the purchasing system device 5900) or the buyer's location (e.g., based on a telephone number area code or the buyer's home address ZIP code). For example, the settlement price may be based on the number of transactions previously completed by the buyer with the purchasing system (e.g., if the buyer previously completed no transactions the minimum selling price is $200, if the buyer previously completed one transaction the minimum price is $195, and so on). A "complete" transaction may comprise, for example: (i) submitting an offer to the purchasing system device 5900; (ii) having an offer accepted by the purchasing system device 5900; or (iii) redeeming a redemption code at a retailer.

If a seller specifies a certain quantity of a product available in a location to be sold through the purchasing system device 5900, a certain number of redemption codes may be issued based on a statistical likelihood of redemption. That is, the number of redemption codes issued may be greater than the allocated available supply, and the redemption codes may be authorized for redemption at the retailer POS until the designated supply is depleted. If a buyer attempts to redeem a redemption code after the supply has been depleted, the purchasing system device 5900 may transmit a counter-offer to the buyer at the POS or service desk of the retailer.

According to another embodiment of the present invention, instead of specifying a settlement price, a seller can specify a maximum subsidy amount that that will be provided to the purchasing system device 5900 for each product sold. Thus, when determining whether to accept a buyer's offer for a given product, the purchasing system device 5900 may determine: (i) the subsidy amount provided by the manufacturer for the product; and (ii) the settlement price due to a retailer for the product. If, for example, the offer plus the subsidy amount is at least equal to the settlement price, the purchasing system device 5900 may accept the buyer offer. The purchasing system device 5900 may also, in some cases, determine that a monetary loss up to a predetermined amount is acceptable in order to increase the volume of sales. In this case, the purchasing system device 5900 would accept an buyer's offer if the buyer's price plus the manufacturer's subsidy amount was not below the predetermined acceptable loss amount (in effect, the purchasing system device 5900 is further subsidizing the buyer's purchase).

According to another embodiment of the present invention, the redemption information sent from the purchasing system to the buyer is similar to a product manufacturer coupon. That is, a voucher can be recognized by a retailer to be worth, for example, the difference between the retail price for the product and the buyer price. By way of example, a buyer may arrange with the purchasing system to purchase a television for $190. The buyer brings a voucher to a retailer that normally sells the product for $200 (i.e., the retail price). In this case, the retailer may recognize that the voucher is redeemable for $10 towards the purchase of the product. If the buyer brought the voucher to another retailer at which it was redeemable, where the product was normally sold for $210, that retailer would recognize that the voucher is redeemable for $20. In other words, in such an embodiment, the actual value that the voucher is redeemable for depends on the retail price of the retailer at which the buyer takes possession of the product. The retailer may then be subsequently reimbursed the difference between the retail price and the buyer price by the purchasing system.

According to another embodiment of the present invention, instead of the purchasing system transmitting redemption information to the buyer, the redemption information is instead sent from the buyer to the purchasing system. For example, the buyer may supply his or her name, address, social security number, telephone number and/or a password to the purchasing system. In this case, the buyer can provide the redemption information to the retailer to take possession of the product.

According to another embodiment of the present invention, the purchasing system may establish a price between a buyer and seller for a product that fulfills at least one product requirement without specifying a particular product that will be provided to the buyer. For example, the purchasing system may establish that the buyer will pay $200 for a 21 inch screen television with a remote control. The product requirement may also, for example, describe a suggested retail price or average retail price associated with the product that will be provided to the buyer without specifying the particular product. Note that the price established between the buyer and the seller (e.g., the $200) may be proposed by the purchasing system, the seller or the buyer. A particular product (e.g., a particular model television available from a particular manufacturer) is then selected and provided to the buyer at the retailer. Note that either the purchasing system, the seller or the retailer may select the particular product. If the retailer is to select the particular product, a voucher identifying the product requirements may be transmitted to the buyer. If the purchasing system or seller is to select the particular product, the voucher may, if desired, identify the particular product that has been selected.

In another embodiment, rather than defining a maximum subsidy amount, the manufacturer specifies a subsidy amount that will be provided to the purchasing system regardless of the buyer's price (i.e., not a maximum subsidy amount where the manufacturer may actually end up paying less than the maximum amount if the buyer's price is high enough). In this embodiment, it is up to the purchasing system to determine whether or not to accept a given buyer offer.

For example, a manufacturer may provide the purchasing system with a $50 subsidy for each product X sold through the purchasing system. The settlement price for the product is $150. A buyer submits a price of $190 with a product description that the purchasing system determines product X meets. The purchasing system accepts the buyer's offer price and fulfills the buyer's offer with product X. Thus, the purchasing system makes a $10 profit off of the transaction (i.e., collects $190 from the buyer, collects $50 from the manufacturer, and pays $150 to the retailer).

The purchasing system may have a minimum profit amount used to determine which buyer offers to accept. Such a minimum profit amount may also be negative at times. For example, the administrator of the purchasing system may determine that a loss on transactions is acceptable for a time in order to build sales volume. Or the purchasing system may determine whether or not to accept a particular buyer's offer based on an average running profit. Thus, some offers may be accepted at a loss if there are others that result in a high enough profit that the average offer profit is positive.

According to another embodiment of the present invention, the purchasing system (and not the seller) determines a buyer price directly. In this embodiment of the settlement system, the manufacturer makes a separate agreement with at least one retailer and the purchasing system. In the agreement with the retailer, the manufacturer sets a price for which the retailer will redeem or honor a purchasing system. The retailer may agree to provide a product through the purchasing system for a price lower than the retail price for the product. The manufacturer's agreement with the purchasing system may include (i) which of the manufacturer's products (e.g. model number, color, size, etc.) the purchasing system can sell; (ii) the quantity of a particular product the purchasing system can sell; and (iii) a monetary amount that will be provided to the purchasing system by the manufacturer for each specified product sold through the purchasing system. The purchasing system collects buyer offers for products and determines at what price to the products will be sold.

According to another embodiment of the present invention, the purchasing system uses the amount provided by the manufacturer to reimburse the retailer at which the buyer takes possession of the product. The amount of money provided to the purchasing system by the manufacturer may be on a per-product basis ($50 per product) or on a bulk inventory basis (e.g., $20,000 to sell 200 products). The purchasing system may also be made aware of the value agreed upon between the manufacturer and the retailer.

According to another embodiment of the present invention, the contract the manufacturer has with the retailer may specify terms under which the retailer agrees to honor purchasing system vouchers. For example, the contract may specify products the retailer has in stock after a certain predetermined date will be made available to the purchasing system. Thus, the retailer has a predetermined amount of time to try and sell the manufacturer's products in inventory at the retail price. After that time, the manufacturer may make the products in inventory available to the purchasing system. Another term of a contract between the manufacturer and the retailer may specify a rate of sale of a particular product. If the retailer's selling rate of this product falls below a predetermined threshold, the manufacturer has the option of making a certain quantity of the products available for local pick-up sale through the purchasing system. The selling rate specified in the contract may depend on the characteristics of the product. For example, the manufacturer may require a higher selling rate for perishable products or products that have a short product life. The manufacturer does not want the retailer's shelves to be filled up with expired or obsolete products, especially if fresh or updated version are available. Thus, the manufacturer may allow the retailer time to sell the products, or to achieve a preferred sales rate, at the retailer's preferred price and profit margin. If, however, the retailer still has products in stock after a certain time, or is not selling enough of the products, the manufacturer gives the purchasing system access to a certain quantity of that product.

In another variation of the invention, the retailer may also have an agreement with the purchasing system to ensure that the purchasing system preferentially uses that retailer to fill a buyer offer. The retailer may agree to pay the purchasing system a fee, in effect helping to subsidize the customer offers, in exchange for the privilege of being targeted by the purchasing system. For example, a retailer may pay $2 for every transaction they receive through the purchasing system. Thus, if a customer makes an offer for a certain brand and model of a television set, and the purchasing system determines that several retailer are available for filling that offer, the purchasing system may select that retailer. There are, of course, other fee plans that a retailer may agree to in exchange for being targeted by the purchasing system. Some examples of fee plans between the retailer and the purchasing system include: (i) a flat monthly fee; (ii) a fixed or variable percentage of the sales total received by the retailer through the purchasing system; (iii) a percentage from each transaction; and (iv) a fixed fee for each transaction.

According to another embodiment of the present invention, the purchasing system may choose to optimize revenues or profits by setting a minimum acceptance price for any given product. In other words, the purchasing system may at times accept offers on which it suffers a monetary loss in order to promote overall traffic and revenues through the system. At other times, the purchasing system may wish to only accept offers that are profitable. For example, consider the case where a retailer has agreed with the manufacturer to honor a price of $175 for a camera and the manufacturer has agreed to give the purchasing system $50 for each camera sold. The purchasing system may use this $50 to make the retailer whole. Thus, if the purchasing system accepts an offer for the camera from a customer for $125, it has to use the $50 allotted by the manufacturer to make the retailer whole (i.e., use it to bring the total value the retailer receives for the camera up to the $175 agreed upon by the manufacturer and the retailer). Any offer above $125 will be profitable for the purchasing system, because it keeps any value left from the $50 after making the retailer whole. If the purchasing system accepts an offer for $130, only $45 is needed to make the retailer whole and a $5 profit is made from the transaction.

The purchasing system may choose to optimize profits based on individual sales or batch processes. If the profit is determined from each individual sale, only offers above $125 would be accepted in the above example. If the batch process profit model is used, the average sale price has to be above $125. So in the batch process model, some offers below $125 may be accepted in the above example if enough offers above $125 are received for the average price to result in being over $125. The purchasing system in this batch process model may constantly re-calculate the average price received thus far in determining whether to accept an incoming offer.

Although the manufacturer may negotiate a settlement price with each retailer individually for each product, the manufacturer may instead set the same settlement price for a given product with each participating retailer. Similarly, the settlement price the manufacturer sets with each participating retailer for a given product can be based on: (i) the quantity of the product typically purchased by the retailer from the manufacturer; (ii) the quantity of the product typically sold by the retailer; or (iii) the quantity of the product in stock at the manufacturer at the time the agreement is made or at the time a buyer takes possession the product from the retailer. In other words, a retailer who historically sells more of a product will be given a different settlement amount than one who sells less of the item.

According to another embodiment of the present invention, there are several settlement prices associated with each given product, each with at least one associated condition. For example, the settlement price may be based on: (i) the amount of the product in stock at the retailer at the time the buyer takes possession of the product; (ii) the number of units of the product provided to purchasing system buyers at the retailer within a predefined time period (e.g. the settlement price is $50 if the retailer provided less than 10 product units to buyers within the previous thirty days, and the settlement price is $60 if the retailer provided 10 or more product units within the previous thirty days): (iii) the time of day/year at which the buyer takes possession the product at the retailer; or (iv) the amount of time elapsed between the time the buyer established the buyer's price for the product online and the time he or she takes possession of product up at the retailer.

According to another embodiment of the present invention, the retailer is reimbursed the full retail price for any product provided to a purchasing system buyer. A manufacturer accepts a buyer named price online and provides the amount necessary to make the retailer whole. In other words, the manufacturer subsidizes the buyer's purchase. For example, a participating retailer sells television X for a retail price of $250. A buyer names a price of $200 for television X. The manufacturer of television X accepts the buyer's price and agrees to provide a $50 subsidy to the purchasing system in order to make the retailer whole. Once the buyer picks up the television at the retailer, the purchasing system transmits the $200 paid by the buyer to the retailer as well as the $50 provided by the manufacturer necessary to reimburse the retailer the full retail price for television X. Additionally, the purchasing system charges the manufacturer a $10 commission fee for processing the transaction.

According to still another embodiment, the subsidy necessary to make the retailer whole is provided by the purchasing system and there is no manufacturer involvement. Thus, the purchasing system has access to the retailer's retail prices for various products. The purchasing system evaluates a buyer named price for a product and, if t accepts the price, it provides the price plus any subsidy necessary to make the retailer whole when the buyer takes possession of the product at the retailer.

According to another embodiment of the present invention, the purchasing system authorizes a freeze for an amount of funds greater than the buyer's price plus an applicable sales tax (e.g., 5% greater). This is to provide a cushion to the purchasing system in case something unforeseen happens at the point of sale when the buyer takes possession of the product at the retailer. For example, the buyer may take possession of the product in a sales tax region that requires a greater sales tax than that applied by the purchasing system (e.g., the purchasing system determined the applicable sales tax based on the buyer's home address but the buyer actually redeemed the redemption code in a neighboring state, with a higher tax rate). The credit card processing system charges the purchasing system a fee for each authorization of a credit card account (a typical fee is 25¢ per authorization). Thus, if the purchasing system were to authorize a certain amount, but the buyer actually should be charged more than the authorized amount (e.g., due to a higher than expected sales tax) the purchasing system would need to send another authorization through the credit card processing system for the increase—and thus pay another fee. In authorizing an amount greater than what should be necessary, the purchasing system is only paying one authorization fee and is free to subsequently process a charge that is less than the authorized fee. Accordingly, in this embodiment of the present invention, the purchasing system would store the amount it authorized when the buyer's offer was accepted. Then when it received the data from the retailer regarding the final conditions of the transaction during which the redemption code was redeemed (e.g. the address of the retailer at which the redemption code was used), the purchasing system would determine the appropriate amount to charge to the buyer's account.

According to another embodiment of the present invention, rather than authorizing an extra amount, the processing system charges or authorizes the exact amount the buyer is expected to owe, and any necessary adjustments are handled at the retailer. The buyer may pay any adjustment necessary, based on the final conditions of the transaction when he or she takes possession of the product, directly to the retailer. In such a case, the retailer notifies the purchasing system, and, if the adjustment requires a reimbursement to the buyer, the retailer may provide this reimbursement to the buyer directly (e.g., out of the cash drawer). Accordingly, the purchasing system may add the reimbursement to the settlement amount it owes the retailer.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of operating a purchasing system, comprising:
arranging, by a central controller and through a communication network, for a buyer to purchase a product from a seller, wherein the buyer agrees to pay a first price for the product;
sending, by the central controller, redemption information to the buyer, the redemption information enabling the buyer to take possession of the product at a retailer, different from the seller, that offers the product for sale at a second price; and
providing, by the central controller and to the retailer, a third price for the product once the buyer takes possession of the product at the retailer, wherein the third price is a price for the product agreed upon between the retailer and the seller and is not based on the first price that the buyer agreed to pay for the product.

2. The method of claim 1, in which arranging for the buyer to purchase the product comprises:
receiving a buyer offer, including a buyer-defined first price and information about the product, from the buyer; and
determining if the buyer offer will be accepted.

3. The method of claim 2, in which determining comprises at least one of sending information about the buyer offer to at least one seller, or locally determining if the buyer offer will be accepted.

4. The method of claim 1, in which arranging for the buyer to purchase the product comprises receiving payment from the buyer of an amount based on the first price.

5. The method of claim 4, wherein the payment is received at a time based on at least one of when the purchasing system arranges for the buyer to purchase the product, or when the buyer takes possession of the product at the retailer.

6. The method of claim 1, in which arranging for the buyer to purchase the product comprises receiving a payment identifier from the buyer.

7. The method of claim 6, in which arranging for the buyer to purchase the product comprises at least one of charging an amount based on the first price using the payment identifier, or reserving an amount based on the first price using the payment identifier.

8. The method of claim 1, wherein the first price is greater than the second price.

9. The method of claim 1, further comprising:
receiving from the retailer information related to an attempt to take possession of the product; and
sending to the retailer a verification authorizing the buyer to take possession of the product.

10. The method of claim 1, in which arranging for the buyer to purchase the product comprises receiving payment from the buyer of an amount based on the first price adjusted with a subsequent amount.

11. A computer readable memory storing instructions configured to direct a processor to:
arrange through a communication network for a buyer to purchase a product from a seller, wherein the buyer agrees to pay a first price for the product;
transmit redemption information to the buyer, the redemption information enabling the buyer to take possession of the product at a retailer, different from the seller, that offers the product for sale at a second price; and
provide to the retailer a third price for the product once the buyer takes possession of the product at the retailer, wherein the third price is a price for the product agreed upon between the retailer and the seller and is not based on the first price that the buyer agreed to pay for the product.

12. The computer readable medium of claim 11, in which the instructions for arranging for the buyer to purchase the product comprise instructions configured to direct the processor to:
  receive a buyer offer, including a buyer-defined first price and information about the product, from the buyer; and
  determine if the buyer offer will be accepted.

13. The computer readable medium of claim 12, in which determining comprises instructions configured to direct the processor to at least one of transmit information about the buyer offer to at least one seller, or locally determine if the buyer offer will be accepted.

14. The computer readable medium of claim 11, in which arranging for the buyer to purchase the product comprises instructions configured to direct the processor to receive an indication of payment by the buyer of an amount based on the first price.

15. The computer readable medium of claim 14, in which the instructions for receiving the indication of payment comprise instructions configured to direct the processor to receive the indication of payment at a time based on at least one of when the purchasing system arranges for the buyer to purchase the product, or when the buyer takes possession of the product at the retailer.

16. The computer readable medium of claim 11, in which arranging for the buyer to purchase the product comprises instructions configured to direct the processor to receive a payment identifier from the buyer.

17. The computer readable medium of claim 16, in which arranging for the buyer to purchase the product comprises instructions configured to direct the processor to at least one of charge an amount based on the first price using the payment identifier, or reserve an amount based on the first price using the payment identifier.

18. The computer readable medium of claim 11, wherein the first price is greater than the second price.

19. The computer readable medium of claim 11, further comprising instructions for configured to direct the processor to:
  receive from the retailer information related to an attempt to take possession of the product; and
  transmit to the retailer a verification authorizing the buyer to take possession of the product.

20. The computer readable medium of claim 11, in which the instructions for arranging for the buyer to purchase the product comprise instructions configured to direct the processor to receive an indication of payment by the buyer of an amount based on the first price adjusted with a subsequent amount.

21. A purchasing system device, comprising:
  a processor; and
  a storage device operatively coupled to the processor and storing instructions that when executed by the processor result in:
    arranging through a communication network for a buyer to purchase a product from a seller, wherein the buyer agrees to pay a first price for the product,
    transmitting redemption information to the buyer, the redemption information enabling the buyer to take possession of the product at a retailer that offers the product for sale at a second price; and
    providing to the retailer a third price for the product once the buyer takes possession of the product at the retailer, wherein the third price is a price for the product agreed upon between the retailer and the seller and is not based on the first price that the buyer agreed to pay for the product.

22. The purchasing system device of claim 21, wherein the arranging comprises:
  receiving a buyer offer, including a buyer-defined first price and information about the product, from the buyer; and
  determining if the buyer offer will be accepted.

23. The purchasing system device of claim 22, wherein the determining comprises at least one of (i) transmitting information about the buyer offer to at least one seller, and (ii) locally determining if the buyer offer will be accepted.

24. The purchasing system device of claim 21, wherein the arranging comprises:
  receiving an indication of payment by the buyer of an amount based on the first price.

25. The purchasing system device of claim 24, wherein the receiving of the indication of payment comprises:
  receiving the indication of payment at a time based on at least one of when the purchasing system arranges for the buyer to purchase the product, or when the buyer takes possession of the product at the retailer.

26. The purchasing system device of claim 21, wherein the arranging comprises:
  receiving a payment identifier from the buyer.

27. The purchasing system device of claim 26, wherein the arranging comprises at least one of (i) charging an amount based on the first price using the payment identifier, and (ii) reserving an amount based on the first price using the payment identifier.

28. The purchasing system device of claim 21, wherein the first price is greater than the second price.

29. The purchasing system device of claim 21, wherein the storage device further stores instructions that when executed by the processor result in:
  receiving, from the retailer, information related to an attempt to take possession of the product; and
  transmitting, to the retailer, a verification authorizing the buyer to take possession of the product.

30. The purchasing system device of claim 21, wherein the arranging comprises:
  receiving an indication of payment by the buyer of an amount based on the first price adjusted with a subsequent amount.

* * * * *